United States Patent
Ito et al.

[11] Patent Number: 5,864,374
[45] Date of Patent: Jan. 26, 1999

[54] METHOD AND APPARATUS FOR IMAGE GENERATION

[75] Inventors: Toshio Ito; Yoshisuke Ohtsuru; Hisao Koizumi; Takio Okuda; Yasuhito Myoi; Toshimasa Tomoda; Masaaki Tanaka; Teruo Miyamoto; Toyomi Ohshige; Toshiyuki Yoneda; Fumio Suzuki; Kou Nishino; Kazuaki Matoba; Masanori Kojima; Hiroshi Kawamura; Kenji Kimura; Kenji Samejima; Naoki Kawamoto; Miki Fukada; Haruhiko Nagai; Kenji Maeno, all of Tokyo, Japan

[73] Assignee: Mitsubishi Denki Kabushiki Kaisha, Tokyo, Japan

[21] Appl. No.: 625,004

[22] Filed: Mar. 29, 1996

[30]     Foreign Application Priority Data

Apr. 4, 1995  [JP]  Japan .................................. 7-078993
Aug. 9, 1995  [JP]  Japan .................................. 7-203664

[51] Int. Cl.⁶ ................................ H04N 5/74; H04N 9/31
[52] U.S. Cl. .......................... 348/757; 348/756; 359/638; 359/634; 353/33
[58] Field of Search .................................. 348/750, 751, 348/756, 757, 761; 359/634, 629, 638, 639, 587, 589, 490; 349/8, 9, 57; 353/31, 34, 81, 82, 33; H04N 9/31, 5/74

[56]          References Cited

U.S. PATENT DOCUMENTS

| | | | |
|---|---|---|---|
| 4,544,237 | 10/1985 | Gagnon | 353/31 |
| 5,142,387 | 8/1992 | Shikama et al. | |
| 5,172,254 | 12/1992 | Atarashi et al. | 353/20 |
| 5,270,804 | 12/1993 | Lach . | |
| 5,295,009 | 3/1994 | Barnik et al. . | |

FOREIGN PATENT DOCUMENTS

| | | |
|---|---|---|
| 0 504 813 | 9/1992 | European Pat. Off. . |
| 0 603 583 | 6/1994 | European Pat. Off. . |
| 0 731 603 | 9/1996 | European Pat. Off. . |
| 3 720 375 | 12/1988 | Germany . |
| 61-13885 | 1/1986 | Japan . |
| 1-314289 | 12/1989 | Japan . |
| 4044490 | 2/1992 | Japan .............................. H04N 9/31 |
| 6-281881 | 10/1994 | Japan . |

OTHER PUBLICATIONS

*Japanese Patent Abstracts of Japan,* 100 P 1016, [1–314289].
*Japanese Patent Abstracts of Japan,* 96 P 1333, [3–296030].
*Japanese Patent Abstracts of Japan,* 116 E 1138, [3–201695].

*Primary Examiner*—Michael Lee
*Attorney, Agent, or Firm*—Burns, Doane, Swecker & Mathis, LLP

[57]           ABSTRACT

A dichroic mirror for reflecting red light for optical separating and a dichroic mirror for reflecting red light for optical synthesizing are installed on the same plane in an image generating apparatus of the present invention. In addition, a dichroic mirror for reflecting blue light for optical separating and a dichroic mirror for reflecting blue light for optical synthesizing are installed on the same plane. Accordingly, a compact configuration can be realized. Since a main reflecting mirror is a rotating elliptic mirror and a lamp is located on a focus or around the focus, a lighting equipment which irradiates conic luminous flux can be realized.

12 Claims, 154 Drawing Sheets

Fig.129
RELATED ART

| CHARACTERISTICS & SPEC OF LCD | |
|---|---|
| DISPLAY AREA | 667 × 667 mm² (38 INCHES) |
| RESOLUTION | 3 LINES/mm |
| DISPLAY COLOR | 8 COLORS |
| MAX LUMINANCE | 40 ft-L |
| DISPLAY CONTRAST | >20:1 (MAX 100:1) |
| SCREEN RENEW SP. | 0.5 SEC./SCREEN |
| VISION | ±30 DEG. (HORIZONTAL / VERTICAL) |
| OUTER SIZE | 794(H) ×1040(W) × 650(D) mm³ |
| WHOLE WEIGHT | 65 kg |

DM : DICHROIC MIRROR
FL : FIELD LENS

PROJECTION DISPLAY OF HIGH MOLECULE
DISPERSION TYPE LIQUID CRYSTAL ( LCPC )

Fig.136
RELATED ART

| LAMP | METAL HALIDE | XENON | HALOGEN |
|---|---|---|---|
| LUMINOUS EFFICIENCY | 80lm/W | 30lm/W | 30lm/W |
| COLOR TEMPERATURE | 9000K | 6500K | 3000K |
| LIFE TIME | 2000H | 500H | 100H |

Fig.153
RELATED ART

| TV. METHOD | 525/60 | 625/50 |
|---|---|---|
| SAMPL. NO. PER SCAN LINE<br>LUMINANCE Y<br>CLR DIFFERENCE $C_r$ $C_b$ | 858<br>429 | 864<br>432 |
| SAMPL. FREQ.<br>LUMINANCE Y<br>CLR DIFFERENCE $C_r$ $C_b$ | 13.5 MHz<br>6.75 MHz | |
| EFFCT. SAMP. NO. PER SCAN LINE<br>LUMINANCE Y<br>CLR DIFFERENCE $C_r$ $C_b$ | 720<br>360 | |
| QUANTIZATION | 8 BITS DIRECT QUANTIZATION | |
| LEVEL ALLOCAT.<br>LUMINANCE Y<br>CLR DIFFERENCE $C_r$ $C_b$ | BLACK: 16<br>WHITE PEAK:235<br>$128 \pm 112$ | |

Fig.154
RELATED ART

| | |
|---|---|
| SCAN LINE NO. | 1125 |
| FIELD NO. PER. S. | 60 |
| ASPECT RATIO | 16 : 9 |
| SAMPL. NO. PER SCAN LINE<br>LUMINANCE Y<br>CLR DIFFERENCE $P_r$ $P_b$ | 2200<br>1100 |
| SAMPL. FREQ.<br>LUMINANCE Y<br>CLR DIFFERENCE $P_r$ $P_b$ | 74.25 MHz<br>37.125 MHz |
| EFFCT. SAMP. NO. PER SCAN LINE<br>LUMINANCE Y<br>CLR DIFFERENCE $P_r$ $P_b$ | 1920<br>960 |

Fig.161
RELATED ART

Preparation

Definition of Functions

Note that every length is divided by Mirror focal length
x,r,a:cylindrical coordinates,
  Origin at Top of Parab. & x is axial direction of Lens
rm:radius of Mirror  xm:position of axis direction, fm:Focal length
Pf:Focus of Mirror, Pm:Any Point on Mirror , Ps:Radiating point on Axis
fxb[f,Modification of L,xa]:Lens Equation

```
rm[fm_, xm_]:=2 Sqrt[fm xm]
ab[x_]:=sqrt[x.x]
Pm:={xm,rm[fm,xm] Cos[a],rm[fm,xm] Sin[a]}
pf:={fm,0,0}
Ps:={fm+xs,0,0}
fxb[f_,L_,xa_]:=(-L^2 + f*xa + L*xa)/(f - L + xa)
```

Fig. 162
RELATED ART

Analysis

1. Slope of Light from {fm+xs,0,0}

1.1 Slope of Light {fm+xs,0,0} through Pms

Lm:Mirror length, xs:axial position of an emitted point from Focus,
s:Slope of Emitted Light from the position, asr:aspect ratio of Mirror(=Dm/Lm)

```
a=0
Tan[t]->(Pm-Pf)[[1]]/(Pm-Pf)[[2]]
Normal[Series[Tan[t]-Tan[t-dt],{dt,0,1}]]
Simplify[Solve[xs==rm[fm,xm] %,dt][[1]]/.%%]
asl=s->Simplify[PowerExpand[dt/.%/.xm->fm Xm/
     Solve[Dm==2 rm[fm,Lm],fm][[1]]]]/.
     Solve[asr==Dm/Lm,Lm][[1]]]
```

0

Fig. 163
RELATED ART $$\text{Tan}[t] \to \frac{-fm + xm}{2\sqrt{fm\,xm}}$$

$$dt\,(1 + \text{Tan}[t]^2) \to \frac{2\sqrt{fm\,xm}\,xs}{(fm + xm)^2}$$

$$\{dt \to \frac{32\sqrt{Xm}\,xs}{asr\,Dm\,(1 + Xm)^2}\}$$

Fig.164
RELATED ART

■ 1.2 Change of Slope due to Beam Shaping by relay Lens

Dc:Diameter of Collimated Light Path by Relay Lens
sc:Slope of Light at Collimated Path

```
xc->Normal[Simplify[series[fxb[
    fc,fm,-rm[fm,xm]/dt+fm],{dt,0,1}]]]
Simplify[Normal[series[fxb[
    -fr,fc+fm-fr,xc/.%],{dt,0,1}]]]
sc->-(rm[fm,xm] fr/fc)/(%-(fc+fm-2 fr))
sc/.%/.fr->fc Dc/Dm
sc->%/.asl
```

$$xc \rightarrow fc + fm + (dt*fc^2*(fm*xm)^{(1/2)})/(2*fm*xm)$$

Fig.165
RELATED ART $$fc + fm - 2\ fr - \frac{2\ fr^2\ sqrt[fm\ xm]}{dt\ fc^2}$$

$$sc \rightarrow \frac{dt\ fc}{fr}$$

$$\frac{Dm\ dt}{Dc}$$

$$sc \rightarrow \frac{Dm\ dt}{Dc}$$

☐ Result fs[as,D,xs,xm]: slope of light beam as a function of as,D,xs,Xm
D:Diameter of Light Path, as:aspect ratio of Main Mirror $$fs[asr, D, xs, Xm] := (32 * Xm^{(1/2)} * xs) / (asr * D * (1 + Xm)^2)$$

Fig. 166
RELATED ART

1.3 Average Slope of Light from {fm+xs,0,0} va:angle between Axis & Light from Focus
as:aspect ratio of Main Mirror

```
a=0
Cos[va]->PowerExpand[Simplify[
  (Pf-Pm)[[1]]/ab[Pf-Pm]/.xm->Xm fm]]
Simplify[D[Cos[va]/.%,Xm]]
S->fs[as,D,xs,Xm]/xs D as
Sav->N[Integrate[- (S/.%) %%,{Xm,0,1}]]
sa=Sav xs/D/as/.%

0
```

Fig.167 RELATED ART $$\cos[va] \rightarrow \frac{1 - Xm}{1 + Xm}$$

$$S \rightarrow \frac{-2}{(1 + Xm)^2} \cdot \frac{32 \sqrt{Xm}}{(1 + Xm)^2}$$

$$Sav \rightarrow 8.94985$$

$$8.94985 \, xs \quad \text{as D}$$

Fig.168
RELATED ART

2. Distribution of Slope of Light from Source with length of ls

2.1 Maximum Slope of Light

```
Solve[D[fs[as,D,ls/2,Xm],Xm]==0,Xm][[1]]
sm=N[fs[as,D,ls/2,Xm]/.%]
```

$$\{Xm \rightarrow \frac{1}{3}\}$$

$$\frac{5.19615 \text{ ls}}{\text{as D}}$$

Fig.169
RELATED ART

■ 2.2 Outer Slope of Light

```
so=fs[as,D,ls/2,1]
4 ls
---
as D
```

■ Standard Deviation of Slope of Light

☐ AC Metalhalide with 4mm arc

Distribution of Light Intensity:{{xs,Intensity},....}==
{{-1,0},{-(1-1/4),2.4},{-0.5,3.3}, {0,3.9},{0.5,3.3},{(1-1/4),2.4},{1,0}}

```
fx=Interpolation[{{{-1,0},{-(1-1/4),2.4},{-0.5,3.3},
   {0,3.9},{0.5,3.3},{(1-1/4),2.4},{1,0}}]
Plot[fx[x],{x,-1,1},PlotRange->All]
NIntegrate[fx[x],{x,-1,1}]
RelativeMeanDeviation->NIntegrate[
Abs[x] fx[x],{x,-1,1}]/%
RelativeStDeviation->Sqrt[NIntegrate[
x^2 fx[x],{x,-1,1}]/%%]
SlopeDeviation->sa RelativeStDeviation/
%/.xs->ls/2
```

Fig. 171
RELATED ART

■ Final Result sm : Mean Slope of Light radiated from {fm+xs,0,0},
so:Slope of light emitted from Mirror end
sac : Deviation of Slope emitted from Light Source of ls

```
Clear[sm,so,sa]
sm[asr_,D_,ls_]:= 4.5 ls/(asr*D)
so[asr_,D_,ls_]:= 4.0 ls/(asr*D)
sac[asr_,D_,ls_]:= 2.1*ls/(asr*D)
```

□ Example sac[2,8.0,0.5] 180/3.14

■ Slope at Focus xi: Input of Condenser Lens, xo: Output of Condenser Lens,
y:Locus of Outer Beam, dtf:Slope at Focus

```
fxo[f_,L_,xi_]:=(-L^2 + f*xi + L*xi)/(f - L + xi)
fy[L_,yi_,xo_,x_]:=yi(1-(x-L)/(xo-L))

Normal[Series[fxo[f,0,-D/2/s],{s,0,1}]]
RadiusAtFocus->Series[fy[0,D/2,%,f],{s,0,1}]
Solve[Dp/2==f s,f]/.%
sf->D/2/f/.%
```

$$f + \frac{2 f^2 s}{D}$$

$$\text{RadiusAtFocus} \to f s + O[s]^2$$

$$\left\{f \to \frac{Dp}{2 s}\right\}$$

$$sf \to \frac{D s}{Dp}$$

METHOD AND APPARATUS FOR IMAGE GENERATION

BACKGROUND OF THE INVENTION

1. Field of the Invention

The present invention relates to a color image generation apparatus such as a screen projector and a projection television. The present invention also relates to parts, such as a lighting equipment, an optical mixer and a dichroic filter, used in the color image generation apparatus.

An image generation apparatus, wherein an optical modulation element such as a liquid crystal panel is used, can be classified as follows.

(a) direct-view type display

An image formed by an optical modulation effect of the liquid crystal panel and a polarization film is viewed directly without being magnified. Display of this type is used for watches, notebook type personal computers and various electric appliances.

(b) projecting type display

An image formed by projecting light on the liquid crystal panel and a polarization element, which have an optical modulation effect, is projected on a screen with being magnified. Depending upon the number of the liquid crystal panels, there are two methods in the projecting type display. One is a single-panel-method having only one panel and the other is a plural-panels-method having more than two or three panels.

The present invention relates to the plural-panels-method of the projecting type display. The present invention also relates to a lighting equipment for irradiating the liquid crystal panel. Particularly, the present invention relates to an image generation apparatus wherein a basis that human visual characteristic has a high resolution for luminance (bright or dark) and a low resolution for color is applied.

2. Description of the Related Art

Related Art 1.

FIGS. 121 and 122 show configurations of optical systems of conventional liquid crystal projecting apparatus in which the single-panel-method is applied. In this single-panel-method, one liquid crystal panel having a polarization film is used as optical modulation means.

There are two methods of projecting: one is a rear projection and the other is a front projection. FIG. 121 shows the rear projection method. FIG. 122 shows the front projection method. (Reference: "Everything of Liquid Crystal Display" by Akio Sasaki and Shouhei Naemura, Kougyou Cyousakai Company, Apr. 22, 1994 p. 210)

In FIGS. 121 and 122, a lamp (light source) 10, a main reflecting mirror 11, a condenser lens 12, a light source system 1 including the lamp 10 and the main reflecting mirror 11, a color filter CF formed like mosaic on a liquid crystal panel (LCD: Liquid Crystal Display) 300, a projection lens 50 for magnifying and projecting an image of the liquid crystal panel passed through the color filter CF onto a screen 60, are shown.

Although display luminance is lessened to one-third by the color filter CF, the color filter is utilized because of its simplicity.

Related Art 2.

FIG. 123 shows a three-panels-method which is currently used. The present invention relates to the three-panels-method. FIG. 123 shows a configuration of optical system in a conventional liquid crystal projecting apparatus wherein three liquid crystal panels are used. The three liquid crystal panels of three primary colors, red (R), green (G) and blue (B), are used as the optical modulation means in order to avoid luminance reduction caused by the color filter in the single-panel-method.

The followings are shown in FIG. 123. The lamp 10, the main reflecting mirror 11, the light source system 1 including the lamp 10 and the main reflecting mirror 11, and a mirror 2 for spectral-separation and reflection are provided. In addition, a first dichroic mirror 21 which transmits blue components and reflects red components and green components, in the white light of the lamp 10 is shown. A second dichroic mirror 22 reflects only the green components in the red light and the green light which have passed through the first dichroic mirror 21. Then the second dichroic mirror 22 supplies the green components to a liquid crystal panel 31 for green. Reflecting mirrors 23 and 24 supply the red light and blue light spectral-separated in the first and second dichroic mirrors, to a liquid crystal panel 30 for red and a liquid crystal panel 32 for blue. A third dichroic mirror 40f and a fourth dichroic mirror 41f synthesize light passed through one of liquid crystal panels 30, 31 and 32 for red, green and blue. The projection lens 50 magnifies and projects an image synthesized in the third dichroic mirror 40f onto the screen 60. The liquid crystal panels 30, 31 and 32 for red, green and blue are located at places whose optical path lengths from the lamp 10 are equal and optical path lengths to the projection lens 50 are also equal. Namely, optical path lengths from the lamp 10 to the projection lens 50 through each of the liquid crystal panels 30, 31 and 32 are equal.

Liquid crystal panels having seventy thousand pixels through three hundred thousand pixels are used for red, green and blue in the liquid crystal projector of the prevailing three-panels-method.

Operation of the liquid crystal projector of the three-panels-method will now be explained.

The light source system 1 is composed of the lamp 10 and the main reflecting mirror 11. A subsidiary reflecting mirror, not shown in FIG. 123, is sometimes provided for returning light irradiated forward, to the main reflecting mirror. This is a reason for naming the mirror 11 the main reflecting mirror. Almost parallel white output light 100 is output from the light source system 1.

A white light source, such as a metal halide lamp, xenon lamp and halogen lamp, is used as the lamp 10. A reflecting surface of the main reflecting mirror 11 is used as light collecting means. A rotating parabolic surface is usually used for the reflecting surface of the main reflecting mirror 11. By locating a center of emission of the lamp 10 at about a focal point of the rotating parabolic surface, almost parallel output light 100 can be obtained.

The output light 100 is separated into three monochromatic lights by the first dichroic mirror 21 and the second dichroic mirror 22. The first dichroic mirror 21 transmits the blue light and reflects the green light and the red light. The second dichroic mirror 22 reflects the green light and transmits the red light. The three monochromatic lights are a red monochromatic light 100R, a green monochromatic light 100G and a blue monochromatic light 100B. An optical path of the red monochromatic light 100R is turned at the reflecting mirror 24 and input into the liquid crystal panel 30 for red. An optical path of the blue monochromatic light 100B is turned at the reflecting mirror 23 and input into the liquid crystal panel 32 for blue. An optical path of the green monochromatic light 100G is turned at the second dichroic mirror 22 and input into the liquid crystal panel 31 for green.

Each of the liquid crystal panels 30, 31 and 32 generates a monochromatic image corresponding to each of R signal, G signal and B signal. The R, G and B signals are monochromatic picture signals decoded from color signals in picture signals. Each of monochromatic lights, red, green and blue input into the liquid crystal panels 30, 31 and 32 is controlled its strength of the light by passing through the liquid crystal panels 30, 31 and 32. Namely, each of monochromatic lights is modulated optically.

Then, the light optically modulated is synthesized to luminous flux again at the third and fourth dichroic mirrors 40f and 41f. The third and fourth dichroic mirrors 40f and 41f are means for synthesizing each monochromatic light. The synthesized luminous flux is input into the projection lens 50 and magnified by specific magnification. Then, the magnified luminous flux is projected onto the screen 60.

Compared with the single-panel-method in which three primary colors are realized by using one liquid crystal panel, the three-panels-method wherein three plates (liquid crystal panels) are used has an advantage that high precise picture quality can be obtained.

The followings are some disadvantages of the three-panels-method.

(1) configuration is complicated
(2) a large number of components are indispensable (ex. lens, dichroic mirror)
(3) accuracy of optical axis should be enhanced Related Art 3.

A configuration in FIG. 124 is devised for improving the disadvantages of FIG. 123. The main optical system is composed of the lamp 10 (metal halide lamp), a condenser lens 12, dichroic mirrors 36 and 37 (since crossly located, commonly called a cross dichro), three liquid crystal panels 30, 31 and 32 for red, green and blue, a dichroic prism 45, the projection lens 50, field lenses 12a and so forth.

FIGS. 125 and 126 show configurations of the cross dichro. The dichroic mirrors 36 and 37 are jointed crossly at joints 36t and 37t. One side of the dichroic mirror 36 is coated with multilayer thin film element 36m and that of the dichroic mirror 37 is with multilayer thin film element 37m. The multilayer thin film elements 36m and 37m are for separating or synthesizing the light. Since it is possible that components for separating or synthesizing the light become one module by using the cross dichro and the dichroic prism 45, the configuration in FIG. 124 is simpler than that of FIG. 123. Namely, comparing with the configuration of FIG. 123, the number of the components is less and the accuracy of the optical axis can be higher in FIG. 124.

Now, operation of the liquid crystal projector shown in FIG. 124 will be explained.

The output light 100 from the metal halide lamp used as the lamp 10 is separated into the monochromatic lights 100R, 100G and 100B by the cross dichro made of the dichroic mirrors 36 and 37. The lights 100R, 100G and 100B are monochromatic lights of the three primary colors R, G and B. The lights of R and B are turned 90 degrees at reflecting mirrors 23, 24, 25 and 26 and sent to the dichroic prism 45. On the other hand, the light of G is sent to the dichroic prism 45 directly passing an optical path shorter than that of R or B, without passing any reflecting mirror. The three liquid crystal panels 30, 31 and 32 for displaying each color image of R, G and B are installed at entrances of the dichroic prism 45. The light of R, G or B is input into each of the three liquid crystal panels 30, 31 and 32. The lights of R, G and B are modulated and transmitted respectively by one of the three liquid crystal panels, and are synthesized at the dichroic prism 45. Then the synthesized light is magnified and projected onto the screen by the projection lens 50.

A disadvantage of optical transmission systems in the Related Arts 2 and 3 is that the dichroic prism, which is expensive, is necessary for optical synthesizing instead of the cross dichro when the distance between the liquid crystal panel and the dichroic prism is short. The reason for this is that if the cross dichro is used for optical synthesizing instead of the dichroic prism, joints 36t and 37t of the cross dichro are projected on the screen.

A technique for solving the above problem by soaking the cross dichro in liquid is disclosed in Unexamined Japanese Patent Publications 1-214801 and 5-241018.

In addition, the optical path lengths of red and blue between the cross dichro and the dichroic prism are longer than that of green. Since there is inconsistency in the optical path lengths, it is difficult to execute various optical systematic adjustments. This is also the problem of the optical transmission system of the Related Art 3 shown in FIG. 124.

In the optical transmission system of the Related Art 2 shown in FIG. 123, the optical path lengths are equal. Although the optical transmission system of the Related Art 3 shown in FIG. 124 has an advantage of simplifying the configuration by using a small number of components, it has the disadvantage that its optical path lengths are not equal.

Related Art 4.

FIG. 127 shows a perspective illustration of one example of a conventional liquid crystal color projecting apparatus disclosed in Unexamined Japanese Patent Publication 6-281881.

The light source system 1 including the main reflecting mirror 11, an optical separating/synthesizing apparatus 81, a liquid crystal light valve 51 including a polarizing plate, and a projecting optical system 19 are provided in a liquid crystal color projecting apparatus 80. The optical separating/synthesizing apparatus 81 separates light from the light source system 1 into three primary colors and synthesizes the light serially.

The optical separating/synthesizing apparatus 81 includes the followings. Color-separation optical means 82 separates the light from the light source system 1 into three primary color lights of red, green and blue. Each of optical path opening/closing optical means 83, 84 and 85 respectively transmits or shuts down the primary color light separated by the color-separation optical means 82, in order of red light, green light and blue light at a desired timing.

Color-synthesis optical means 86 serially synthesizes the primary color lights of red, green and blue transmitted through the optical path opening/closing optical means 83, 84 and 85 in order of red, green and blue. Right-angle prisms 87, 88 and 89 lead the primary color lights transmitted through the color-separation optical means 82, to the optical path opening/closing optical means 83, 84 and 85 as a light leading system.

The color-separation optical means 82 is located on the color-synthesis optical means 86. The light source system 1 is located near a light input surface 82a of the color-separation optical means 82, facing the light input surface 82a. The liquid crystal light valve 51 is located near a light output surface 86a of the color-synthesis optical means 86, facing the light output surface 86a. Namely, the liquid crystal light valve 51 is located under the light source system 1.

The color-separation optical means 82 and the color-synthesis optical means 86 have identical configurations. In the above configurations, a dichroic prism wherein a dichroic multilayer film 892 for reflecting red and a dichroic multilayer film 893 for reflecting blue are crossed, is used. Each optical path opening/closing optical means 83, 84 or 85 is located facing each of three surfaces, one of which, denoted by 86b, faces the light output surface 86a and two of which cross the surfaces 86a and 86b orthogonally. The optical path opening/closing optical means 83, 84 and 85 transmit or shut down the red light, green light and blue light separated by the color-separation optical means 82, by being controlled on or off in turn at the desired timing. The red light, green light and the blue light phase-converted to light of S polarization are input into the color-synthesis optical means 86 again serially in order of red light, green light and blue light.

The right-angle prisms 87, 88 and 89 are used as the light leading optical system. Bottoms of the right-angle prisms 87, 88 and 89 are located on three sides of the color-separation optical means 82 and the color-synthesis optical means 86, excepting the side which faces the light source. Accordingly, each slope of the right-angle prisms 87, 88 and 89 slopes 45 degrees with respect to the surface facing the color-separation optical means 82 and the color-synthesis optical means 86. The red light, green light and the blue light output from the color-separation optical means 82 hit the upper slopes 1104 of the right-angle prisms 87, 88, 89, and are reflected totally, downward vertically. Then, the reflected lights hit the lower slopes 105 and are reflected totally and horizontally. The reflected lights are input into each of the optical path opening/closing optical means 83, 84 and 85.

Similar configurations to the configuration of FIG. 127 are disclosed in Unexamined Japanese Patent Publications 1-314289, 3-245136, 6-242414, 5-244616 and "46.4: Avionics Color Display Using LCD Projection Technology" by J. A. Fowler and R. Blanchard, Hughes Aircraft Co., Carlsbad, Calif. 912 SID 92 DIGEST.
Related Art 5.

FIG. 128 shows a conventional liquid crystal projector disclosed in Unexamined Japanese Patent Publication 6-214208.

The liquid crystal projector has two-layers structure of optical separation system and optical synthesis system. In the liquid crystal projector, the number of installed dichroic filters is reduced by extending two dichroic filters of the above two optical systems to the both layers and unifying them. The two layers, first layer and second layer, are arranged top and bottom. The two dichroic filters 20 and 21 are arranged parallel or orthogonally by being extended from the first layer to the second layer. An optical separation system 120 separates light from the light source 1 into plural color lights in order. An optical synthesis system 160 synthesizes each color image. The optical separation system 120 is provided in the first layer and the optical synthesis system 160 are provided in the second layer. Liquid crystal display panels 13, 14 and 15 which display images corresponding to each color and a projection lens 18 located overlapping the light source are provided in the second layer. The reflecting mirrors 23, 24 and 25 reflecting optical path of each color, from the first layer to the second layer are also provided.

Characteristics and specifications of LCD used in the stated Related Arts will now be described with reference to FIG. 129.

In the Related Art, a multi color image of diagonally 38 inches can be displayed in a cabinet of 650 mm deep by applying the rear projection method using three reflecting mirrors. Panel size of ferroelectricity LCD for Black/White (B/W) light shutter is 3.34 inches diagonally. Electrode dot structure is 2000×2000. Resolution of a projected image is 3 lines/mm. Maximum luminance 40 ft-L, maximum contrast 100:1 can be obtained by using a metal halide lamp of 250 W. (Reference: "Color Liquid Crystal Display" by Shunsuke Kobayashi, Sangyo Tosho Company, Dec. 14, 1990, pp. 111–113)
Related Art 6.

The liquid crystal panel used for optical modulation will now be described.

FIGS. 130 and 131 illustrate operations of a liquid crystal panel of 90 degrees twisted nematic (TN). (Reference: "Color Liquid Crystal Display" by Shunsuke Kobayashi, Sangyo Tosho Company, Dec. 14, 1990, p. 1)

FIG. 130 illustrates how a polarization light of input light, in the rubbing direction P of a polarizing plate (or polarizer), is transmitted when applied voltage of the liquid crystal panel is off (=0). FIG. 130 also illustrates how the polarization light of the input light passes through the polarizing plate (or polarizer, analyzer) at the output side, whose rubbing direction A is twisted 90 degrees with respect to the rubbing direction P. On the other hand, FIG. 131 shows that the input light is blocked by the polarizing plate (or polarizer, analyzer) at the output side when the applied voltage of the liquid crystal panel is on. This explanation for TN describes one example of controlling a polarization direction with keeping the state of direct polarizing. There are simple nematic, vertical array nematic, super twisted nematic (STN) and so forth in the nematic liquid crystal.

Polarizer is needed for obtaining a polarization light necessary as an incident light of TN type liquid crystal. A polarization film is most generally used as the polarizer. However, since the polarization film absorbs a wave P or a wave S from the light source, quantity of light used effectively for image forming of optical modulation means of the liquid crystal is less than 50%. Namely, there is the problem that it is difficult to obtain a bright image. In addition, there is also the problem that the polarizer of the polarization film easily deteriorates since absorbed light by the polarizer is converted to heat and makes temperature of the polarization film increase. Concretely, the polarizer can be tolerant of only one million lux though the liquid crystal panel is tolerant of five million lux. It is desirable to irradiate light up to the limit of the liquid crystal panel in order to improve image quality. However, heat resistance performance of the polarization film prevents from irradiating the light up to the limit of the liquid crystal panel.

So as to solve the above problems, a technique of cooling the liquid crystal panel by soaking it in liquid is disclosed in Unexamined Japanese Patent Publications 4-31847 and 6-118371.
Related Art 7.

A polymer dispersed liquid crystal panel does not need the polarizer having the above problems. In the method of the polymer dispersed liquid crystal panel, a plurality of sphere small drops of the nematic liquid crystal are dispersed into polymer. An array of liquid crystal molecule in each of the sphere small drops is changed depending upon an electric field. Then, a refractive index change caused by the array change is applied. When applied voltage in the electric field is off, optic axes of the liquid crystal are irregularly directed as shown in FIG. 132, and transmitted light is irregularly reflected to be opaque white. When the applied voltage in the electric field is on, the optic axes of the small drop are arranged in the direction of the electric field as shown in FIG. 133. Then, the refractive index of the light is almost coincident with the refractive index of the polymer, which makes the dispersion decrease and the transmitted light becomes almost transparent. (Reference: "Everything of Liquid Crystal Display" by Akio Sasaki and Shouhei Naemura, Kougyou Chousakai Company, Apr. 22, 1994 p. 32)

When degree of parallelization of a projected light is high, a remarkable contrasted modulated light can be obtained in the configuration of FIG. 134. (Reference "Liquid Crystal Display Technique in Next Generation" by Tatsuo Uchida, Kogyou Chousakai Company, Nov. 1, 1994, p 229)
Related Art 8.

In order to overcome the problem of the polarizer absorbing the light from the light source more than 50% and converting it to the heat, a polarization converting element shown in FIG. 135 has been considered. Light from the light source is separated into the wave P and the wave S by a polarization beam splitter 952. The waves P and S are direct polarization light and polarization surfaces of the waves P and S go orthogonally. Polarization direction of the wave S is turned 90 degrees at a ½ wavelength plate 953, and so all the waves become the wave P. A disadvantage of the configuration is that a section shape of the optical path after being polarized becomes a rectangle whose ratio of length to breadth is 1:2 as shown in FIG. 135. Therefore, it sometimes has difficulty in improving light utilization efficiency.
Related Art 9.

Now, the light source will be described. It is necessary to have enough brightness in the projecting type liquid crystal projector. In order to realize the brightness, a bright light source is needed.

Requiring the enough brightness of the light source indicates that the light source size becomes large. According to Boltzman law and Wien law, it is impossible to downsize the light source size below a specific amount. Life time of the light source and color temperature are also factors of not allowing the downsizing of the light source. In addition, it is inevitably necessary for the light source to have some length when long life time of the light source is required.

FIG. 136 shows characteristics of various light sources. When long life time of thousands of hours is required in the case of metal halide lamp having adequate temperature, an arc length decided by an electrode distance of discharging, that is the light source length, is 5 mm. FIG. 137 shows space distribution of emission luminance which is 250 W and whose arc length is 5 mm.

Assuming that the brightest emission light is 1.0 in FIG. 137, values less than 1.0 are weighted based on 1.0 as a standard.

FIG. 138 shows a metal halide lamp of 250 W used in a conventional liquid crystal projector.

The metal halide lamp is composed of the lamp 10 and the main reflecting mirror 11. The main reflecting mirror 11 is a rotating parabolic mirror, for instance. The metal halide lamp includes a filter 149 for blocking light in a band wherein unnecessary heat for the optical system, such as infrared radiation, is generated. The infrared radiation heats the main reflecting mirror. In order to treat (cool) the heat, it is necessary for the main reflecting mirror to be a specific size. A diameter of the lamp shown in FIG. 138 is 80 mm (8 cm).

FIG. 139 shows an example of the light source system used in a conventional liquid crystal projecting apparatus. The lamp 10, the main reflecting mirror 11 and a subsidiary reflecting mirror 16 made of the rotating parabolic mirror having the same focus with the main reflecting mirror 11, are provided in the liquid crystal projecting apparatus. By installing the subsidiary reflecting mirror 16, luminous flux dispersed forward, which has not been treated in the case of the subsidiary reflecting mirror being not provided, can be effectively utilized.
Related Art 10.

The dichroic mirror will now be described. The dichroic mirror is a glass plate whose surface is coated with a multilayer thin film. Owing to an optical interference function of the thin film, some light whose wavelength is more than a fixed value, in the light input at a specific incident angle, is reflected and other light is transmitted. Namely, the dichroic mirror has a function of optical filter. The dichroic mirror is sometimes called a dichroic filter.

The function is greatly various depending upon the incident angle of input light, which is a problem. FIGS. 140 and 141 show examples of characteristic of the dichroic mirror being dependent upon the incident angle. FIG. 140 shows the characteristic of green being dependent upon the incident angle, by the quadrature axis of wavelength of the input light and the vertical axis of transmittance of the wave P. FIG. 141 shows the characteristic of red being dependent upon the incident angle, by the above-mentioned quadrature axis and the vertical axis. When the incident angle changes ±5 degrees, the characteristic changes largely.

A center value of the incident angle can be freely changed to some extent depending upon the configuration of the thin film. However, a filter function decline caused by large dispersion of the incident angle depends upon substance of the thin film configuration, which can not be improved. This problem is characteristic and substantial for not only the dichroic mirror but also an element wherein the multilayer thin film is used.

The polarization beam splitter is also the element wherein the multilayer thin film is used. The polarization beam splitter has a function of polarization separation realized by the thin film effect. Accordingly, a separation characteristic depends upon the incident angle.

FIGS. 142, 143 and 144 show the characteristic of the polarization beam splitter, that is being dependent upon the incident angle, by the quadrature axis of wavelength of the incident light and the vertical axis of transmittance of the waves P and S.

In FIGS. 142, 143 and 144, TP denotes the transmittance of the wave P and TS denotes that of the wave S. TH indicates an average of TP and TS.

FIG. 142 shows the case of the incident angle being 45 degrees ±0 degrees. FIG. 143 shows the case of the incident angle being 45 degrees−2 degrees=43 degrees. FIG. 144 shows the case of the incident angle being 45 degrees+4 degrees=49 degrees. Similar to the dichroic mirror, the characteristic of the polarization beam splitter considerably changes depending upon the incident angle change of around ±5 degrees.

Compared with the element wherein the multilayer thin film is used, the characteristic depending upon the incident angle is not so conspicuous in the TN type liquid crystal panel because the TN type liquid crystal panel is not the element made of multilayer thin film. However, it is necessary to take the following two phenomena (a) and (b) into consideration.

(a) Phenomenon caused by product of refractive index anisotropy Δn of liquid crystal and thickness d of liquid crystal The phenomenon is dependent upon the product Δn×d. The product Δn×d is made by multiplying refractive index anisotropy Δn of liquid crystal and the depth d of liquid crystal. (Reference: "Everything of Liquid Crystal Display" by Akio Sasaki and Shouhei Naemura, Kougyou Cyousakai Company, Apr. 22, 1994 p. 143) As shown in FIG. 145, the characteristic changes depending upon the incident angle (angle of view). The characteristic depending upon the incident angle changes based on a direction of the incident angle. FIG. 146 shows one example of this characteristic. FIG. 146 shows a luminance characteristic, being dependent upon the angle of view, of a liquid crystal panel of 1.3 inches. Each circle indicates the angle of view being 10 degrees, and the case of the luminance being various depending upon the direction of the incident angle is shown. In FIG. 146, the smaller the value is, the higher the luminance is. These values are measured in the case that the rubbing directions of the liquid crystal panel are up-and-down and right-and-left. In FIG. 146 case, for instance, the phenomenon of the characteristic being dependent upon the incident angle becomes a problem when spread of the incident angle exceeds ±10 to 15 degrees. (Reference: "Basis of Liquid Crystal and Display Application" by Katsumi Yoshino and Masanori Ozaki, Korona Company, 1994)

(b) Phenomenon caused by crosstalk

The phenomenon is generated when light of high luminance, the incident angle of which is more than a specific value, is input since a glass plate for enclosing the liquid crystal has some thickness. FIG. 147 shows a basis of the phenomenon. Generally, in the case such as the projecting type, when a TFT (Thin Film Transistor) for driving the liquid crystal is directly projected by the light of high luminance, dark current flows in a transistor circuit of the TFT. Consequently, a condenser which has a memory function formed in the TFT, discharges early and contrast of the liquid crystal declines. In order to prevent this phenomenon, a surface of the liquid crystal of the TFT is coated with chrome mask for cutting the light off, in the projecting type liquid crystal panel. However, as shown in FIG. 147, when the incident angle is more than a specific value, slanting light is reflected at one of glass plates for enclosing the liquid crystal, that is, at opposite side with respect to the liquid crystal. Therefore, the TFT is projected from the rear side having no chrome mask. Although reflectance of the glass is about 4%, the above phenomenon becomes a problem when light of high-density is projected on a high light-resistant panel, such as polycrystalline silicon (poly. Si) liquid crystal panel. It is necessary to take measures of antireflection for the side which reflects the problematic light.

The polymer dispersed liquid crystal will now be described.

Generally, it is possible to make the light whose solid angle is corresponding with angular dispersion ±dθ of light slanting by providing a convex lens and an adequate aperture diaphragm on an optical path wherein light is collimated.

If the polymer dispersed liquid crystal is provided between the lens and the light source, all the parallel beam whose maximum dispersion is ±dθ can be transmitted. However, in light dispersed at the polymer dispersed liquid crystal panel, only the light, which is in the solid angle of dθ in dispersion solid angle Ω, can be transmitted. Accordingly, contrast of the dispersion type liquid crystal is expressed in the following expression.

$$\text{Contrast} = \Omega/\{2\pi(1 - \cos d\theta)\}$$
$$\approx \Omega/\{\pi d\theta^2\}$$

On the other hand, dθ can be expressed in the following expression if contrast of value Co is required.

$$d\theta = (\Omega/\pi/Co)^{1/2}$$

Supposing that Co is 100, dθ can be expressed as follows.

$$d\theta = 3.24\Omega^{1/2} \text{ degrees}$$

Even if the dispersion type liquid crystal shows an ideal characteristic, a permissible value of the dispersion is 8 degrees.

Since the dispersion solid angle Ω is actually smaller, the polymer dispersed liquid crystal allows only a dispersion angle value which is close to the permissible value of dispersion angle of an element in which thin film is used, such as the cross dichro and the polarization beam splitter.

Because of the above reason, the following has been considered to be necessary in a configuration of the optical transmission system, which mainly includes the main reflecting mirror 11, the condenser lens 12 and the projection lens 50 shown in FIG. 122 for instance, in the conventional projecting type liquid crystal projector. It has been considered to be necessary to make the optical transmission system close to a telecentric system using the main reflecting mirror as a rotating parabolic mirror and the condenser lens as a long focus lens, and to make the light be parallel light as much as possible.

Even the telecentric system has some problems. Although the light irradiated from the part at the focus of the main reflecting mirror 11 in FIG. 138 become parallel, other light irradiated from the other part is slanting and not parallel. The maximum value dθ of the slant is in proportion to an arc length is located at the optical axis, and in inverse proportion to a diameter Dm of the main reflecting mirror and aspect ratio asr of the main reflecting mirror. The above can be easily proved and explained with reference to FIGS. 148 to 150 and mathematical expressions in FIGS. 161 to 172.

As long as the arc length ls is finite, it is necessary even for the telecentric system to make the diameter Dm of the main reflecting mirror comparatively large in order to control the maximum value dθ of the slant to be within a tolerance of the thin film element. Supposing that the tolerance of the thin film element such as a dichroic mirror and polarization separation element is 6 degrees, the value of the diameter of the main reflecting mirror can not be less than 7.5 cm (3 inches) on condition that the light source whose arc length is 5 mm and the conventional main reflecting mirror whose aspect ratio is less than 2 is used. The aspect ratio is a value expressed by the diameter Dm of the main reflecting mirror/length Lm of the main reflecting mirror. In the configuration of the conventional lamp as shown in FIG. 138, a front end of the main reflecting mirror is located forward with respect to the light source, which increases light collecting efficiency and then the aspect ratio is around 2.

Accordingly, each optical component in the telecentric system is large, which makes the cost high.

Especially when size of the liquid crystal panel is large, there is a possibility of not only the cost of the TFT but also the cost of peripheral equipment becoming rather high. Regarding the material of the TFT, it is ideal to use polycrystalline silicon (poly. Si) having high mobility. However, it is necessary to use quartz glass for the poly. Si because of high temperature treatment. The cost of the quartz glass is much higher than that of other material. Therefore, amorphous silicon (a-Si), which does not need to use the quartz glass, is currently used in a large size liquid crystal panel. The size of the liquid crystal panel used for projecting is mainly 3 inches (7.62 cm) or 3.26 inches (8.28 cm), for instance.

FIG. 151 shows a relation between the light source and the liquid crystal panel in the case that the light source of the telecentric system shown in FIG. 138 is applied in the liquid crystal panel of 3 inches or 3.26 inches or in a filter system of the same size. The main reflecting mirror, whose diameter is 8 cm or 9 cm, projects parallel light on a panel of 7.62 cm to 8.28 cm with an angular dispersion of ± around 8 degrees.

Now, the optical transmission system of a projecting apparatus wherein the liquid crystal panel whose poly. Si is small to be around 1.3 inches is used, will be described. In this case, it is also necessary for the diameter of the main reflecting mirror to be around 3 inches, based on the efficiency of a thin film element in use. Therefore, as shown in FIG. 152, only a part of the parallel light from the light source is projected on the liquid crystal panel, which brings about a decline of the luminance on the screen. However, comparing with the case of the amorphous silicon of 3 inches, it is possible to prevent the luminance decline to some extent in the case of the poly. Si by increasing an aperture efficiency more than twice, because of a high mobility of the poly. Si. Since an optical path diameter and an optical path length can be small, the apparatus can be compact. In this respect, the apparatus of the case can be a meritorious product. In proportion to downsizing and decreasing weight of a telecommunication apparatus caused by progress of semi-conductor technique, it is required for the projector as an information display apparatus to be compact.

Related Art 11.

Image signals input into Cathode-Ray Tube (CRT) and the liquid crystal panel will now be described. Taking a response time characteristic of human vision into consideration, an image frame is transmitted every 30 ms in a common TV broadcast. In this case, the image signals are transmitted as forms of luminance signal Y and color difference signals U and V. The followings show relations between the signals of luminance and color difference, and values of the color signals R, G and B of red, green and blue. The color signals R, G and B can be easily reproduced by calculating the following expressions.

$$Y = 0.30R + 0.59G + 0.11B \quad (1)$$

$$U = R - Y \quad (2)$$

$$V = B - Y \quad (3)$$

A color television broadcast system of National Television System Committee (NTSC) is a typical example of narrowing a band of electric wave for broadcasting, by signal compression applying the above basis and a human visual characteristic for chromaticity recognition function.

The electric wave for broadcasting is sent to each house by applying a characteristic of human vision wherein a recognizable resolution of the color signal is low comparing with one of the luminance signal. In this case, bandwidths of the color difference signals U and V, in which the resolution can be low, are 1.5 MHz and 0.5 MHz, and the bandwidth of the luminance signal, in which the resolution should be high, is enhanced to be 4.5 MHz.

Coding of the image signal will now be explained. A method that the luminance signal Y and the color difference signals U and V, which compose the image signal, are respectively converted into digital codes, is called component coding. An input image signal in this coding method is called a component image signal.

It is a respect to be considered how a transmission rate (transmittable bit in a unit time, Mb/second) or a data amount of referred pixel is decreased, when the component image signals Y, U and V are transmitted or memory process is performed, by the component coding method.

Supposing that the luminance signal Y and the color difference signals U and V are digital signals in the coding method, the following three component coding methods can be expressed, for instance. The three component coding methods are different depending upon taken consideration for human visual characteristic.

$$(A) \ Y{:}U{:}V = 4{:}4{:}4 \quad (4)$$

$$(B) \ Y{:}U{:}V = 4{:}2{:}2 \quad (5)$$

$$(C) \ Y{:}U{:}V = 4{:}1{:}1 \quad (6)$$

In the above method (A), which is a basic method, all of the transmission rates (or the number of data of referred pixel) of digital data of the luminance signal Y and the color difference signals U and V are equal, and the human visual characteristic has not been considered. In the methods (B) and (C), the human visual characteristic has been considered, and the color difference signals are processed (transmitted or memory processed) in the transmission rate (or data amount of referred pixel) corresponding to ½, ¼ of the transmission rate (or data amount of referred pixel) of the digital data of the luminance signal Y.

It is natural that image quality of the color difference signal declines in order of (A), (B) and (C). Since human visual characteristic is that color resolution is low for the luminance signal, the above methods (B) and (C) are practically used without any problem.

FIG. 153 shows a typical example of 4:2:2. (Reference: "Digital Circuit of Television Signal" by Etoh and Achiba, Korona Company, Sep. 25, 1989 pp. 8–10.) According to parameter of FIG. 153, the transmission rate (Mb/s) is 216 Mb/s (=8 bits×13.5M+8 bits×6.75M×2) in a serial transmission method, and 27 Mb/s (13.5M+6.75M×2) per transmission line in a parallel transmission method having nine transmission lines of eight data lines and one clock. Practically, redundant bit is needed in the above. Supposing that the redundant bit is 1 bit for data of 8 bits, the transmission rate is 243 Mb/s (=9×13.5M+9×6.75×2) in the serial transmission method.

In the case that the transmission lines of the luminance signal and the color difference signal are separated into two lines in parallel (the redundant bit is omitted), each of the luminance signal and the color difference signals U and V can be 108 Mb/s by using the above calculation. Then, it is supposed to add one clock transmission line of 108 Mb/s. In any case, the transmission line tolerant of the transmission rate of around 100 Mb/s is needed. The coding method of 4:2:2 shown in the above (B) is a standard recommended by General Meeting of CCIR (CONSULTIVE COMMITTEE INTERNATIONAL RADIO) used in a studio for a digital television and used for DI format of a digital VTR.

As a reference, FIG. 154 shows a proposed HDTV coding method described in the "Digital Circuit of Television Signal" (p. 10). In the case of the High Definition Television (HDTV) coding method, 148.5 Mb/s (74.25M+37.125M×2) is necessary in the parallel method, and 1188 Mb/s (148.5M×8) in the serial method.

In the case of 4:1:1 of the method (C), the luminance signal is 108 Mb/s and the color difference signals U and V are 54 Mb/s when the transmission lines are separated into two lines in parallel as the above (the redundant bit is omitted).

If the transmission rate for the color difference signal (or data amount per referred pixel) is suppressed to be lower than the component signal in the case of 4:1:1 of the method (C), the image quality naturally deteriorates. (case of 4:0.5:0.5=8:1:1, for instance)

However, there are advantages as follows. Since data amount of the image is wholly lessened, memory amount, circuit scale and consumption power, used in digital image apparatus, can be lessened. As the image data amount is lessened, specific data, such as data of one frame, can be transmitted in a short time when the same transmission rate is used. It is also possible to transmit more redundant data, character data and encoded data in a specific time.

Conventionally, taking the above advantages and the disadvantage of the image quality deterioration into consideration, 4:1:1 is actually used as a practical level coding method.

FIGS. 155, 156 and 157 show models of pixel configuration in each of the stated methods 4:4:4, 4:2:2 and 4:1:1.

There is a conventional signal processing apparatus in which the component image signals, made of the luminance signal Y and the color difference signals U and V of 4:4:4, are input and the luminance signal Y and the color difference signals U and V of 4:2:2 or 4:1:1 are output. In the signal processing apparatus, a specific filtering process, with respect to sampling frequency ratio 4:2:2 or 4:1:1, is performed for the luminance signal Y and the color difference signals U and V. It is well known that method conversion from the coding method of 4:4:4 to the coding method of 4:2:2 or 4:1:1 is performed in a signal processing block shown in FIG. 158.

Related Art 12.

Conventionally, an image source in image data is formed in proportion to a ratio of length to breadth of a final image. The liquid crystal panel used in image generation means is also formed in proportion to the ratio of the length to breadth.

The above will now be explained with reference to FIG. 159 showing one example of the conventional image generation apparatus.

A liquid crystal panel 910 has the same ratio of length to breadth as that of a desired image for generating, in the conventional image generation apparatus. Supposing that the ratio of length to breadth of the desired image for generating is 3:4, the ratio of length to breadth of physical form of the liquid crystal panel 910 is 3:4. An image signal 900 input into the liquid crystal panel 910 has the same ratio of length to breadth as that of the liquid crystal panel 910.

An image generation means 920 inputs the image signal 900 into the liquid crystal panel 910. The image generation means 920 modulates light 905 optically based on the input image signal 900 and generates an optically modulated image 930.

Since the conventional image generation apparatus is constructed as the above, it is restricted to use the liquid crystal panel corresponding to the ratio of length to breadth of an input picture source. It is also restricted to use the liquid crystal panel corresponding to an aspect ratio (ratio of length to breadth) of the picture finally seen by the user.

Because of the above restriction, since a section of the optical path of the light source is generally circular, utilization efficiency of the light source is extremely decreased in the case of a high definition television whose ratio of length to breadth is large to be 9:16, for instance. Although the utilization efficiency of a square panel is 64%, that of the case of 9:16 is 54%.

A shape, with which the panel can be taken as many as possible from one quartz panel, is required in the case of smaller sized panel, such as the TFT liquid crystal panel of the poly. Si, being used in order to reduce the cost.

Accordingly, it is ideal to decide the ratio of length to breadth of the panel by considering the above respects, not based on the image signal.

One of the objects of the present invention is to solve a problem caused by a large number of optical components and complicated optical structure. For instance, in the related art described with reference to FIG. 123, there are too many optical components and the structure is very complicated, since the reflecting mirror and the dichro, which compose the structure, have not become module.

Another object of the present invention is to solve a problem caused by the cross dichro, which is applied in order to reduce the number of components. The joints of the cross dichro are projected on the screen when the distance between at least one of the cross dichros and the panel becomes short. Accordingly, the prism cross dichro, having no joints and being expensive, is needed to be used instead of the cross dichro.

Another object of the present invention is to solve a structural problem caused by a difference between size of the lighting equipment used for the liquid crystal projector and the projection lens and size of the liquid crystal panel and the dichroic mirror. Compared with the size of the lighting equipment and the projection lens, the size of the liquid crystal panel and the dichroic mirror has been reduced. According as the size of the liquid crystal panel has been reduced from 3 inches to less than 1 inch, the size of the reflecting mirror and the dichroic mirror has also been reduced, which totally makes the apparatus compact.

On the other hand, for the purpose of irradiating enough light, it is necessary for the size of the lighting equipment to be more than some specific size. In other words, it is impossible for the lighting equipment to be less than some specific size. Then, it is also necessary to use the projection lens whose size is relatively large.

When there is a big size difference between the size of the lighting equipment and the size of the liquid crystal panel, the light is not effectively utilized. It is needed to narrow diameter of the light being projected and to keep a specific length of the optical path between the lighting equipment and the liquid crystal panel so as to effectively utilize the light.

It is very important to efficiently allocate the components having different size, to keep a necessary length of the optical path and to apply the most appropriate structure for the apparatus in order to totally make the apparatus compact.

Another object of the present invention is to solve a problem caused by a difference between length of the optical path from the lamp 10 to image generation of red or blue and length of the optical path from the lamp 10 to image generation of green. Especially, it can be the problem that illuminance distribution on the liquid crystal panels 30 and 32 for red and blue differs from the illuminance distribution on the liquid crystal panel 31 for green. The reason is that even when the main reflecting mirror 11 having a perfect rotating parabolic surface is used, the light can not be perfectly parallel because of the arc length of the lamp. Generally, the longer the distance from the light source becomes, the brighter the center becomes and the darker the outlying part becomes in the liquid crystal panel. Accordingly, the illuminance distribution difference that bright at the center and dark at the outlying part easily occurs in the liquid crystal panels for red and blue having the longest optical paths. In order to correct the above phenomenon, it is necessary to give a white balance correction signal to a picture signal circuit from the wellknown picture signal correction circuit (not shown).

However, if much correction amount is given, a gradation display faculty originally obtained will be restricted. Namely, a problem of white balance break caused by the optical length difference and a problem of gradation faculty decline of the projected image caused by correcting the white balance break, will easily occur.

Another object of the present invention is to solve a problem caused by inconsistency in the optical path lengths.

In order to prevent color disparity, it is necessary to perform precise mutual convergence for each pixel among liquid crystal panels for red, green and blue in the apparatus wherein the optical path lengths are different. This procedure makes adjustment time in manufacturing process long.

Another object of the present invention is to solve a problem caused by the polarization film, which generates much heat and has low tolerance of light, being applied close to the liquid crystal panel. The tolerance level for the light of a small-sized liquid crystal depends upon the polarization film. Then, it is necessary to apply a method wherein the polarization film is not needed, in the liquid crystal display apparatus whose output luminous flux is large. The method of using material of the polymer dispersed liquid crystal or using the polarization converting element has been suggested instead of the method using the polarization film.

Another object of the present invention is to solve a problem relating to the polarization converting element. After the luminous flux from the light source, whose section is circular, passes through the polarization converting element, the circular section of the luminous flux is transformed to a rectangle whose ratio of length to breadth is 2:1. This indicates that the luminous flux is not effectively utilized because the most appropriate shape for the liquid crystal panel is a square or a rectangle whose ratio of length to breadth is at most 4:3. In order to compensate this disadvantage, the ratio of the length to breadth of the luminous flux can be changed by a cylindrical lens and then the luminous flux can be input into the thin film element. However, there is a possibility of the image quality being deteriorated by the cylindrical lens. The reason is that rates of dispersion of the light inclination in the length and in the breadth, which are important for various thin film elements installed after the cylindrical lens, are different in some luminous fluxes. This may bring about the image quality deterioration.

Another object of the present invention is to solve a problem relating to a large amount of cubic of the optical system.

The element in which the thin film is used, such as the dichroic mirror and the polarization beam splitter, has a low permissible value against the dispersion existed at the incident angle of the incident light.

It is required for gap length of the light source to be some specific length in order to keep long life time. Consequently, it is necessary for the diameter of the main reflecting mirror of the light source system to have some long length for the purpose of suppressing a dispersion value of angle of irradiated light.

According to the above reason, it is needed for the dichroic mirror and the polarization beam splitter to have some large size so as to obtain a desired characteristic. In addition, the element in which the thin film is used, has to be installed with its surface applied thin film, inclining around 45 degrees. Since the area amount relates to a cubic amount, the cubic of the optical system also becomes large.

Another object of the present invention is to solve a problem caused by shading. There is a dichroic mirror system for synthesizing, whose optical path length is long, between the liquid crystal panel and the projection lens for projecting light. Therefore, the length of the optical path between the liquid crystal panel and the projection lens is long. Then, the shading is generated in the simple telecentric system, which often makes the projected image dim.

FIG. 160 illustrates the shading. In the case of parallel light, the light can be projected on the liquid crystal panel and utilized, regardless of the optical path length. In the cases of light A and light B, it depends upon the length of optical path whether or not the light is utilized. Both lights A and B can be utilized in a short optical path A. However, only the light B is utilized and the light A is not utilized in a long optical path B. Accordingly, it is necessary to make the optical path as short as possible in order to effectively utilize the light.

Another object of the present invention is to solve a cost problem caused by using the dichroic mirror. In the front type projecting apparatus wherein distance between the projector and the screen is not fixed, it is necessary to put the dichroic mirror, being expensive, for synthesizing between the liquid crystal panel and the projection lens. On the other hand, it is not necessary to put the dichroic mirror in the rear type projecting apparatus wherein the distance between the projector and the screen is fixed.

Another object of the present invention is to solve a problem relating to size of the dichroic mirror and the liquid crystal panel. In the conventional apparatus, the size of the dichroic mirror is often a base for deciding the size of the liquid crystal panel whose cost per specific area is expensive. A permissible value for the incident light dispersion of liquid crystal element is primarily higher than that of the element, such as the dichroic mirror, in which the thin film is used. However, since the simple telecentric system has been conventionally used, the size of the liquid crystal panel corresponding to the size of the dichroic mirror is used.

Another object of the present invention is to solve a problem relating to the liquid crystal panel of poly. Si. Since the quartz glass, which is expensive, is used in the liquid crystal panel of poly. Si, it is necessary to make the area of the panel small. Compared with the panel of a —Si, the panel of poly Si can have much higher aperture efficiency per a specific area. Namely, the size of the liquid crystal panel of poly. Si can be small. It is earnestly desired for the liquid crystal panel of poly. Si to develop a method of effectively projecting the light on the small area.

Another object of the present invention is to solve a problem of the crosstalk described with reference to FIG. 147. Since the glass plate for enclosing the liquid crystal has some thickness, the crosstalk is generated when the light of high luminance, whose incident angle is more than a specific value, is input.

Another object of the present invention is to solve a problem relating to the aspect ratio. When the aspect ratio of the main reflecting mirror used in the light source system is small, dispersion of inclination of irradiated light from the main reflecting mirror has become large even in the same diameter and the same light source length. The reason of the small aspect ratio being used is that the smaller the aspect ratio is, the more the light collecting efficiency of the main reflecting mirror becomes.

Another object of the present invention is to solve a problem that the human visual characteristic has not been thoroughly utilized in the signal process, optical modulation process and image synthesizing process at the conventional liquid crystal projecting apparatus. Therefore, it has been needed to make the pixel size minute and raise the power of the white light source up in order to progress the image quality, in the conventional method. Signal assignment and operational processing adapted to the human visual characteristic, having a high resolution for luminance and a low resolution for color, have been desired. In addition, suiting the pixel size of the liquid crystal panel to the signal and simple processing of image synthesis have also been desired.

Another object of the present invention is to solve a problem relating to the ratio of length to breadth of the panel.

As stated above, since the section of the optical path of the light source is generally circular, utilization efficiency of the light source is extremely decreased in the case of the high definition television whose ratio of length to breadth is large to be 9:16, for instance. Although the utilization efficiency of a square panel is 64%, that of the case of 9:16 is 54%.

In addition, the shape, with which panel can be taken as many as possible from one quartz panel, is required in the case of smaller sized panel, such as the TFT liquid crystal panel of the poly. Si, being used in order to reduce the cost.

Accordingly, it is ideal to decide the ratio of length to breadth of the panel by considering the above respects, not based on the image signal.

To sum up, the object of the present invention is to provide the projecting apparatus, which is composed of a small number of components and is compact, whose structure is adapted to the human visual characteristic, wherein a high precise projected image can be realized.

SUMMARY OF THE INVENTION

An image generation apparatus according to one aspect of the present invention comprises a color processing part and a polarization processing part.

The color processing part comprises:
- (a) a wavelength separating module
  including a first reflection surface for reflecting a light having a first wavelength, and a second reflection surface crossing the first reflection surface and reflecting a light having a second wavelength,
  for outputting three lights by reflecting the lights having the first wavelength and the second wavelength and transmitting a light having other wavelength;
- (b) a first, a second and a third optical modulators for respectively modulating the three lights output from the wavelength separating module, and for respectively outputting the three lights modulated by the first, the second and the third optical modulators;
- (c) a wavelength synthesizing module
  including a first reflection surface for reflecting a light having the first wavelength out of input lights and a second reflection surface for reflecting a light having the second wavelength out of input lights,
  for inputting the three lights modulated by the first, the second and the third optical modulators, for synthesizing the three lights to generate an image by reflecting the lights having the first wavelength and the second wavelength and transmitting a light having other wavelength, and for outputting a synthesized light made by synthesizing the three lights; and
- (d) a first optical path connecting module for setting a first optical path between the wavelength separating module and the wavelength synthesizing module.

The polarization processing part comprises:
- (e) a polarization separating module for inputting a light, separating the light into a first light and a second light, whose polarization directions are different, and outputting the first light to the wavelength separating module;
- (f) a fourth optical modulator for inputting the second light and an image signal, modulating polarization state of the input second light based on the image signal, and outputting a modulated light made by modulating the polarization state of the input second light based on the image signal;
- (g) a polarization synthesizing module for inputting the synthesized light output from the wavelength synthesizing module and the modulated light output from the fourth optical modulator, and for synthesizing the lights to generate an image; and
- (h) a second optical path connecting module, installed between the polarization separating module and the polarization synthesizing module, for setting a second optical path in order to lead the second light from the polarization separating module to the polarization synthesizing module through the fourth optical modulator.

An image generation apparatus according to another aspect of the present invention comprises a color processing part and a polarization processing part.

The color processing part comprises:
- (a) a wavelength separating module
  including a first reflection surface for reflecting a light having a first wavelength, and a second reflection surface crossing the first reflection surface and reflecting a light having a second wavelength,
  for outputting three lights by reflecting the lights having the first wavelength and the second wavelength and transmitting a light having other wavelength;
- (b) a first, a second and a third optical modulators for respectively modulating the three lights output from the wavelength separating module, and for respectively outputting the three lights modulated by the first, the second and the third optical modulators;
- (c) a wavelength synthesizing module
  including a first reflection surface for reflecting a light having the first wavelength out of input lights and a second reflection surface for reflecting a light having the second wavelength out of input lights,
  for inputting the three lights modulated by the first, the second and the third optical modulators, for synthesizing the three lights to generate an image by reflecting the lights having the first wavelength and the second wavelength and transmitting light having other wavelength, and for outputting a synthesized light made by synthesizing the three lights;
- (d) at least one collective lens, provided between the wavelength separating module and the wavelength synthesizing module; and
- (e) a first optical path connecting module for setting an optical path including the at least one collective lens, between the wavelength separating module and the wavelength synthesizing module.

The polarization processing part comprises:
- (f) a polarization separating module for inputting a light, separating the light into a first light and a second light, whose polarization directions are different, and outputting the first light to the wavelength separating module;
- (g) a fourth optical modulator for inputting the second light and an image signal, modulating polarization state of the input second light based on the image signal, and outputting a modulated light made by modulating the polarization state of the input second light based on the image signal;
- (h) a polarization synthesizing module for inputting the synthesized light output from the wavelength synthesizing module and the modulated light output from the fourth optical modulator, and for synthesizing the lights to generate an image; and
- (i) a second optical path connecting module, installed between the polarization separating module and the polarization synthesizing module, for setting a second optical path in order to lead the second light from the polarization separating module to the polarization synthesizing module through the fourth optical modulator.

An image generation apparatus according to another aspect of the present invention comprises a color processing part, a polarization processing part, and a projection lens for projecting an image onto a screen.

The color processing part comprises:

(a) a first, a second and a third optical modulators for displaying color;

(b) a wavelength separating module, installed at light-input-side of the first, the second and the third optical modulators, for inputting a light, separating the light to three lights of a first light, a second light, and a third light, and outputting the three lights to the first, the second and the third optical modulators;

(c) a wavelength synthesizing module, installed at light-output-side of the first, the second and the third optical modulators, for inputting the three lights from the first, the second and the third optical modulators, for synthesizing the three lights to generate a synthesized light as the image, and for outputting the image; and (d) a first optical path connecting module including a reflecting mirror, for setting optical paths between the wavelength separating module and the first, the second and the third optical modulators, and between the wavelength synthesizing module and the first, the second and the third optical modulators.

The polarization processing part comprises:

(e) a polarization separating module for inputting a light, separating the light into a first light and a second light, whose polarization directions are different, and outputting the first light to the wavelength separating module;

(f) a fourth optical modulator for inputting the second light and an image signal, modulating polarization state of the input second light based on the image signal, and outputting a modulated light made by modulating the polarization state of the input second light based on the image signal;

(g) a polarization synthesizing module for inputting the synthesized light output from the wavelength synthesizing module and the modulated light output from the fourth optical modulator, and for synthesizing the lights to generate an image; and (h) a second optical path connecting module, installed between the polarization separating module and the polarization synthesizing module, for setting a second optical path in order to lead the second light from the polarization separating module to the polarization synthesizing module through the fourth optical modulator, wherein the image generation apparatus forms the image from the wavelength synthesizing module at an image forming position, whose distance from the projection lens is equal to distance between the projection lens and the fourth optical modulator, the image forming position located on an optical path between the wavelength synthesizing module and the projection lens.

An image generation apparatus according to another aspect of the present invention comprises an optical mixer. The optical mixer includes:

(a) a first filter for reflecting a light having a first wavelength;

(b) a second filter, crossing the first filter, for reflecting a light having a second wavelength; and (c) a third filter, diagonally crossing both the first filter and the second filter, for reflecting a light having a specific polarization-direction and transmitting a light having other polarization-direction.

An image generation apparatus according to another aspect of the present invention comprises a color processing part.

The color processing part comprises:

(a) a wavelength separating module
including a first reflection surface for reflecting a light having a first wavelength and a second reflection surface crossing the first reflection surface at a diagonal line with the first reflection surface and reflecting a light having a second wavelength,
for outputting three lights by reflecting the lights having the first wavelength and the second wavelength and transmitting a light having other wavelength;

(b) a first, a second and a third optical modulators for respectively modulating the three lights output from the wavelength separating module and for respectively outputting the three lights modulated by the first, the second and the third optical modulators;

(c) a wavelength synthesizing module
including a first reflection surface for reflecting a light having the first wavelength out of input lights, and a second reflection surface crossing the first reflection surface at a diagonal line with the first reflection surface and for reflecting a light having the second wavelength out of input lights,
for inputting the three lights modulated by the first, the second and the third optical modulators, and for synthesizing the three lights to generate an image by reflecting the lights having the first wavelength and the second wavelength and transmitting a light having other wavelength, wherein the wavelength synthesizing module is located offset from any direction of three dimensional directions of the wavelength separating module; and (d) an optical path connecting module for setting an optical path between the wavelength separating module and the wavelength synthesizing module.

Other objects, features, and advantages of the invention will be apparent from the following description when taken in conjunction with the accompanying drawings.

BRIEF DESCRIPTION OF THE DRAWINGS

In the drawings,

FIG. 119 shows a characteristic in the case of a filter being not used, in the present invention;

FIG. 120 shows a characteristic in the case of a filter being used, in the present invention;

FIG. 121 shows an optical system of a conventional liquid crystal display of rear projection type;

FIG. 122 shows an optical system of a conventional liquid crystal display of front projection type;

FIG. 123 shows a configuration of a conventional projector wherein three liquid crystal panels are used;

FIG. 124 shows another configuration of a conventional projector wherein three liquid crystal panels are used;

FIG. 125 shows a configuration of a conventional cross dichroic mirror;

FIG. 126 shows a plan view of a conventional cross dichroic mirror;

FIG. 127 shows a conventional liquid crystal projector;

FIG. 128 shows another conventional liquid crystal projector;

FIG. 129 shows a characteristic and a specification of a conventional projector wherein a liquid crystal panel is used;

FIG. 130 illustrates operation of a conventional TN type liquid crystal panel;

Figure 131:
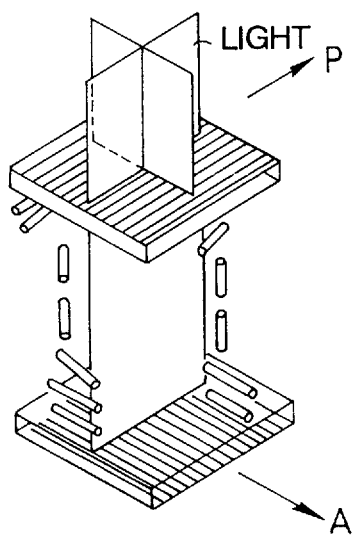
Figure 132:
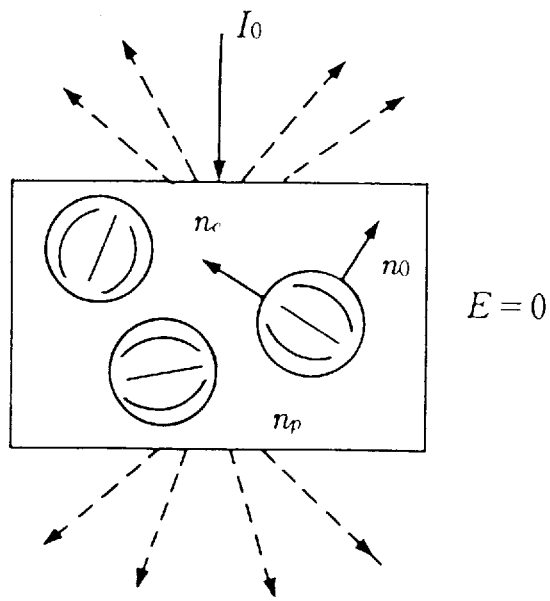
Figure 133:
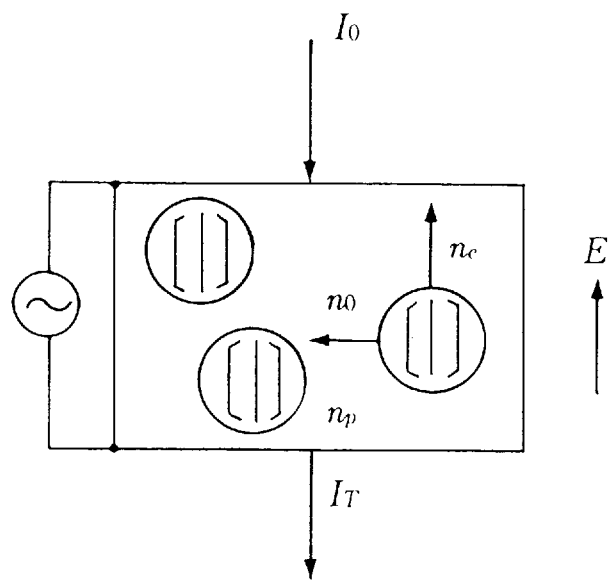
Figure 134:
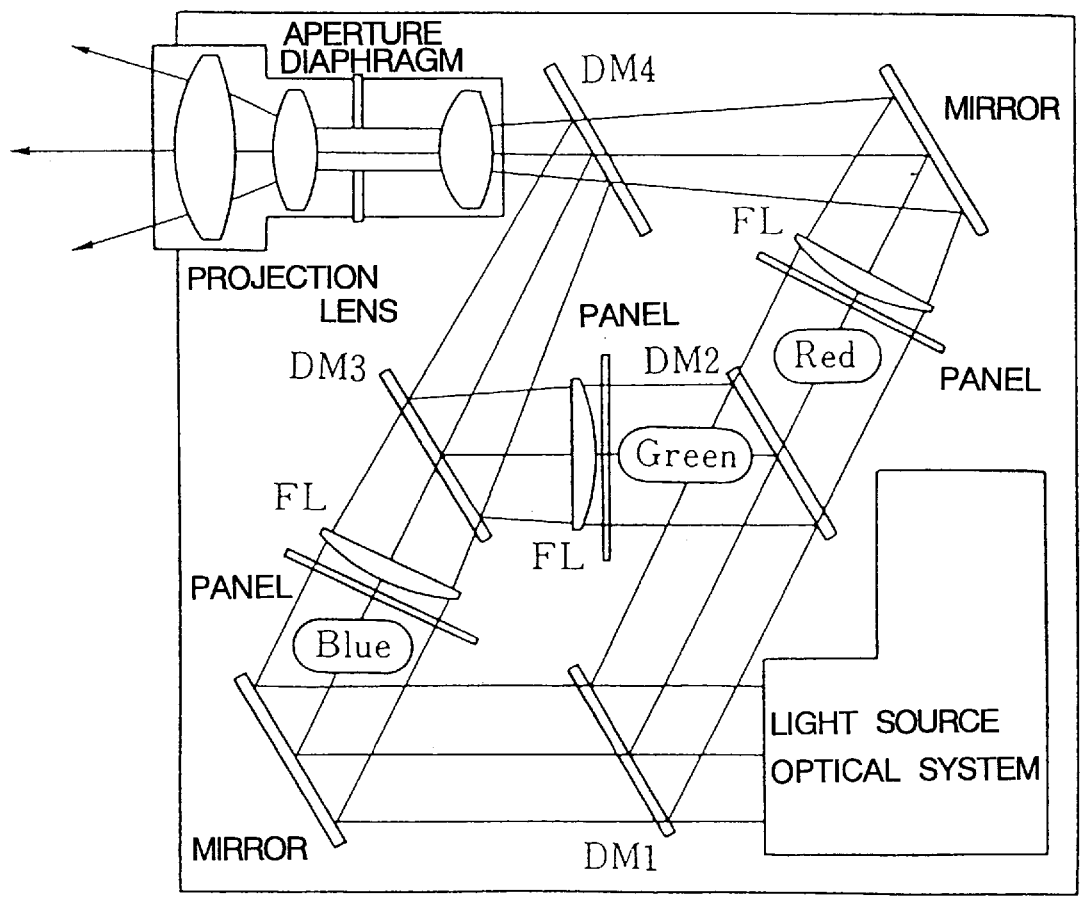
Figure 135:
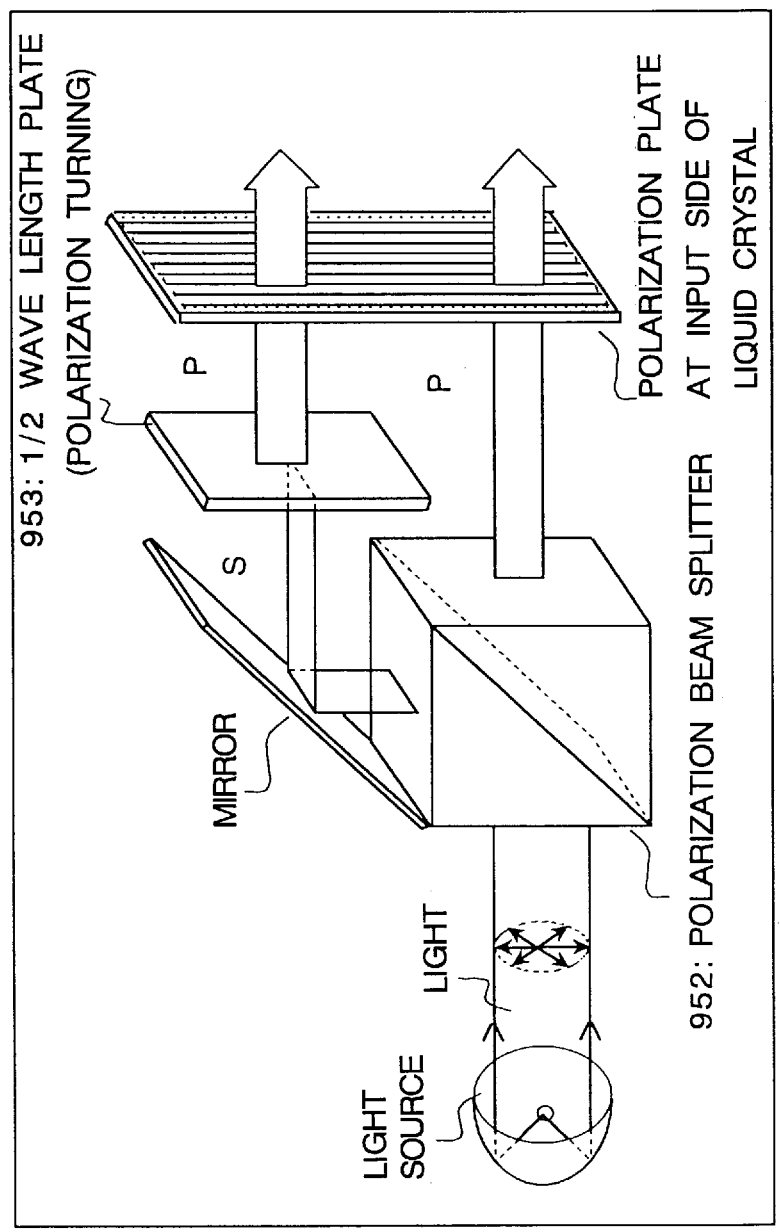
Figure 137:
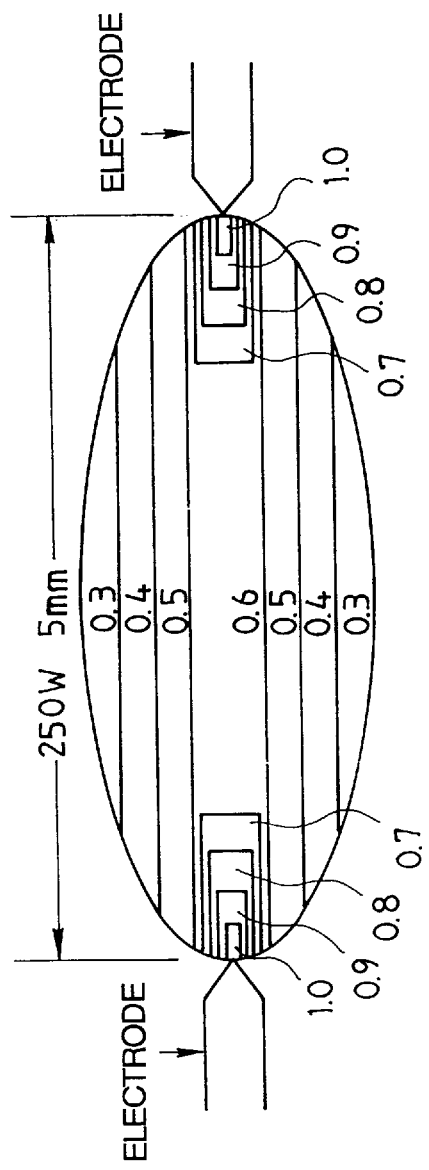
Figure 138:
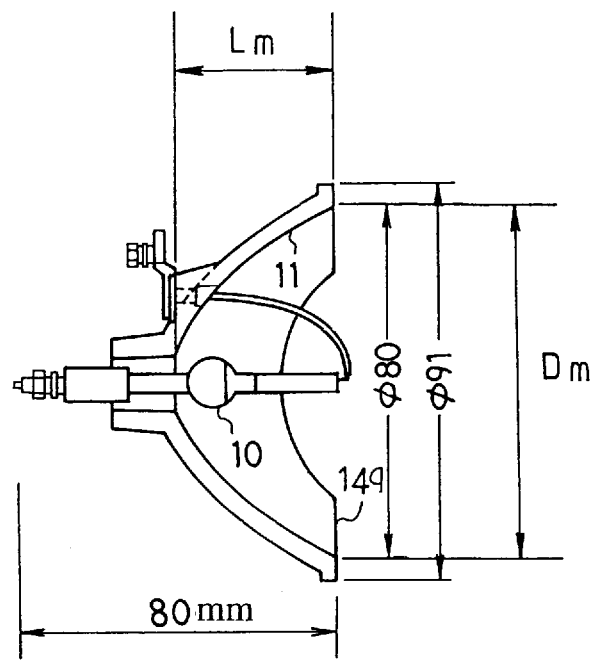
Figure 139:
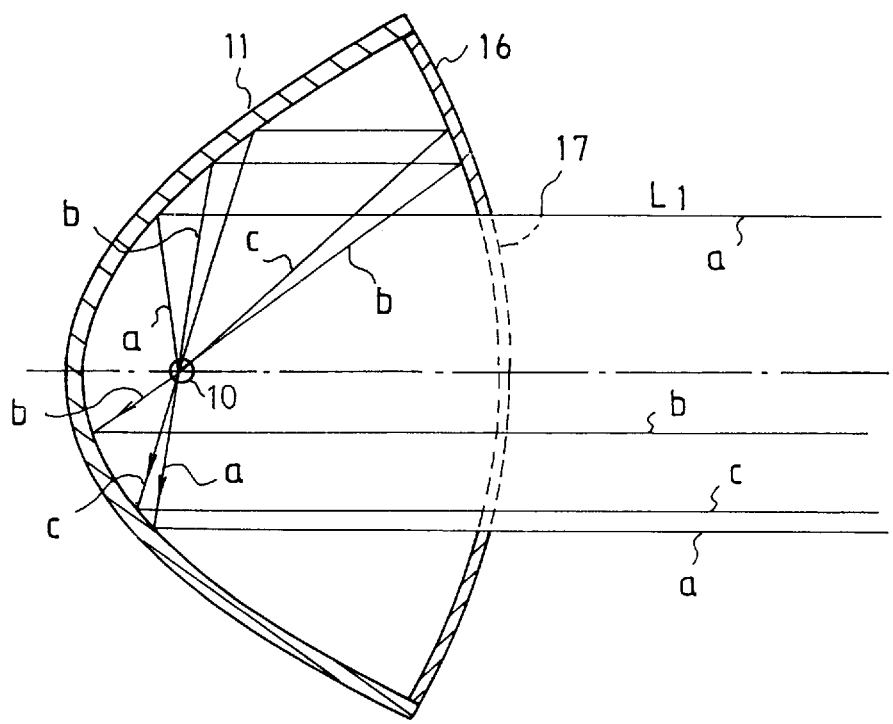
Figure 140:
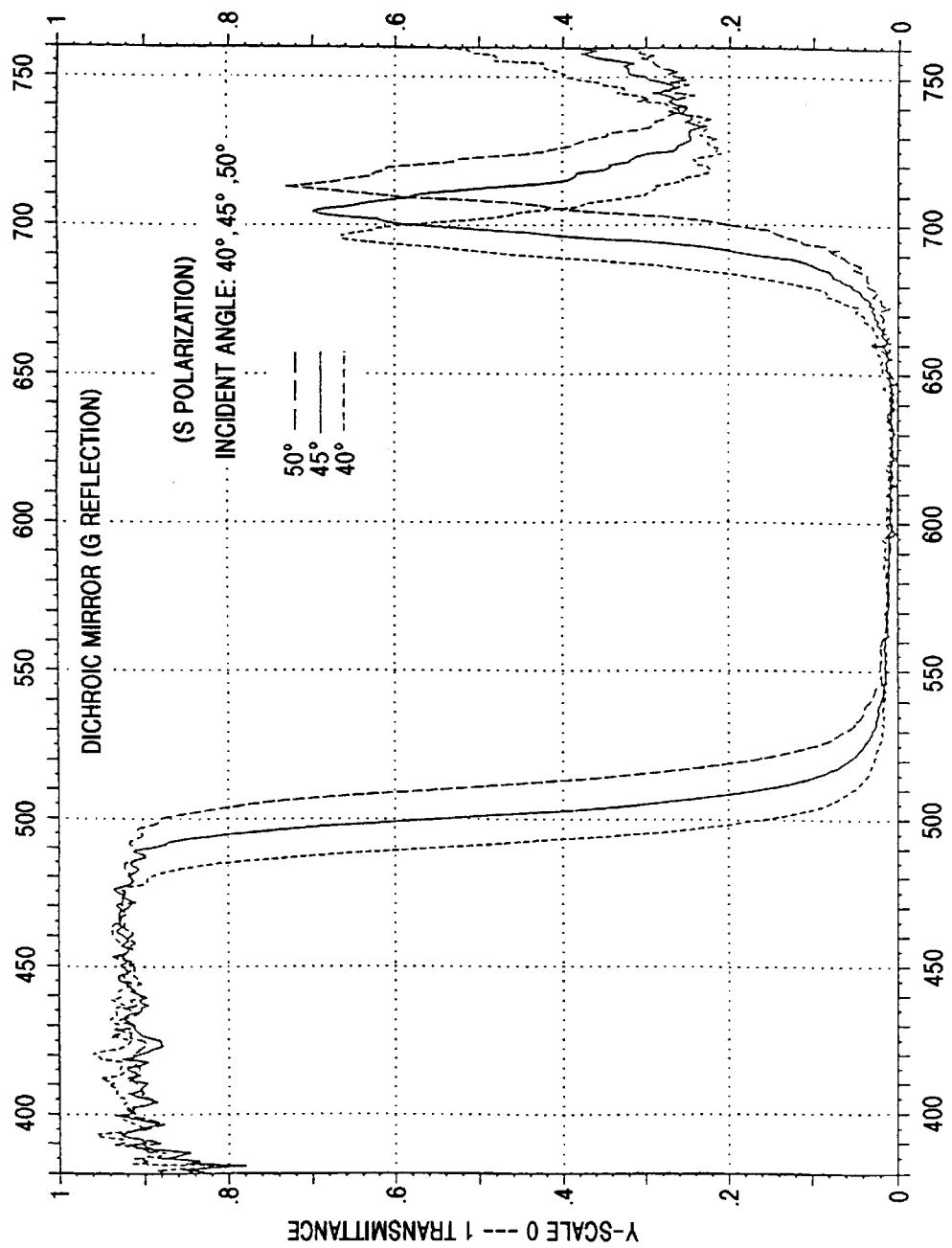
Figure 141:
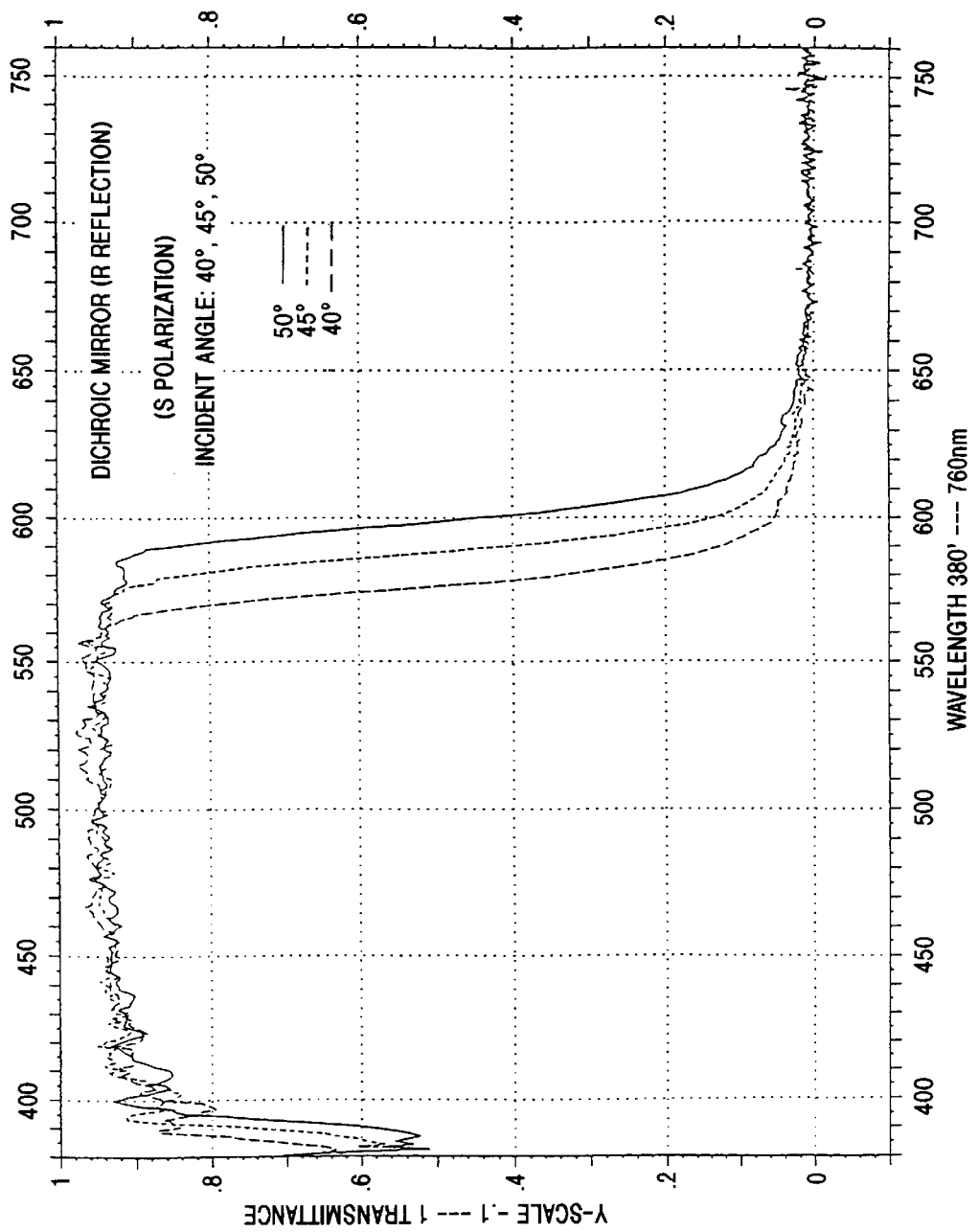
Figure 142:
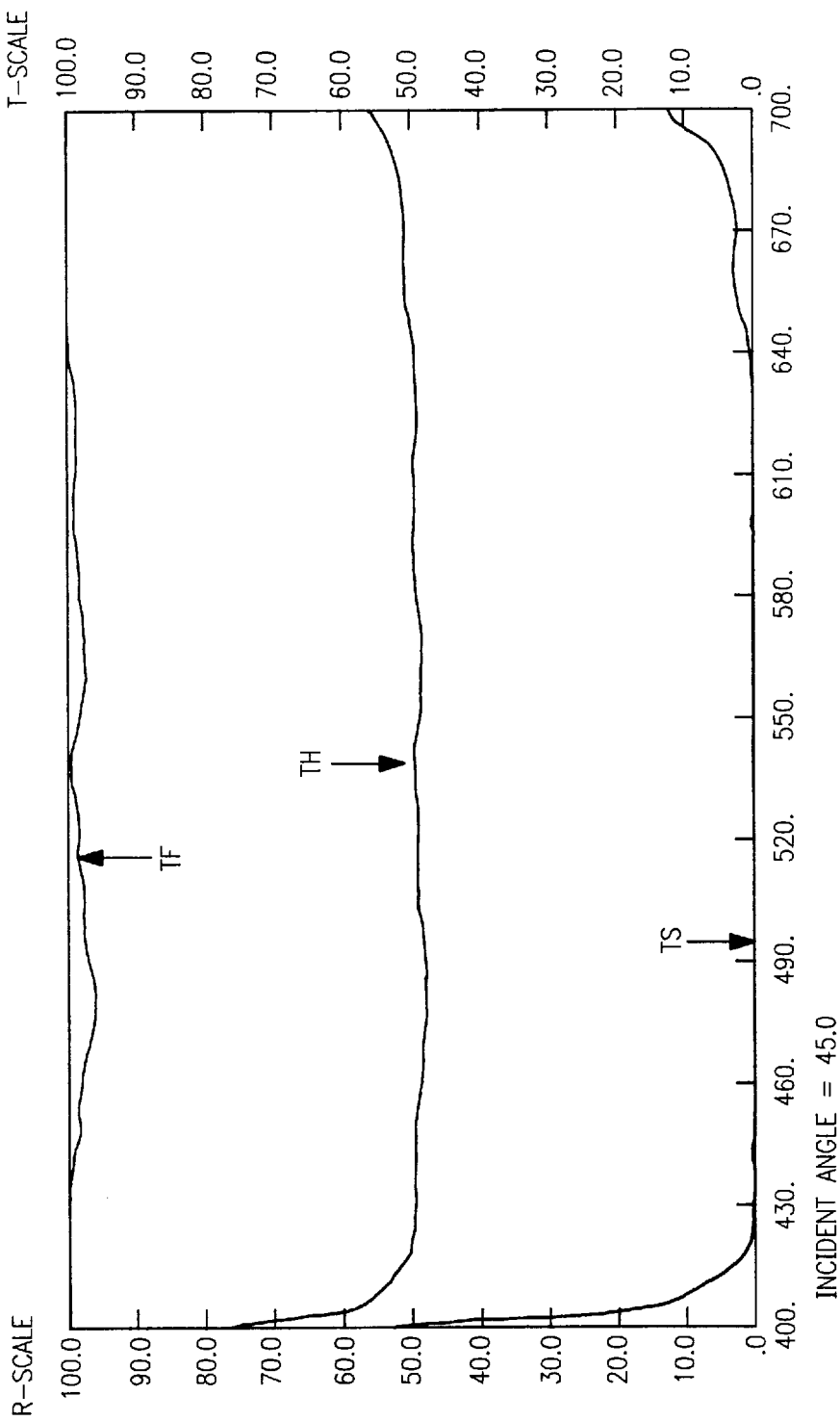
Figure 143:
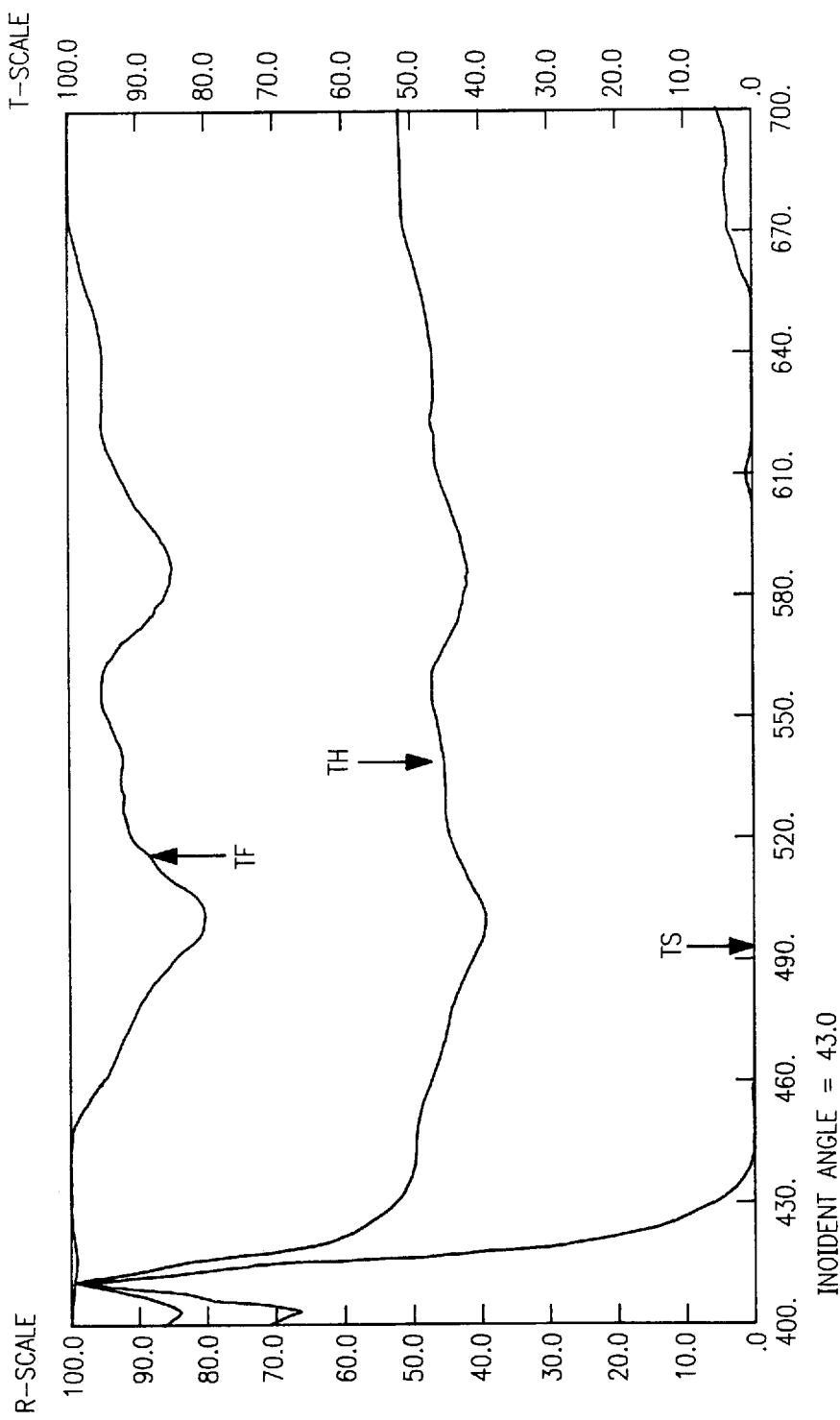
Figure 144:
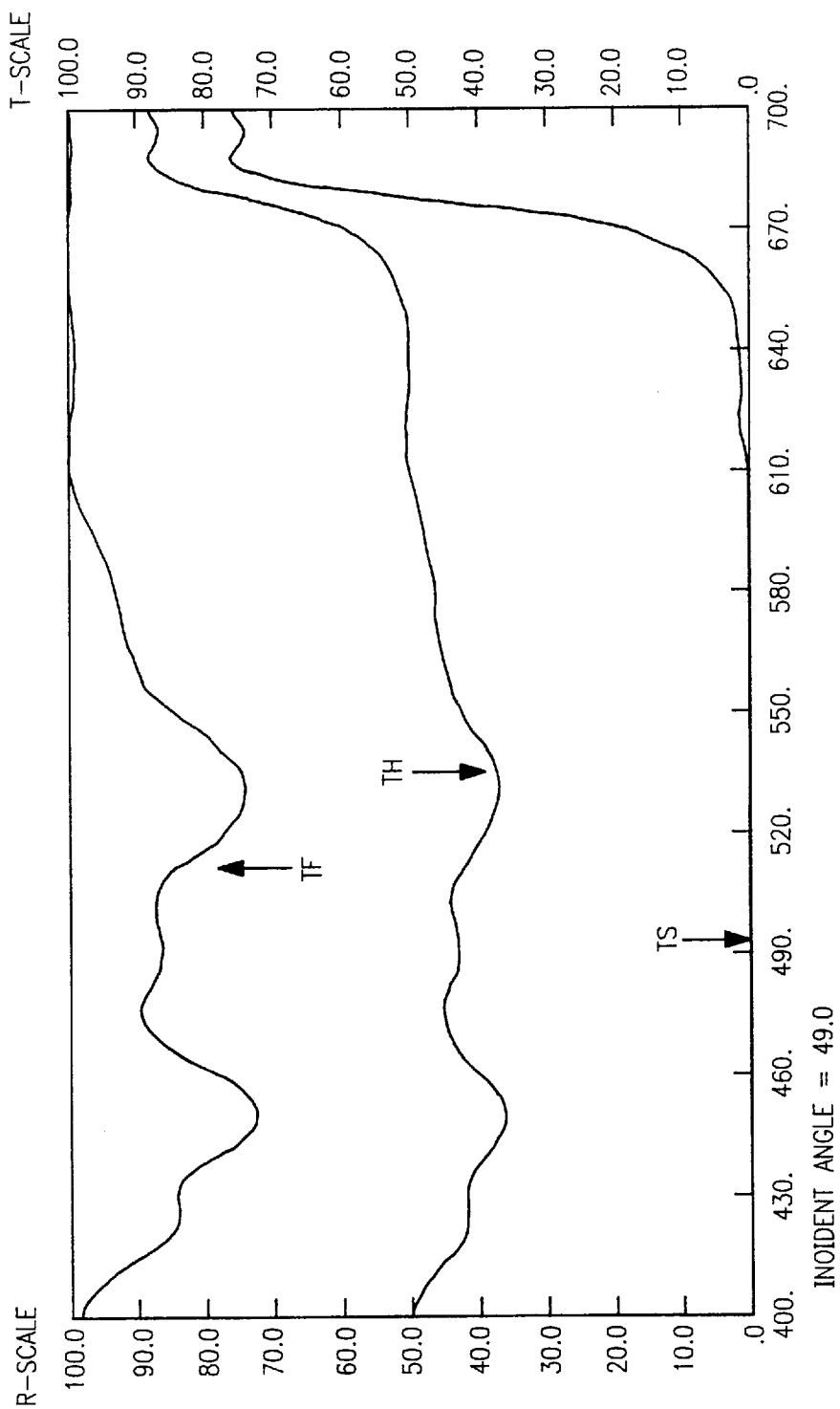
Figure 145:
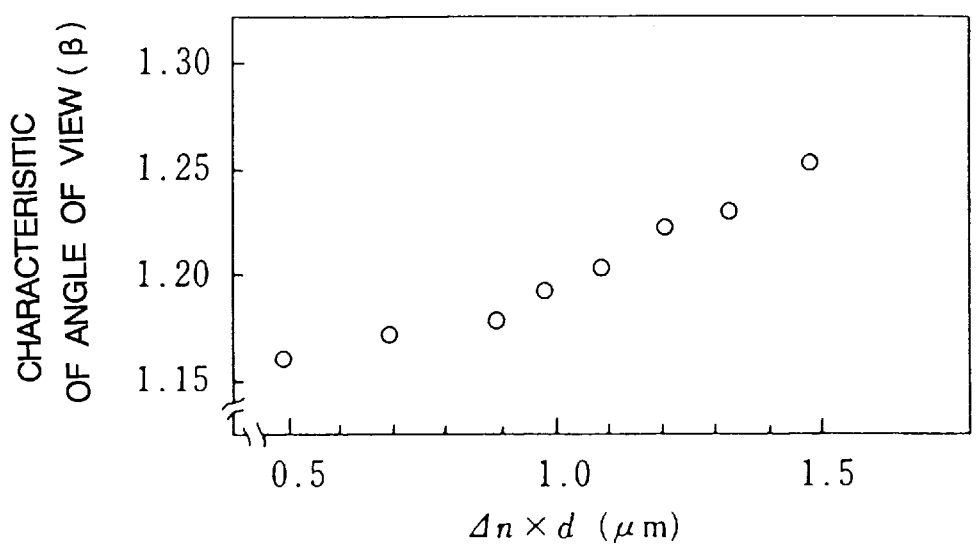
Figure 146:
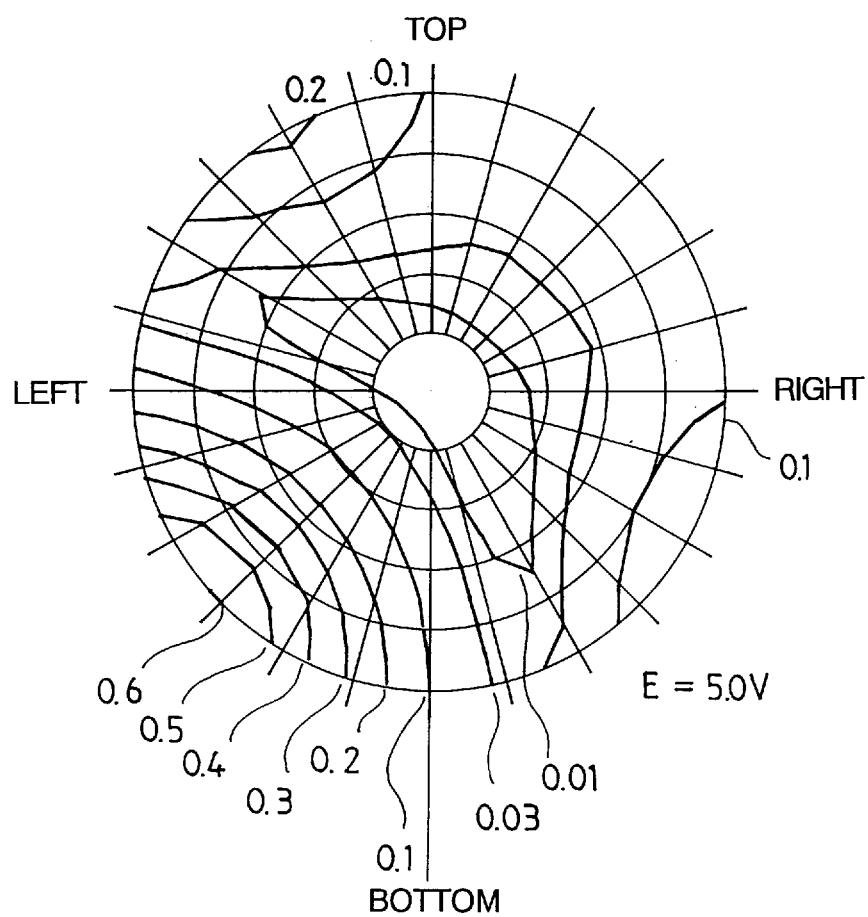
Figure 147A:
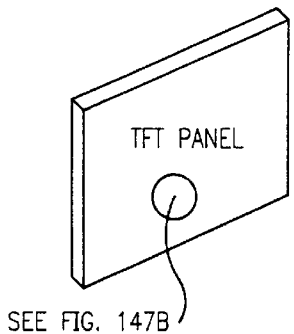
Figure 147B:
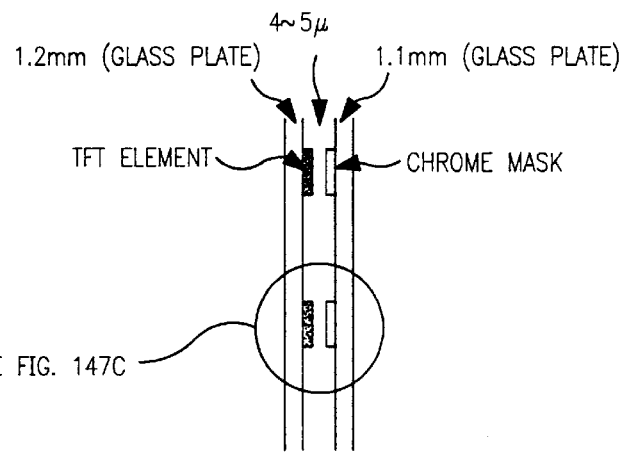
Figure 147C:
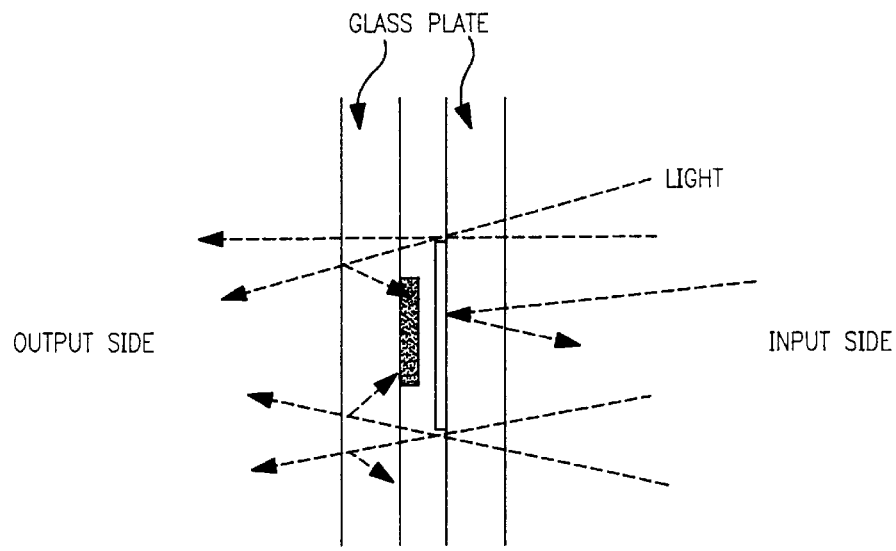
Figure 148:
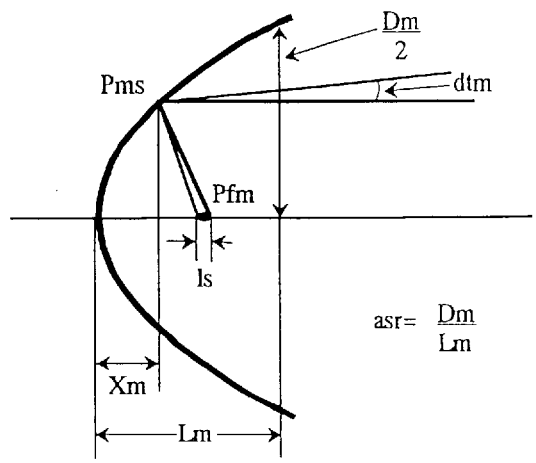
Figure 149:
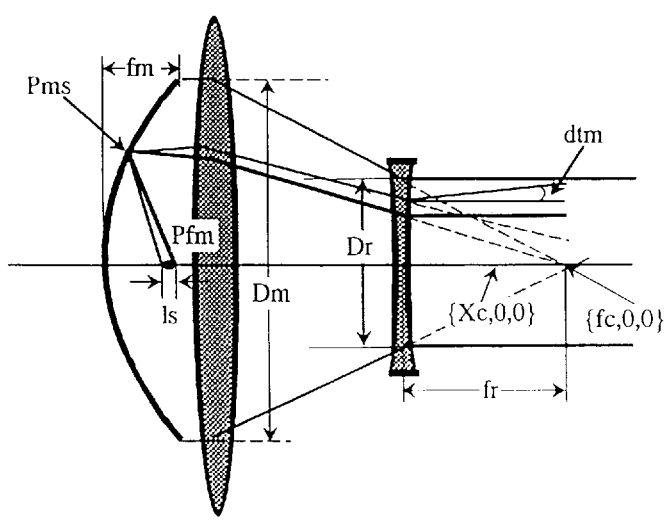
Figure 150:
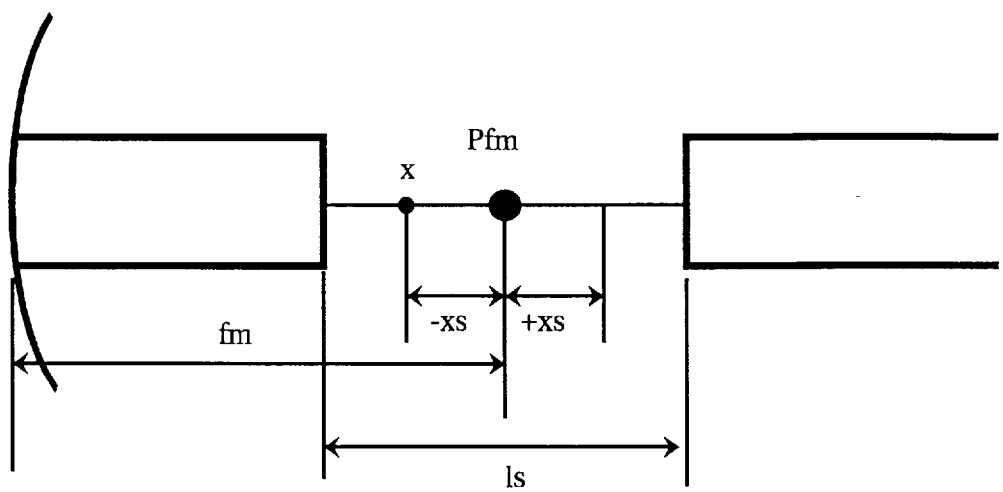
Figure 151:
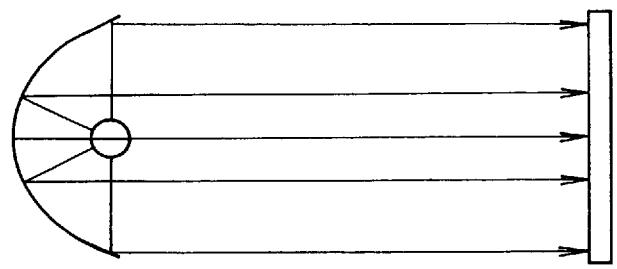
Figure 152:
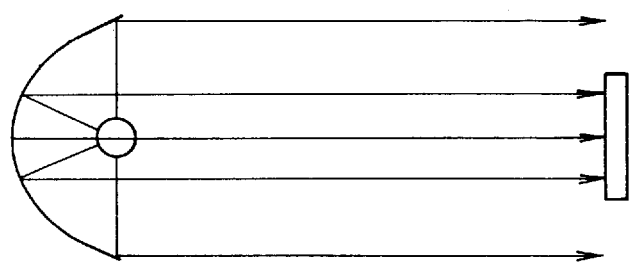
Figure 155:
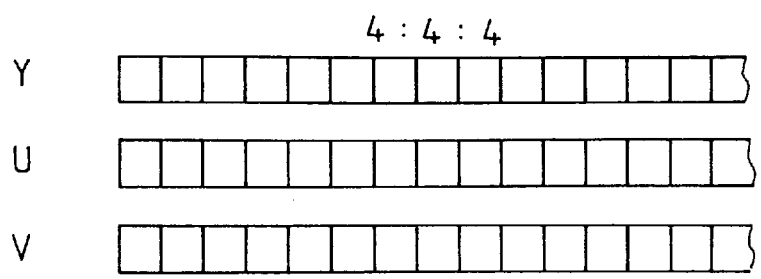
Figure 156:
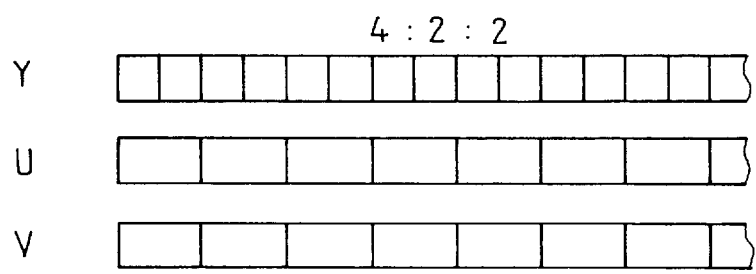
Figure 157:
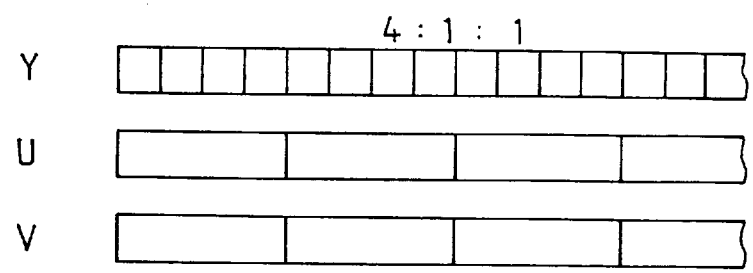
Figure 158:
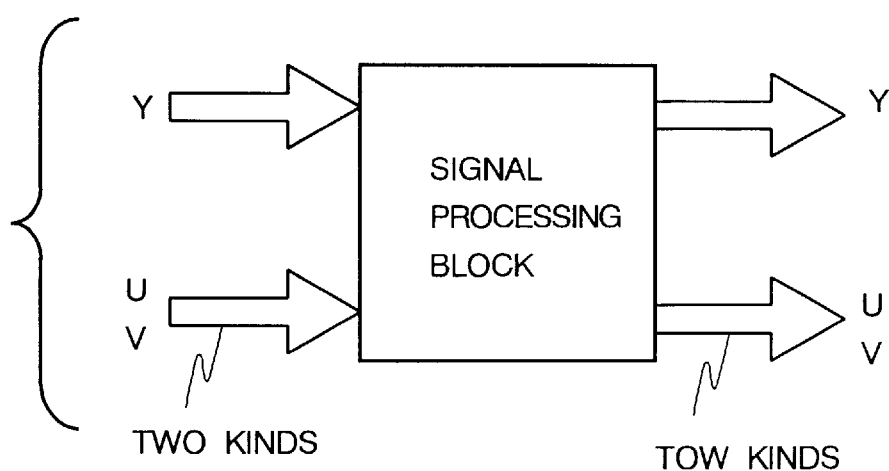
Figure 159:
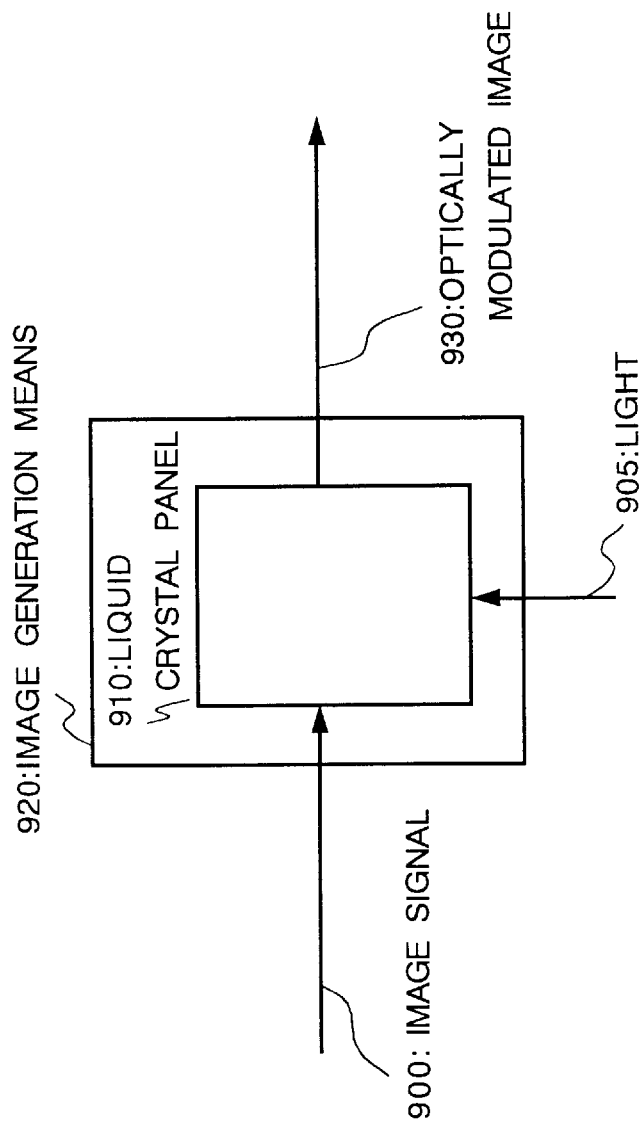
Figure 160:
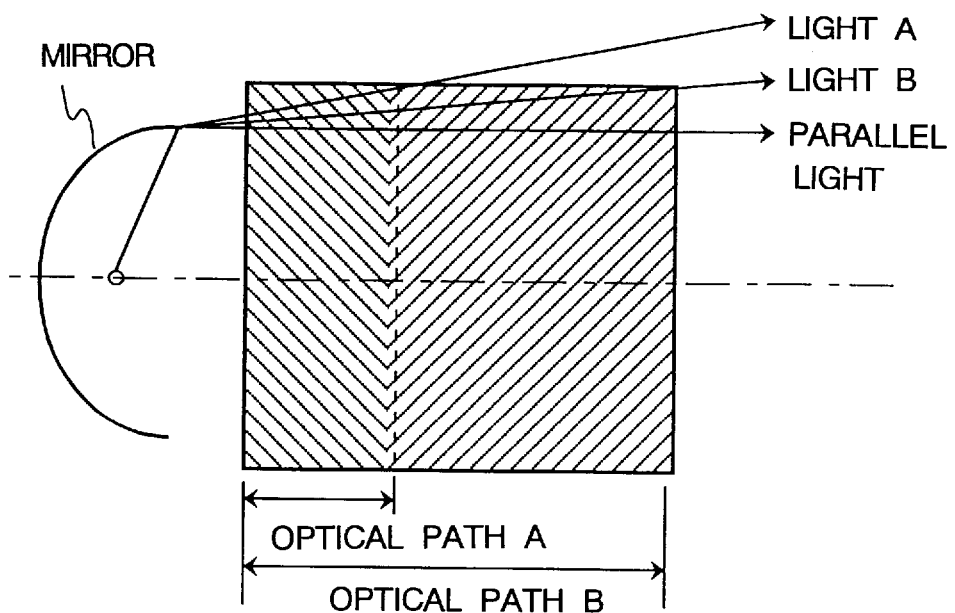
Figure 170:
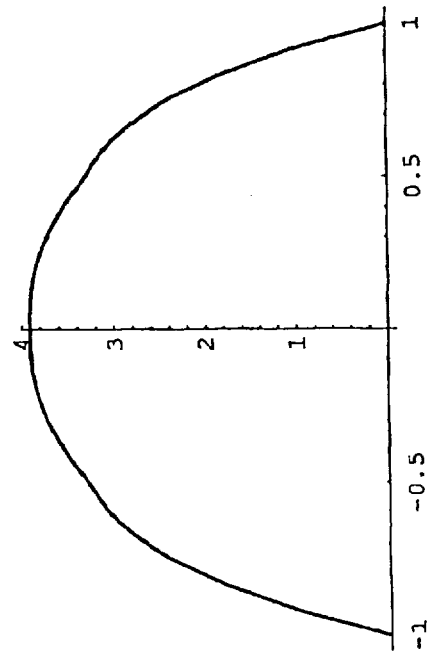

FIG. 131 illustrates operation of a conventional TN type liquid crystal panel;

FIG. 132 illustrates operational basis of a conventional liquid crystal panel of polymer dispersion type;

FIG. 133 illustrates another operational basis of a conventional liquid crystal panel of polymer dispersion type;

FIG. 134 shows a projection display of conventional liquid crystal panel of polymer dispersion type;

FIG. 135 shows a conventional optical system wherein a ½ wavelength plate is used;

FIG. 136 shows characteristics of conventional various lamps for light source;

FIG. 137 shows weighting based on conventional lamp emission shape and emission location;

FIG. 138 shows a conventional light source;

FIG. 139 shows a conventional lighting equipment including a subsidiary reflecting mirror;

FIG. 140 shows a characteristic of incident angle of dichroic mirror;

FIG. 141 shows a characteristic of incident angle of dichroic mirror;

FIG. 142 shows a characteristic of incident angle of polarization beam splitter;

FIG. 143 shows a characteristic of incident angle of polarization beam splitter;

FIG. 144 shows a characteristic of incident angle of polarization beam splitter;

FIG. 145 shows relation among incident angle characteristic, refractive index anisotropy and thickness;

FIG. 146 shows a visual characteristic of a liquid crystal panel;

FIG. 147 illustrates crosstalk in a conventional liquid crystal panel;

FIG. 148 shows light inclination based on arc length, diameter of main reflecting mirror and aspect ratio of main reflecting mirror;

FIG. 149 shows light inclination based on arc length, diameter of main reflecting mirror and aspect ratio of main reflecting mirror;

FIG. 150 shows light inclination based on arc length, diameter of main reflecting mirror and aspect ratio of main reflecting mirror;

FIG. 151 shows a conventional light source system and liquid crystal panel;

FIG. 152 shows a conventional light source system and liquid crystal panel;

FIG. 153 shows various parameter examples of component image signal in a conventional 4:2:2 coding system;

FIG. 154 shows various parameter examples of image signal in conventional HDTV;

FIG. 155 shows a model of pixel configuration of conventional various coding system for component image signal;

FIG. 156 shows a model of pixel configuration of conventional various coding system for component image signal;

FIG. 157 shows a model of pixel configuration of conventional various coding system for component image signal;

FIG. 158 shows a block for conventional signal processing;

FIG. 159 shows a block diagram for conventional image generating apparatus;

FIG. 160 illustrates light shading;

FIG. 161 shows mathematical expressions for explaining a conventional system;

FIG. 162 shows mathematical expressions for explaining a conventional system;

FIG. 163 shows mathematical expressions for explaining a conventional system;

FIG. 164 shows mathematical expressions for explaining a conventional system;

FIG. 165 shows mathematical expressions for explaining a conventional system;

FIG. 166 shows mathematical expressions for explaining a conventional system;

FIG. 167 shows mathematical expressions for explaining a conventional system;

FIG. 168 shows mathematical expressions for explaining a conventional system;

FIG. 169 shows mathematical expressions for explaining a conventional system;

FIG. 170 shows mathematical expressions for explaining a conventional system;

FIG. 171 shows mathematical expressions for explaining a conventional system; and FIG. 172 shows mathematical expressions for explaining a conventional system.

DETAILED DESCRIPTION OF THE PREFERRED EMBODIMENTS

Embodiment 1

Embodiment 1-1.

As one example of a transmission type liquid crystal panel, a twisted nematic (TN) type liquid crystal panel whose twisted angle is 90 degrees, will now be described in this embodiment.

Figure 1:
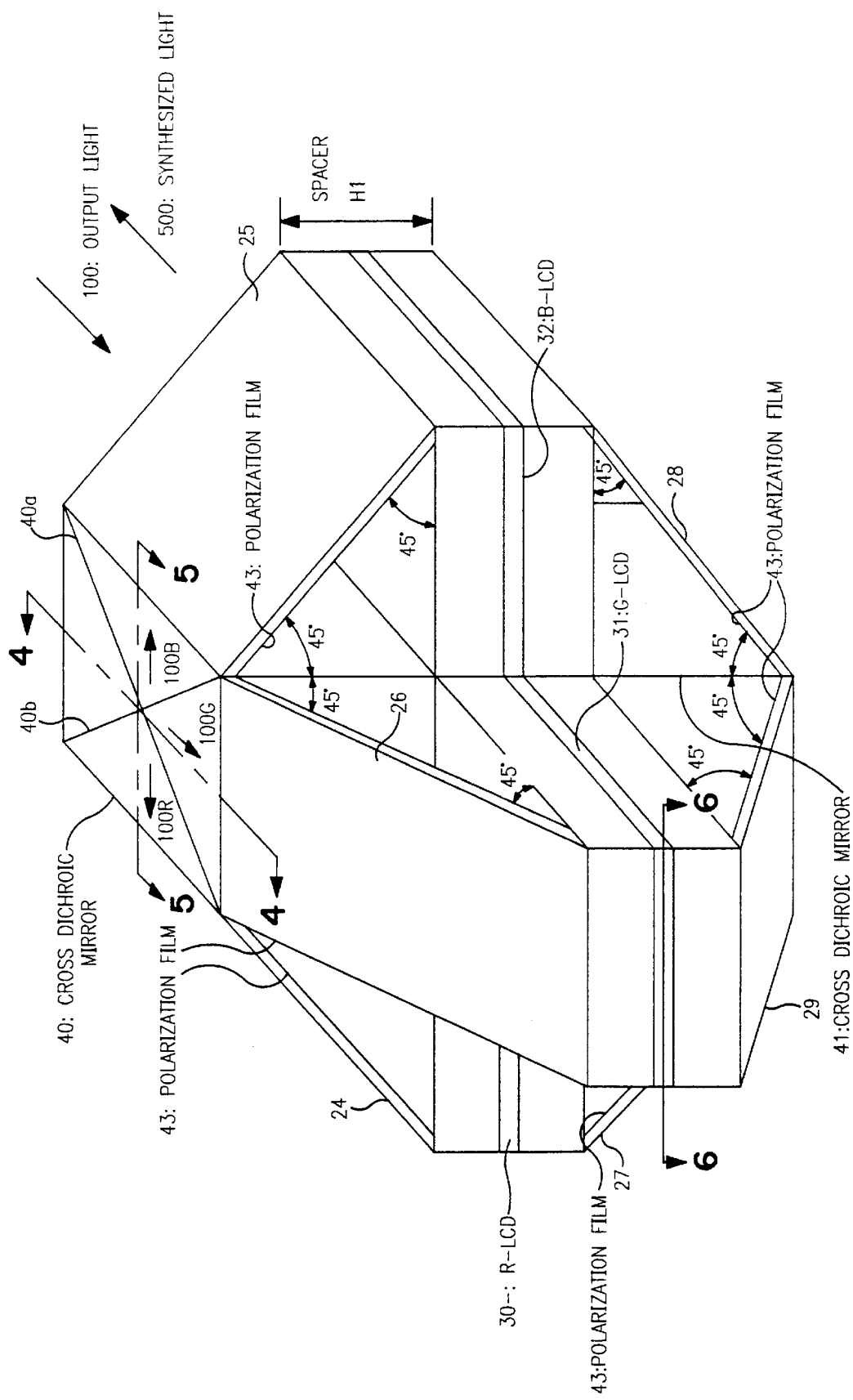
FIG. 1 shows a configuration of an image generation apparatus of the present invention.
Figure 2:
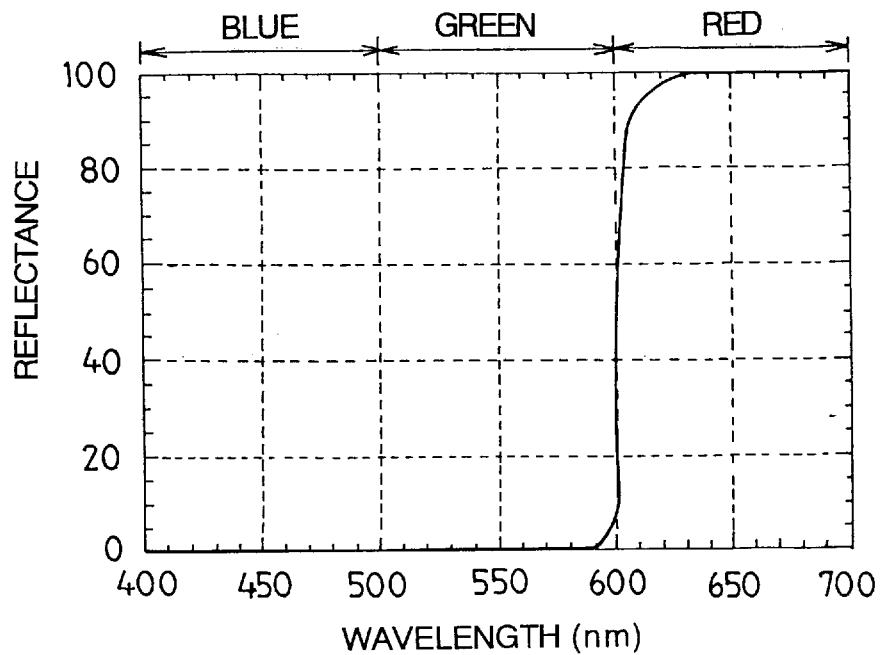
FIG. 2 shows a characteristic of reflectance being dependent upon wavelength, of a dichroic mirror for reflecting red light in an image generation apparatus of the present invention.
Figure 3:
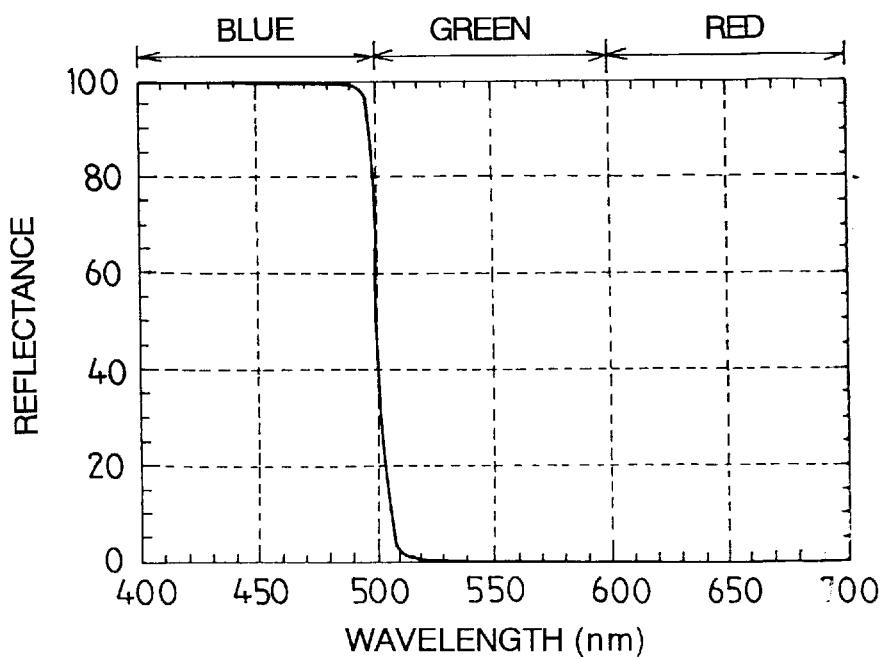
FIG. 3 shows a characteristic of reflectance being dependent upon wavelength, of a dichroic mirror for reflecting blue light in an image generation apparatus of the present invention.
Figure 4:
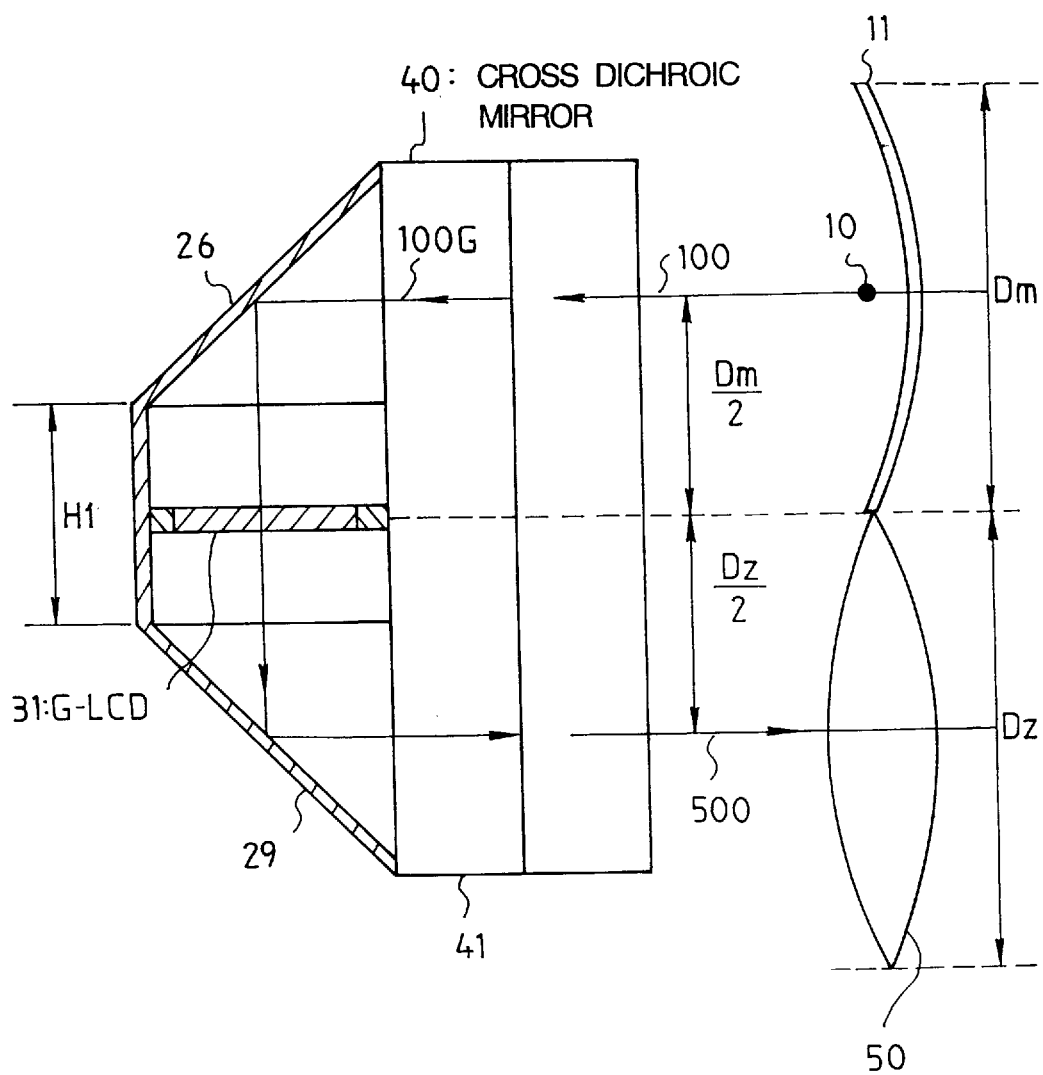
FIG. 4 shows a sectional view of an image generation apparatus of the present invention.
Figure 5:
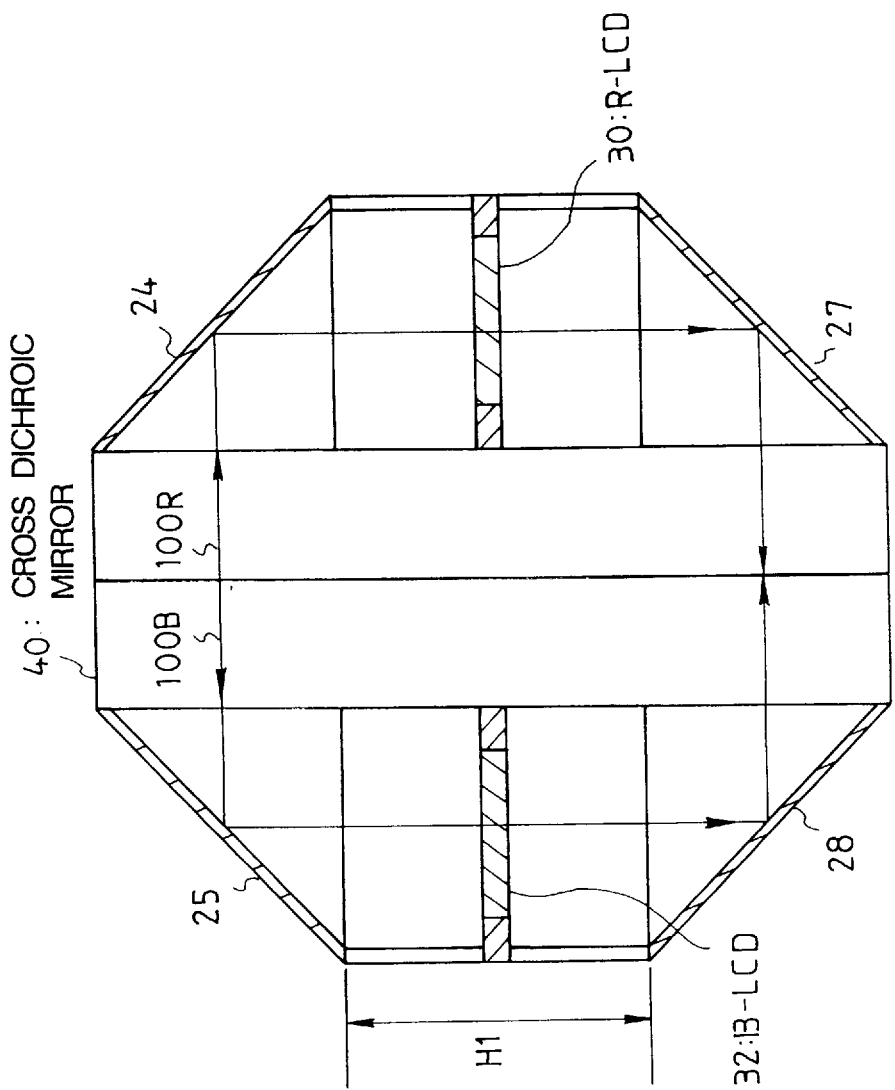
FIG. 5 shows another sectional view of an image generation apparatus of the present invention.
Figure 6:
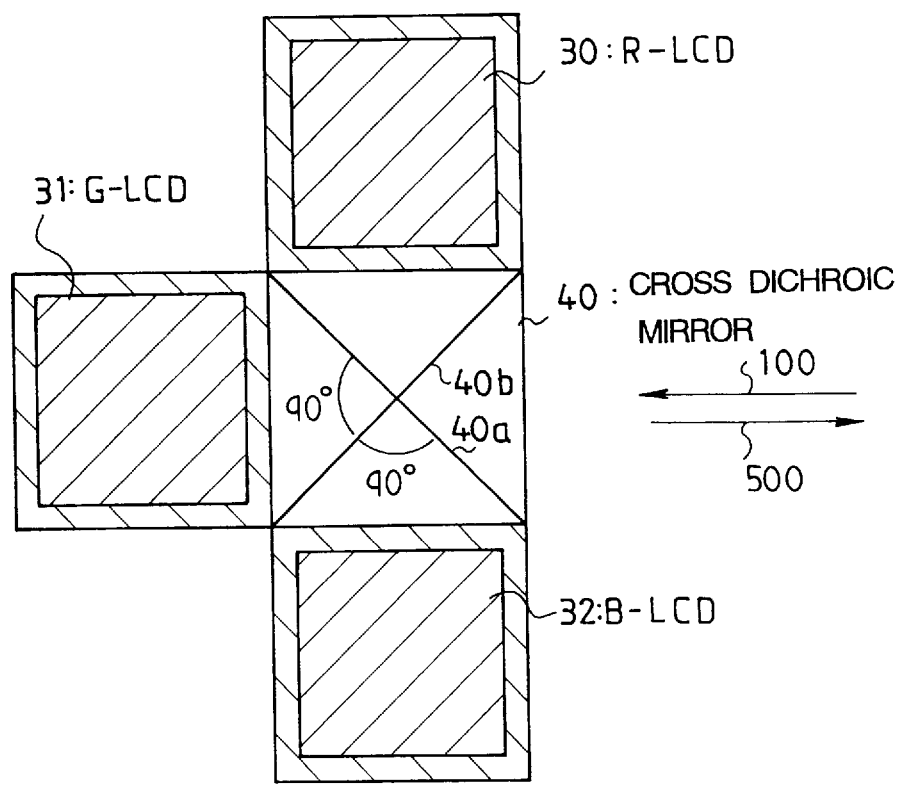
FIG. 6 shows another sectional view of an image generation apparatus of the present invention.

FIG. 1 shows a configuration of an image generation apparatus of the embodiment in the present invention. A liquid crystal projector of three-panels-method as shown in FIG. 1 will be explained as an example of the image generation apparatus. FIG. 2 shows a characteristic of reflectance being dependent upon wavelength, of a dichroic mirror 40a for reflecting red light. FIG. 3 shows a characteristic of reflectance being dependent upon wavelength, of a dichroic mirror 40*b* for reflecting blue light. FIG. 4 shows a sectional view at the line A—A in FIG. 1. FIG. 5 shows a sectional view at the line B—B in FIG. 1. FIG. 6 shows a sectional view at the line C—C in FIG. 1.

Figure 7:
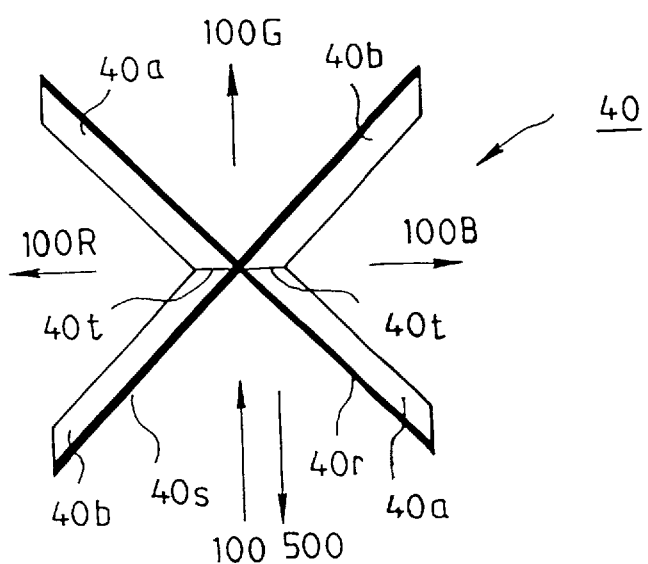
FIG. 7 shows a plan view of a cross dichroic mirror of the present invention.

Operation of the image generation apparatus will be described with reference to FIGS. 1 to 6. White output light 100 from a light source system (not shown) projects a cross dichroic mirror 40. (A lighting equipment as the light source system for this embodiment will be stated later.) As shown in FIG. 7, the cross dichroic mirror 40 is composed of the dichroic mirror 40*a* having a surface 40*r* for reflecting red light and the dichroic mirror 40*b* having a surface 40*s* for reflecting blue light. The dichroic mirrors 40*a* and 40*b* are combined crossly and their reflecting surfaces 40*r* and 40*s* go orthogonally. The two surfaces 40*r* and 40*s*, applied thin film, go continuously without any open space at their crossing line.

The output light 100 from the light source system is separated into red light 100R, green light 100G and blue light 100B by the cross dichroic mirror 40. The separated red light 100R is reflected at a reflecting mirror 24 and the reflected red light is transmitted through a liquid crystal panel 30 for red (R-LCD). Image signals have been already input in the liquid crystal panel 30 for red (R-LCD). The transmitted red light 100R is controlled its light strength depending upon the image signals, namely the red light is optically modulated. The modulated light is reflected at a reflecting mirror 27 and input into a cross dichroic mirror 41. The cross dichroic mirror 41 has the same configuration as shown in FIG. 7.

The separated green light 100G is reflected at a reflecting mirror 26 and the reflected green light is transmitted through a liquid crystal panel 31 for green (G-LCD). Image signals have been already input in the liquid crystal panel 31 (G-LCD). The transmitted green light 100G is controlled its light strength depending upon the image signals, namely the light is optically modulated. The modulated light is reflected at a reflecting mirror 29 and input into the cross dichroic mirror 41.

Similarly, the separated blue light 100B is input into the cross dichroic mirror 41 through a reflecting mirror 25, liquid crystal panel 32 for blue (B-LCD) and a reflecting mirror 28.

The input red light 100R, green light 100G and blue light 100B are synthesized at the cross dichroic mirror 41 to generate an image.

Figure 8:
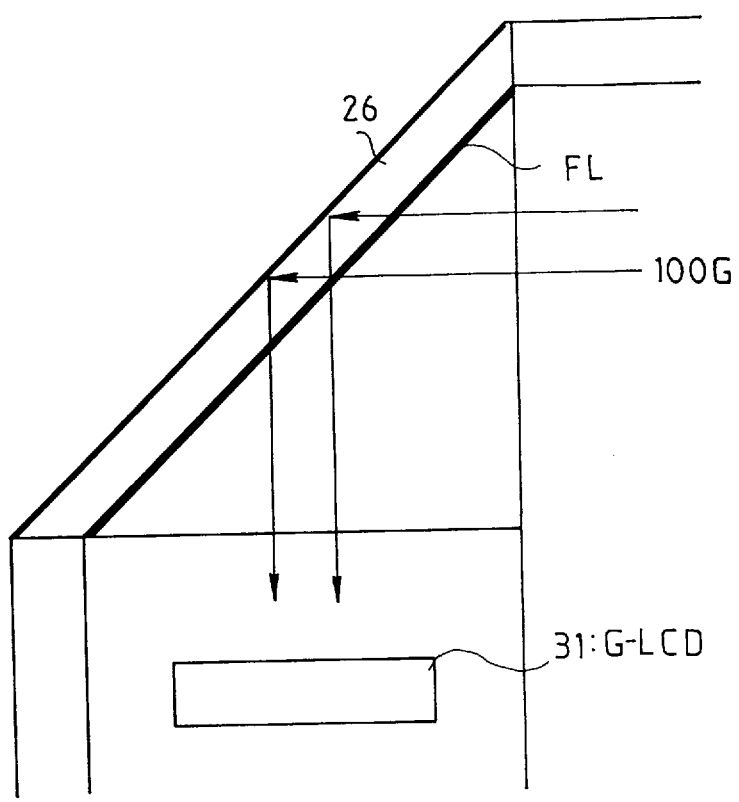
FIG. 8 shows a side view of a reflecting mirror of the present invention.

As shown in FIG. 8, a polarization film FL is applied to the reflecting mirror 26. The polarization films FL are also applied to the reflecting mirrors 24, 25, 27, 28 and 29. The polarization film has a function of polarizer for the liquid crystal panels 30, 31 and 32 (R-LCD, G-LCD, B-LCD).

An optical system of the embodiment will now be explained with reference to FIGS. 4 and 9. In the case that diameter of a main reflecting mirror 11 is Dm and diameter of a projection lens 50 is Dz, size of the diameter Dm or Dz is larger than size of the cross dichroic mirror 40 or 41, or the liquid crystal panel. Therefore, as shown in FIG. 4, a spacer having height H1 is provided for the liquid crystal projector. The height H1 of the spacer is set up for the main reflecting mirror 11 and the projection lens 50 to be structurally within the box of the liquid crystal projector. The height H1 is also set up for optical path for inputting and optical path for outputting, not to interfere one another.

Each of the liquid crystal panels is installed at the center of the height H1 of the spacer. Accordingly, optical path lengths from the light source to each of the liquid crystal panels are equal. Optical path lengths from each of the liquid crystal panels to the projection lens 50 are also equal. Each liquid crystal panel is provided at the center of the optical path from the light source to the projection lens 50.

Figure 9:
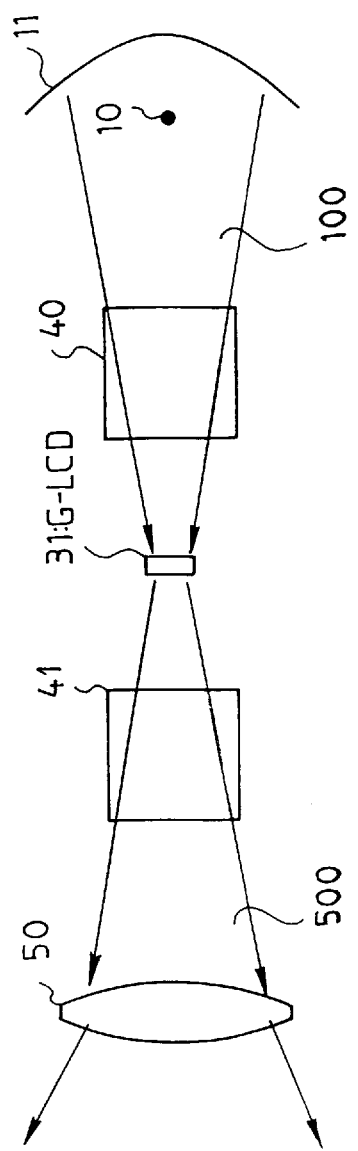
FIG. 9 shows an optical system of the present invention.

FIG. 9 illustrates a configuration of the optical system shown in FIG. 4.

The output light 100 from the main reflecting mirror forms conic luminous flux in order to be collected on the liquid crystal panel 31. The output light 100 is input into the liquid crystal panel 31 through the cross dichroic mirror 40. The light modulated in the liquid crystal panel 31 is output spreading conically. This light goes to the projection lens 50 through the cross dichroic mirror 41. Namely, a characteristic of the embodiment is to irradiate conic luminous flux and collect the luminous flux onto the liquid crystal panel. By projecting the conic luminous flux on the liquid crystal panel, the light can be effectively utilized. In addition, the above stated structural difference that the size of the main reflecting mirror or the projection lens is larger than the size of the cross dichroic mirror 40 or 41, or the liquid crystal panel 30, 31 or 32, can be overcome.

The liquid crystal panels are used as optical modulators. Pixel size of the liquid crystal panel 31 for green is minuter than pixel size of other two liquid crystal panels 30 and 32 for red and blue in this embodiment. Bandwidth for image signal of green is wider than that for image signal of other colors in this embodiment. The reason for this is as follows.

A human eye has a visual characteristic that recognizable resolution for luminance is high and recognizable resolution for color is low. The following two examples are about the liquid crystal projector using the human visual characteristic in order to obtain a beautiful image.

As the first example, there is a method that optical modulation means is composed of optical modulation means for luminance signal and optical modulation means for color signal. (Projecting apparatus applying this method was filed on Apr. 27, 1994 to Japanese Patent Office by the same applicant as the present invention. Japanese Patent Application Number of the filing is 6-89354.)

As the second example, there is a method that optical modulation means is composed of optical modulation means for green color signal and optical modulation means for red color signal and blue color signal. The optical modulation means for green color signal modulates green light from the above-mentioned optical separation means, based on a green color signal in input image signals. The optical modulation means for red color signal and blue color signal modulates red light or blue light from the above-mentioned optical separation means, based on a red color signal or blue color signal in input picture signals. In addition, this projecting apparatus has the following characteristics. Pixel size of the optical modulation means for red color signal and blue color signal is larger than that of the optical modulation means for green color. Frequency bandwidth of the green color signal is wider than that of the red color signal or the blue color signal. (Projecting apparatus applying this method was filed on Dec. 1, 1994 to Japanese Patent Office by the same applicant as the present invention. Japanese Patent Application Number of the filing is 6-298462.)

In the configuration of this embodiment, pixel size of the optical modulation means for green color signal is smaller than that of the optical modulation means for red color signal and blue color signal. Namely, resolution of the liquid crystal panel for green is higher than resolution of the other liquid crystal panels for red and blue. The frequency bandwidth of the green color signal is wider than that of the red color signal or the blue color signal. The reason for selecting green is based on a characteristic that human eye is more sensitive to green information than to red or blue information.

It is not necessary to set high resolution for all the three colors. Reason for this will now be described.

Even if all the three colors, red, green and blue, are expressed in high resolution, it is impossible for the human visual characteristic to identify the high resolution of them, because such color signals are in excessive efficiency. Therefore, it is not necessary to set high resolution for all the three colors. In order to obtain a beautiful image, it is enough for the human eye to have high precise image data for at least one of the three color signals.

Regarding the liquid crystal panel, only one liquid crystal panel having high resolution is necessary for corresponding with the high precise image data, and then liquid crystal panels having low resolution can be used for other colors.

Making the resolution of the liquid crystal panel high brings about the cost increase, because rate of panel production becomes low when the high resolution is needed for the liquid crystal panel. In addition, the resolution enhancing brings about a brightness decline of the image because aperture efficiency of the panel decreases. In this method, the number of the liquid crystal panels having the high resolution is suppressed as few as possible, and an apparatus adapted to a signal band can be structured by using the liquid crystal panel having low resolution. Accordingly, this method is suitable for obtaining a low-priced and practical projector.

Comparing with the case that all the three colors are expressed in high resolution, data amount for an image signal can be lessened without giving any deteriorated feeling of image quality.

There is an effect that the whole size of the image generation apparatus can be compact in proportion as the size of the liquid crystal panel becomes small.

As stated above, it is not necessary for all the liquid crystal panels to have the same efficiency. Therefore, a selection method for the liquid crystal panel based on an escalating inspection standard can be considered.

The escalating inspection standard indicates that an inspection standard of the liquid crystal panel is set to be lowered in order of green, red and blue.

Concretely, each critical value of panel yield at the manufacturing process is strictly defined in order of green, red and blue. Namely, liquid crystal panels for green are selected based on the critical value of the panel yield for green, which is defined most strictly. Then, liquid crystal panels for red are selected based on the critical value of the panel yield for red, which is defined lower than the panel yield for green. Liquid crystal panels for blue are selected based on the critical value of the panel yield for blue, which is lowestly defined. In an actual liquid crystal panel manufacturing process and an inspection process of the manufactured liquid crystal panel, panels are firstly selected based on the inspection standard of the liquid crystal panel for blue, which is the lowest standard. Panels which do not satisfy the inspection standard of liquid crystal panel for blue are not going to be used because they have defects.

Secondly, panels are selected based on the inspection standard of the liquid crystal panel for red. Panels which do not satisfy the inspection standard of liquid crystal panel for red are going to be used as the liquid crystal panels for blue.

Thirdly, panels are selected based on the inspection standard of the liquid crystal panel for green. Panels which do not satisfy the inspection standard of liquid crystal panel for green are going to be used as the liquid crystal panels for red. Panels which satisfy the inspection standard of liquid crystal panel for green are going to be used as the liquid crystal panel for green.

The critical value of the panel yield can be defined depending upon the above-mentioned human visual characteristic.

In the image generation apparatus of this embodiment, a red light reflecting dichroic mirror for optical separation and a red light reflecting dichroic mirror for optical synthesis are installed on the same plane. In addition, a blue light reflecting dichroic mirror for optical separation and a blue light reflecting dichroic mirror for optical synthesis are installed on the same plane. Therefore, the compact structure can be realized.

Each liquid crystal panel is vertically installed with respect to both of the red light reflecting dichroic mirror and the blue light reflecting dichroic mirror, which also makes the structure compact.

Each liquid crystal panel is installed on the same plane which is vertical with respect to the cross dichroic mirror. The cross dichroic mirror is located in the center of the liquid crystal panels. Thus, optical path lengths from the light source to each of the liquid crystal panels are equal.

Comparing with the configuration of the conventional optical system, optical path length from the lamp can be lessened. Namely, light amount input into the liquid crystal panel can be increased, which makes the image bright.

Optical path lengths from each of the liquid crystal panels to the location of synthesizing light signals (that is a mirror surface of the cross dichroic mirror) are also equal, which makes the image beautiful and well-focused.

The optical path is formed by the six reflecting mirrors, which surround the cross dichroic mirror and the three liquid crystal panels. Since the polarization film FL is applied on the six reflecting mirrors 24 to 29, it is not necessary to establish a polarizer on the liquid crystal panel, as an annex. As stated above, the polarizer is not as heat-resistant as the liquid crystal panel. Since the polarization film FL is applied on the reflecting mirrors 24 to 29 in the present embodiment, the reflecting mirrors can be used as heat radiating means, which leads to effect that the disadvantage of the heat resistance of the polarization film can be overcome. As each reflecting mirror is installed at 45 degrees with respect to each liquid crystal panel, size of a side of the polarization film applied on the reflecting mirror in this embodiment can be 1.4 times as large as that of the polarization film applied on the liquid crystal panel. Accordingly, the heat radiating efficiency is further enhanced. As shown in FIG. 8, the light is transmitted through the polarization film FL to get into the reflecting mirror from a front surface of the reflecting mirror, and then reflected at the other surface of the reflecting mirror to go out of the reflecting mirror through the polarization film applied on the front surface of the reflecting mirror. Since the light is transmitted through the polarization film twice, at getting into the reflecting mirror and at getting out of it, polarization effect can be twice as much as the polarization effect in the case of being transmitted through the polarization film once. Therefore, thickness of the polarization film can be thinned down to one second. Generally, the thinner the polarizer is, the better the polarization efficiency becomes, which is one of the advantages of the present embodiment.

In addition, since the deterioration of the polarizer caused by the heat can be lessened, the life time of the components can be extended. Since the liquid crystal panels having low resolution are used for red and blue, a practical and low-priced image generation apparatus can be realized. The conventional disadvantage that the light source power can not be very strong because the polarizing plate gets the heat, can be overcome. Consequently, the liquid crystal projector giving a bright image can be realized. The liquid crystal projector can be used even under bright illumination without turning down the illumination of the room. Conventionally, the illumination has been turned down.

In the present embodiment, since the cross dichroic mirror having no joints is used as shown in FIG. 7, no joint of the cross dichroic mirror is projected on the screen even when distance between the liquid crystal panel and the cross dichroic mirror for optical synthesis becomes short. The conventional disadvantage that the joint of the cross dichroic mirror has been projected on the screen, can be overcome.

According to the present embodiment, since the spacer having height H1 is provided, each component can be arranged without any inconsistency even when size of the main reflecting mirror of a lighting equipment is large or diameter of the projection lens is large.

Conventionally, there has been a method that the cross dichroic mirror is two-stagedly arranged to construct the liquid crystal projector. The following respects of the liquid crystal projector of the present embodiment are very different from the conventional liquid crystal projector. Optical path lengths of red, green and blue from the light entering the liquid crystal projector to the light going out of the liquid crystal projector are equal, and each liquid crystal panel is located at the center of each optical path. In the liquid crystal projector of the configuration of the present embodiment, the arrangement of the cross dichroic mirror and the liquid crystal panel is considered in order to realize an ideal optical path. Especially, it is a great characteristic of the present embodiment to have the configuration wherein the optical system having the liquid crystal panel at the center of the whole optical paths is provided.

Embodiment 1-2.

Figure 10:
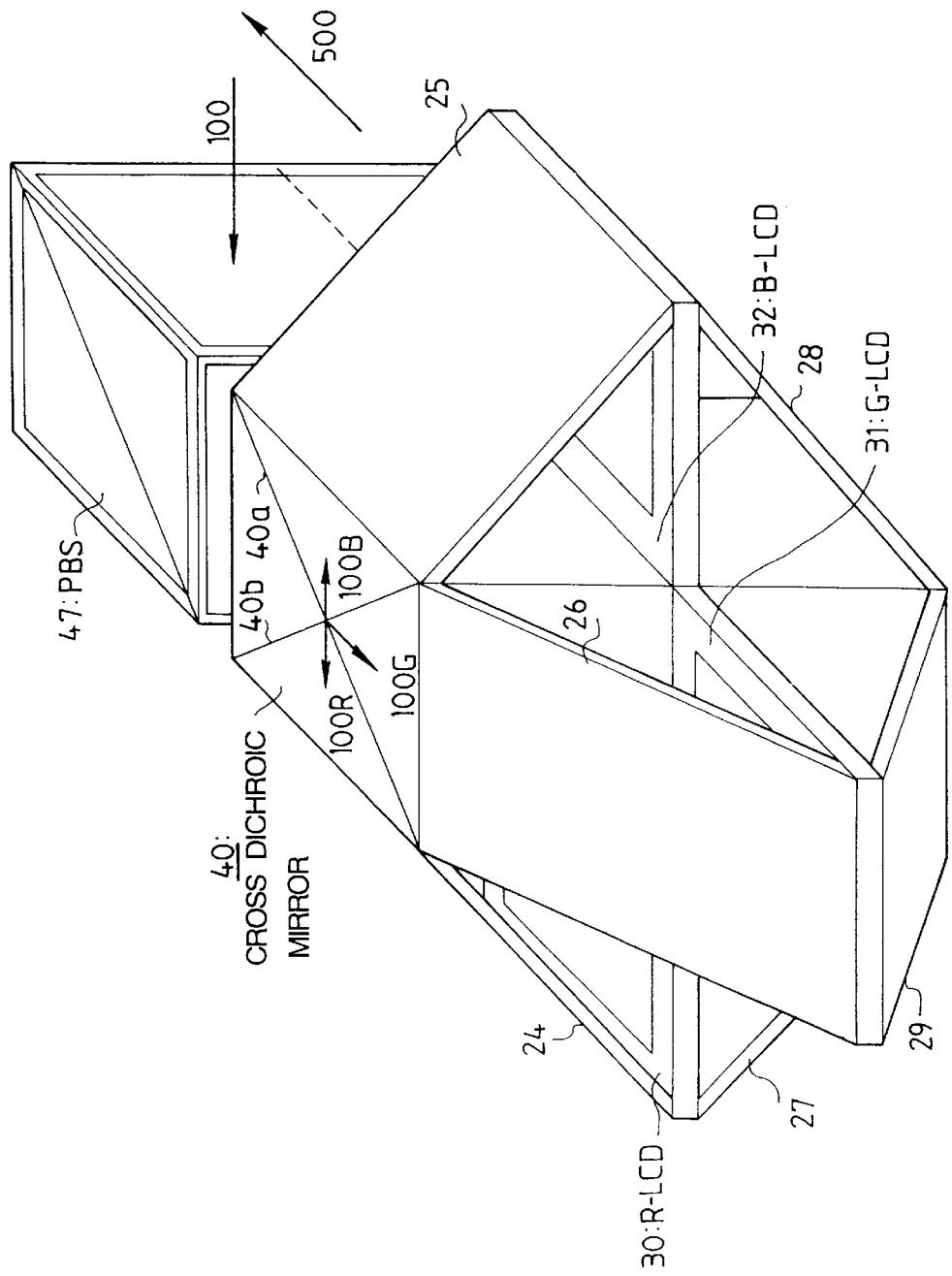
FIG. 10 shows a configuration of an image generation apparatus of the present invention.

FIG. 10 shows a configuration of the image generation apparatus of another embodiment in the present invention.

A polarization beam splitter (PBS) 47 is provided as shown in FIG. 10. Since the PBS 47 is used as the polarizer, the polarization film is not applied on the reflecting mirrors 24, 25, 26, 27, 28 and 29. In addition, as the PBS 47 is provided, it is possible to set the direction of inputting the output light 100 from the main reflecting mirror and the direction of the output light 500 from the liquid crystal projector to be different. Therefore, the spacer having the height H1 as shown in FIG. 1 is not provided. It is also acceptable to provide the spacer having the height H1 in the present embodiment. Since other structural elements are similar to the elements in the image generation apparatus shown in FIG. 1, the explanation about them is omitted.

In the present embodiment, the polarization beam splitter (PBS) 47 is used as the polarizer. The polarization beam splitter polarizingly separates the white light of the natural light into two white light waves, a wave P and a wave S. The polarization directions of the waves P and S go orthogonally each other. The light polarizingly separated has optical wavelength of 400 nm to 700 nm, which is human visible light.

As stated above, the projector applying the polarizer has conventionally had the problem that the polarizer is deteriorated by the heat. Another problem that the light is not effectively projected on the liquid crystal panel since the output light is absorbed by the polarizer, has also existed.

As the polarization beam splitter is used in the present embodiment, the above problems can be solved. The output light from the light source can be processed to polarization light going orthogonally, in advance. Then, owing to this optical system having no polarizer, there is an effect that an optical system which has less light absorbing can be constructed. In addition, there is an effect that the structure of the image generation apparatus can be compact.

The polarization beam splitter of the present embodiment is one component being both optical distributer and optical synthesizer. Accordingly, the number of the components in the image generation apparatus can be lessened.

Figure 11:
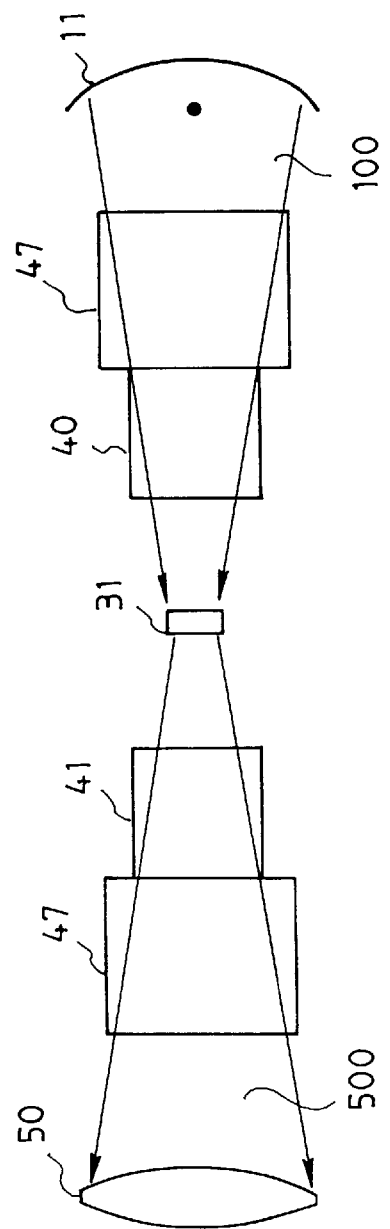
FIG. 11 shows an optical system of the present invention.

FIG. 11 illustrates an optical system of the liquid crystal projector of the present embodiment.

By making the size of the polarization beam splitter (PBS) 47 larger than the size of the cross dichroic mirrors 40 and 41, conic output light 100 can be effectively projected on the liquid crystal panel 31. Similarly, the conic light irradiated from the liquid crystal panel can be effectively output to the projection lens 50.

Embodiment 1-3.

Figure 12:
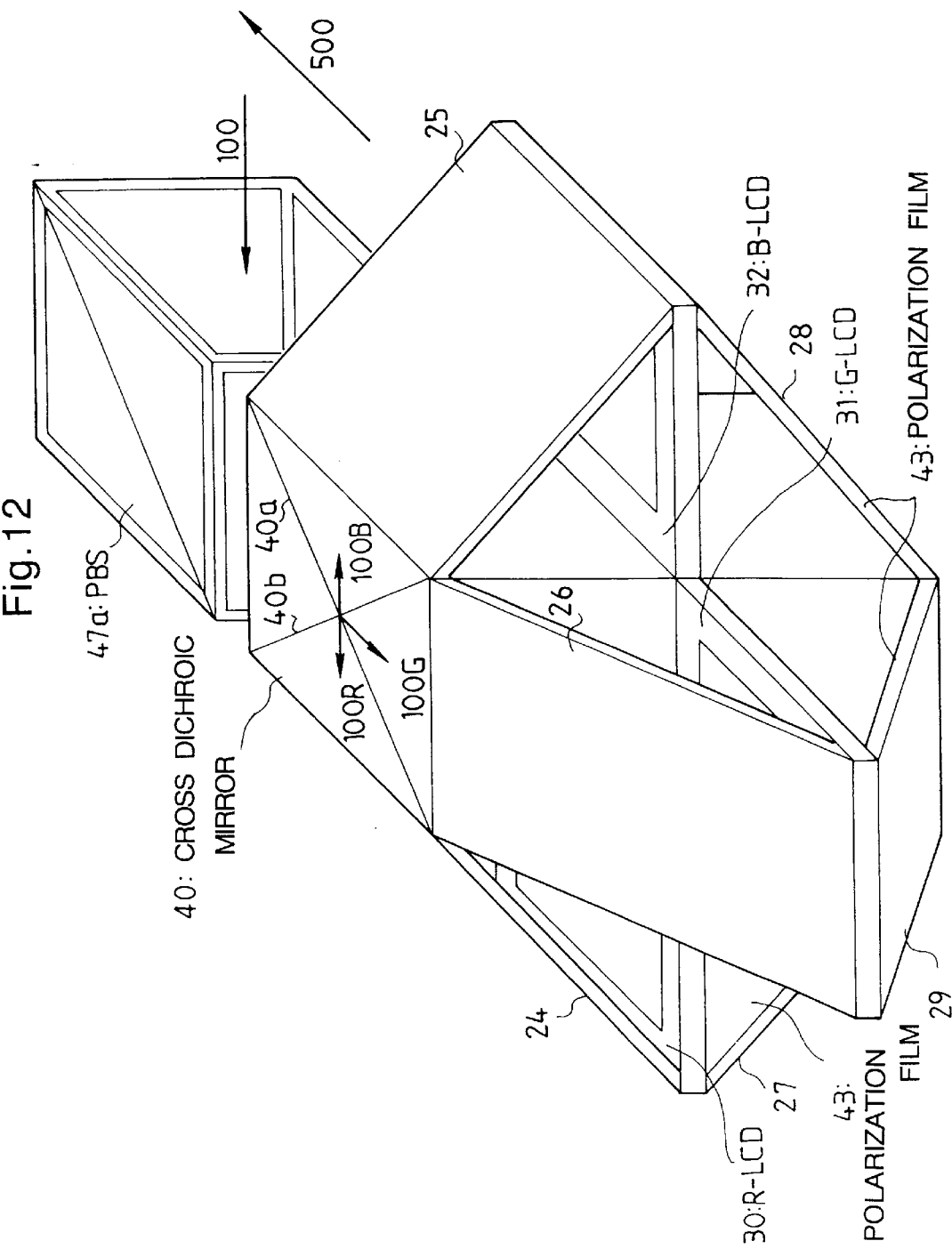
FIG. 12 shows a configuration of an image generation apparatus of the present invention.

FIG. 12 shows a configuration of the image generation apparatus of another embodiment in the present invention.

As shown in FIG. 12, the image generation apparatus of the present embodiment has the configuration wherein lower half of the polarization beam splitter stated in Embodiment 1-2 is removed. As a polarizer substituting for the lower half of the polarization beam splitter, a polarization film 43 is applied on the reflecting mirrors 27, 28 and 29.

Embodiment 1-4.

Figure 13:
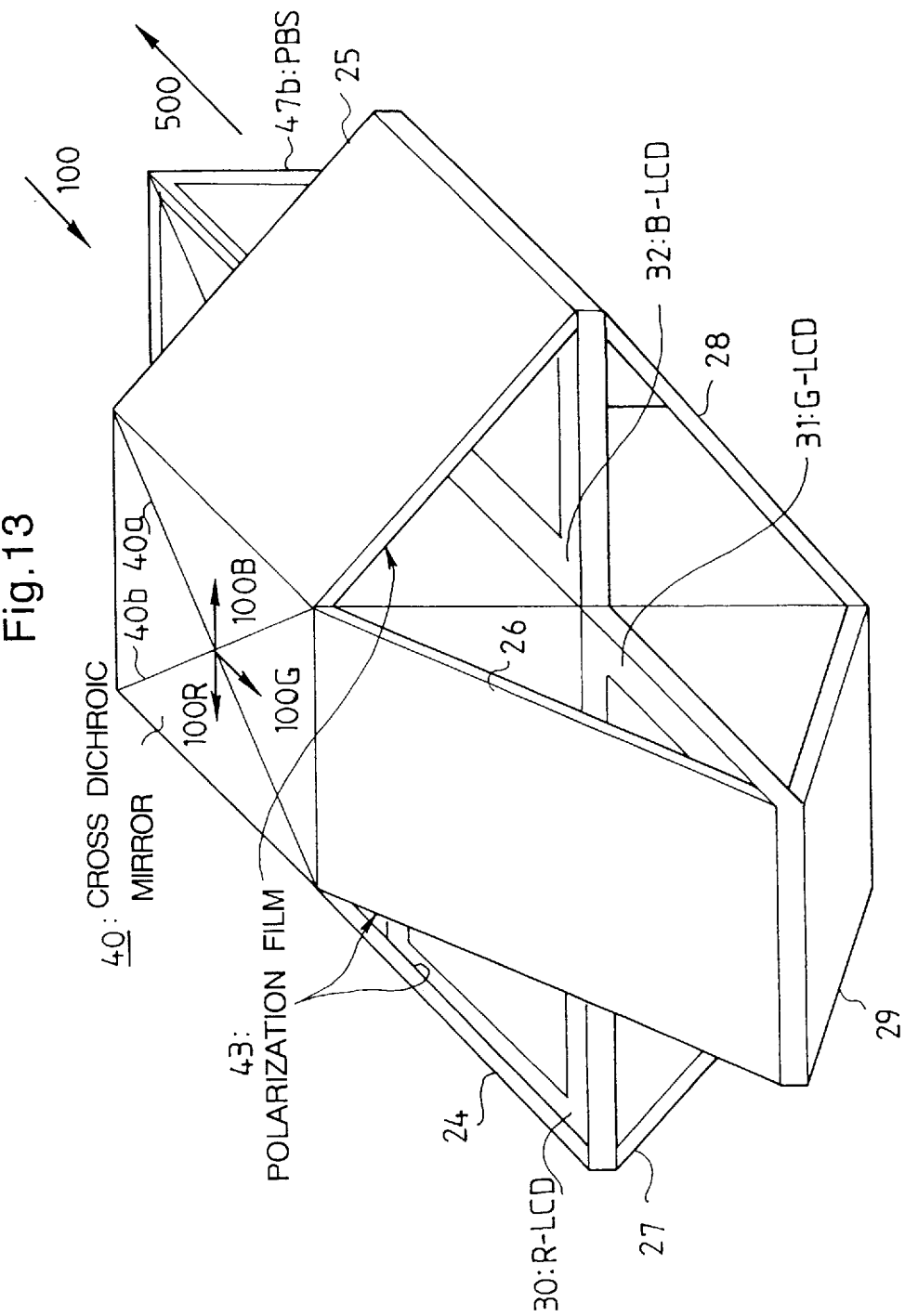
FIG. 13 shows another configuration of an image generation apparatus of the present invention.

FIG. 13 shows a configuration of the image generation apparatus of another embodiment in the present invention.

Contrary to the configuration described in the Embodiment 1-3, upper half of the polarization beam splitter stated in the Embodiment 1-2 is removed in the configuration of the present embodiment. As a polarizer substituting for the upper half of the polarization beam splitter, the polarization film 43 is applied on the reflecting mirrors 24, 25 and 26.

By applying the configuration stated in the Embodiment 1-3 or 1-4, there is an effect that the form of the image generation apparatus can be variable.

It is also acceptable to have a configuration combining both of the Embodiments 1-3 and 1-4. By connecting PBS 47a shown in FIG. 12 with PBS 47b shown in FIG. 13, the configuration, wherein the polarization beam splitter is both the optical distributer and the optical synthesizer as stated in the Embodiment 1-2, can be obtained in the image generation apparatus.

Embodiment 1-5.

In this embodiment, a luminance signal and a color signal are separated, and then the separated signal is optically modulated in the liquid crystal panel and the modulated signal is synthesized to generate the image.

Figure 14:
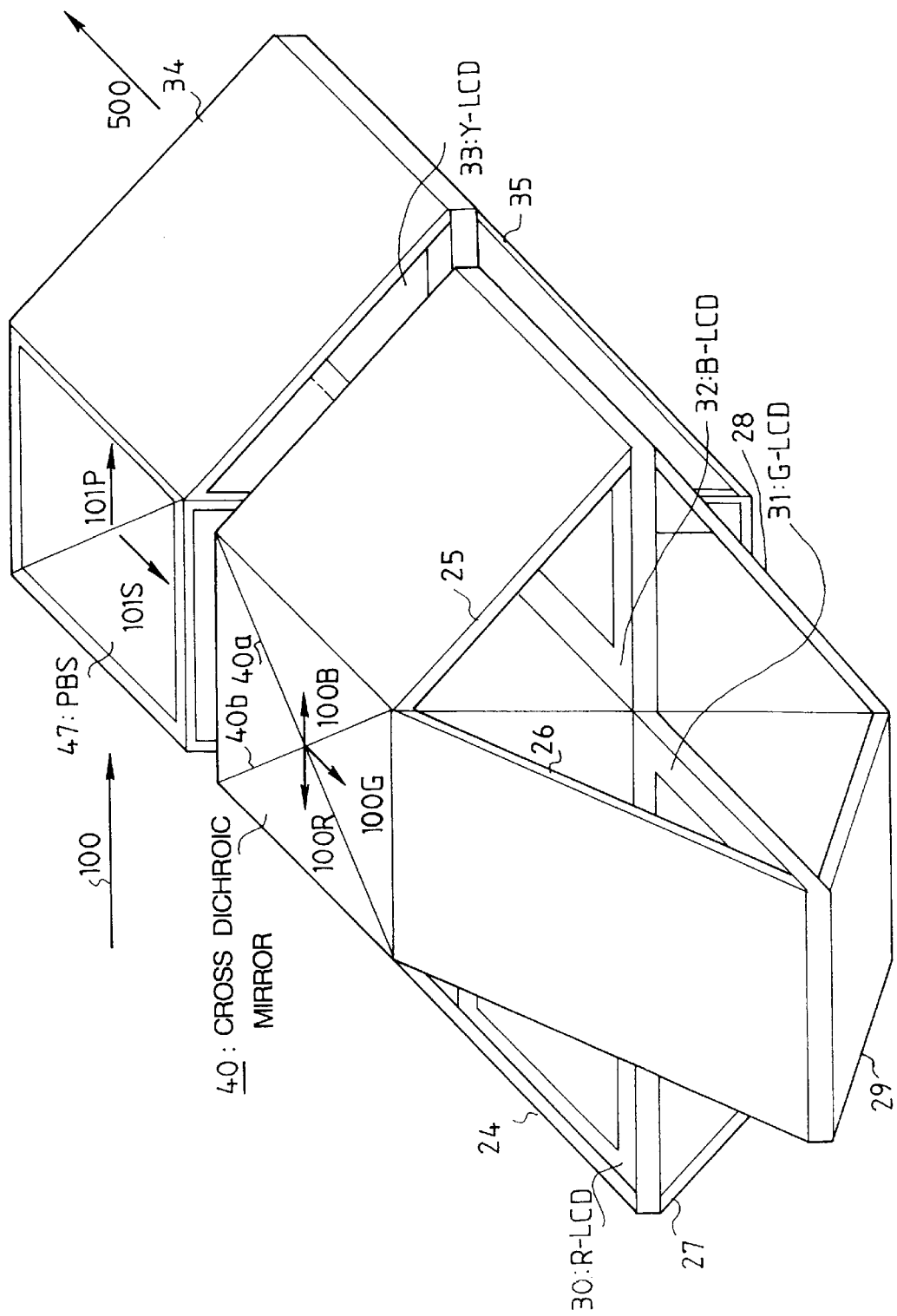
FIG. 14 shows another configuration of an image generation apparatus of the present invention.

FIG. 14 shows a configuration of the image generation apparatus of another embodiment in the present invention.

As shown in FIG. 14, a liquid crystal panel 33 for luminance signal (Y-LCD) is arranged on the same plane as the liquid crystal panel 30 for red (R-LCD), the liquid crystal panel 31 for green (G-LCD), and the liquid crystal panel 32 for blue (B-LCD). The liquid crystal panel 33 for luminance signal is vertically installed with respect to the polarization beam splitter (PBS) 47. The reflecting mirrors 34 and 35 are installed, facing one another, at 45 degrees with respect to both the polarization beam splitter (PBS) 47 and the liquid crystal panel 33 for luminance signal (Y-LCD).

In the present embodiment, pixel size of the liquid crystal panel for color signal is larger than pixel size of the liquid crystal panel for luminance signal. Namely, liquid crystal panel having low resolution is used for the color signal, and liquid crystal panel having high resolution is used for the luminance signal. Since other elements in the configuration are similar to the elements stated in Embodiment 1-2, the explanation about them is omitted.

Operation will now be described. The output light 100 is separated into two waves, a wave P 101P and a wave S 101S, whose polarization directions go orthogonally each other, by a polarization-separation surface of the polarization beam splitter 47. The wave P 101P is projected on the liquid crystal panel 33 for luminance signal and the wave S 101S is projected on the liquid crystal panels 30, 31 and 32 for color signal. Namely, the light is optically separated. Each liquid crystal panel is a transmission type liquid crystal panel for transmitting an optically modulated light.

A polarization direction of the light input into the liquid crystal panel 33 for luminance signal and a polarization direction of the light input into the liquid crystal panel 31 for color signal go orthogonally each other. Therefore, a rubbing direction, which defines an arrangement direction of liquid crystal element of each panel, goes orthogonally one another depending upon the polarization direction of the input light.

When voltage for driving the panel is applied to each liquid crystal panel, the polarization direction of the light, which is transmitted through voltage-applied pixel and is reflected, out of the wave P 101P input into the panel 33 is turned 90 degrees as the result of the inputting and the reflection. Namely, the polarization direction of the light is modulated. The polarizing light is input into the polarization beam splitter 47 as the wave S. Then, the input light is reflected in the direction of the screen, at the polarization-separation surface of the polarization beam splitter 47. The polarization direction of the light, which is transmitted through the voltage-applied pixel and is reflected, out of the wave S 101S input into the panels 30, 31 and 32 for color signal is also turned 90 degrees. The polarizing light is input into the polarization beam splitter 47 as the wave P. The wave P is transmitted through the polarization-separation surface of the polarization beam splitter 47 and goes to the screen.

Accordingly, the light is input into the pixel, which is applied with the voltage for driving the liquid crystal panel, at one panel of the liquid crystal panel 33 for luminance signal and the liquid crystal panels 30, 31 and 32 for color signal. Then, the light is reflected or polarized. The polarizing light is optically synthesized by the polarization beam splitter 47 to be the light 500 wherein color image is synthesized. The light 500 is projected onto the screen (not shown) by a projection lens (not shown). Namely, the polarization beam splitter has a function of optical separator and optical synthesizer.

The polarization beam splitter 47 in the configuration of the present embodiment has the following four functions. The first function is to separate the output light from the light source. The second function is to optically synthesize each modulated light. The third is a function of the polarizer at the input side of the conventional TN type liquid crystal panel. The fourth is a function of an analyzer at the output side of the conventional TN type liquid crystal panel. Since the polarization beam splitter 47 of the present embodiment has the above four functions, the apparatus can be compact and low-priced.

Particularly, since the polarizer and the analyzer are dispensable in the present embodiment, light loss caused by the polarizer and the analyzer is not generated in the optical path. The loss is commonly around 50%. Even when power-downed lights of the wave P and the wave S is respectively optically modulated at the liquid crystal panels, total projected light power is not downed since natural light is polarizingly separated into the wave P and the wave S and the modulated light from each liquid crystal is optically synthesized in the polarization beam splitter 47. Accordingly, a bright projected image can be generated.

The optical path lengths are in the minimum length and each of the components can be integrated in the optical system of FIG. 14. Therefore, it is possible to apply a module configuration of a three-dimensional "one-package".

As stated above, depending upon the human visual characteristic, the liquid crystal panel for luminance signal has higher resolution than that of the liquid crystal panel for color signal. Therefore, the following selection method of the liquid crystal panel can be considered. When the liquid crystal panels for luminance signal or for color signal are taken from one substrate as many as possible, a critical value of panel yield at the manufacturing process is defined most strictly for the liquid crystal panel for luminance. Then, the liquid crystal panels for luminance are selected based on the strictest critical value. A critical value of the panel yield for green is defined lower than that of the panel yield for luminance. Then, liquid crystal panels for green are selected based on the critical value. A critical value of the panel yield for red is defined lower than that of the panel yield for green. Then, liquid crystal panels for red are selected based on the critical value. A critical value of the panel yield for blue is defined most lowly. Then, liquid crystal panels for blue are selected based on the lowest critical value.

When a large-sized liquid crystal panel for luminance is needed to use, such a liquid crystal panel can be produced by taking the following liquid crystal panels from one substrate as many as possible. A liquid crystal panel for luminance is applied with TFTs (Thin Film Transistors) whose rule size is the same as that of liquid crystal panel for color in a color processing part. The liquid crystal panel for luminance has a similar shape to the liquid crystal panel for color. Area of the liquid crystal panel for luminance is four times as much as that of the panel for color.

The inspection method based on the above-mentioned escalating inspection standard can also be used for selecting the liquid crystal panel for luminance and that for color. By setting additional escalating inspection standard which is most strictly defined for the liquid crystal panel for luminance, the above-mentioned inspection method can be intactly used.

Embodiment 2

Embodiment 2-1.

The lighting equipment used in the above-mentioned image generation apparatus will be explained in Embodiments 2-1 to 2-10.

Figure 15:
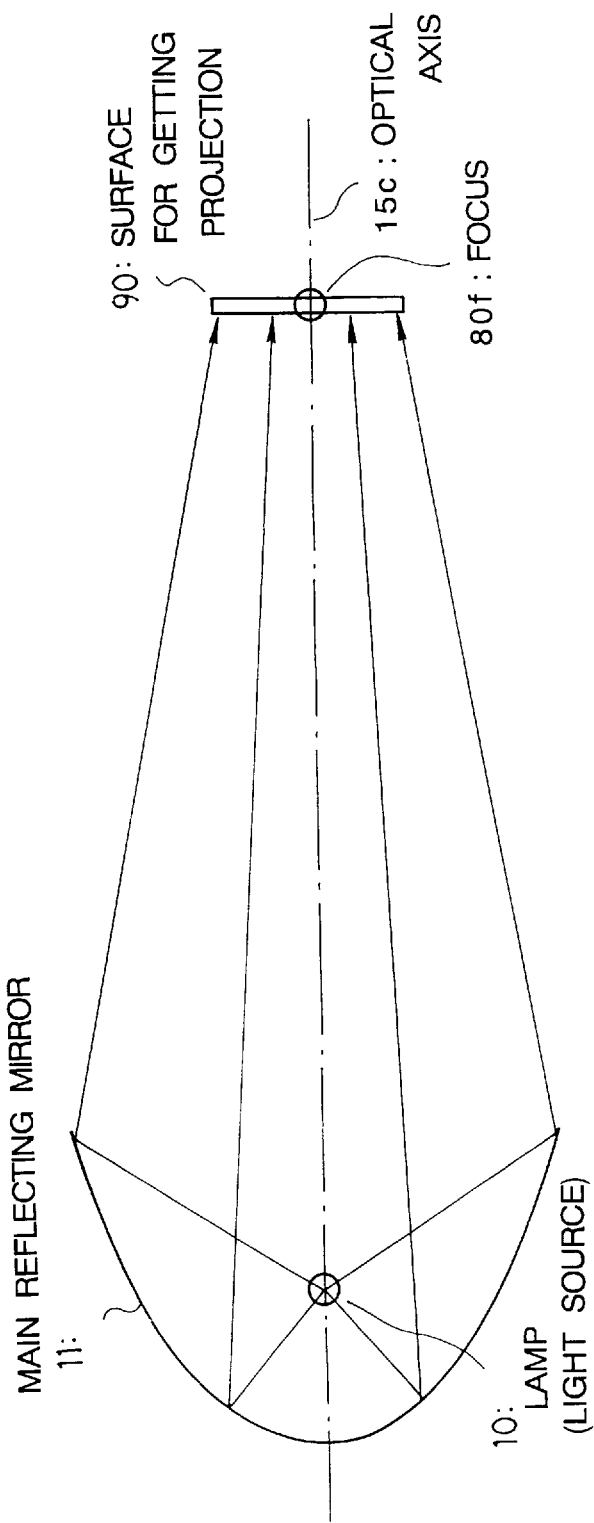
FIG. 15 shows a configuration of a lighting equipment of the present invention.

FIG. 15 shows a sectional view of the lighting equipment of the present embodiment. The lighting equipment is composed of the lamp 10 and the main reflecting mirror 11. The main reflecting mirror 11 is a rotating elliptic mirror. In this embodiment, the lamp 10 is located at a focus or close to the focus of the rotating elliptic mirror. A surface 90, on which the light is projected, is located at the other focus 80f of the rotating elliptic mirror to make an optical axis 15c be a center or a general center of the surface 90. The other focus 80f of the rotating elliptic mirror is a point where the diameter of the conically collected luminous flux becomes the smallest.

Output light from the lamp 10 is conically collected by applying the above configuration for the lighting equipment. Therefore, the light can be effectively projected on a small-sized liquid crystal panel.

Embodiment 2-2.

Figure 16:
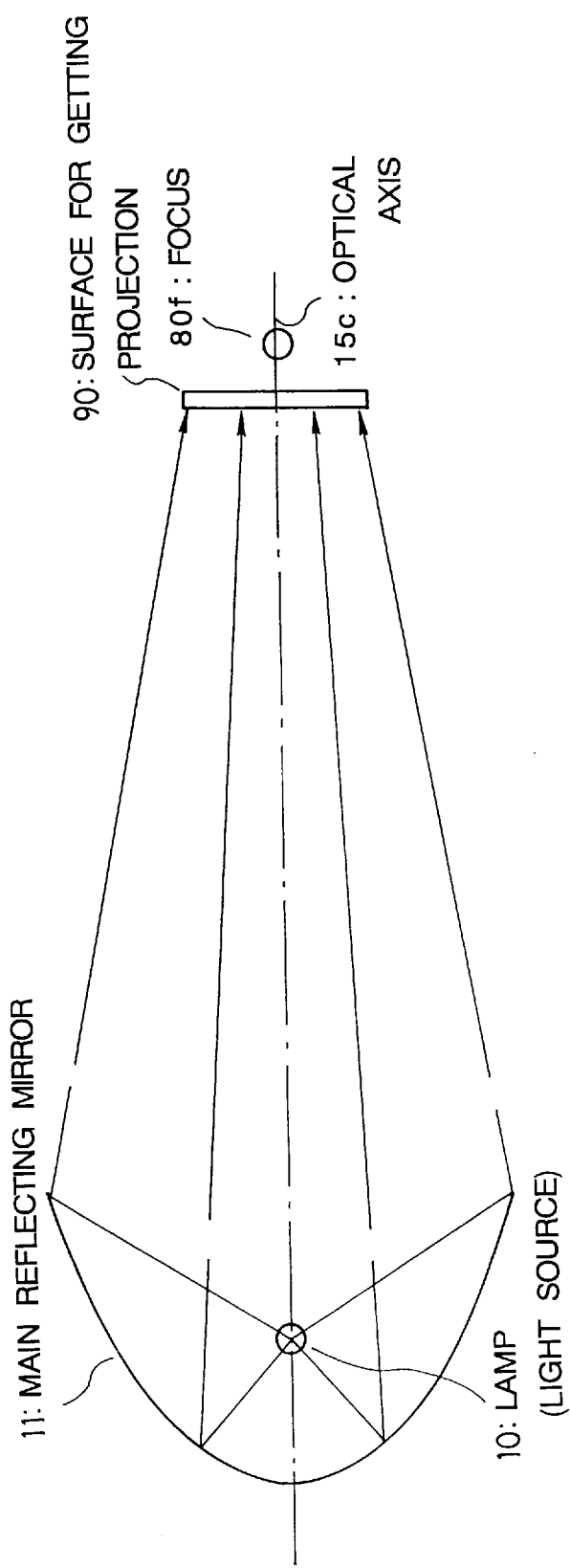
FIG. 16 shows another configuration of a lighting equipment of the present invention.

FIG. 16 shows a sectional view of the lighting equipment of the present embodiment.

The configurations of the lamp 10 and the main reflecting mirror 11 are the same as those of the Embodiment 2-1. In the present embodiment, the surface 90 for getting projection is located a little closer to the lamp 10 than the other focus 80f of the rotating elliptic mirror. Similar to the Embodiment 2-1, the light is effectively projected on the small-sized liquid crystal panel in the present embodiment.

Embodiment 2-3.

Figure 17:
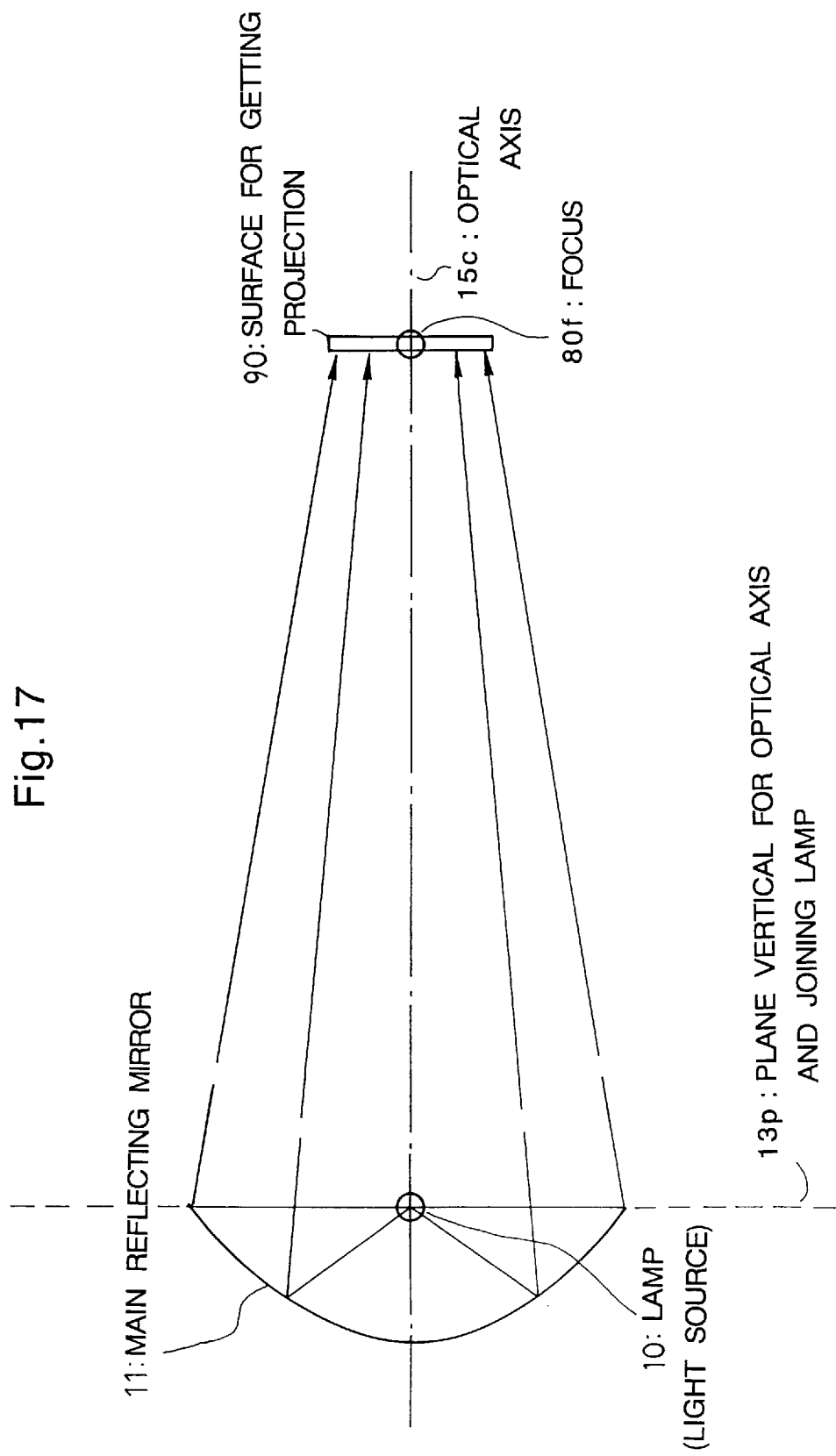
FIG. 17 shows another configuration of a lighting equipment of the present invention.

FIG. 17 shows a sectional view of the lighting equipment of the present embodiment.

Elements except the shape of the main reflecting mirror 11 are similar to the elements in FIG. 15. The main reflecting mirror 11 is a rotating elliptic mirror and is cut at a plane 13p which is vertical with respect to the optical axis and joins the lamp 10. Similar to FIG. 15, the lamp 10 is located at the focus or the general focus of the rotating elliptic mirror, which indicates that the main reflecting mirror 10 is cut at the plane which joins the focus or the general focus. Owing to this configuration, collecting efficiency of the output light from the main reflecting mirror 11 can be enhanced. Accordingly, similar to the above Embodiment, the light can be effectively projected on the small-sized liquid crystal panel in the present embodiment.

Embodiment 2-4.

Figure 18:
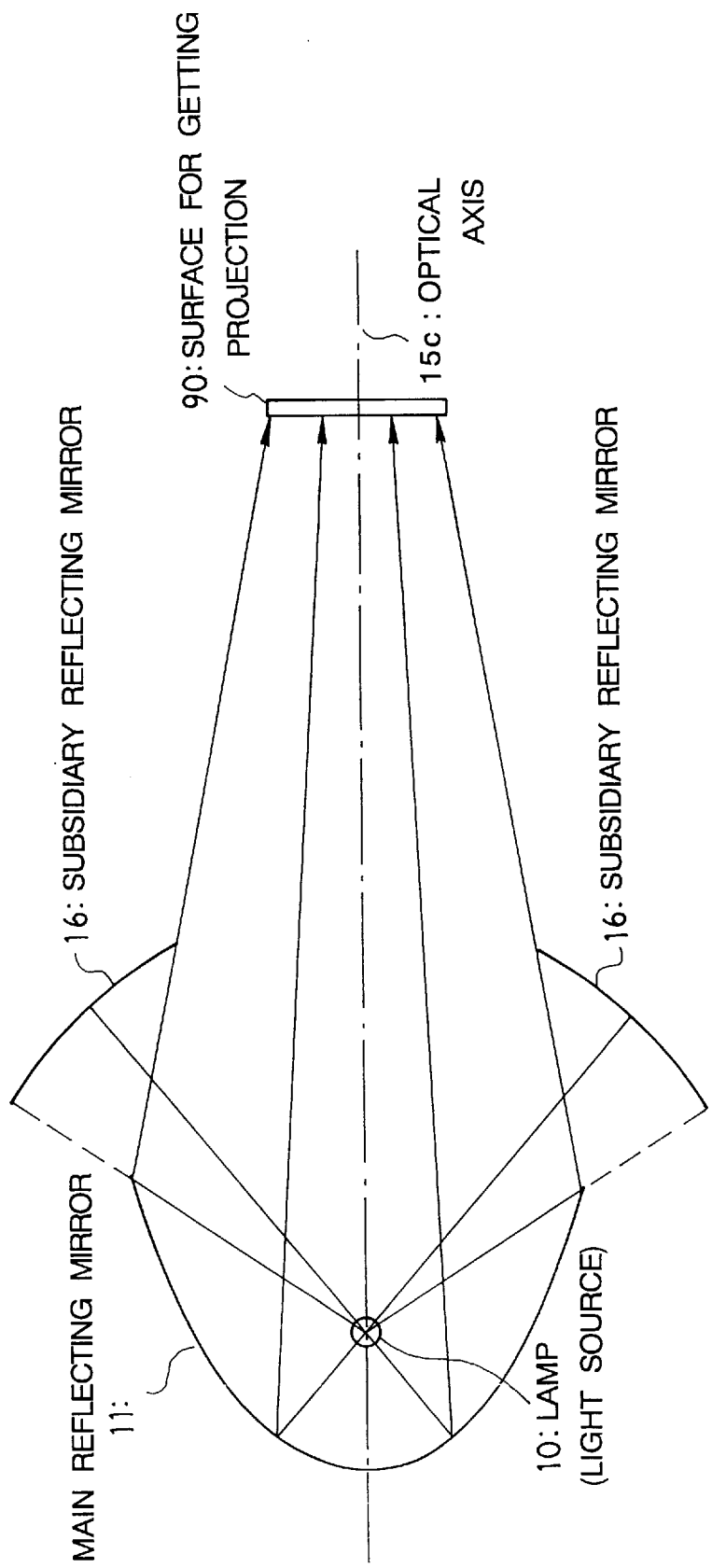
FIG. 18 shows another configuration of a lighting equipment of the present invention.

A lighting equipment including a subsidiary reflecting mirror will now be stated. The subsidiary reflecting mirror is used for returning the output light irradiated forward, to the lamp in order to utilize the light effectively. FIG. 18 shows a sectional view of the lighting equipment of the present embodiment. The configuration of the lighting equipment of the present embodiment can be made by adding a subsidiary reflecting mirror 16 to the configuration of FIG. 15 or FIG. 16. The subsidiary reflecting mirror 16 is a sphere mirror. The lamp 10 is located at the center or the general center of the sphere mirror.

Owing to the subsidiary reflecting mirror 16, light which is not directly reflected by the main reflecting mirror 11 can be projected onto the surface 90 for getting projection, via the subsidiary reflecting mirror 16 and the main reflecting mirror 11. Since the subsidiary reflecting mirror 16, being the sphere mirror, is located to set the center or the general center of the sphere mirror just at the location of the lamp 10, light reflected at the subsidiary reflecting mirror 16 is always returned to the main reflecting mirror 11. Namely, light loss can be lessened.

Embodiment 2-5.

Figure 19:
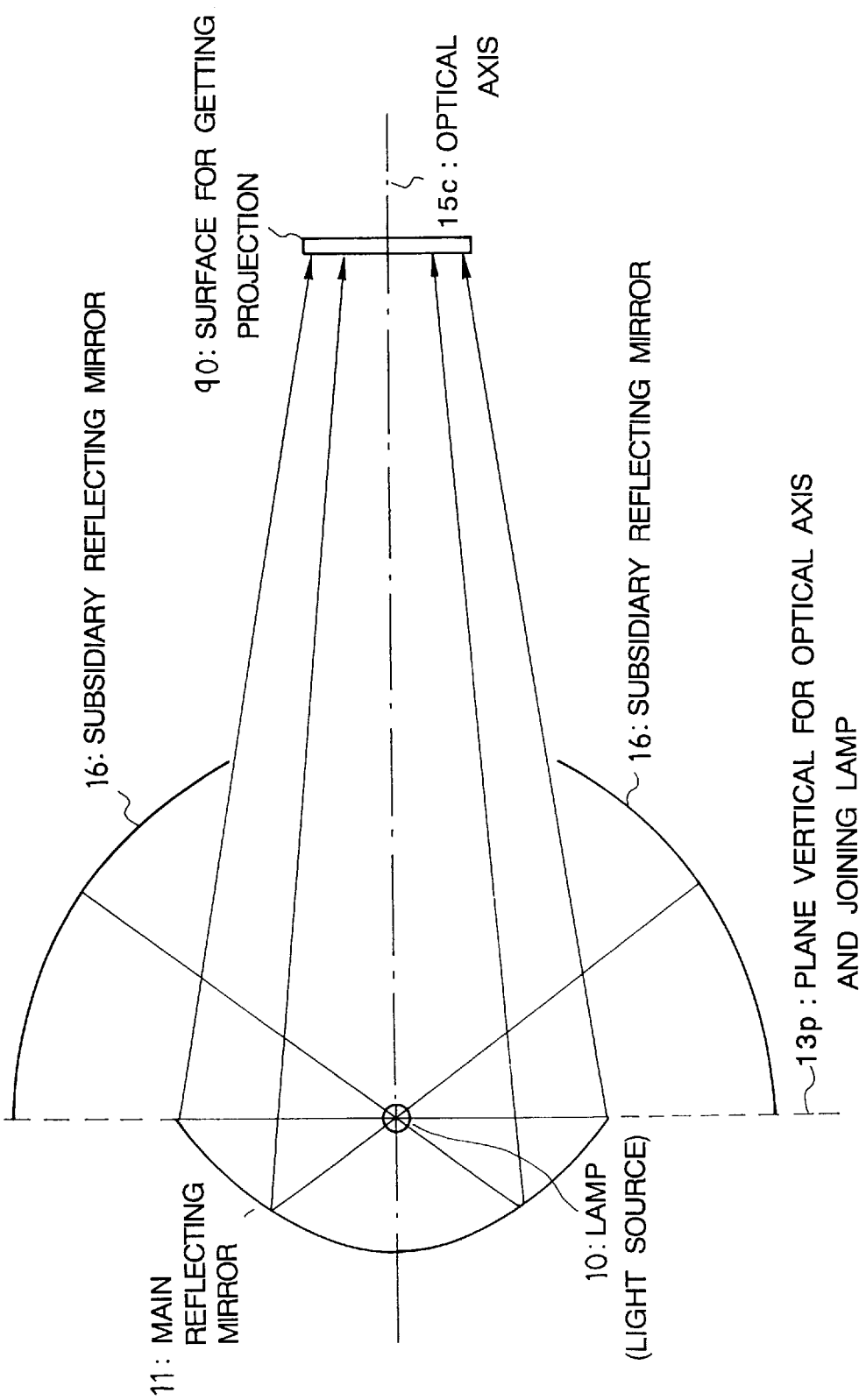
FIG. 19 shows another configuration of a lighting equipment of the present invention.

FIG. 19 shows a sectional view of the lighting equipment of the present embodiment. The configuration of the lighting equipment of the present embodiment can be made by adding the subsidiary reflecting mirror 16 to the configuration of FIG. 17. The subsidiary reflecting mirror 16, being the sphere mirror, is located to set the center or the general center of the sphere mirror just at the location of the lamp 10.

Owing to the subsidiary reflecting mirror 16, light which is not directly reflected by the main reflecting mirror can be projected on the surface 90 for getting projection via the subsidiary reflecting mirror 16 and the main reflecting mirror 11.

Embodiment 2-6.

Figure 20:
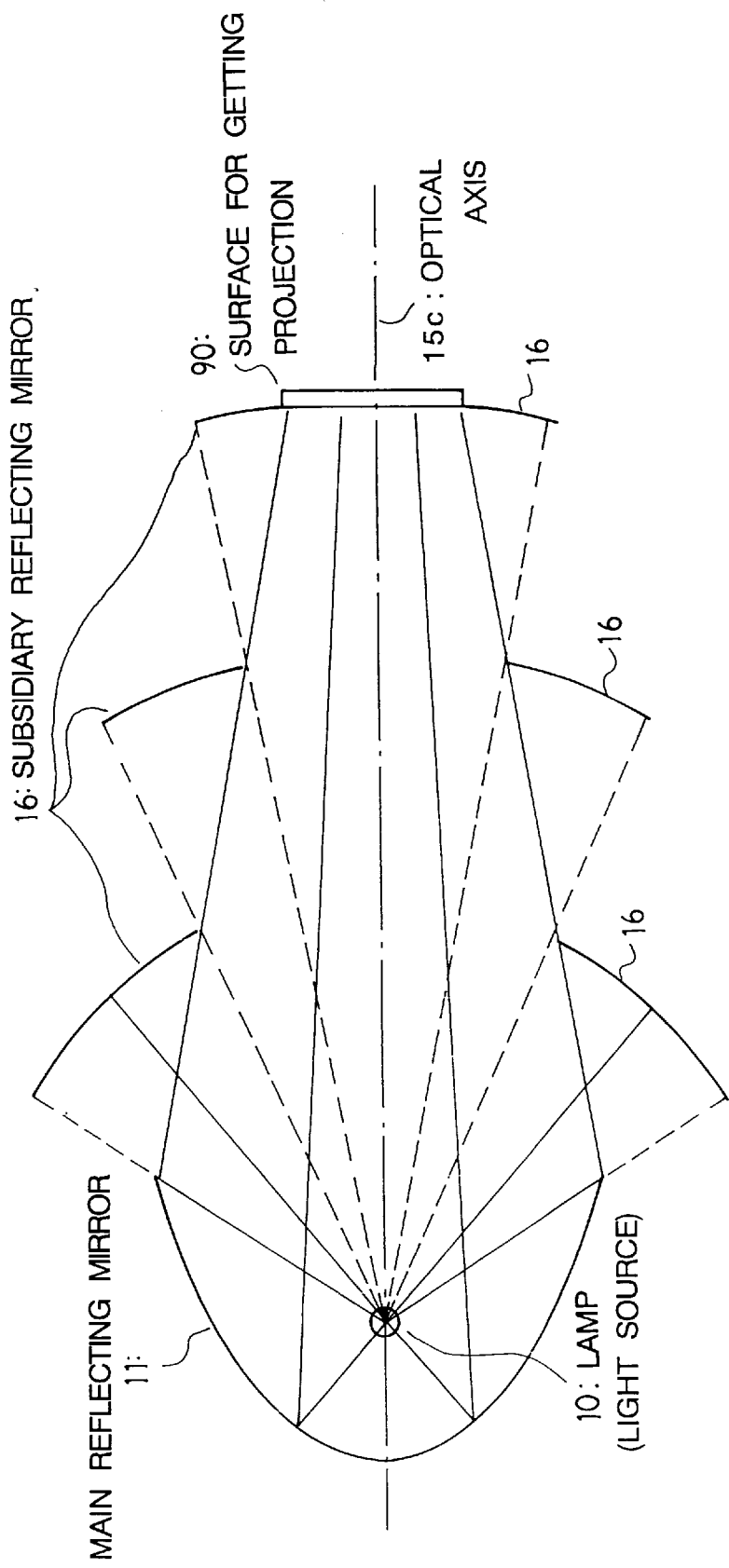
FIG. 20 shows another configuration of a lighting equipment of the present invention.

FIG. 20 shows a sectional view of the lighting equipment of the present embodiment. The configuration of the lighting equipment of the present embodiment can be made by adding a plurality of the subsidiary reflecting mirrors 16 to the configuration of FIG. 18. The plural subsidiary reflecting mirrors 16 are sphere mirrors and located to set the centers or the general centers of the sphere mirrors just at the location of the lamp 10.

Owing to the plural subsidiary reflecting mirrors 16, the light loss can be less in the present embodiment than the above Embodiments. Namely, the output light from the lamp 10 can be effectively projected on the surface 90 for getting projection.

Embodiment 2-7.

Figure 21:
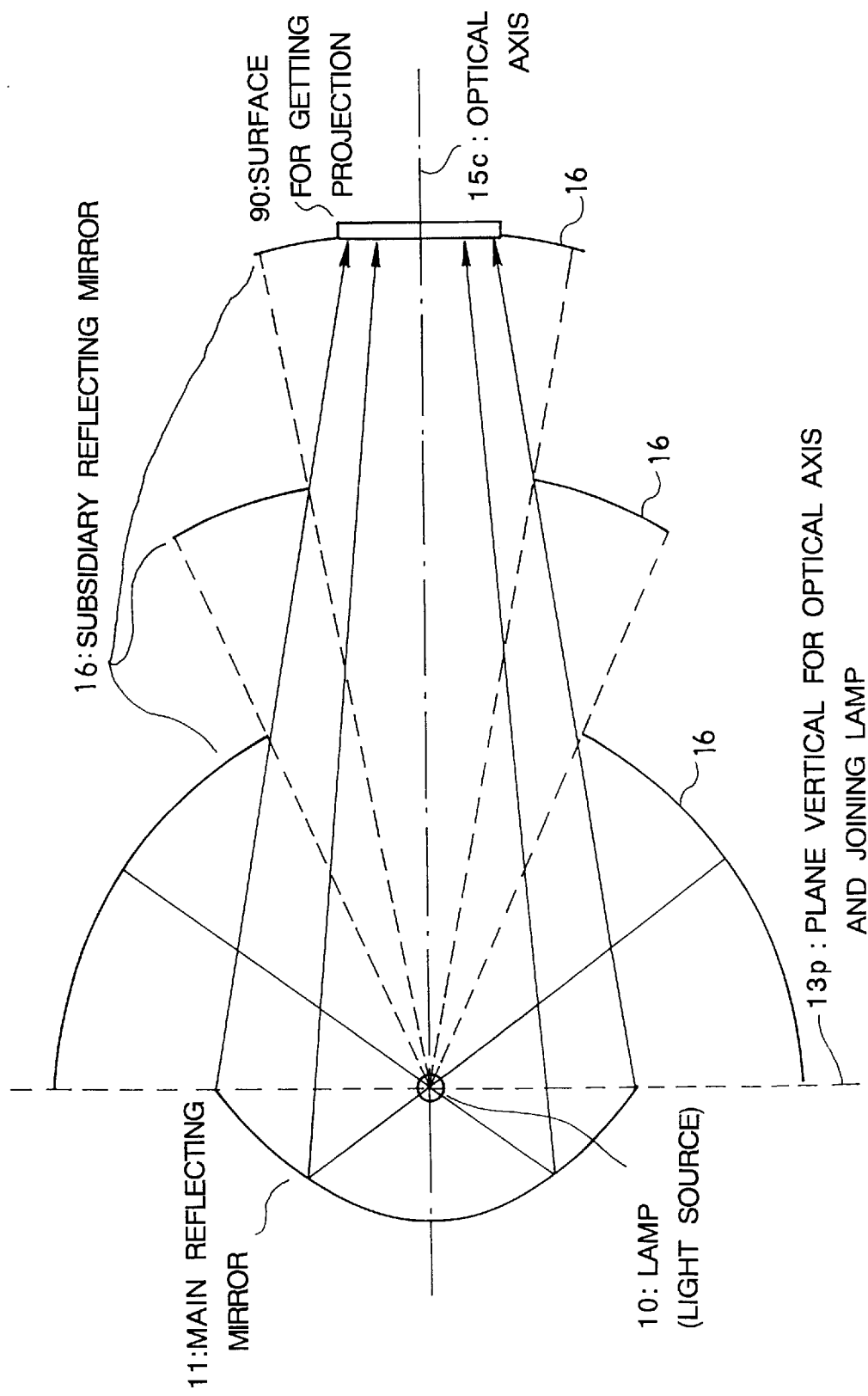
FIG. 21 shows another configuration of a lighting equipment of the present invention.

FIG. 21 shows a sectional view of the lighting equipment of the present embodiment. The configuration of the lighting equipment of the present embodiment can be made by adding a plurality of the subsidiary reflecting mirrors 16 to the configuration of FIG. 19. The plural subsidiary reflecting mirrors 16 are sphere mirrors and located to set the center or the general centers of the sphere mirrors just at the location of the lamp 10.

Owing to the plural subsidiary reflecting mirrors 16, the light loss can be less in the present embodiment than the above Embodiments. Namely, the output light from the lamp 10 can be effectively projected on the surface 90 for getting projection.

Embodiment 2-8.

Figure 22:
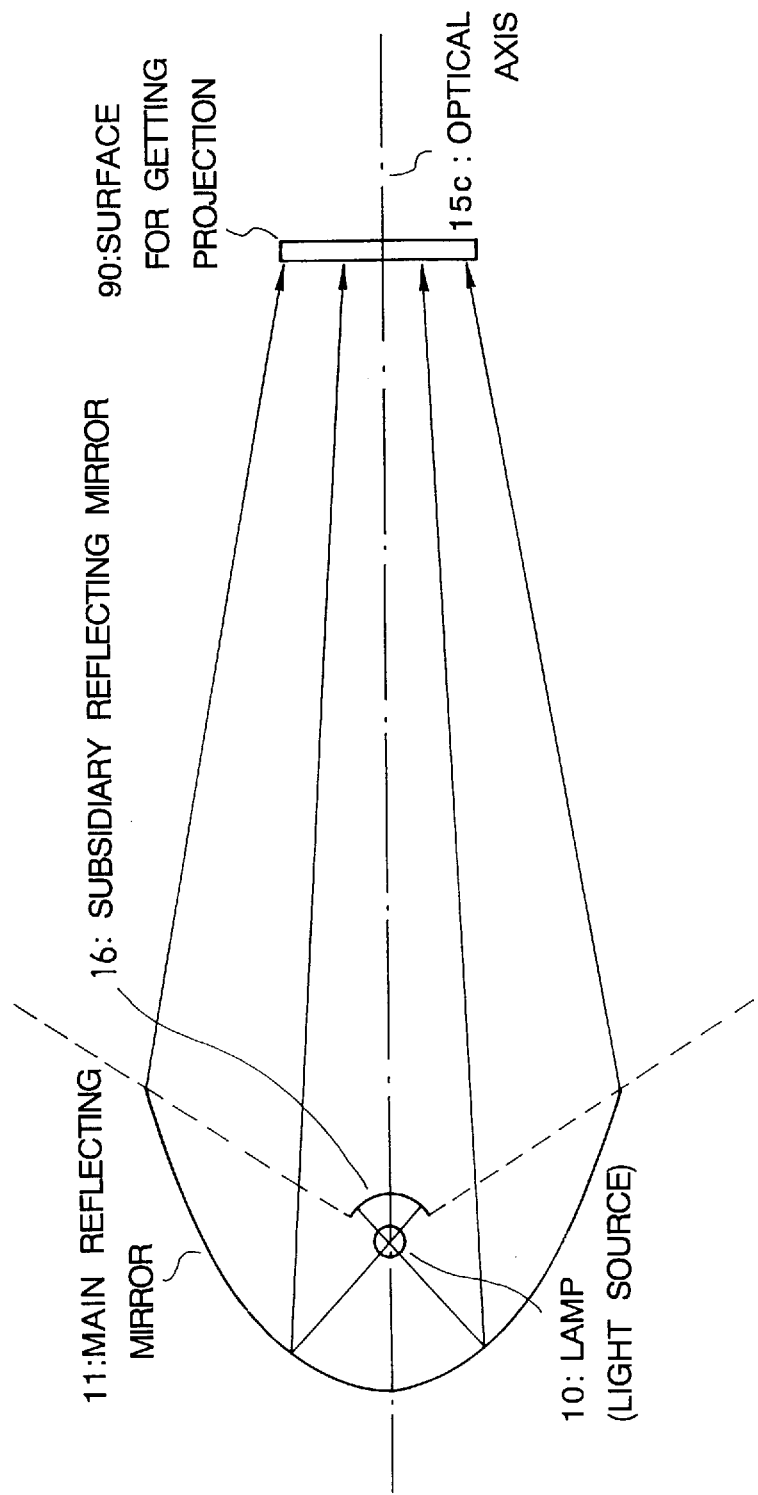
FIG. 22 shows another configuration of a lighting equipment of the present invention.

FIG. 22 shows a sectional view of the lighting equipment of the present embodiment. The configuration of the lighting equipment of the present embodiment can be made by adding the subsidiary reflecting mirror 16 to the configuration of FIG. 15. A characteristic of the subsidiary reflecting mirror 16 of the present embodiment is that the output light, directly forwarded to the surface 90 for getting the projection, from the lamp 10 is reflected to the main reflecting mirror 11 by the subsidiary reflecting mirror 16. The output light from the lamp 10 can also be effectively projected on the surface 90 for getting projection by applying this configuration.

Embodiment 2-9.

Figure 23:
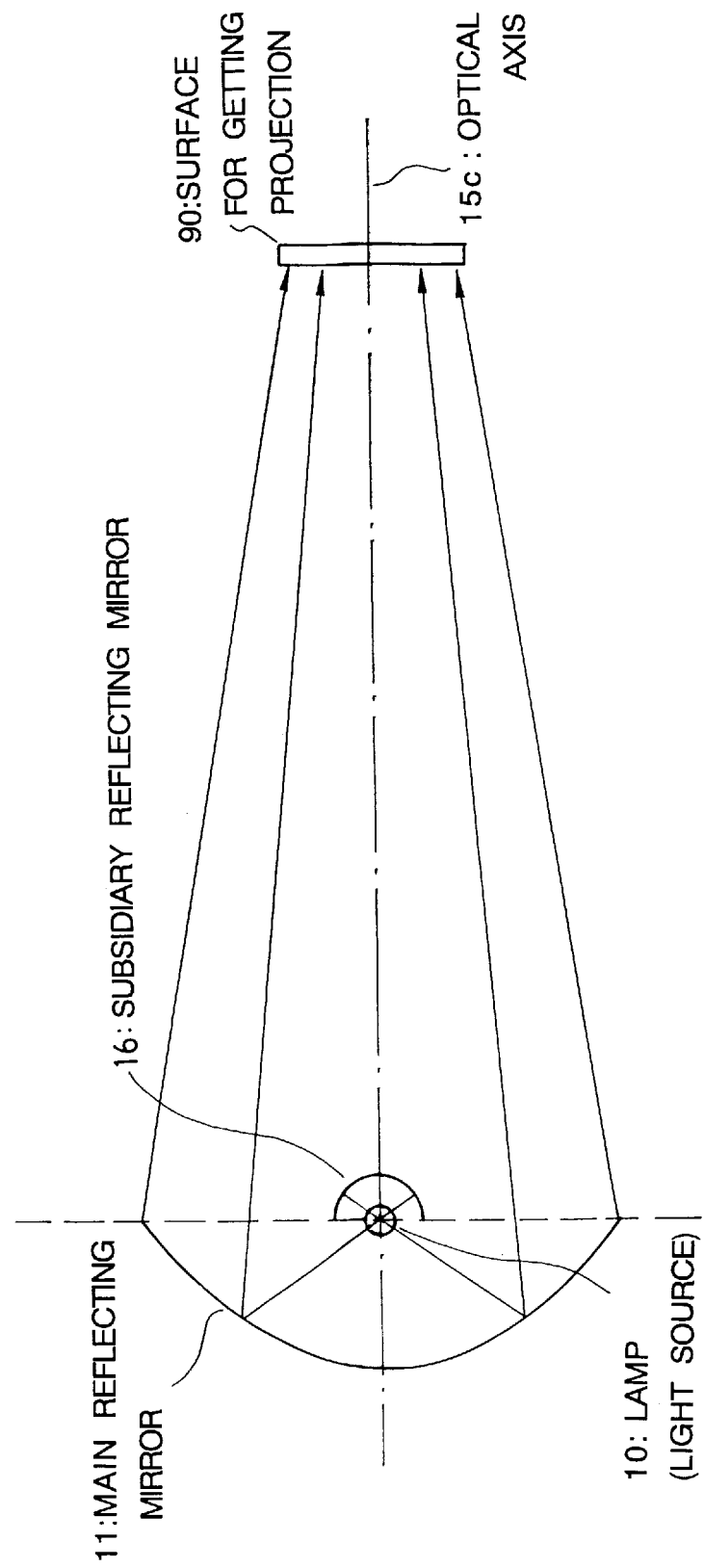
FIG. 23 shows another configuration of a lighting equipment of the present invention.

FIG. 23 shows a sectional view of the lighting equipment of the present embodiment. The subsidiary reflecting mirror 16 similar to that in FIG. 22 is provided in the lighting equipment of the present embodiment. The main reflecting mirror 11 is cut at a plane, which is vertical with respect to the optical axis and joins the lamp 10. The output light from the lamp 10 can also be effectively projected on the surface 90 for getting projection by applying this configuration.

Embodiment 2-10.

Figure 24:
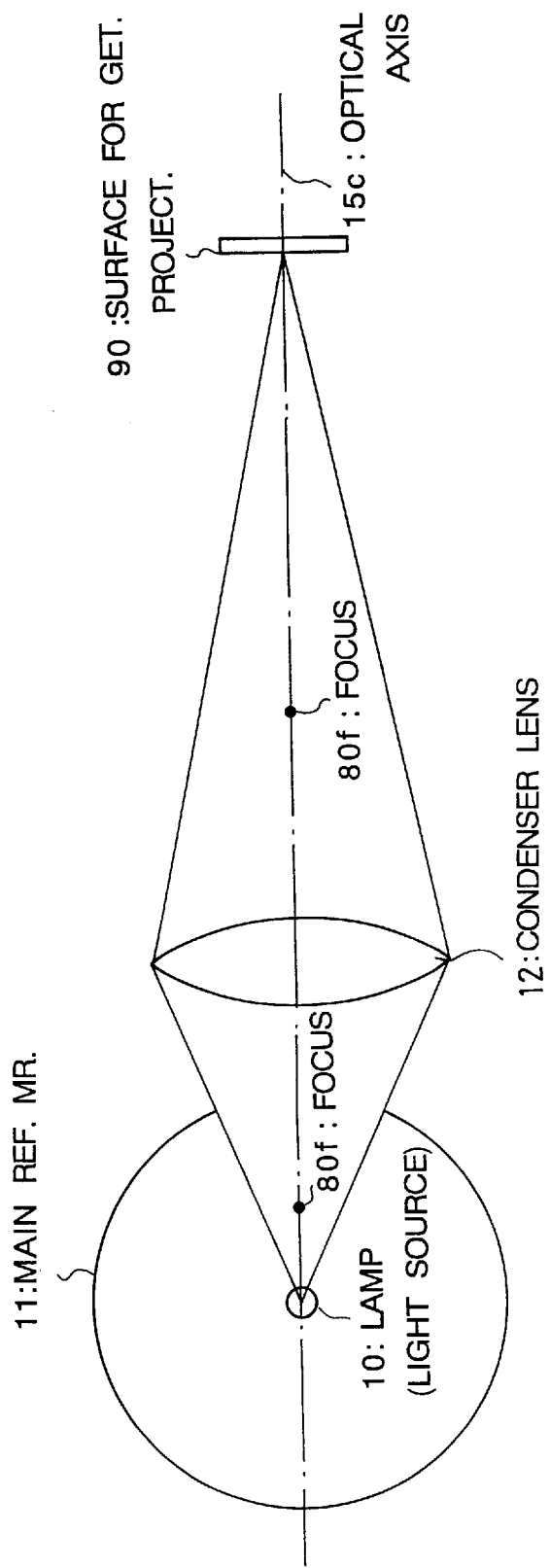
FIG. 24 shows another configuration of a lighting equipment of the present invention.

FIG. 24 shows a sectional view of the lighting equipment of the present embodiment. The output light from the lamp 10 is conically collected on the surface 90 for getting projection by a condenser lens 12, in the lighting equipment of the present embodiment. The main reflecting mirror 11 is a sphere mirror and the lamp 10 is located at the center or the general center of the sphere mirror. The condenser lens 12 is located to set the light source between the main reflecting mirror 11 and the focus 80f, at the main reflecting mirror side, of the condenser lens 12.

Figure 25:
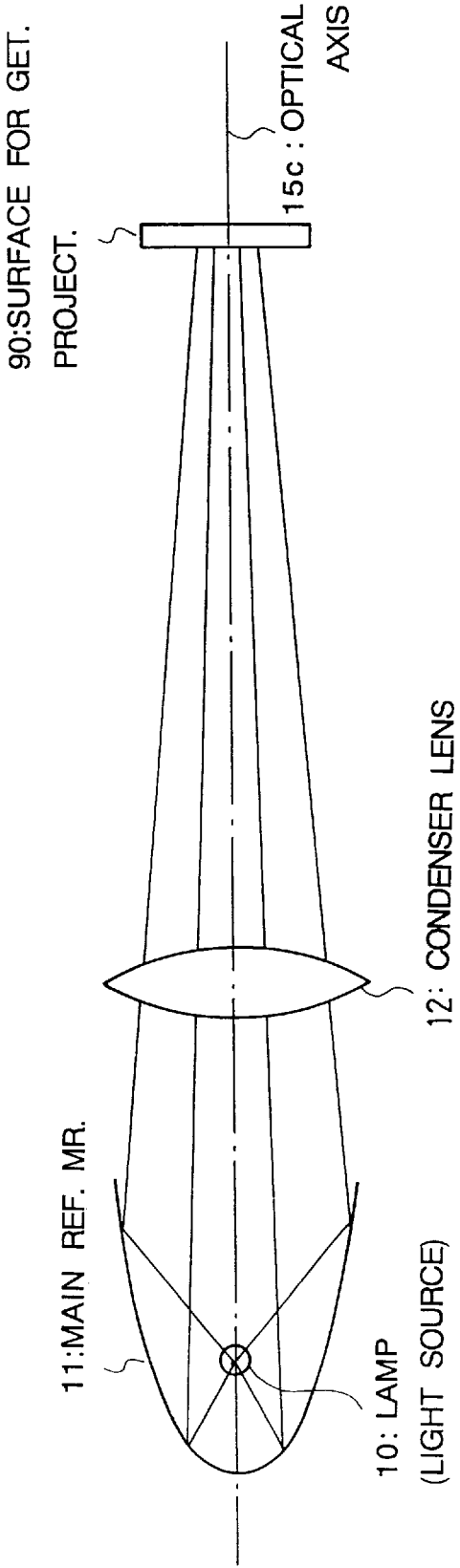
FIG. 25 shows another configuration of a lighting equipment of the present invention.
Figure 26:
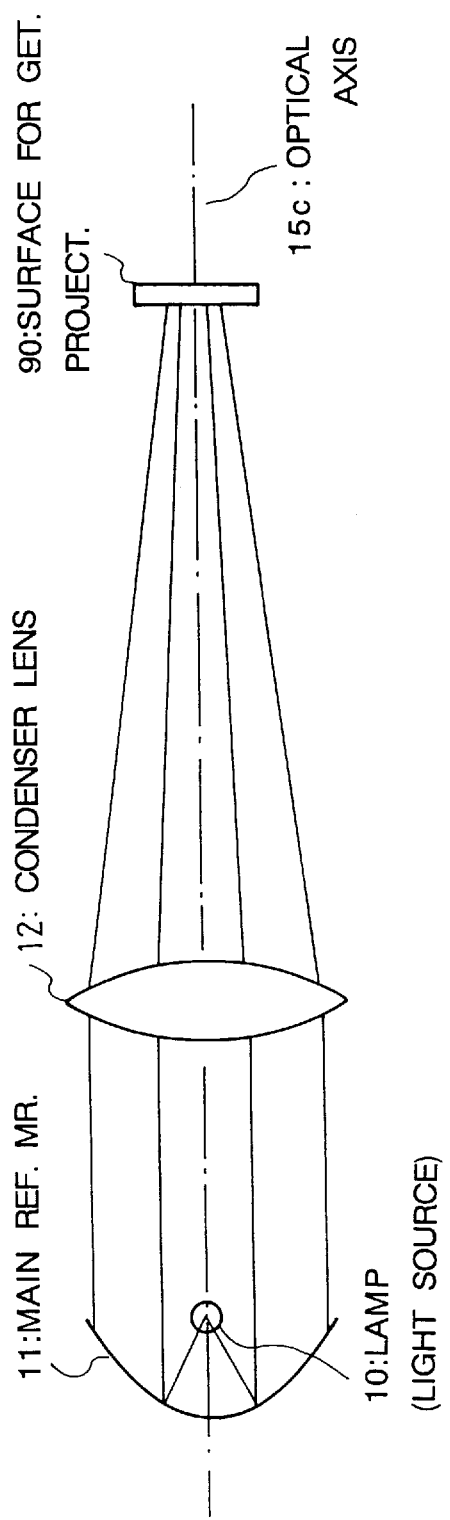
FIG. 26 shows another configuration of a lighting equipment of the present invention.

FIG. 25 shows a sectional view of another lighting equipment of the present embodiment. The main reflecting mirror 11 is a rotating parabolic mirror in FIG. 25. FIG. 26 shows a sectional view of another lighting equipment whose main reflecting mirror 11 is a rotating parabolic mirror.

The light source for irradiating light and the main reflecting mirror for reflecting the light are provided in the lighting equipment of the present embodiment. The main reflecting mirror 11 is a rotating parabolic mirror. Since the light source is located at the center or the general focus of the rotating parabolic mirror, cylindrical parallel luminous flux is generated. The condenser lens 12 provided in the lighting equipment collects the light from the main reflecting mirror 11 and irradiates conic luminous flux.

Figure 27:
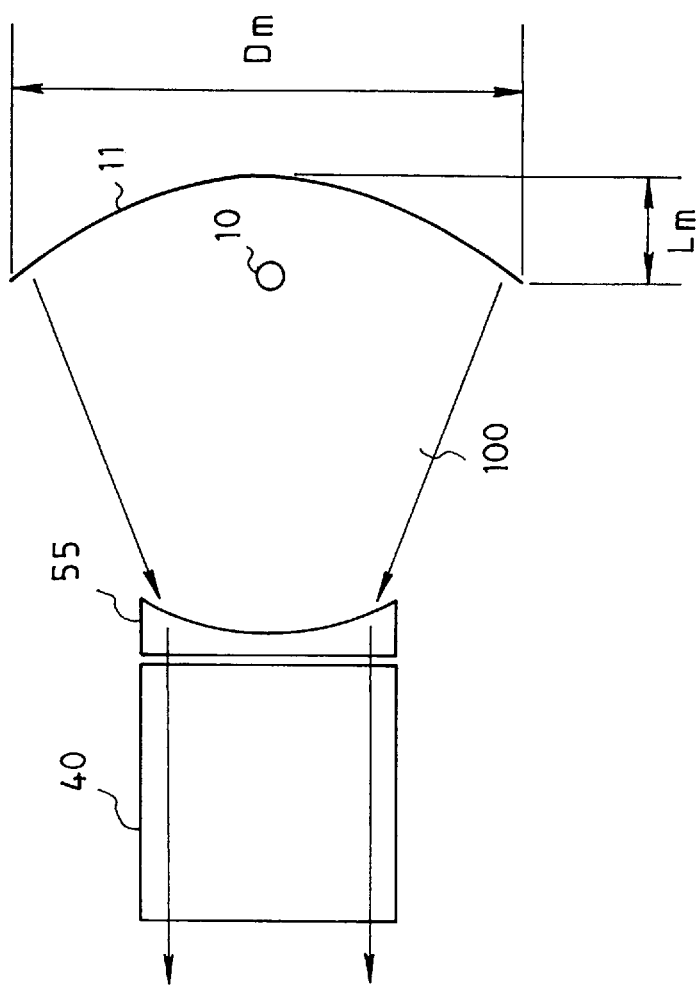
FIG. 27 shows an optical path from a lighting equipment of the present invention.

FIG. 27 shows the case that the conic luminous flux from each lighting equipment in the above Embodiments is converted to cylindrical parallel flux in a collimator lens 55. Rate of dispersion of a light inclination at the conversion from the conic luminous flux to the cylindrical luminous flux in the collimator lens 55, is in reverse proportion to an aspect ratio asr of the main reflecting mirror 11 (aspect ratio asr=diameter Dm of the main reflecting mirror 11/length Lm of the main reflecting mirror 11). Therefore, the aspect ratio of the main reflecting mirror 11 is large to be more than 2. Supposing that the aspect ratio is large to be 4, the rate of the dispersion of the input light becomes around half. Then size of the liquid crystal panel can be small to be 0.75 inches.

Especially in the case of the main reflecting mirror 11 having a large aspect ratio being used, much light is not reflected. The subsidiary reflecting mirror 16 provided in the lighting equipment is for returning the unreflected light to the main reflecting mirror 11.

For instance, the subsidiary reflecting mirror 16 can be a sphere reflecting mirror whose center or general center is at the light source. By applying this shape to the subsidiary reflecting mirror, the output light from the light source can be reflected to the main reflecting mirror 11 without any loss.

For example, when the subsidiary reflecting mirror 16 is a sphere mirror provided on the center axis of the main reflecting mirror 11, close to the light source, no parallel light is interfered by the subsidiary reflecting mirror 16.

The subsidiary reflecting mirror 16 can be a ring, for instance. Since the output light from the light source to the liquid crystal panel is transmitted through the center of the ring, no parallel light is interfered by the subsidiary reflecting mirror 16.

In the case of the plural subsidiary reflecting mirrors 16 being provided, the light, which can not be returned by a single subsidiary reflecting mirror, can be reflected back to the main reflecting mirror 11.

Figure 28:
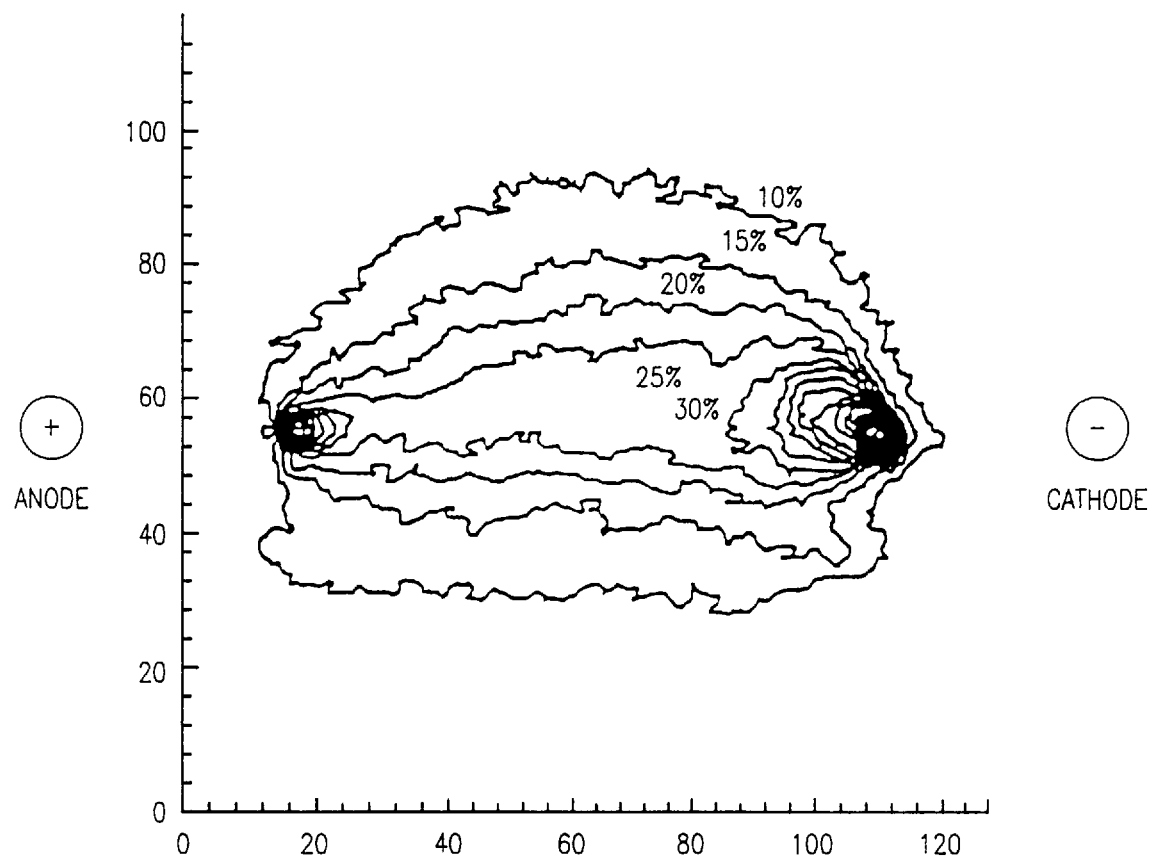
FIG. 28 shows light emission distribution of a direct current lamp.

Another method for improving the light source system is to use a metal halide lamp of direct current excitation, available on the market lately, whose characteristic is shown in FIG. 28. In the case of the direct current excitation, points of high luminance are concentratedly distributed at the cathode in the end of one of electrodes as shown in FIG. 28. Accordingly, if the center of the luminance distribution around the cathode is located at the focus of the rotating parabolic surface, dispersion of the light inclination can be lessened. In the case of the conventional metal halide lamp of alternating current excitation, since the highest luminance points are at the ends of the both electrodes because the cathode is interchanged, the rate of the dispersion becomes large.

The lighting equipment wherein the output light from the light source is conically collected by the condenser lens has been stated in the present embodiment. Even when the diameter of the lighting equipment is around 8 centimeters, the light can be effectively projected on a small-sized liquid crystal panel of less than 1.3 inches, by using the lighting equipment of the present embodiment. When the lighting equipment of this embodiment is used for a projector, a bright and beautiful image can be obtained.

The lighting equipment in the above embodiments has been explained on condition that it is used for the liquid crystal panel of the three-panels-method. However, the various lighting equipments stated above can also be used for the conventional liquid crystal projector or other image generation apparatus. In addition, the above-mentioned various lighting equipments can be used not only for the liquid crystal panel of transmission type but also for the liquid crystal panel of reflection type.

Embodiment 3

Embodiment 3-1.

Figure 29:
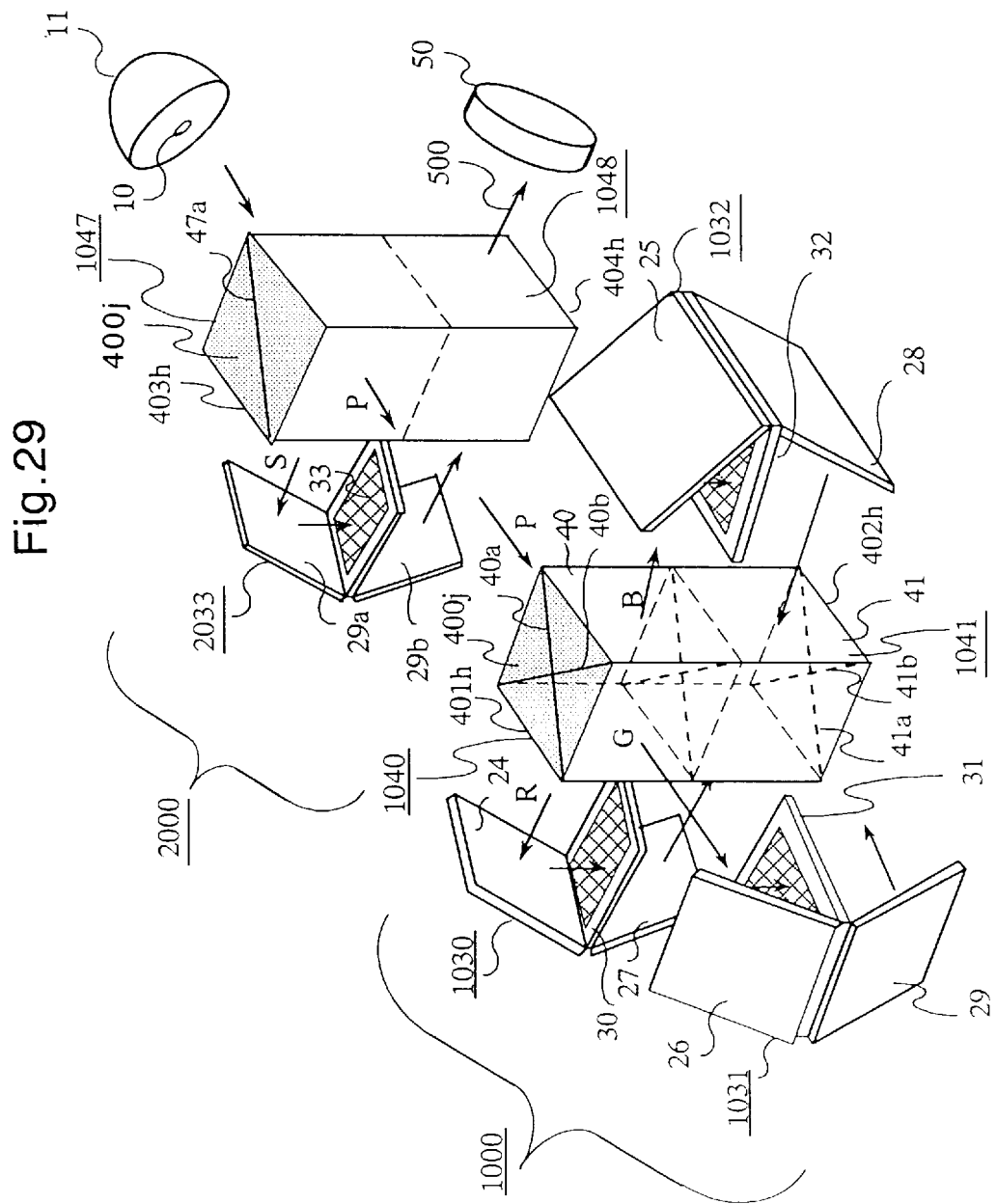
FIG. 29 shows a configuration of a liquid crystal projector of the present invention.

FIG. 29 shows the image generation apparatus of the present embodiment. A color processing part 1000 is provided in this image generation apparatus. The color processing part 1000 is composed of a wavelength separating module 1040, optical modulators (liquid crystal panels) 30, 31, 32, a wavelength synthesizing module 1041, and an optical path connecting module. The wavelength separating module 1040 includes a first cross dichroic mirror 40 soaked in liquid 400j in a box 401h. The wavelength synthesizing module 1041 includes a second cross dichroic mirror 41 soaked in the liquid 400j in a box 402h. The optical path connecting module is composed of reflecting mirrors 24 to 29.

The first cross dichroic mirror 40 in the wavelength separating module 1040 is the same as the cross dichroic mirror in FIG. 7. The first cross dichroic mirror 40 includes a first reflecting surface (dichroic mirror 40a) and a second reflecting surface (dichroic mirror 40b). The first reflecting surface (dichroic mirror 40a) reflects light R having a first wavelength. The second reflecting surface (dichroic mirror 40b) reflects light B having a second wavelength. Since light G having other wavelength is transmitted through the first cross dichroic mirror 40, three lights R, G and B are output from the first cross dichroic mirror 40.

The optical modulators (liquid crystal panels) 30, 31 and 32 are vertically located with respect to each of the three lights from the first cross dichroic mirror. That is, the optical modulator 30 is vertically located with respect to the light R. Similarly, the optical modulator 31 is vertically to the light G, modulator 32 to the light B. Each of the three optical modulators inputs one of the three lights output from the first cross dichroic mirror 40. In addition, each of the three optical modulators inputs an image signal, modulates polarization state of the input light depending upon the image signal, and outputs the modulated light. The above optical modulators are liquid crystal panels and then modulate the polarization state of the input light depending upon the image signal. Since the liquid crystal panels are transmission type, they perform optical modulation by transmitting the input light.

The second cross dichroic mirror 41 in the wavelength synthesizing module 1041 is the same as the cross dichroic mirror shown in FIG. 7. The cross dichroic mirror 41 inputs the three lights, R, G and B modulated by the optical modulators 30, 31 and 32. The second cross dichroic mirror 41 includes a first reflecting surface (dichroic mirror 41a) and a second reflecting surface (dichroic mirror 41b). The first reflecting surface (dichroic mirror 41a) is located on the same plane as the first reflecting surface (dichroic mirror 40a) of the first cross dichroic mirror 40, and reflects the light R having the first wavelength. The second reflecting surface (dichroic mirror 41b) is located on the same plane as the second reflecting surface (dichroic mirror 40b) of the first cross dichroic mirror 40 and, reflects the light B having the second wavelength. Since the light G having other wavelength is transmitted through the second cross dichroic mirror 41, three lights R, G and B are synthesized to generate an image.

The optical path connecting module exists between the wavelength separating module 1040 and the three optical modulators 30, 31, 32, and exists between the wavelength synthesizing module 1041 and the three optical modulators

30, 31, 32. The optical path connecting module includes the reflecting mirrors 24 to 29. The reflecting mirrors 24 to 29 are located at 45 degrees with respect to the three lights output from the wavelength separating module 1040, and turn the directions of the three lights almost 90 degrees. The optical paths are connected to lead the lights turned by the reflecting mirrors, to the wavelength synthesizing module 1041 through the optical modulators.

The reflecting mirrors 24 to 29 are installed at the both sides of each of the liquid crystal panels 30, 31 and 32. The reflecting mirrors 24, 25 and 26 input the lights, which are output from the wavelength separating module 1040, into the liquid crystal panels 30, 31 and 32. The reflecting mirrors 27, 28 and 29 input the lights, which are output from the liquid crystal panels 30, 31 and 32, into the wavelength synthesizing module 1041.

The light R having the first wavelength, the light B having the second wavelength and the light G having other wavelength are color signals indicating red, blue and green. The liquid crystal panels 30, 31 and 32 are provided corresponding to the color signals, and modulate the color signals for red, blue and green. Since the optical modulators 30, 31 and 32 exclusively adapted to an optical wavelength of each color are used, a bright projected image wherein the best color tone is performed and the colors seldom interfere one another, is generated.

The first and second cross dichroic mirrors 40 and 41 are composed of separate plates. The first cross dichroic mirror 40 in the box 401*h* forms the wavelength separating module 1040. The second cross dichroic mirror 41 in the box 402*h* forms the wavelength synthesizing module 1041. Conventionally, two mirrors and plural components for maintaining the mirrors have been used for the cross dichroic mirror. The number of the above components can be reduced in the cross dichroic mirror of the present invention. Therefore, assembling and adjusting can be easily performed.

Although the two boxes, the first box 401*h* and the second box 402*h*, are used in the above explanation, it is also acceptable to unite them to be one box. In this case, the dichroic mirrors 40*a* and 41*a* can be composed of a dichroic mirror of one plate. Similarly, the dichroic mirrors 40*b* and 41*b* can be composed of a dichroic mirror of one plate. By applying this configuration, one wavelength separating/synthesizing module can be formed, which further reduces the number of the components.

Points of forming the dichroic mirrors of the first and second cross dichroic mirrors by separate plates or by one plate will now be described with reference to FIGS. 30 and 31.

When a normal white mode for displaying a white image screen is used (which is the case of general projector) in the case of TN type liquid crystal not being applied with voltage, light whose polarization-surface-direction at input into the liquid crystal panel is turned 90 degrees with respect to the polarization-surface-direction at output from the liquid crystal panel, is used for forming the image. For instance, when the wave S is input into the liquid crystal panel, the wave P, whose polarization surface is at 90 degrees with respect to the polarization surface of the wave S, is output from the liquid crystal panel.

Accordingly, when the wave S is input into the wavelength separating module 1040, the wave P is input into the wavelength synthesizing module 1041. Therefore, it is desirable that the dichroic mirror or dichroic prism, used for the wavelength separating module 1040, has the most appropriate characteristic for the wave S. It is also desirable that the wavelength synthesizing module 1041 has the most appropriate characteristic for the wave P.

However, an optical separation characteristic of the wave P for defining color tune is different from the optical separation characteristic of the wave S for defining the color tune, in the dichroic mirror or the dichroic prism. If the characteristic best for the wave S is defined, it is not the best for the wave P.

Figure 30:
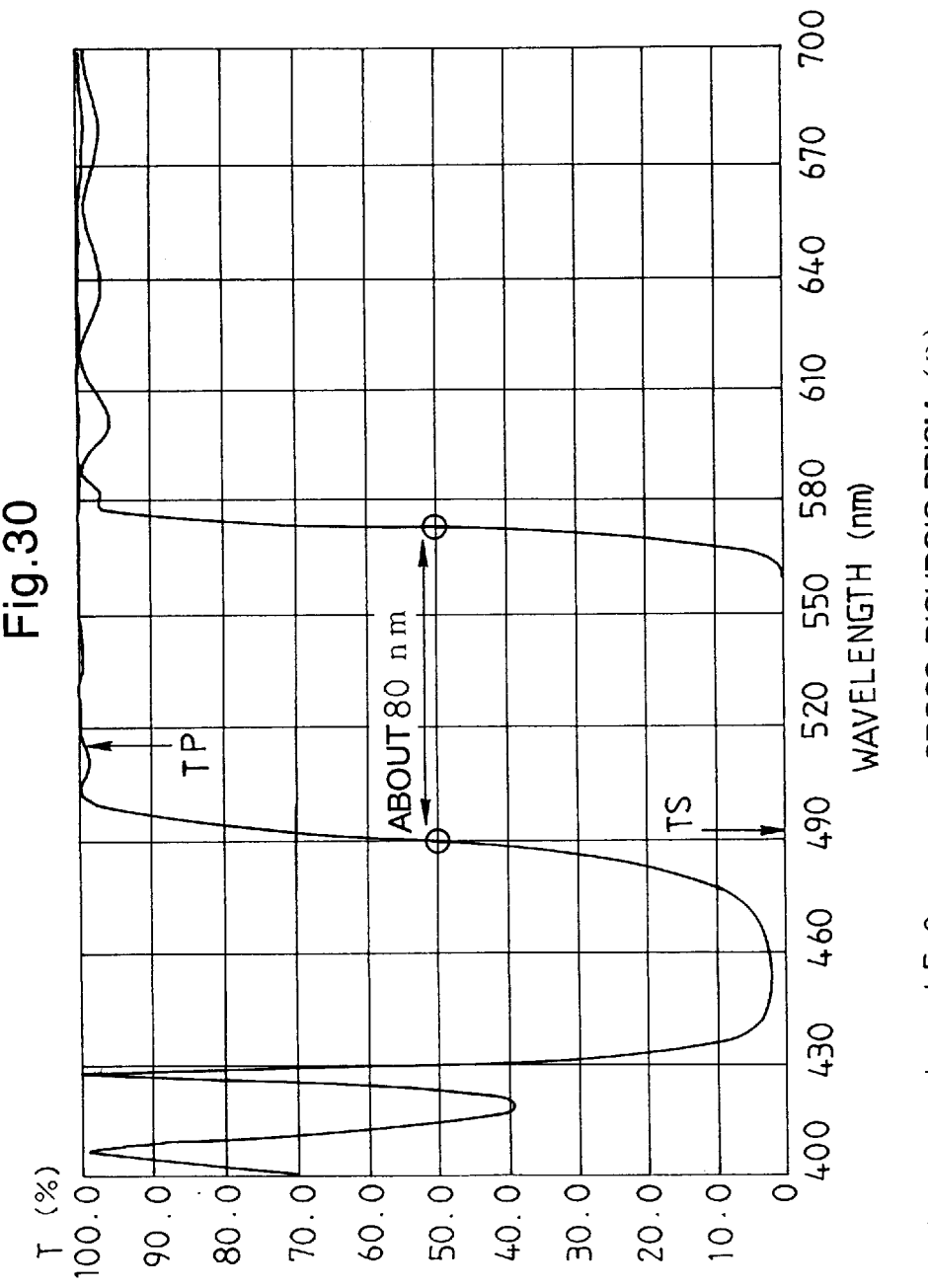
FIG. 30 shows an optical separation characteristic of a cross dichroic prism.

FIG. 30 shows the optical separation characteristic in which blue of the cross dichroic prism is reflected. FIG. 31 shows the optical separation characteristic in which red of the cross dichroic prism is reflected.

Figure 31:
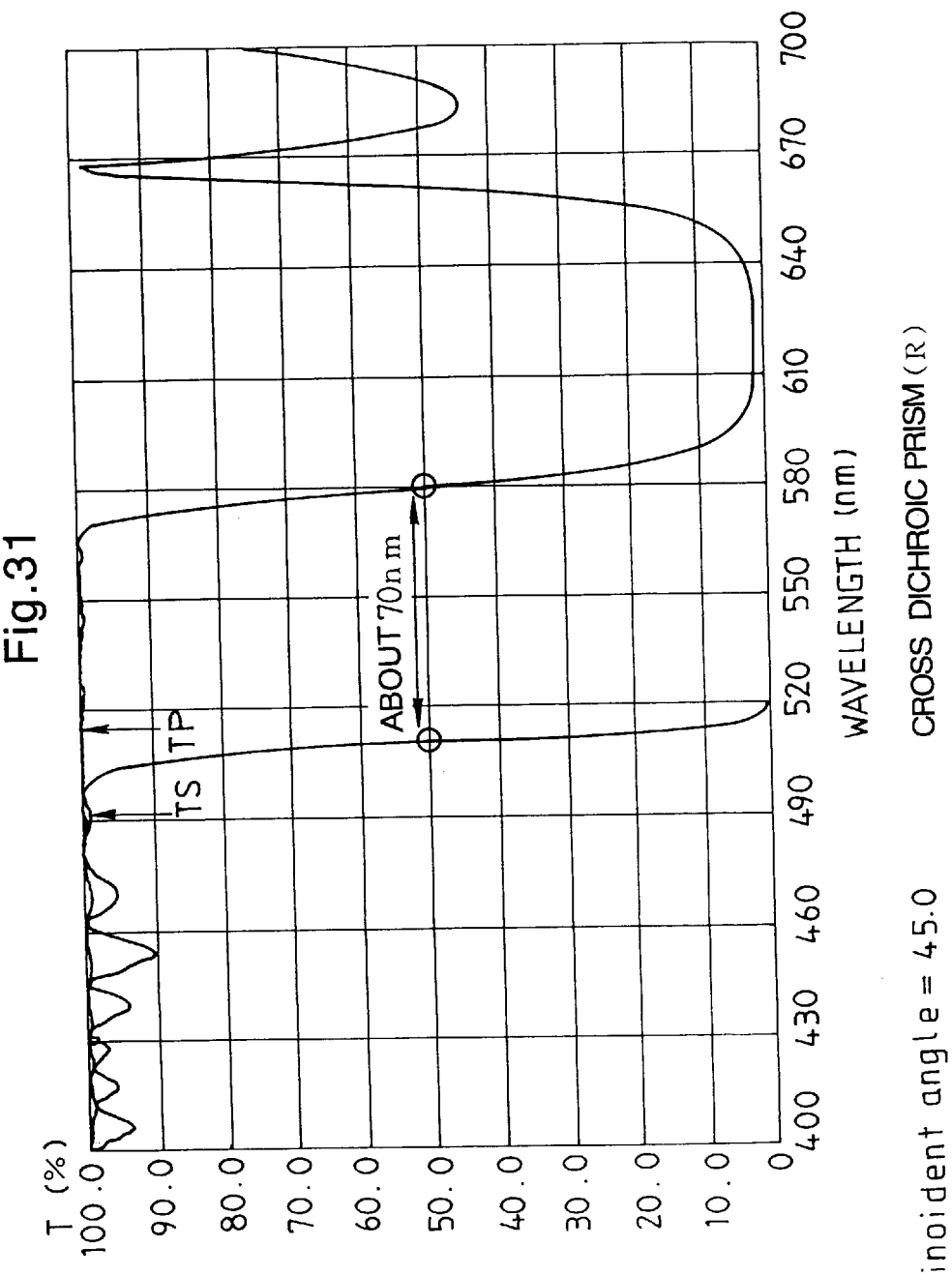
FIG. 31 shows another optical separation characteristic of a cross dichroic prism.

In FIGS. 30 and 31, TS indicates the optical separation characteristic for the wave S and TP indicates the optical separation characteristic for the wave P. As shown in the figures, there is a wavelength difference of about 80 nm between wavelength of the wave P in the case of its transmittance T being 50% and wavelength of the wave S in the case of its transmittance T being 50%. Though the case of the dichroic prism being used is shown in FIGS. 30 and 31, there is a wavelength difference of about 70 nm between wavelength of the wave P in the case of its transmittance T being 50% and wavelength of the wave S in the case of its transmittance T being 50% when the dichroic mirror is used. Therefore, it is difficult to realize proper colors when both color separation and color synthesis are performed by the dichroic mirror or the dichroic prism made of one plate having a uniform characteristic.

According to the above-mentioned reason, it is desirable to use the dichroic mirror or dichroic prism made of separate plates having different characteristics, for the wavelength separating module and the wavelength synthesizing module. There is a conventional liquid crystal projector, having two-staged structure, wherein one cross dichroic mirror is used for separating and for synthesizing. However, as stated above, it is desirable to have separate cross dichroic mirrors for separating and for synthesizing because the characteristic of the wave P differs from that of the wave S. One of features of the present embodiment is to construct the cross dichroic mirror by separate cross dichroic mirrors having different characteristics even when the two-staged structure is applied.

The liquid 400*j*, whose refractive index is almost the same as that of plate material (generally, glass) for the dichroic mirrors 40*a*, 40*b*, 41*a* and 41*b*, is put in the boxes 401*h* and 402*h* of FIG. 29. Matching oil, such as ethylene glycol, is one example of the liquid 400*j*. When the dichroic mirrors 40*a*, 40*b*, 41*a* and 41*b* are soaked in the liquid 400*j*, the following effect will be produced.

(1) When the cross dichroic mirror of separate plates type is used in the air, a connection line (joint) of two dichroic mirrors caused by a refractive index difference between a glass and the air makes a screen bad. Such a phenomenon of the connection line (joint) being projected on the screen can be avoided in the present embodiment by using the cross dichroic mirror soaked in the liquid 400*j*. Conventionally, the cross dichroic prism, being expensive, has been used for avoiding the joint trouble. In addition, since the cross dichroic mirror having no joint as shown in FIG. 7 is used in the present embodiment, the joint trouble can be further avoided. Although a joint 40*t* exists in the configuration of FIG. 7, a phenomenon that inaccurate joining at the joint 40*t* makes the screen bad can be avoided by using the cross dichroic mirror soaked in the liquid 400*j* even when the joint 40*t* is not accurately joined.

As stated above, the cross dichroic mirror shown in FIG. 7 or the cross dichroic mirror of FIG. 7 soaked in the liquid is used for preventing the joint from being projected on the screen. Accordingly, it is desirable to apply the usage of the cross dichroic mirror of FIG. 7 or the cross dichroic mirror of FIG. 7 soaked in the liquid, for the second cross dichroic mirror 41 for optical synthesizing.

(2) Since the liquid of high refractive index is put in the box, an inclination of the light in the box is reduced to be 1/refractive index. In addition, a practical optical length of the wavelength separating module 1040 in the color processing part 1000 is also reduced. Namely, the shading which is generated in the case of the optical length being long can be avoided. The transmission efficiency is progressed.

Particularly, the reduction of the light inclination indicates that efficiency of the multilayer thin film element is progressed, which is an important respect for making the apparatus compact enormously. This respect will be stated later.

(3) Since the liquid can be a cooling medium, the heat radiating efficiency of the cross dichroic mirror is enhanced.

It is desirable for the liquid to have a refractive index smaller than that of plate material for the cross dichroic mirror and larger than that of the air. As stated above, for the purpose of adjusting the optical path length and avoiding the joint trouble of the dichroic mirror, it is considered to soak the cross dichroic mirror in the liquid. With respect to this purpose, in fact, it is desirable for the refractive index of the liquid to be the same as the refractive index of the plate material. However, if the liquid and the plate material of the cross dichroic mirror have the same refractive index, it becomes difficult to design the dichroic mirror. The reason for this is that it becomes difficult to make the cross dichroic mirror have desired characteristics. Therefore, the refractive index smaller than that of the plate material (glass) of the cross dichroic mirror is used as the refractive index of the liquid. For example, supposing that the refractive index of the plate material is 1.5 to 1.7, it is desirable for the refractive index of the liquid (ethylene glycol) to be 1.42 to 1.44.

Figure 124:
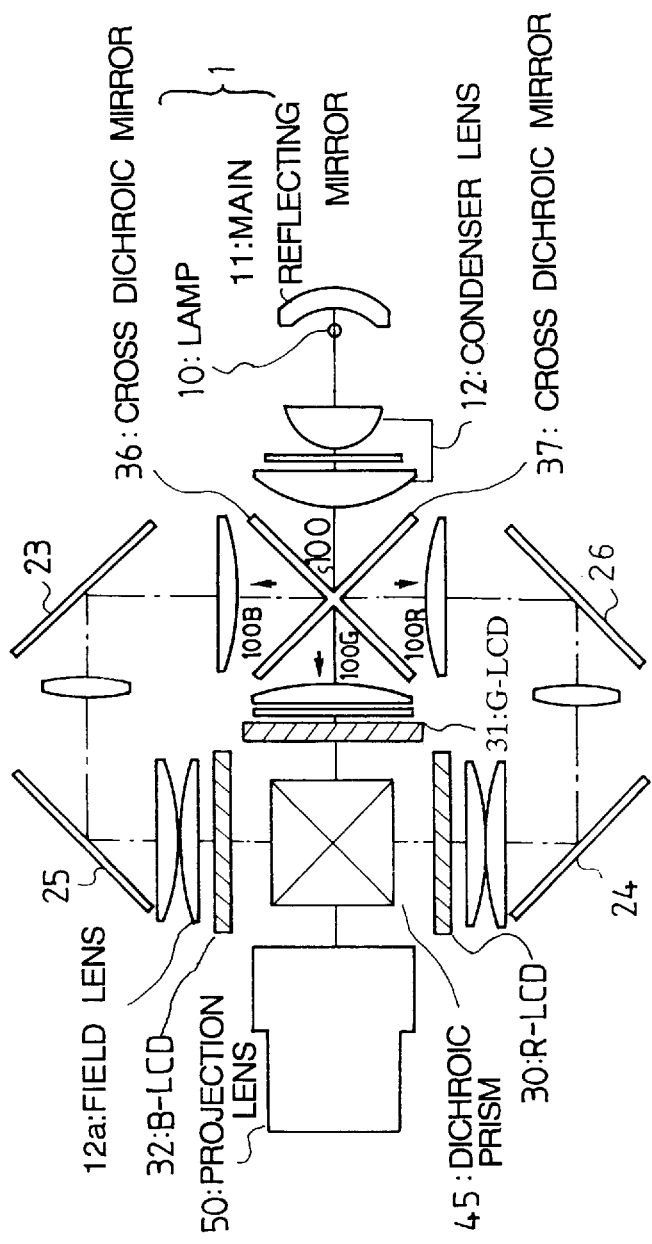
Figure 125:
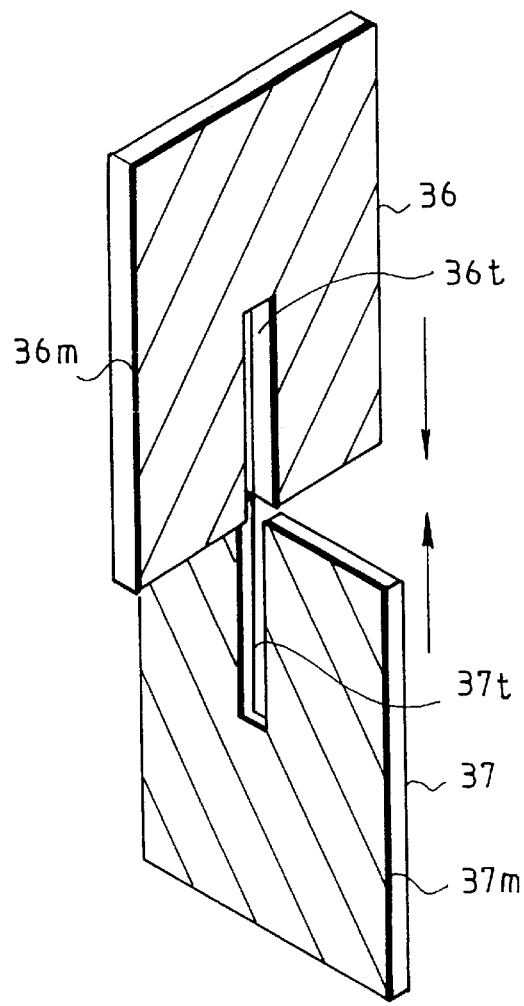
Figure 126:
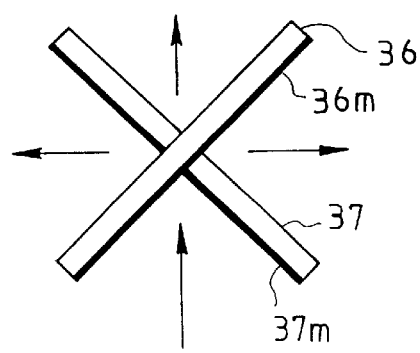
Figure 127:
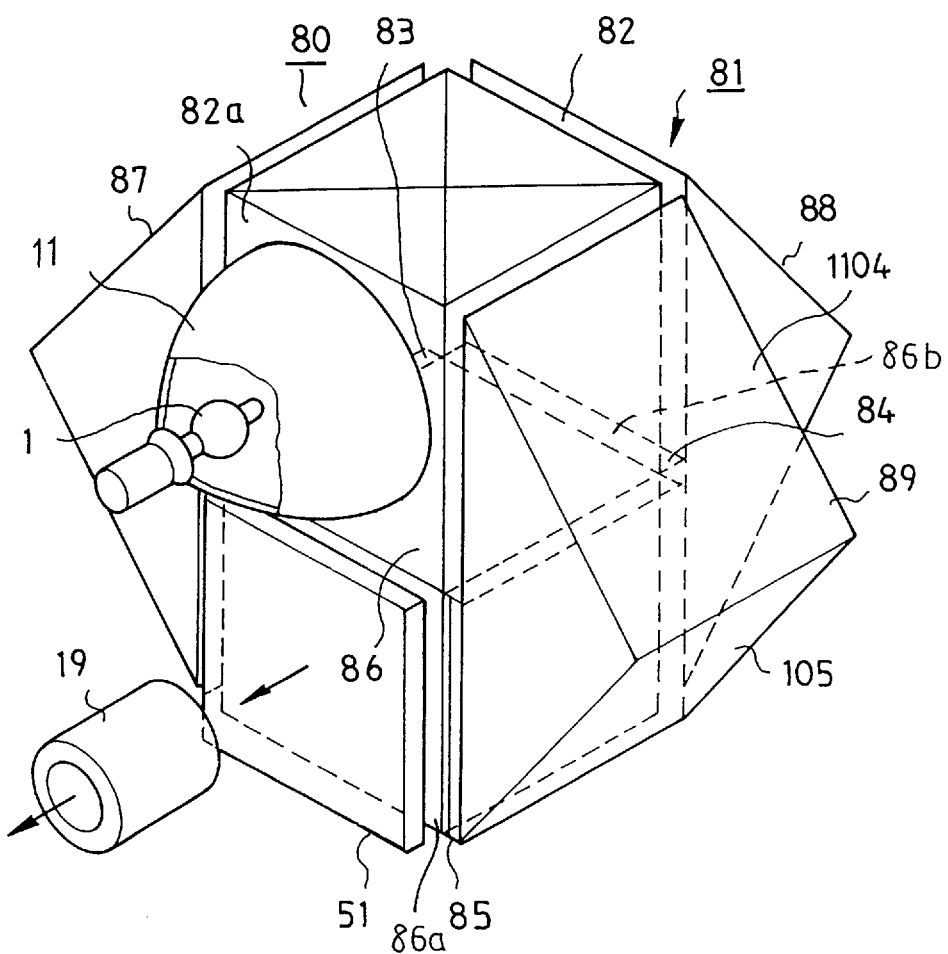
Figure 128:
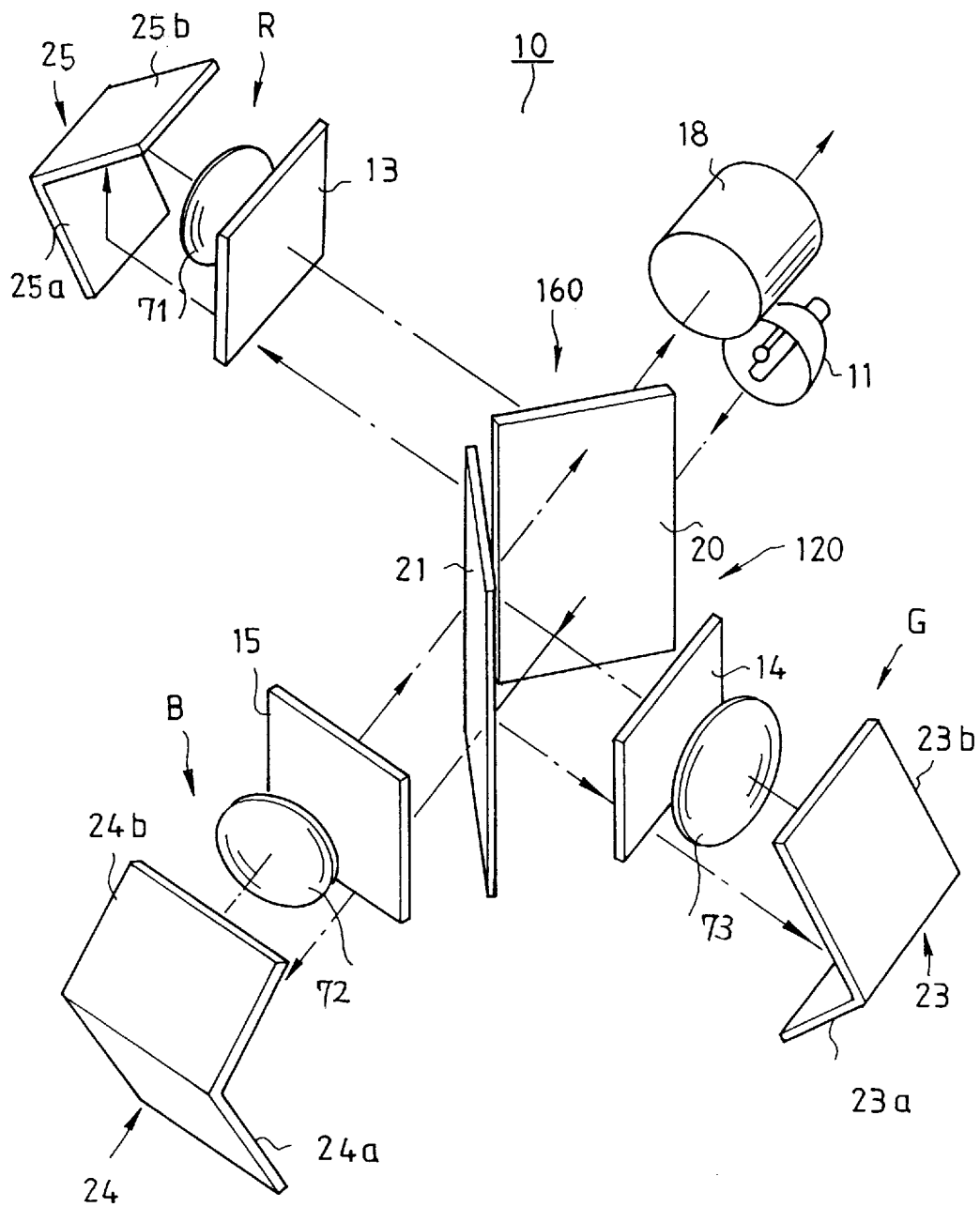
Figure 130:
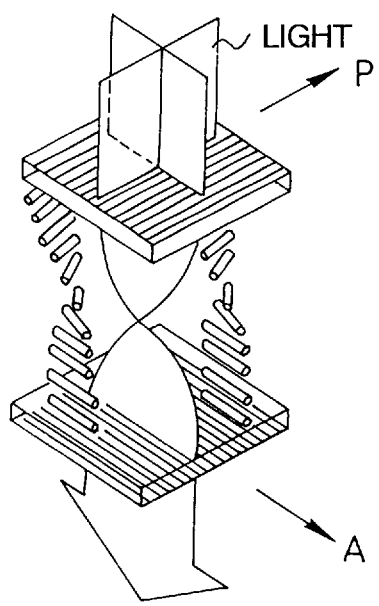

Length difference among optical path lengths of the three colors, which has been generated in the apparatus applying the conventional cross dichroic mirror, is deleted in the color processing part 1000. In FIG. 124, for instance, there is a length difference among optical path lengths of red, blue and green, at the optical path from the light source 10 to the process of image synthesizing of red, green and blue. A green monochromatic light 100G goes to the projection lens 50 directly. On the other hand, a red monochromatic light 100R and a blue monochromatic light 100B go to the projection lens 50 via the reflecting mirrors 26 and 24, or the reflecting mirrors 23 and 25.

When there is inconsistency in optical transmission lines, white balance at the center of the screen differs from white balance at the outskirts of the screen. In addition, when there is inconsistency in optical transmission lines, it is necessary to perform precise mutual convergence for each pixel among liquid crystal panels for red, green and blue. Namely, procedures which need much adjustment time in manufacturing process come about. The color processing part 1000 of the present embodiment solves this problem.

In this embodiment, the polarizer for the liquid crystal panel is applied on at least one of the first reflecting mirror and the second reflecting mirror. The reflecting mirror has a function of cooling medium of the polarizer. As each reflecting mirror is installed at 45 degrees with respect to each liquid crystal panel, area of the polarizer can be larger, which enhances the heat radiating efficiency. When the optical path connecting module is soaked in the liquid in the box, that is the reflecting mirror is soaked in the liquid, the heat radiating efficiency is further increased. In addition, when the polarization film having the polarizer is applied in the wavelength separating module filled with the liquid or in the wavelength synthesizing module filled with the liquid, the heat radiating efficiency of the polarization film is enhanced. Regarding the case of the polarization film having the polarizer being applied in the wavelength separating module or in the wavelength synthesizing module will be stated later.

The image generation apparatus of the present embodiment may include a polarization processing part 2000 at the front and behind the color processing part 1000. The polarization processing part 2000 is composed of a polarization separating module 1047, a polarization synthesizing module 1048, the optical modulator 33 for luminance and an optical path connecting module. The polarization separating module 1047 includes a first polarization beam splitter 47a soaked in the liquid 400j in a third box 403h. The polarization synthesizing module 1048 includes a second polarization beam splitter 47b (not shown) soaked in the liquid 400j in a fourth box 404h.

The first polarization beam splitter 47a of the polarization separating module 1047 inputs the light, separates the light into two lights whose polarization directions go orthogonally, such as first light (ex. the wave P) and second light (ex. the wave S), and outputs the first light (the wave P) to the wavelength separating module 1040.

The optical modulator 33 is installed almost vertically with respect to the optical axis of output second light. The optical modulator 33 inputs the second light and black and white component signal (luminance component signal) in the image signal, modulates polarization state of the input light based on the luminance component signal of the image signal, and outputs the modulated light.

The second polarization beam splitter 47b of the polarization synthesizing module 1048 inputs the first and second lights, and generates an image by synthesizing the two lights.

The optical path connecting module is composed of reflecting mirrors 29a and 29b and located on the optical path of the second light, between the polarization separating module 1047 and the polarization synthesizing module 1048. The optical path connecting module connects a second optical path by leading the light output from the polarization separating module 1047 to the polarization synthesizing module 1048 through the optical modulator 33.

Figure 32:
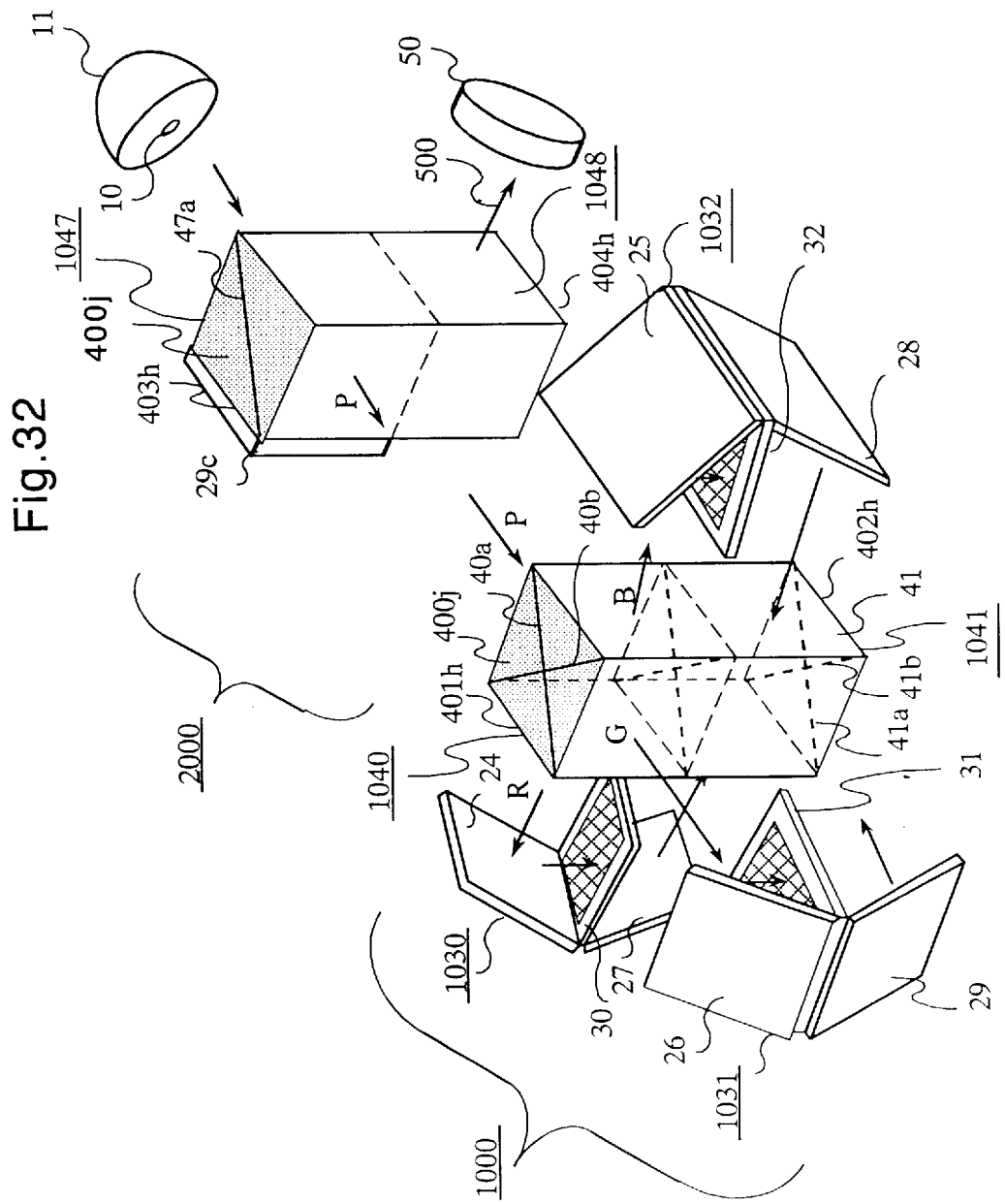
FIG. 32 shows another configuration of a liquid crystal projector of the present invention.

As shown in FIG. 32, it is acceptable to install a reflecting mirror 29c instead of installing the reflecting mirrors 29a and 29b of the optical path connecting module in FIG. 29. The reflecting mirror 29c is installed at an outlet of the second light from the polarization separating module 1047 and vertically attached with respect to the optical axis of the second light. The reflecting mirror 29c returns the light input into the first polarization beam splitter 47a from the lamp 10, to the light source system. The light reflected by the reflecting mirror 29c is input into the first polarization beam splitter 47a again by the main reflecting mirror 11 and goes to the reflecting mirror 29c again. This operation is repeated. Since the light is input into the polarization beam splitter 47a several times, remained wave P which has not been separated by inputting once can be separated. In addition, since the wave S is projected onto the main reflecting mirror, energy of the wave S can be absorbed by the main reflecting mirror, which increases the heat radiating efficiency.

The polarization separating module 1047 and the polarization synthesizing module 1048 have polarization beam splitters separately. Each of the polarization beam splitters is enclosed in the box 403h or 404h. It is possible to make the polarization beam splitters in the polarization separating module 1047 and the polarization synthesizing module 1048, and the boxes 403h and 404h, in common. Namely, one polarization beam splitter is enclosed in a common box, and then polarization separating and polarization synthesizing can be respectively performed by using a different part, that is upper part and lower part, of the polarization beam splitter in the box. Therefore, the conventional two mirrors and the number of components for maintaining them can be reduced.

It is also acceptable to put the wavelength separating module 1040 used in the color processing part 1000 and the polarization separating module 1047 used in the polarization processing part 2000 in one box to be one module. It is also acceptable to put the wavelength synthesizing module 1041 used in the color processing part 1000 and the polarization synthesizing module 1048 used in the polarization processing part 2000 in one box to be one module.

It is also acceptable to put the wavelength separating module 1040, the wavelength synthesizing module 1041, the polarization separating module 1047, and the polarization synthesizing module 1048 in one box to be one module. By applying this configuration, the assembling and adjusting can be enormously facilitated. It is also acceptable to unite the optical path connecting module with other modules.

The liquid 400j whose refractive index is the same or less than that of the plate material (generally, glass) of the polarization beam splitter 47a or 47b is put inside of the box. The polarization beam splitters 47a and 47b are soaked in this liquid 400j. Effects of the liquid 400j are as follows.
(a) Inclination of input light is reduced to be 1/refractive index.

Since the light inclination is reduced, the efficiency of the multilayer thin film element is progressed, which is an important respect of making the apparatus compact enormously. The effect of (a) will be described later.
(b) Optical path length is reduced to be 1/refractive index.

Since the practical lengths of the optical paths of the polarization separating module, the polarization synthesizing module, the wavelength separating module and the wavelength synthesizing module are lessened, the shading can be deleted and the transmittance efficiency can be progressed. In FIG. 160, even light A is transmitted in a short optical path A. In a long optical path B, only light B or light having a smaller inclination than B is transmitted, and the light A or light having a larger inclination than B is thrown out. Namely, it is required to have an optical path whose diameter is large than the diameter of the optical path A whose optical path length is short in order to utilize the light A in addition to the light B.

Figure 33:
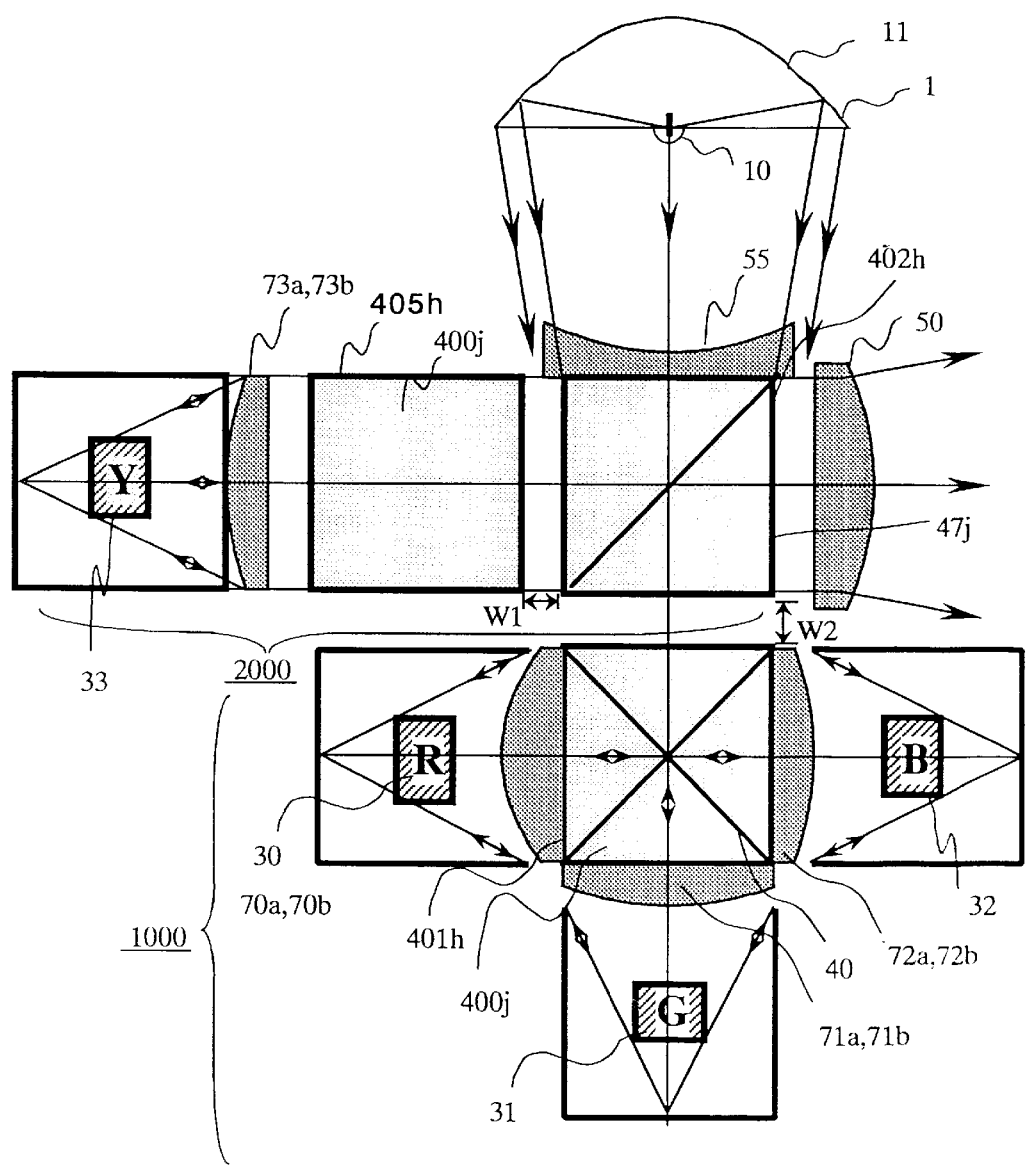
FIG. 33 shows another configuration of a liquid crystal projector of the present invention.
Figure 34:
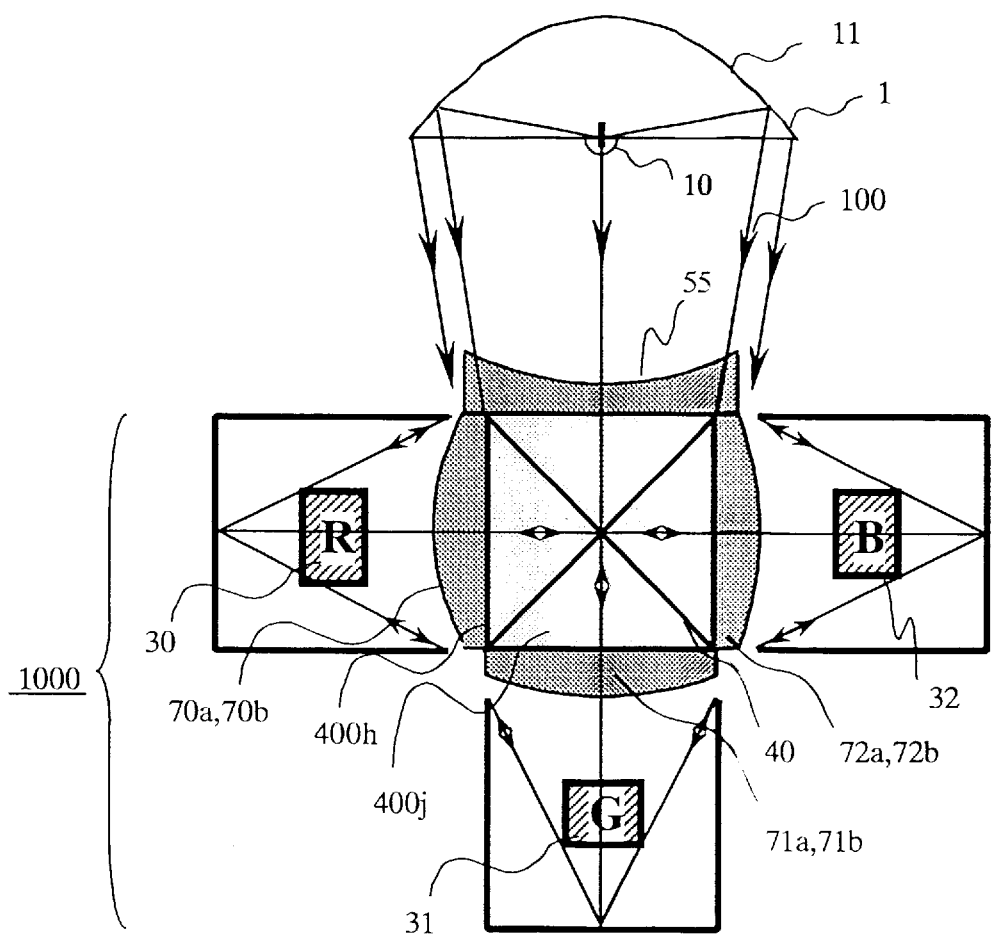
FIG. 34 shows another configuration of a liquid crystal projector of the present invention.
Figure 35:
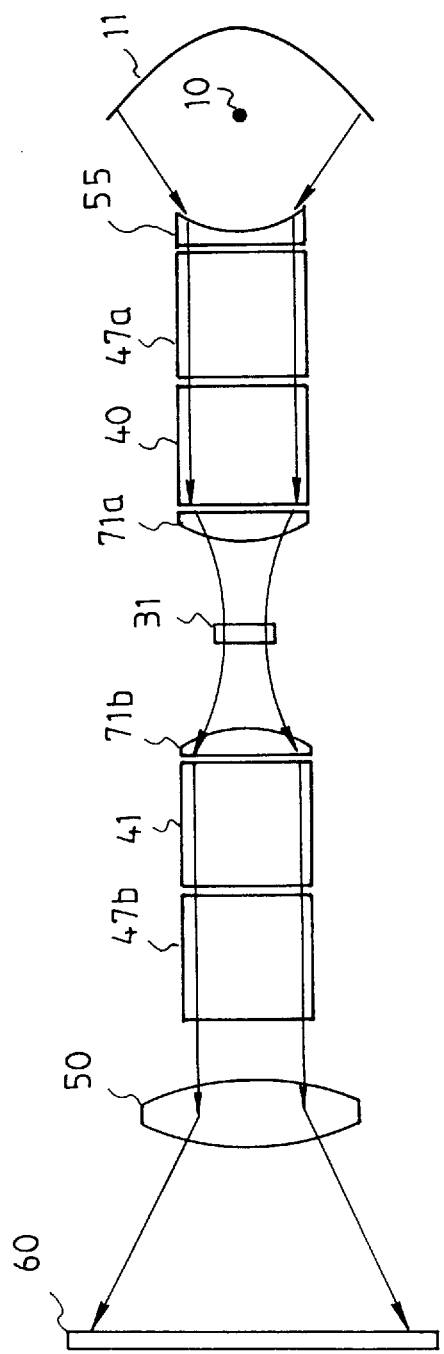
FIG. 35 shows an optical system of a liquid crystal projector of the present invention.
Figure 36:
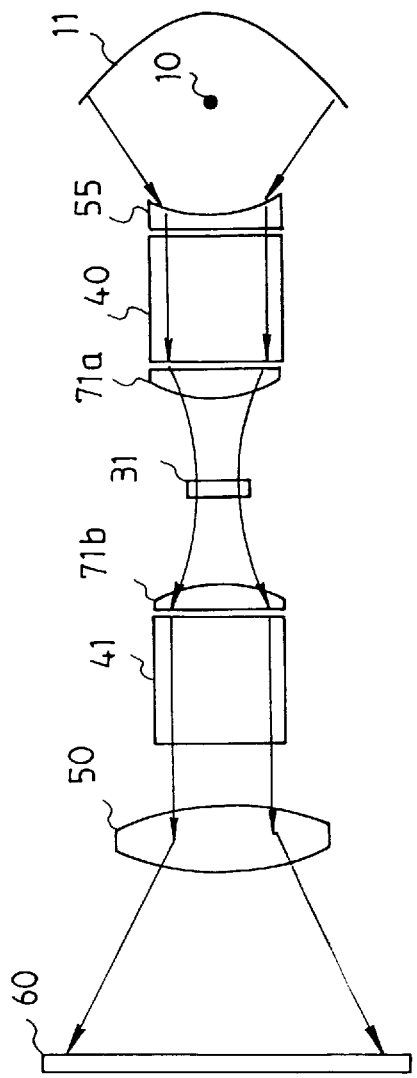
FIG. 36 shows another optical system of a liquid crystal projector of the present invention.

FIGS. 33 and 34 show plan views of the liquid crystal projector of the present embodiment. FIGS. 35 and 36 show optical systems of optical path for green of the liquid crystal projector.

As shown in FIGS. 33 and 35, the lens 55 which converts conic luminous flux to cylindrical luminous flux is installed at the light inputting place of the polarization processing part 2000. In the case of there being no polarization processing part 2000, the lens 55 which converts conic luminous flux to cylindrical luminous flux is installed at the light inputting place of the first cross dichroic mirror 40 of the color processing part 1000, as shown in FIGS. 34 and 36. Considering the heat, a minimum value of the diameter of the light source system 1 is generally suppressed to be 8 cm through 10 cm. The diameter of the optical path of light output from the light source system 1 is conically narrowed in order to be input into the polarization processing part 2000 or the first cross dichroic mirror 40 whose optical path diameters are smaller than that of the output light. Namely, the lens 55 is the collimator lens for converting the conic light to parallel light and leading it into the polarization processing part 2000 or the first cross dichroic mirror 40.

As has been mentioned, the inclination of the light from the light source has finite dispersion even when center light of the light is converted to the parallel light by the collimator lens. The reason is that the light source has some length, and then the center light is not always parallel. The dispersion rate is in proportion to the length of the light source (arc length) and is in reverse proportion to a diameter of the main reflecting mirror and its aspect ratio.

The dispersion rate is different depending upon a design of the light source system and a kind of the light source (lamp). For instance, when a metal halide lamp of alternating current discharge type, whose arc length is 5 mm, is used, the following condition is required in order to be sufficiently operated. It is required that parallel light is irradiated from a parabolic-surface mirror whose diameter is 8 cm, and the light is projected onto the liquid crystal panel and the dichroic mirror whose practical diameters are 3 inches (7.6 cm) through 3.3 inches (8.4 cm).

However, when parallel luminous flux from the light source system is collected by the condenser lens and converted to parallel luminous flux smaller than the diameter Dm of the main reflecting mirror by the collimator lens, the dispersion rate of the light inclination in the luminous flux is increased. Therefore, it becomes difficult for the optical components to be sufficiently operated.

In the case that the dichroic mirror or the polarization beam splitter is used in the air, if the practical diameter of the optical path is lessened from the above 3 inches to 2 inches, efficiency of optical separating and synthesizing is reduced to be half of it.

In order to solve this problem, the wavelength separating module, the wavelength synthesizing module, the polarization separating module and the polarization synthesizing module are soaked in the liquid of high refractive index, in the apparatus of the present embodiment. When the light is input into the polarization separating module filled with the liquid or the wavelength separating module filled with the liquid, the inclination of the light is reduced to be 1/refractive index. Therefore, it becomes possible to narrow the diameter of the optical path in the polarization processing part and in the color processing part, to be 1/refractive index. Supposing that the refractive index of the liquid is 1.5, it is still possible to maintain the efficiency of the apparatus even when the diameter of the optical path at the exit of the light source system is reduced from 3 inches to 2 inches by the condenser lens and the collimator lens.

Lenses 70a, 71a and 72a are installed at the exit of the wavelength separating module 1040 of the color processing part 1000. The lenses 70a, 71a and 72a convert cylindrical luminous flux to conical luminous flux. Lenses 70b, 71b and 72b are installed at the light entrance of the wavelength synthesizing module 1041 in the color processing part 1000. The lenses 70b, 71b and 72b convert conical luminous flux to cylindrical luminous flux. Although each lens of the lenses 70a to 72b is composed of one lens in the present embodiment, it is also acceptable to be composed of plural lenses.

A permissible value for the inclination of the light input into the liquid crystal panel applied proper treatment, is high to be about two or three times as high as the permissible value of the element in which thin film is used, such as the dichroic mirror and the polarization beam splitter. The permissible value of the element in which thin film is used is ±4 degrees, while that of the liquid crystal panel is around ±12 degrees.

Thus, even if the liquid crystal panels 30, 31 and 32 are small-sized, they can be sufficiently projected by using proper relay lenses 70a, 71a and 72a which narrow the luminous flux.

Supposing that a diameter of the luminous flux of the dichroic mirror is 2 inches, the liquid crystal panel of 2/3 inches can be projected by the light without light loss.

The polarization processing part 2000 also has the same configuration by applying the lenses 73a and 73b.

The case of soaking the liquid crystal panel itself in the liquid of high refractive index will be explained later. Since the optical modulation by the liquid crystal is a phenomenon generated in the liquid crystal of high refractive index, no effect can be obtained by soaking the liquid crystal panel in the liquid. Thus, the permissible value for dispersion is only about twice (3/1.5) as much as the permissible value of the dichroic mirror or the polarization beam splitter in the liquid whose refractive index is 1.5.

Accordingly, it is manifest by referring to practical values used for design that it is impossible to make practical diameter of the collected optical path, that is size of the liquid crystal panel, be less than 1.5 inches, half of 3 inches, when the light is collected onto the liquid crystal panel.

The lenses 55, and 70a to 72b can be installed unitedly at the side of each box of the wavelength separating module 1040, the polarization separating module 1047 or the polarization synthesizing module 1048. The boxes and the lenses can be molded from transparent plastic, which reduces the number of the components.

In FIG. 33, a box 405h filled with the liquid 400j is installed at the second optical path. The box 405h is as large as the box 401h, and the liquid 400j in the box 405h has the same refractive index as the liquid 400j in the box 401h. The box 405h is for making the optical path lengths of the first light (wave P) and the second light (wave S) equal, and for making the apparatus compact. Owing to the box 405h, the optical path of the second light (wave S) can be reduced to be 1/refractive index of the liquid 400j, which makes the apparatus compact. An opening space W1 between the box 402h and the box 405h is for preventing the lens 55 from being in contact with the box 405h. An opening space W2 between the box 402h and the box 401h is for preventing the projection lens 50, the lens 55 and the lens 72b from being in touch each other.

Embodiment 3-2.

The problem of light reflection is generated by installing the relay lens and projecting the narrowed luminous flux onto the liquid crystal panel as described in the Embodiment 3-1. As stated in the Related Art, when the light is diagonally input into the liquid crystal panel, crosstalk is generated, and then dark current flows in a TFT circuit. Preventing the crosstalk will now be described in the present embodiment.

Figure 37:
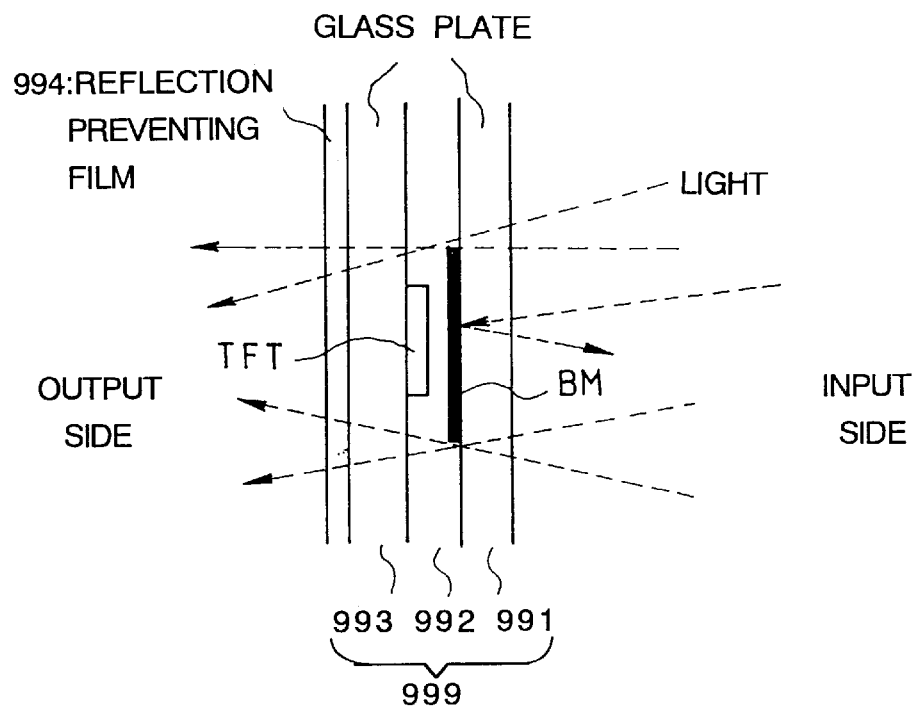
FIG. 37 shows a liquid crystal panel wherein a reflection preventing film is applied, in the present invention.

FIG. 37 shows that glass plates 991 and 993 enclose liquid crystal 992 of a liquid crystal panel 999. The glass plate 991 is at the light input side and the glass plate 993 is at the light output side. The TFT is applied on the light input side of the glass plate 993. A reflection preventing film 994 for preventing reflection is applied on the light output side of the glass plate 993. By applying the reflection preventing film 994, it can be prevented that reflected light makes the TFT excited and a harmful dark current is generated.

Figure 38:
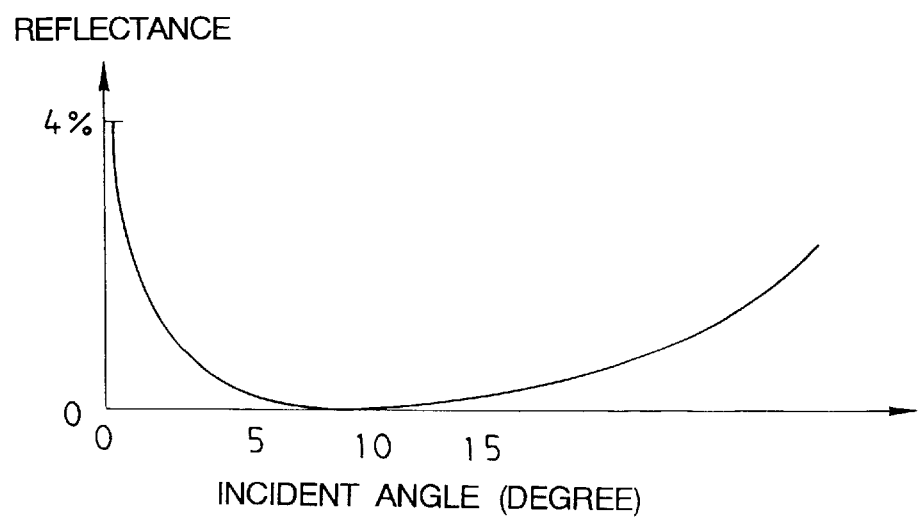
FIG. 38 shows a characteristic of reflecting of a reflection preventing film of the present invention.

The reflection preventing film 994 can be applied on one side of the glass plate 993 at the same time that the TFT is made on the other side of the glass plate 993. Reflectance of the reflection preventing film 994 is designed to be the lowest at the incident angle 5 degrees to 15 degrees as shown in FIG. 38. It is possible to make the reflectance of the reflection preventing film 994 dependent upon the incident angle. For instance, when the incident angle is designed to be 10 degrees, it is possible to make the reflection preventing film whose reflectance is the lowest at the incident angle 10 degrees. Although the case of the reflection preventing film 994 being applied has been explained in the present embodiment, it is also acceptable to stick a reflection preventing thin coat on the glass plate 993.

Figure 39:
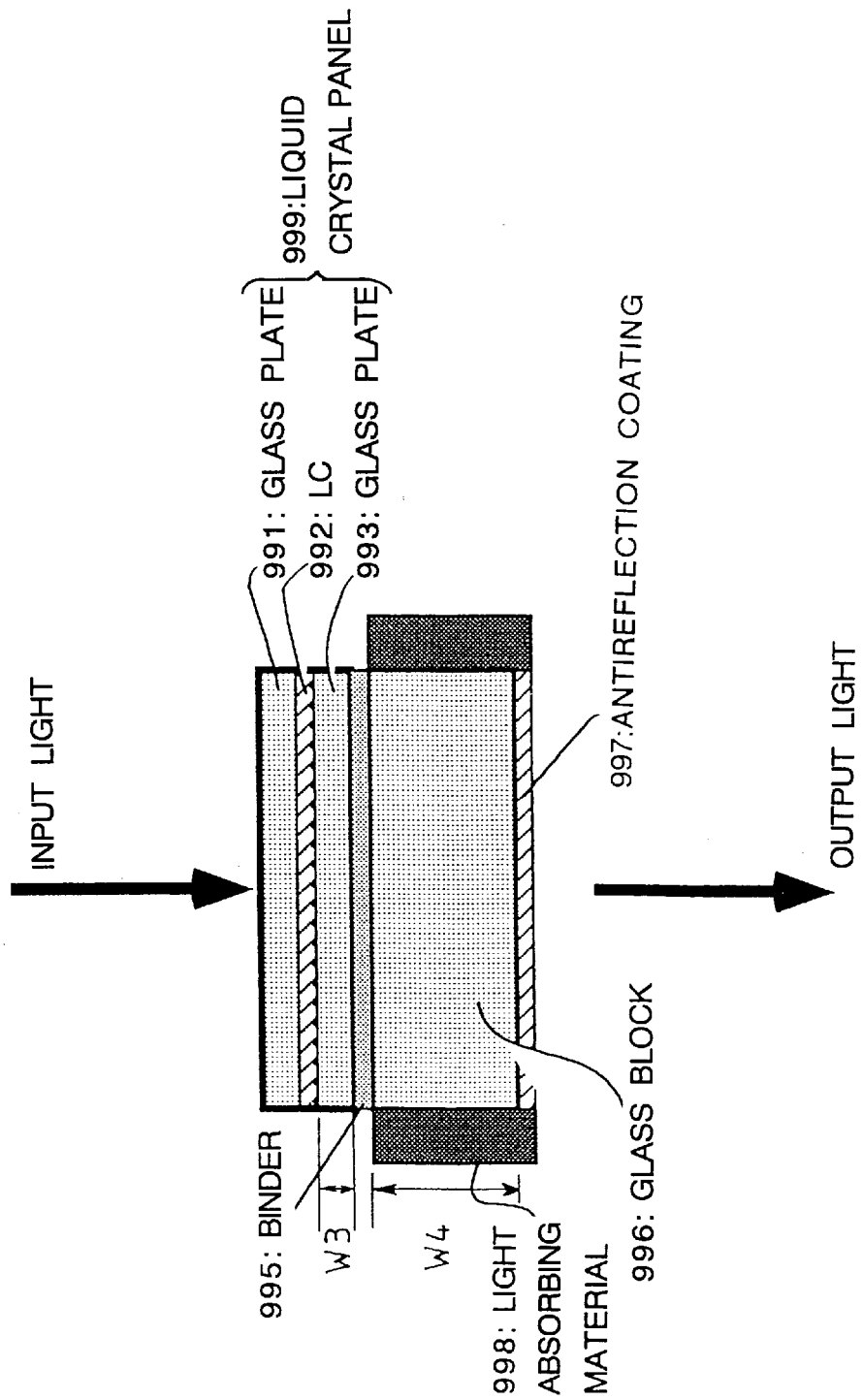
FIG. 39 shows a liquid crystal panel for preventing crosstalk, in the present invention.

FIG. 39 shows another example of the liquid crystal panel for preventing the crosstalk. In FIG. 39, a glass block 996 made of the same material as the glass plates 991 and 993 of the liquid crystal panel 999 is shown. The glass block 996 has width W4 which is thicker than width W3 of the glass plates 991 and 993. The glass block 996 is attached to the liquid crystal panel 999 by a binder 995. A refractive index of the binder 995 is almost the same as that of the glass plates 991 and 993 of the liquid crystal panel 999. Light absorbing material 998 is installed at the both sides of the glass block 996. Antireflection coating 997 is applied on the light output side of the glass block 996.

When the light is diagonally input into the liquid crystal panel of the above configuration, the light input into the glass plate 993 is transmitted through the glass plate 993, the binder 995 and the glass block 996 because the glass plate 993, the binder 995 and the glass block 996 have almost the same refractive index. Then, the light is output after being transmitted through the antireflection coating 997. If the light reaches the light absorbing material 998 during passing the glass block 996, the light is absorbed by the light absorbing material 998, therefore, no cause of the crosstalk is generated. The crosstalk is generated in proportion to the diagonal incident angle of the light with respect to the liquid crystal panel 999. The more the diagonal incident angle is, the more the crosstalk is generated. However, the crosstalk is seldom generated in the present embodiment since the diagonal input light is absorbed by the light absorbing material 998. When the width W4 of the glass block 996 becomes thick, the light absorbing material 998 becomes long. Namely, rate of light absorbing is increased. However, if the light absorbing material 998 becomes long, there is possibility of absorbing light which should not be absorbed. Therefore, it is desirable for the width W4 of the glass block 996 to be several times as much as the width W3 of the glass plate 993.

Figure 40:
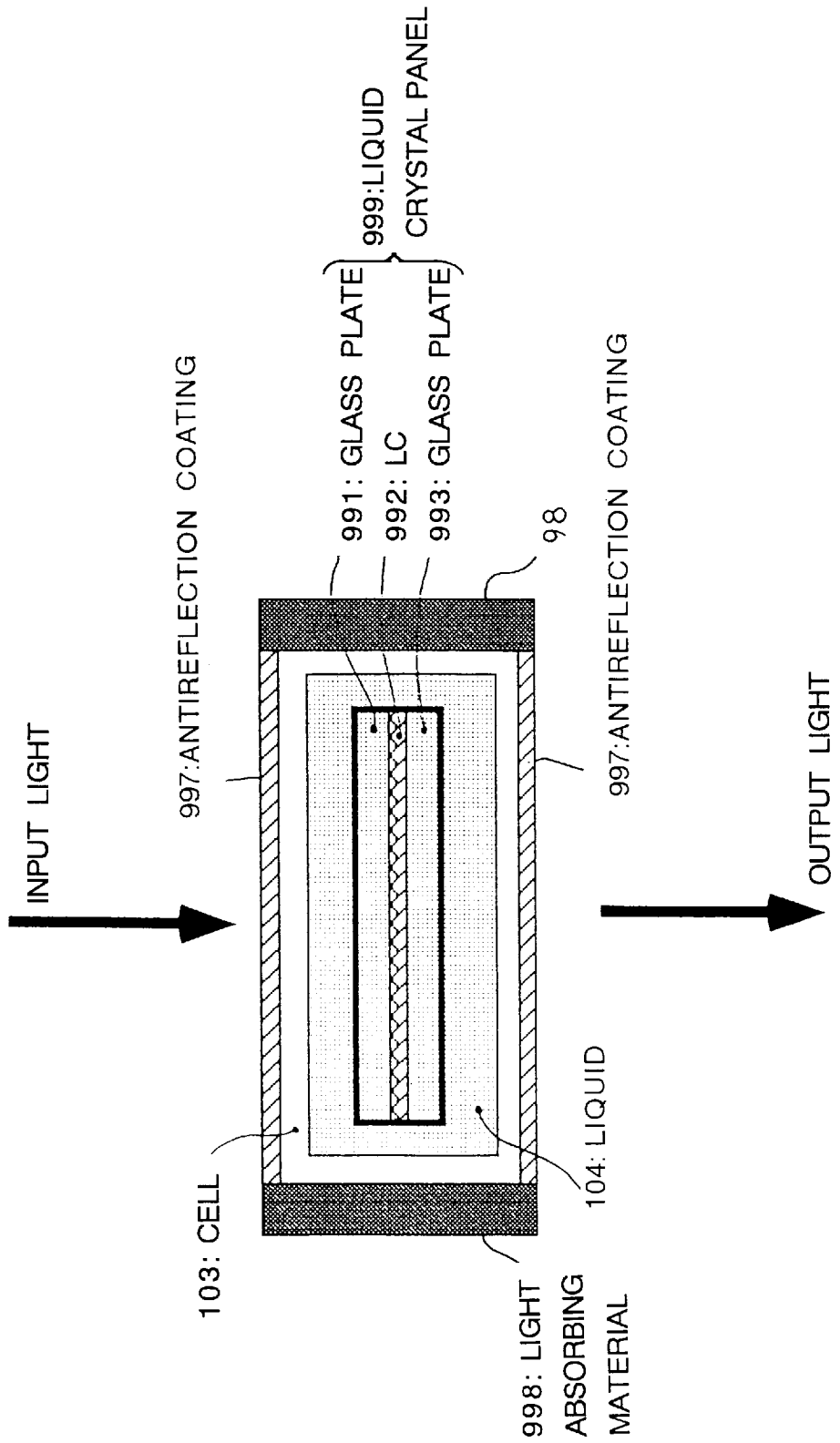
FIG. 40 shows another liquid crystal panel for preventing crosstalk, in the present invention.

FIG. 40 shows another example of the liquid crystal panel for preventing the crosstalk. The liquid crystal panel 999 is installed in a cell 103 filled with liquid 104 whose refractive index is almost the same as that of the glass plates 991 and 993. The cell 103 is composed of material which transmits the light. The antireflection coating 997 is applied on the both sides of the cell 103. The light absorbing material 998 is also installed at other both sides of the cell 103, wherein no antireflection coating 997 is applied.

By using the liquid crystal panel of the above configuration, light reflection at the border of the glass plate 991 and the liquid 104 and light reflection at the border of the glass plate 993 and the liquid 104 can be prevented since the glass plates 991 and 993 and the liquid 104 have almost the same refractive index.

The case of the reflection preventing film being applied on the liquid crystal panel as stated above needs a special process, which makes the liquid crystal panel expensive. When the liquid crystal panel is soaked in the liquid whose refractive index is the same as that of the glass enclosing the liquid crystal, the reflection at the glass can be deleted. However, the reflection at the plate enclosing the liquid becomes the problem. This harmful reflection at the plate can be deleted by applying the reflection preventing film on the proper part of the plate. Generally, it is easier to perform an adhering process for an ordinary plate than to perform the adhering process for the glass of the liquid crystal panel having complicated manufacturing procedures.

Thus, it becomes unnecessary to apply the reflection preventing film 994 or other reflection preventing thin coat when the liquid crystal panel 999 is installed in the liquid 104. In addition, the liquid crystal panel 999 can be cooled by the liquid 104.

Figure 41:
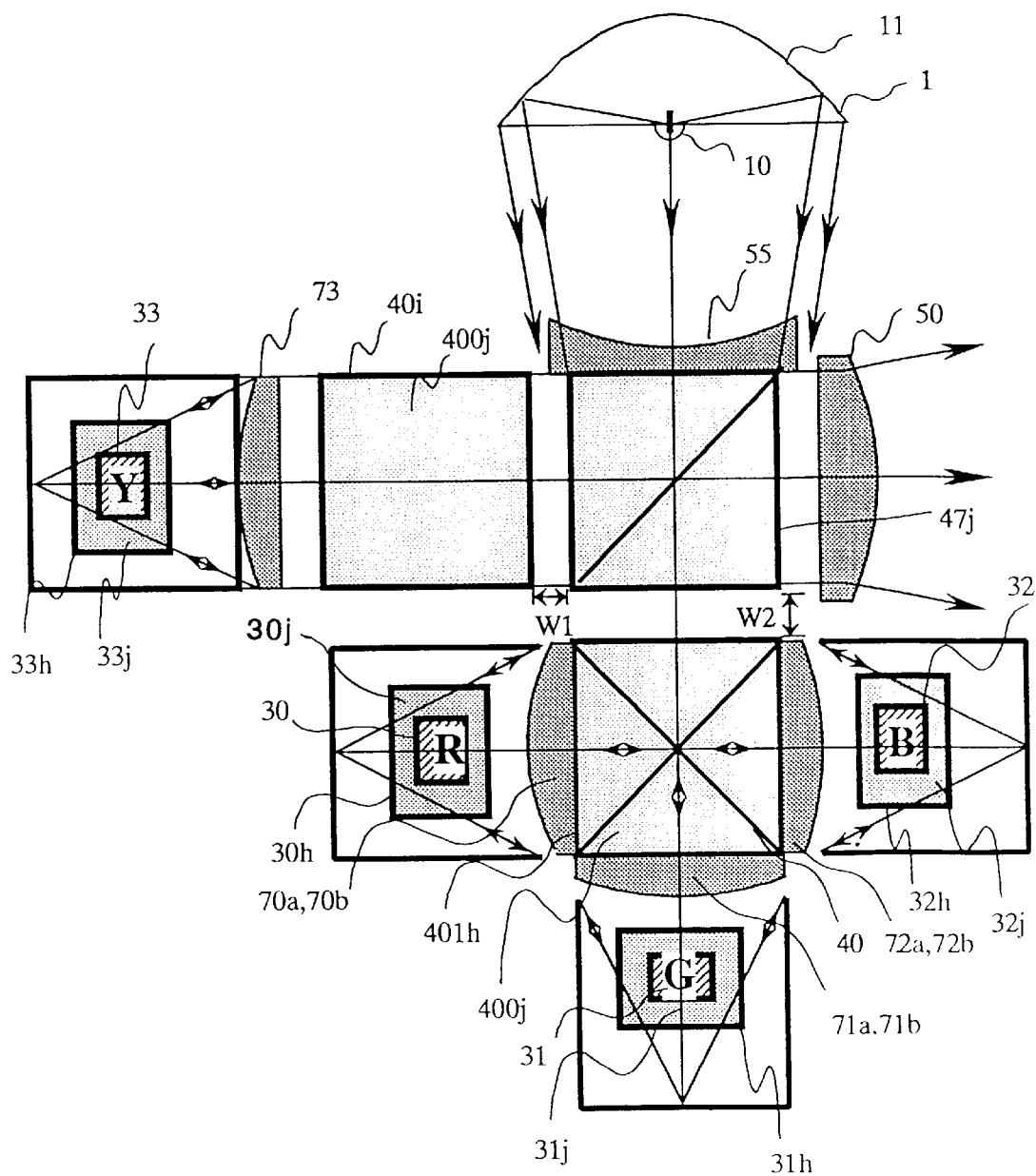
FIG. 41 shows a configuration of a liquid crystal projector wherein a liquid crystal panel for preventing crosstalk is used, in the present invention.

FIG. 41 shows the case of the liquid crystal panel shown in FIG. 40 being used. The liquid crystal panels 30, 31, 32 and 33 are installed in liquid 30j, 31j, 32j and 33j put in boxes 30h, 31h, 32h and 33h.

Figure 42:
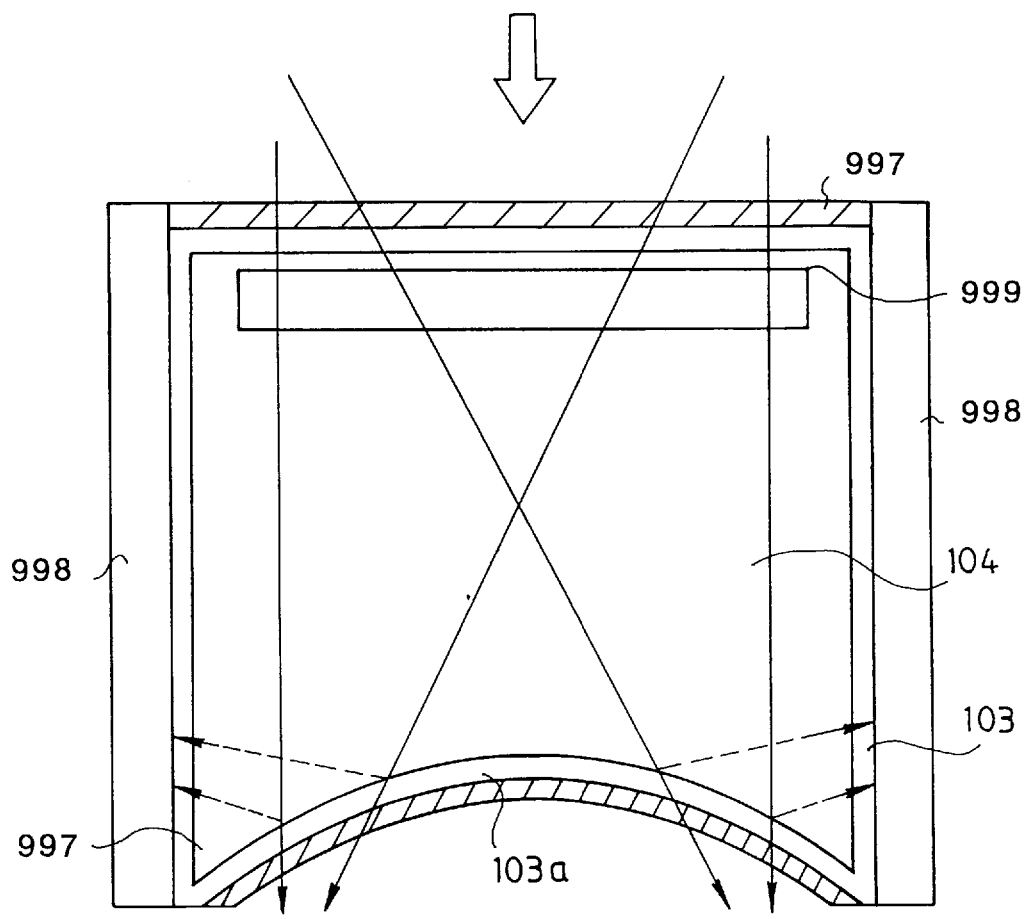
FIG. 42 shows a configuration of a cell for preventing crosstalk, in the present invention.

FIG. 42 shows another example of the liquid crystal panel for preventing the crosstalk. A surface 103a of the cell at the light output side is a curved surface, which is a feature of FIG. 42. Since the surface 103a of the cell is a concave curved surface, the reflection light can be easily absorbed by the light absorbing material 998.

Figure 43:
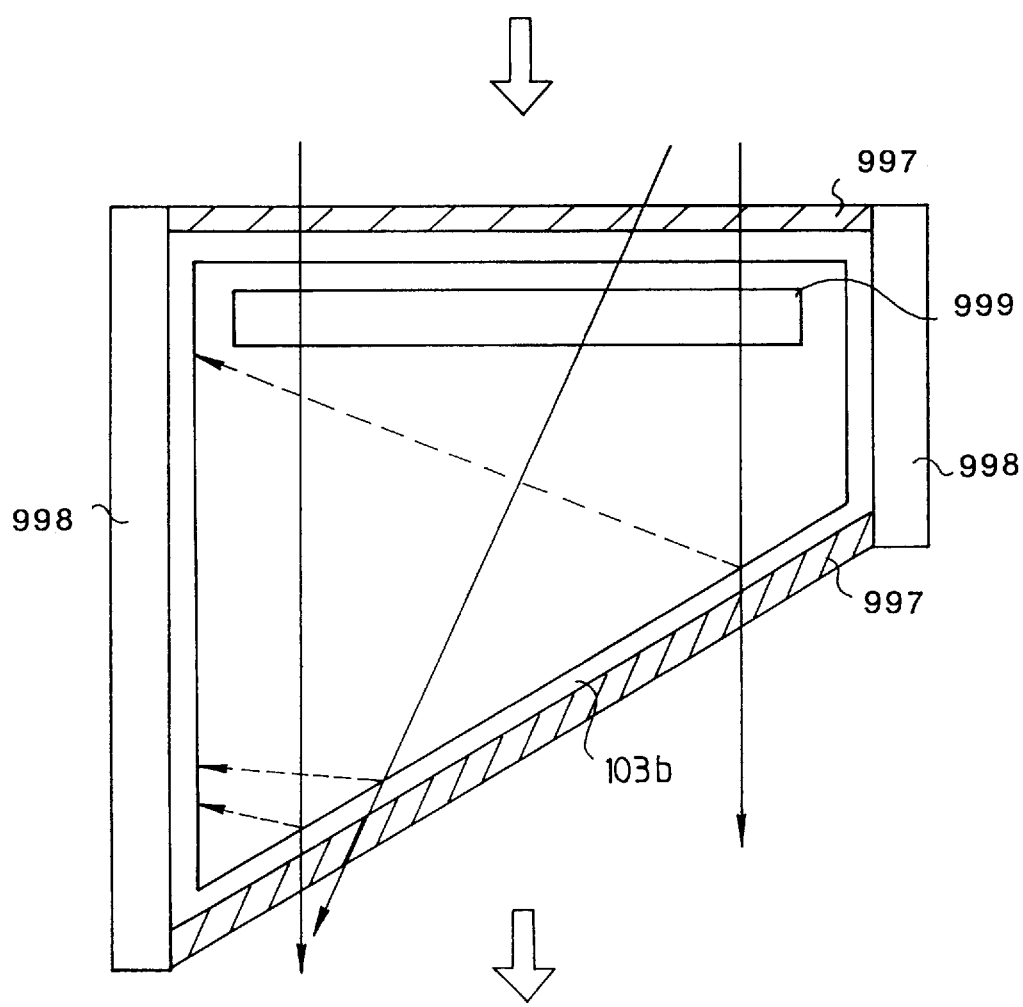
FIG. 43 shows another configuration of a cell for preventing crosstalk, in the present invention.

FIG. 43 shows another example of the liquid crystal panel for preventing the crosstalk. A feature of this example is that a surface 103b of the cell at the light output side is diagonally installed with respect to the output light. The reflection light can be easily absorbed by the light absorbing material 998 because the surface 103b is diagonally installed with respect to the output light.

Figure 44:
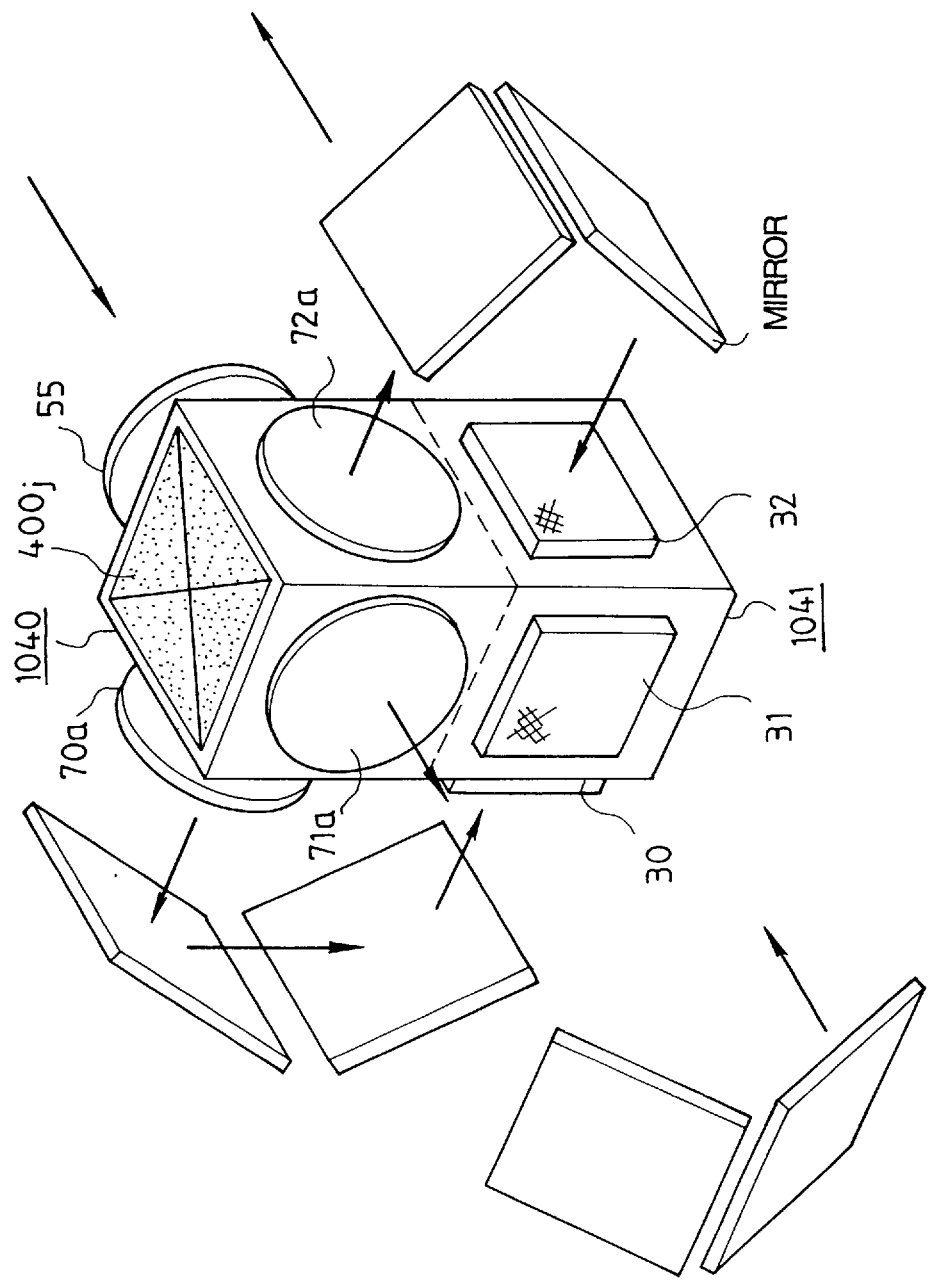
FIG. 44 shows a configuration of a liquid crystal projector for preventing crosstalk, in the present invention.

FIG. 44 shows another example for preventing the crosstalk. In FIG. 44, the glass plates of the liquid crystal panels 30, 31 and 32, at the light output sides, are installed to be soaked in the liquid 400j of the wavelength synthesizing module 1041. The cross dichroic mirror and the liquid crystal panel are generally composed of glass plates. The liquid 400j has refractive index equal to or less than that of the glass plate of the cross dichroic mirror and the liquid crystal panel.

As the glass plates at the light output sides touch the liquid 400j, the light reflection at the light output side can be prevented. Though not shown in the figure, it is possible to apply the similar configuration to the liquid crystal panel 33 for luminance, by sticking the liquid crystal panel 33 for luminance to the polarization synthesizing module 1048, which makes the crosstalk prevented.

Embodiment 3-3.

Figure 45:
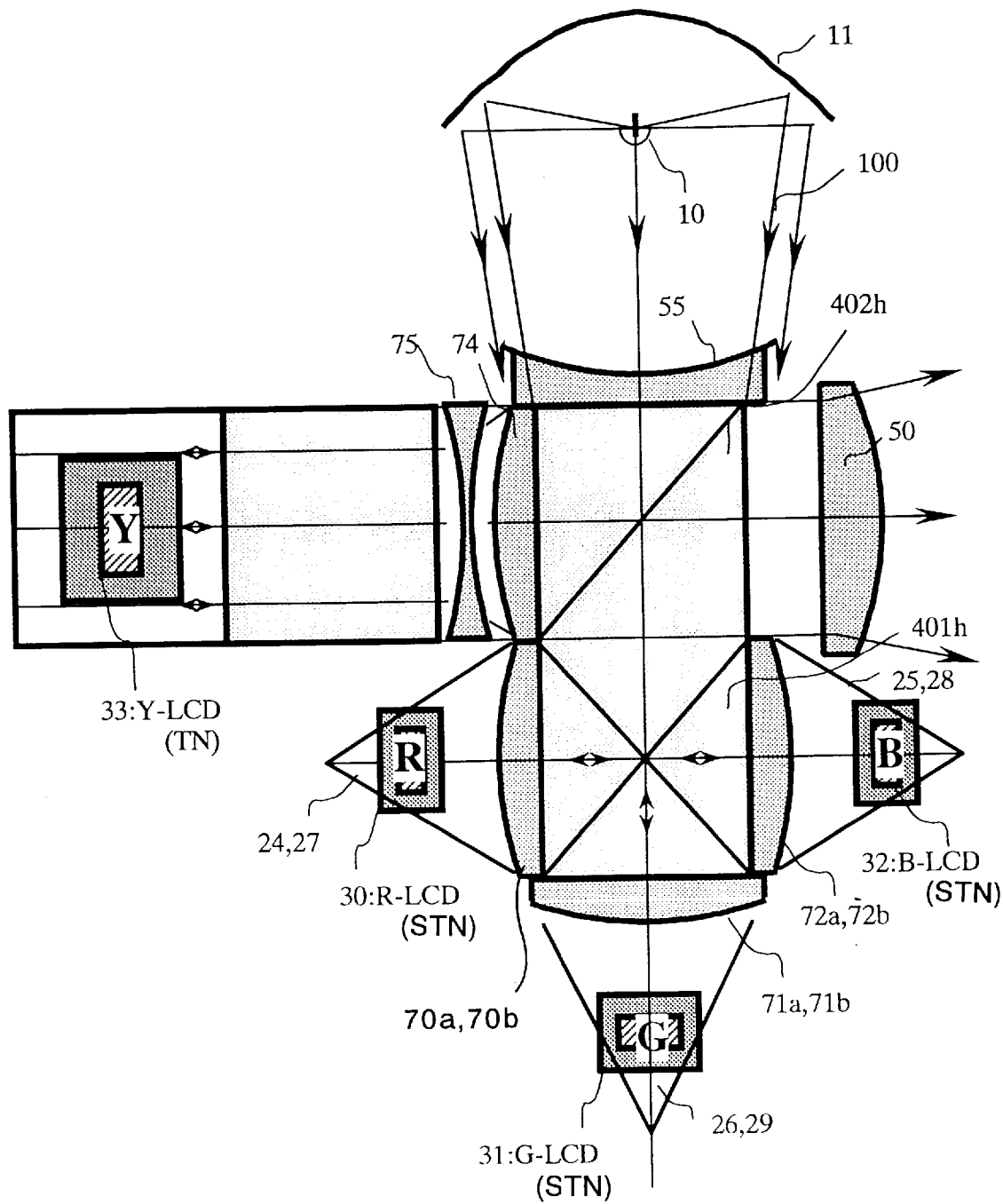
FIG. 45 shows a liquid crystal projector wherein a STN type liquid crystal panel and a TN type liquid crystal panel are used, in the present invention.

FIG. 45 shows a configuration of the liquid crystal projector of the present embodiment. A feature of the embodiment is that super twisted nematic (STN) liquid crystal is used for the liquid crystal panels 30, 31 and 32 for color. Twisted nematic (TN) liquid crystal is used for the liquid crystal panel 33 for luminance. Though the STN liquid crystal has a disadvantage that its response is slow, the STN liquid crystal has an advantage of being low-priced because its configuration is simple. On the other hand, the response of the TN type liquid crystal panel is faster than that of the STN type liquid crystal panel, but the price is higher than that of the STN type liquid crystal panel.

As a human visual characteristic, human eye is more sensitive to luminance than to color. This human visual characteristic is utilized in the present embodiment. Spatial frequency characteristic of human eye for luminance is superior to that for color. Therefore, the resolution of the liquid crystal panel 33 for luminance is defined to be three or four times as much as the resolution of the liquid crystal panels 30, 31 and 32 for color. A liquid crystal panel having about three hundred thousand pixels is used for the liquid crystal panel 33 for luminance in the present embodiment. A liquid crystal panel having seventy-five thousand through one hundred thousand pixels is used for the liquid crystal panels 30, 31 and 32 for color. Based on the spatial frequency characteristic of the human eye, the liquid crystal panels having different resolutions are used.

Time frequency characteristic of human eye for luminance is also superior to that for color. Because of this time frequency characteristic of human eye, the TN type liquid crystal panel 33 being quick to respond is used for the liquid crystal panel for luminance in the present embodiment. The STN type liquid crystal panels 30, 31 and 32 being slow to respond are used for the liquid crystal panels for luminance. Though the STN type liquid crystal panels are slow to respond, no trouble happens because of the time frequency characteristic of human eye. By using the STN type liquid crystal panel for the liquid crystal panel for color, a low-priced liquid crystal projector can be manufactured.

As stated above, the TN type liquid crystal panel 33 having three hundred thousand pixels is used for the liquid crystal panel for luminance. Therefore, size of the liquid crystal panel for luminance is larger than that of the liquid crystal panel for color. It is designed that parallel light is projected onto this large-sized liquid crystal panel. Lenses 74 and 75 are relay lenses for effectively projecting the parallel light for the liquid crystal panel 33 for luminance.

The shape of a mirror for setting up the optical path for the liquid crystal panels 30, 31 and 32 for color is triangle in the present embodiment. The lenses 70a, 71a and 72a diagonally, about 15 degrees, project the light onto the liquid crystal panels 30, 31 and 32. Accordingly, the reflecting mirrors 24 to 29 whose shapes are triangles for adapting to the optical path, can be used. By using the triangle reflecting mirrors 24 to 29, size of the liquid crystal projector can be smaller.

By applying the triangle for the shape of the reflecting mirror 28, the reflecting mirror 28 does not touch the projection lens 50. Therefore, it becomes possible to arrange the boxes 401h and 402h next to each other, without having any opening space. It is also acceptable to make the box 401h and the box 402h be one module, which further reduces the number of the components.

Embodiment 3-4.

Figure 46:
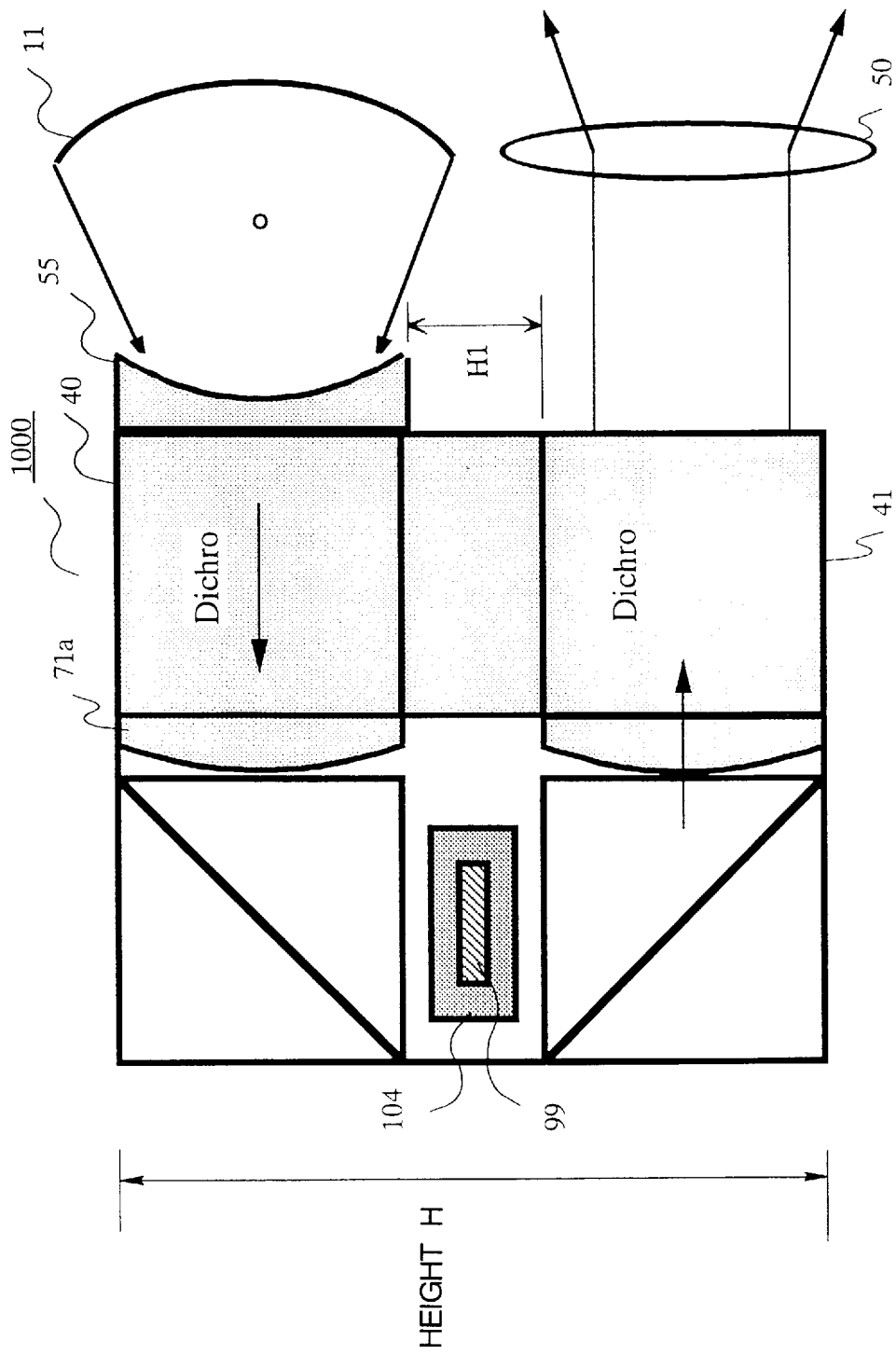
FIG. 46 shows a liquid crystal projector of size A4 of the present invention.
Figure 47:
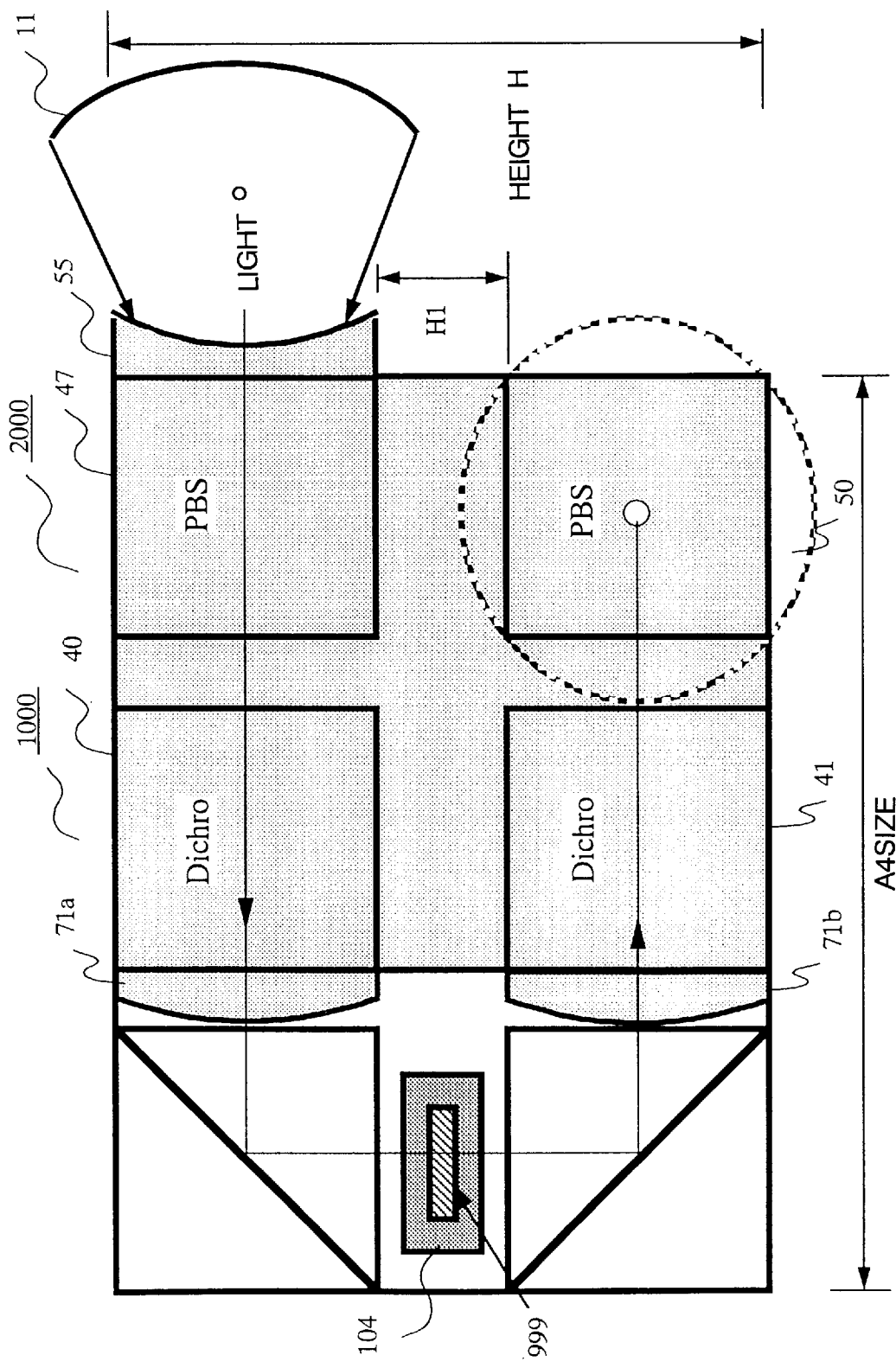
FIG. 47 shows another liquid crystal projector of size A4 of the present invention.

FIGS. 46 and 47 show other examples of the liquid crystal projector. The case of the plane size of the liquid crystal projector being size A4 is described in the present embodiment. In order to realize the plane of the size A4, it is sometimes necessary for the optical path to keep some specific length depending upon other various optical elements in the apparatus. In the present embodiment, keeping some length for the optical path can be realized by increasing height H of the projector. The case that the optical path length is added H1 by installing a spacer of height H1 is shown in FIGS. 46 and 47. It is still desirable to put the liquid crystal panel 999 at the center of the optical path even when the height H1 is added. There is space around the liquid crystal panel 999 in the case of the height H1 is added for the purpose of realizing the size A4. Therefore, the liquid crystal panel 999 which is enclosed in the cell filled with the liquid for preventing reflection can be used. There is an advantage in the present embodiment that it is not necessary to make the size of the liquid crystal panel 999 large even when the panel 999 is soaked in the liquid of high refractive index.

FIG. 46 shows the case that the light is directly input into the color processing part 1000 and directly output from it.

Since the spacer having height H1 is provided, each component can be arranged within the liquid crystal projector without any inconsistency, even when size of the main reflecting mirror 11 or the diameter of the projection lens 50 is large.

FIG. 47 shows the case of there being the color processing part 1000 and the polarization processing part 2000. Since the directions of input light and output light are different, the main reflecting mirror 11 and the projection lens 50 are installed in different locations, in FIG. 47. Thus, comparing with the configuration of FIG. 46, there is no chance of touching between the main reflecting mirror 11 and the projection lens 50. However, in the case that the diameter of the optical path is narrowed by the lens 71a and the narrowed luminous flux is projected onto the liquid crystal panel 999, there is a case that it is necessary to keep a specific distance between the lens 71a and the liquid crystal panel 999. In addition, there is a case that it is necessary to keep a specific optical path length when the light is irradiated from the liquid crystal panel 999 to the lens 71b. It becomes possible to adjust the distance between the lens 71a or 71b, and the liquid crystal panel 999 by installing the spacer of height H1.

Figure 48:
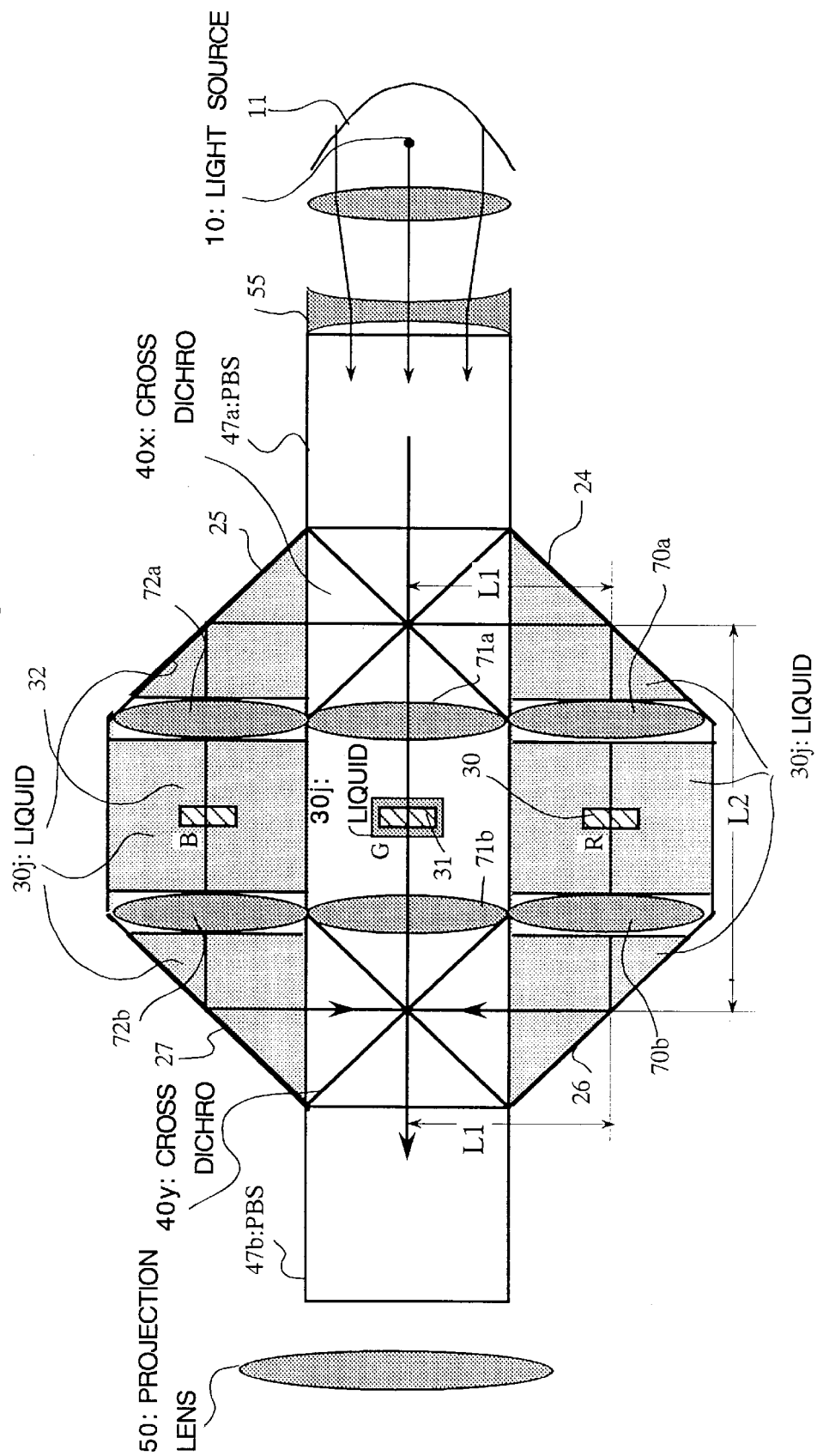
FIG. 48 shows a plan view of another configuration of a liquid crystal projector of the present invention.
Figure 49:
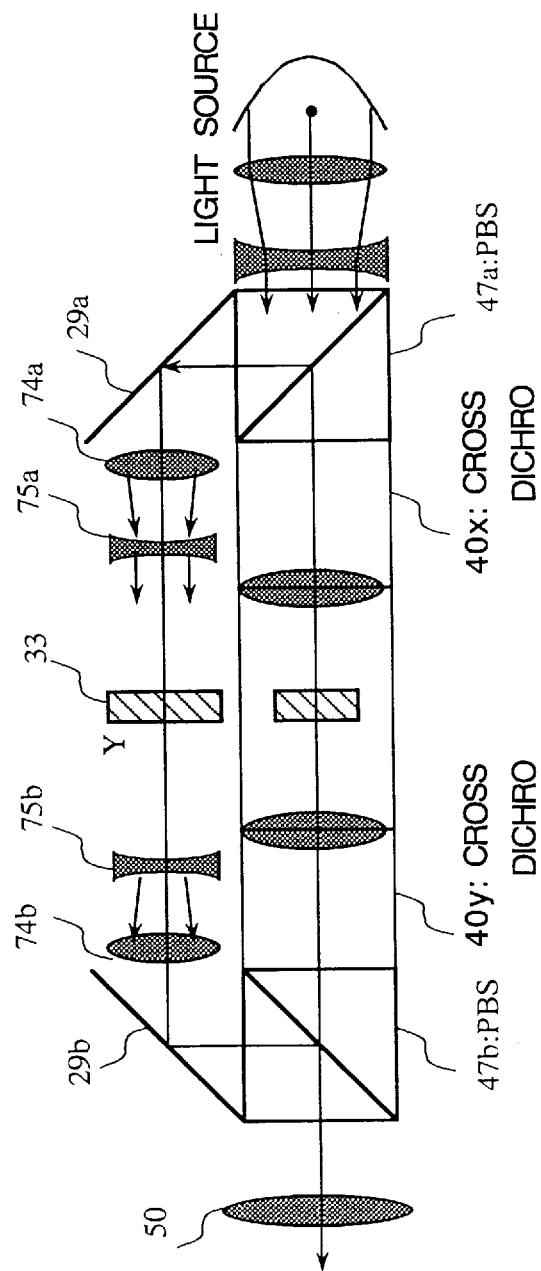
FIG. 49 shows a side view of another configuration of a liquid crystal projector of the present invention.

FIG. 48 shows a plan view of the liquid crystal projector of the present embodiment. FIG. 49 shows a side view of the liquid crystal projector of the present embodiment.

The liquid crystal projector of this embodiment is divided into two stages, a first stage for processing polarization and color processing and a second stage for processing luminance. All the components in the first stage are constructed to be one form. In FIG. 48, the polarization beam splitter 47a separates the light from the light source 10 into the wave P and the wave S. The wave P is input into a cross dichroic mirror 40x and separated into the lights R, G and B. The separated light is relayed by the lens 70a, 71a or 72a and input into the liquid crystal panel 30, 31 or 32. The light modulated in the liquid crystal panel 30, 31 or 32 is input into a cross dichroic mirror 40y via the lens 70b, 71b or 72b. The lights R, G and B are synthesized in the cross dichroic mirror 40y and output to the polarization beam splitter 47b.

FIG. 49 shows that the wave S separated by the polarization beam splitter 47a is projected toward the second stage and input into the liquid crystal panel 33 for luminance via the reflecting mirror 29a and lenses 74a and 75a. The light modulated in the liquid crystal panel 33 goes through lenses 75b and 74b, and is reflected at the reflecting mirror 29b to go into the polarization beam splitter 47b. The polarization beam splitter 47b synthesizes a color signal which is synthesized in the cross dichroic mirror 40y in the first stage, and a signal for luminance which is sent from the second stage, and outputs the synthesized signal to the projection lens 50.

The optical path of the light G is shorter than that of the light R or B in FIG. 48. For the purpose of making the optical path length of the light G equal to that of the light R or B, liquid 30j is provided in the optical paths of R and B. A refractive index of the liquid 30j is higher than that of the air. Therefore, the liquid 30j has an optical function of reducing the optical path length by the amount of the refractive index. The optical path lengths of the light R, G and B can be equivalent by the stated structure.

As shown in FIG. 48, distance between the centers of the two cross dichroic mirrors 40x and 40y is defined to be length L2. Distance between the center of the cross dichroic mirror 40x and the reflecting mirror 24 or 25, or distance between the center of the cross dichroic mirror 40y and the reflecting mirror 26 or 27 is defined to be length L1. The optical path length of the light G is L2 and the optical path length of the light R or B is L2+2L1. As the optical path of the light G is transmitted in the air, the refractive index of the optical path of the light G is 1. The optical paths of the light R and B are transmitted in the liquid. It is needed for the liquid 30j to have a refractive index n which satisfies L2=(L2+2L1)/n. By using the liquid 30j whose refractive index is n, the optical path lengths of the lights R, G and B can be equivalent. Though the optical path length for luminance is not shown, the optical path lengths of the lights R, G and B can be equivalent by putting liquid whose refractive index is high, into the optical path for luminance.

As shown in FIG. 48, it is also acceptable to soak only the liquid crystal panel 31 for the light G in the liquid 30j, while the optical path of the light G goes through the air. Cooling effect can be enhanced by soaking the liquid crystal panel 31 in the liquid 30j. In addition, the crosstalk can be prevented even when diagonal light is input.

Embodiment 3-6.

Figure 50:
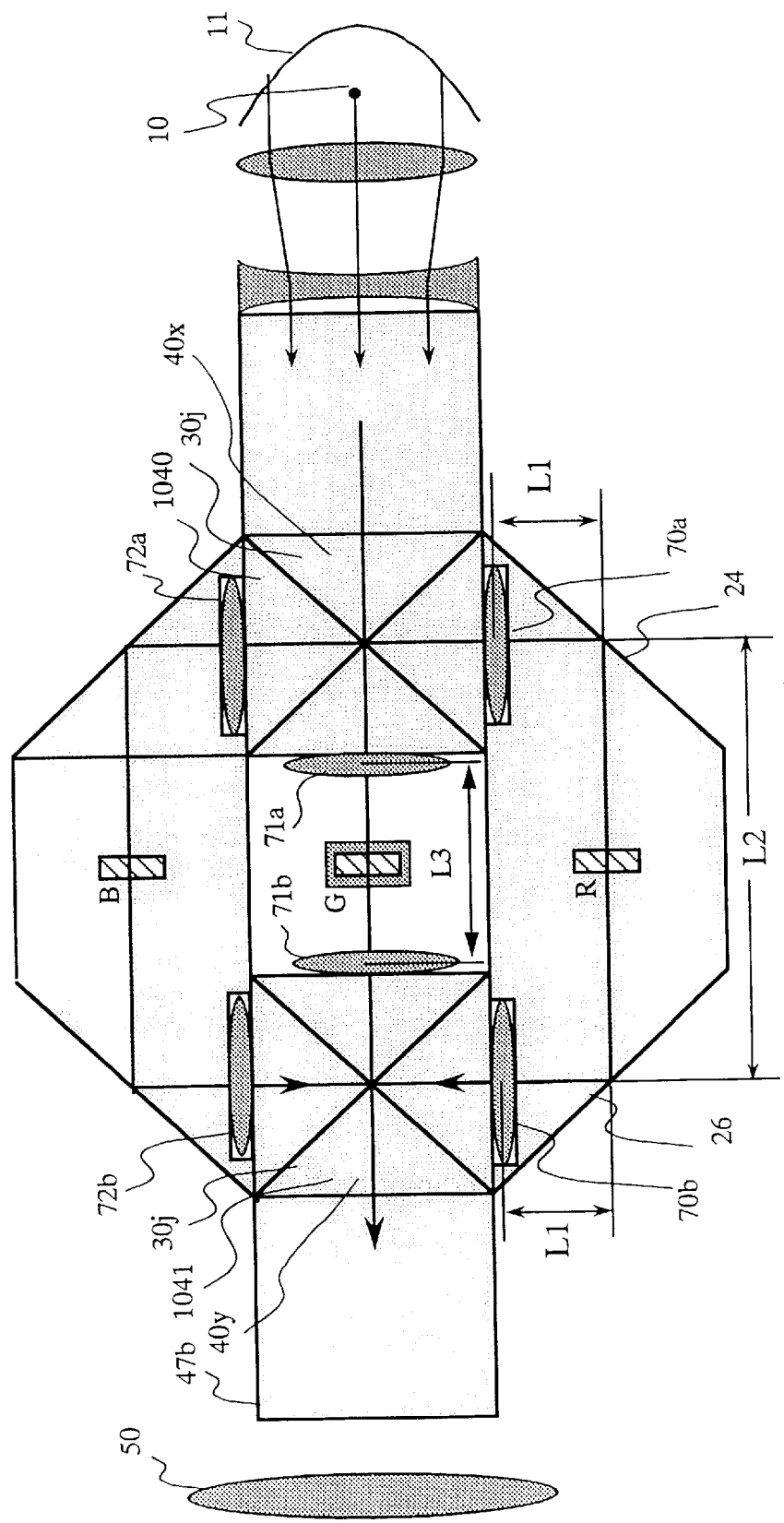
FIG. 50 shows a plan view of another configuration of a liquid crystal projector of the present invention.
Figure 51:
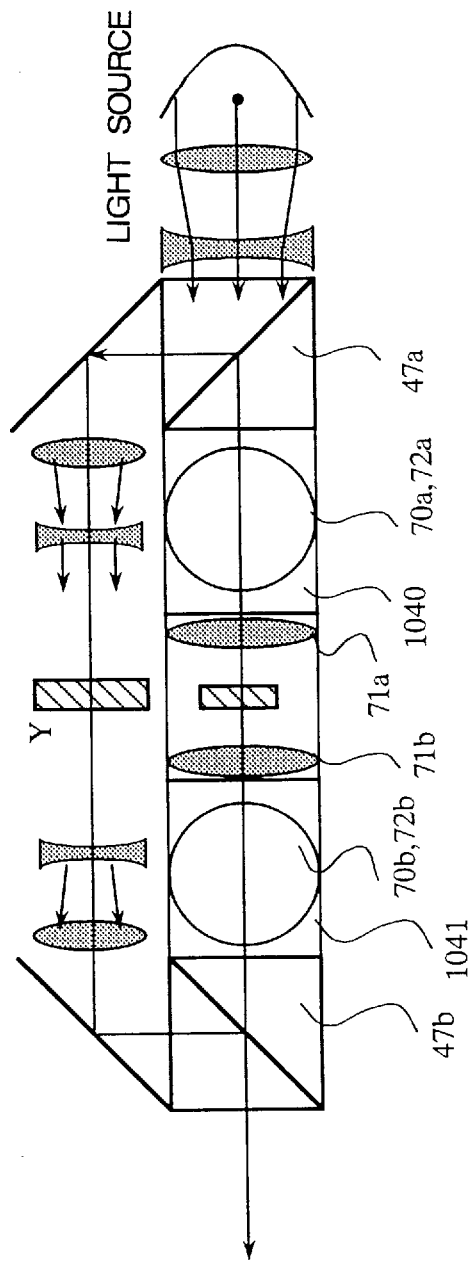
FIG. 51 shows a side view of another configuration of a liquid crystal projector of the present invention.

FIG. 50 shows a plan view of the liquid crystal projector of the present embodiment. FIG. 51 shows a side view of the liquid crystal projector of the present embodiment.

In the liquid crystal projector of the present embodiment, the lenses 70a to 72b are installed at the sides of the cross dichroic mirrors 40x and 40y, which differs from the Embodiment 3-5. The wavelength separating module 1040 is composed of the cross dichroic mirror 40x soaked in the liquid 30j, and the wavelength synthesizing module 1041 is composed of the cross dichroic mirror 40y soaked in the liquid 30j, which are also different from the Embodiment 3-5. The optical path lengths of the lights R, G and B are made to be equivalent by the liquid of high refractive index being put in the optical paths of the light R and B. As shown in FIG. 50, distance between the centers of the two cross dichroic mirrors 40x and 40y is defined to be L2 and distance between the centers of the lens 71a and 71b is defined to be L3. Distance between the center of the lens 70a and the reflecting mirror 24, or between the lens 70b and the reflecting mirror 26 is defined to be L1. If the length L3, the optical path length of the light G, is equal to length L2+2L1, the optical path length of the light R or B, three optical lengths become equivalent. As the optical path length L3 of the light G is transmitted in the air, the refractive index of the optical path of the light G is 1. The optical paths of the light R and B are transmitted in the liquid. It is needed for the liquid to have a refractive index n which satisfies L3=(L2+2L1)/n. By using the liquid 30j whose refractive index is n, the optical path lengths of the lights R, G and B can be equivalent.

Embodiment 3-7.

Figure 52:
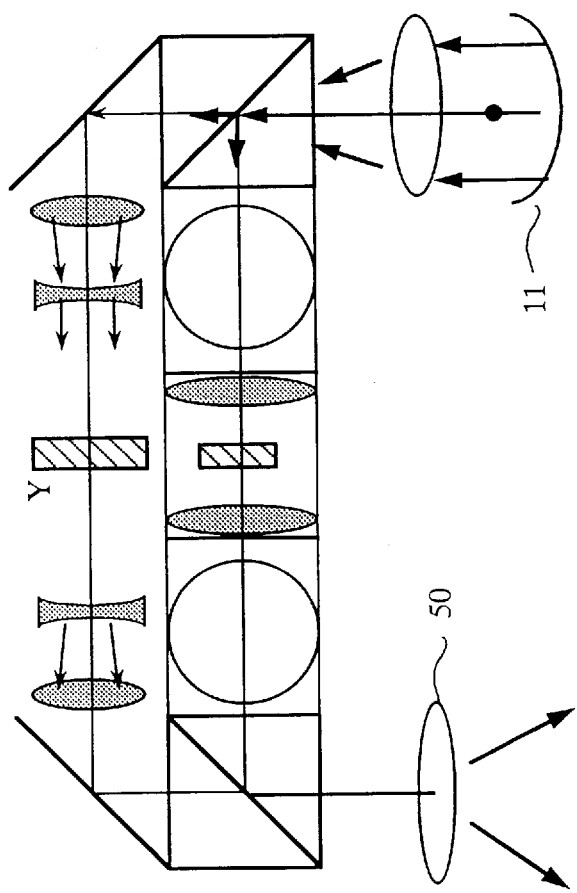
FIG. 52 shows a side view of another configuration of a liquid crystal projector of the present invention.

FIG. 52 shows the liquid crystal projector of the present embodiment. In FIGS. 48 and 51, the light source 10 and the projection lens 50 exist along the direction of a long side of the liquid crystal projector. In the present embodiment, the light source and the projection lens 50 exist at the side, not along the direction of the long side, of the liquid crystal projector, which makes the size of the liquid crystal projector compact. Since there is enough distance between the light source and the projection lens, the light source never touches the projection lens.

Embodiment 3-8.

Figure 53:
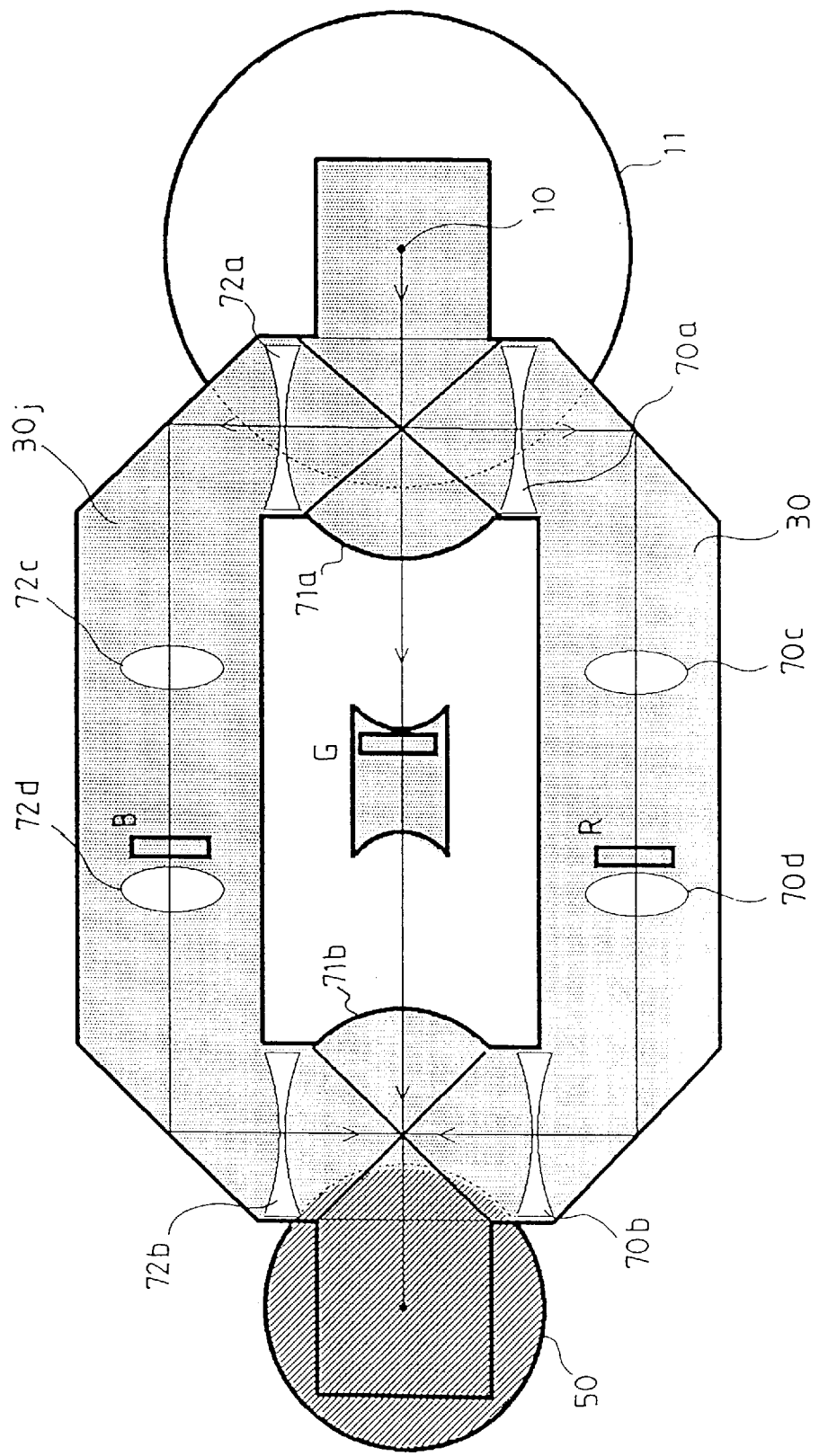
FIG. 53 shows a plan view of another configuration of a liquid crystal projector of the present invention.
Figure 54:
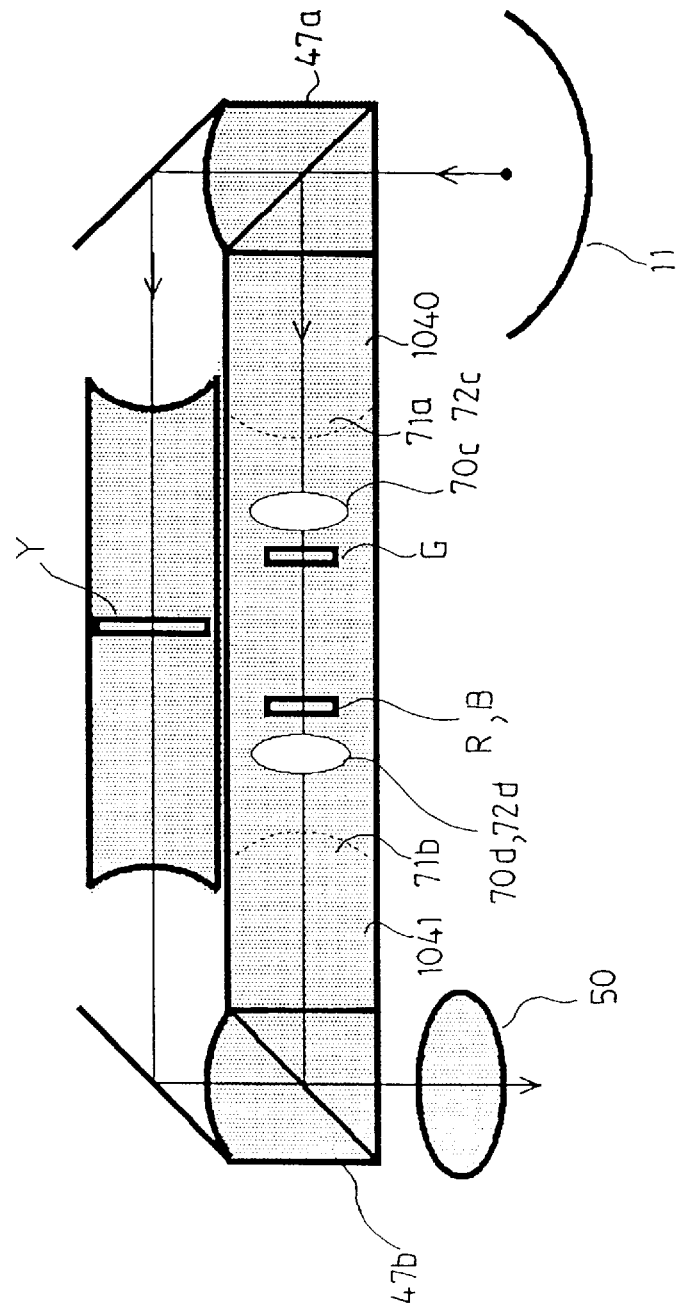
FIG. 54 shows a side view of another configuration of a liquid crystal projector of the present invention.

FIG. 53 shows a plan view of the liquid crystal projector of the present embodiment. FIG. 54 shows a side view of the liquid crystal projector of the present embodiment.

Concave lenses, being hollow, are used for the lenses 70a, 70b, 72a and 72b as shown in FIG. 53, which differs from the configuration in FIG. 50. As the air lenses are directly soaked in the liquid 30j whose refractive index is n, an effect the same as that of convex lens can be performed.

Convex lenses, being hollow, are also used for the lenses 70c, 70d, 72c and 72d. As the air lenses are directly soaked in the liquid 30j whose refractive index is n, an effect the same as that of concave lens can be performed. The lenses 70c, 70d, 72c and 72d are for changing the light input into the liquid crystal panel to parallel light, and for conically irradiating the light output from the liquid crystal panel.

The lenses 71a and 71b are formed including sides of the box of the liquid crystal projector. Surfaces, at the light input side and the output side, of the cell of the liquid crystal panel for the light G shown in FIG. 53 are curved surfaces. By going through the curved surface, the light irradiated from the lens 71a is changed to parallel light. Then, the parallel light is transmitted through the liquid crystal panel and output from the curved surface at the light output side. As the surface at the output side is the curved surface, the crosstalk caused by reflected light can be prevented as shown in FIG. 42. In addition, since the curved surface has a function of lens, conically spreading light is irradiated to the lens 71b.
Embodiment 3-9.

Figure 55:
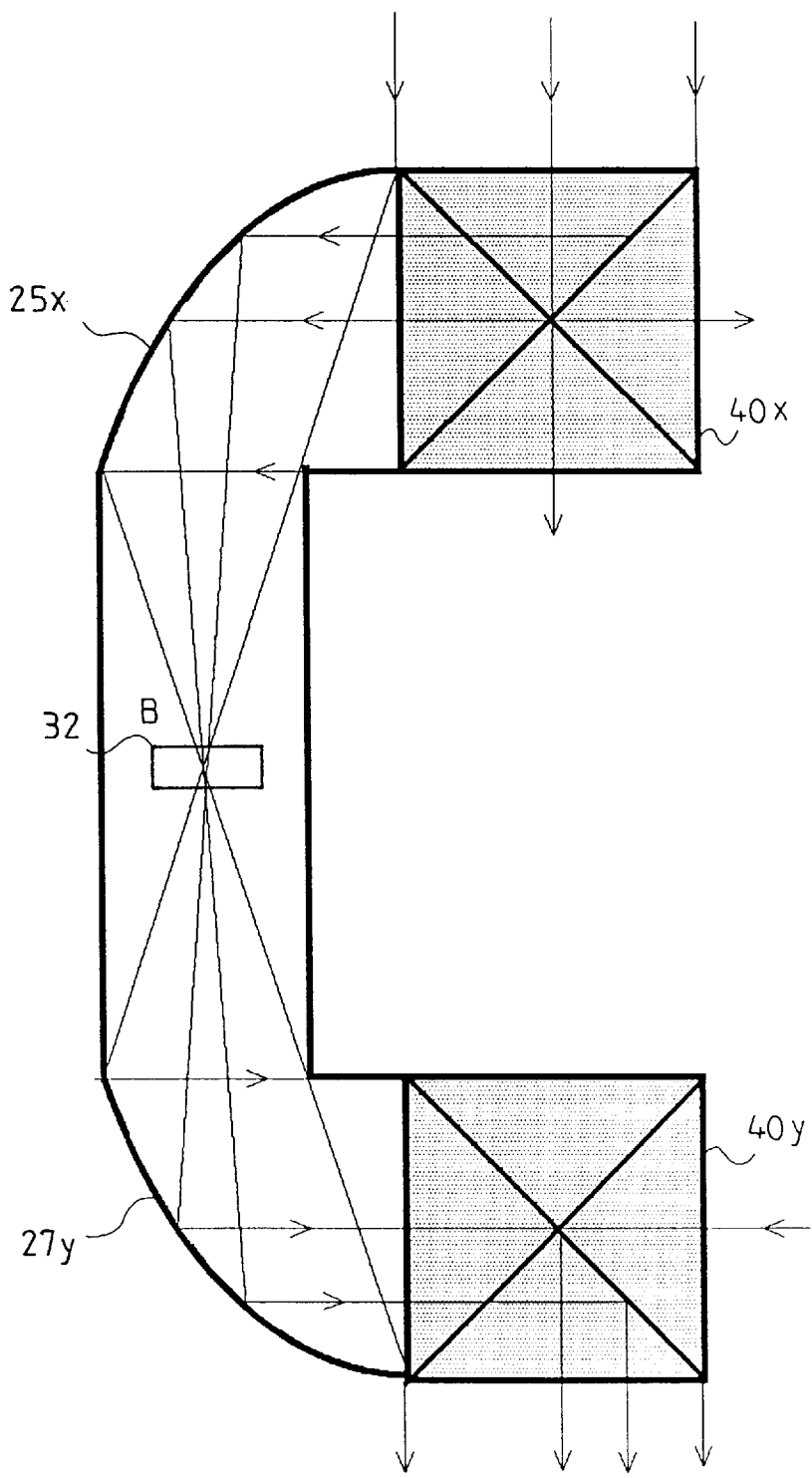
FIG. 55 shows an optical path connecting module wherein a curved-surface reflecting mirror is used, in the present invention.

FIG. 55 shows another example of the optical path connecting module. A feature of the present embodiment is that a first curved-surface reflecting mirror 25x and a second curved-surface reflecting mirror 27y are included. Only the optical path connecting module is shown in FIG. 55. Other elements are the same as the elements of the liquid crystal projector shown in FIG. 48 or 50.

Light separated at the cross dichroic mirror 40x is reflected at the first curved-surface reflecting mirror 25x. The reflected light is collected at almost center of the optical path connecting module. The collected light goes to the second curved-surface reflecting mirror 27y and then, the light is turned about 90 degrees by the second curved-surface reflecting mirror 27y to be parallel light. The parallel light is input into the cross dichroic mirror 40y. Parabolic mirrors can be the above curved-surface mirrors. The parallel light can be collected and the collected light can be returned to the parallel light by using the curved-surface reflecting mirror, without using the lens.
Embodiment 3-10.

Figure 56:
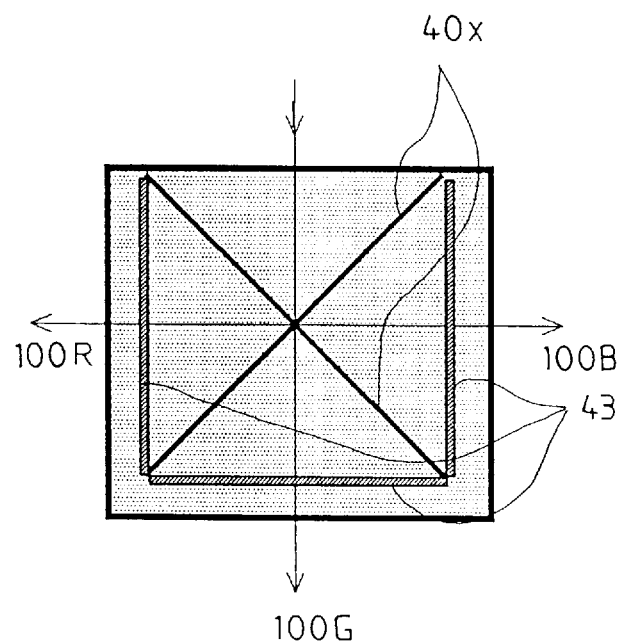
FIG. 56 shows a wavelength separating module having a polarization film, in the present invention.

FIG. 56 shows another example of the wavelength separating module wherein the cross dichroic mirror is enclosed in the liquid in the box.

The polarization film 43 is applied inside the wavelength separating module. Regarding the polarization film, it can be applied at the front or rear of the liquid crystal panel, or can be applied on the reflecting mirror as stated in the above embodiments. The polarization film 43 is applied inside the wavelength separating module in the present embodiment. The followings are advantages of applying the polarization film inside the wavelength separating module.

(1) Compared with the size of the liquid crystal panel, the size of the wavelength separating module is larger. Thus, it is possible to have larger area for the polarization film than the case of the polarization film being applied at the front or rear of the liquid crystal panel.

(2) Since the polarization film is soaked in the liquid, cooling effect of the polarization film is increased.

Although the case of the wavelength separating module is stated with reference to FIG. 56, the polarization film can also be applied for the wavelength synthesizing module.
Embodiment 3-11.

Figure 57:
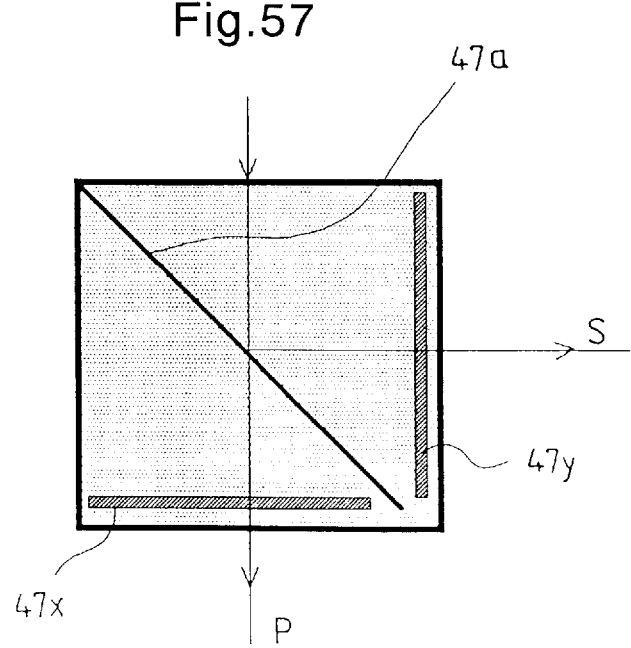
FIG. 57 shows a polarization separating module having a polarization film, in the present invention.

FIG. 57 shows another example of the polarization separating module wherein the polarization beam splitter 47a is put in the liquid in the box. The polarization films 47x and 47y of the polarization separating module are in the liquid in the present embodiment. The polarization film 47x transmits the wave P and shuts out the wave S. The polarization film 47y transmits the wave S and shuts out the wave P. The polarization beam splitter 47a transmits the wave P and reflects the wave S. However, it is impossible to perfectly separate the wave P from the wave S in the polarization beam splitter 47a. Therefore, as shown in FIG. 57, the polarization films 47x and 47y are applied to take out more perfect wave P or wave S. Although the case of the polarization separating module is shown in FIG. 57, the same configuration can be applied to the polarization synthesizing module.
Embodiment 3-12.

Figure 58:
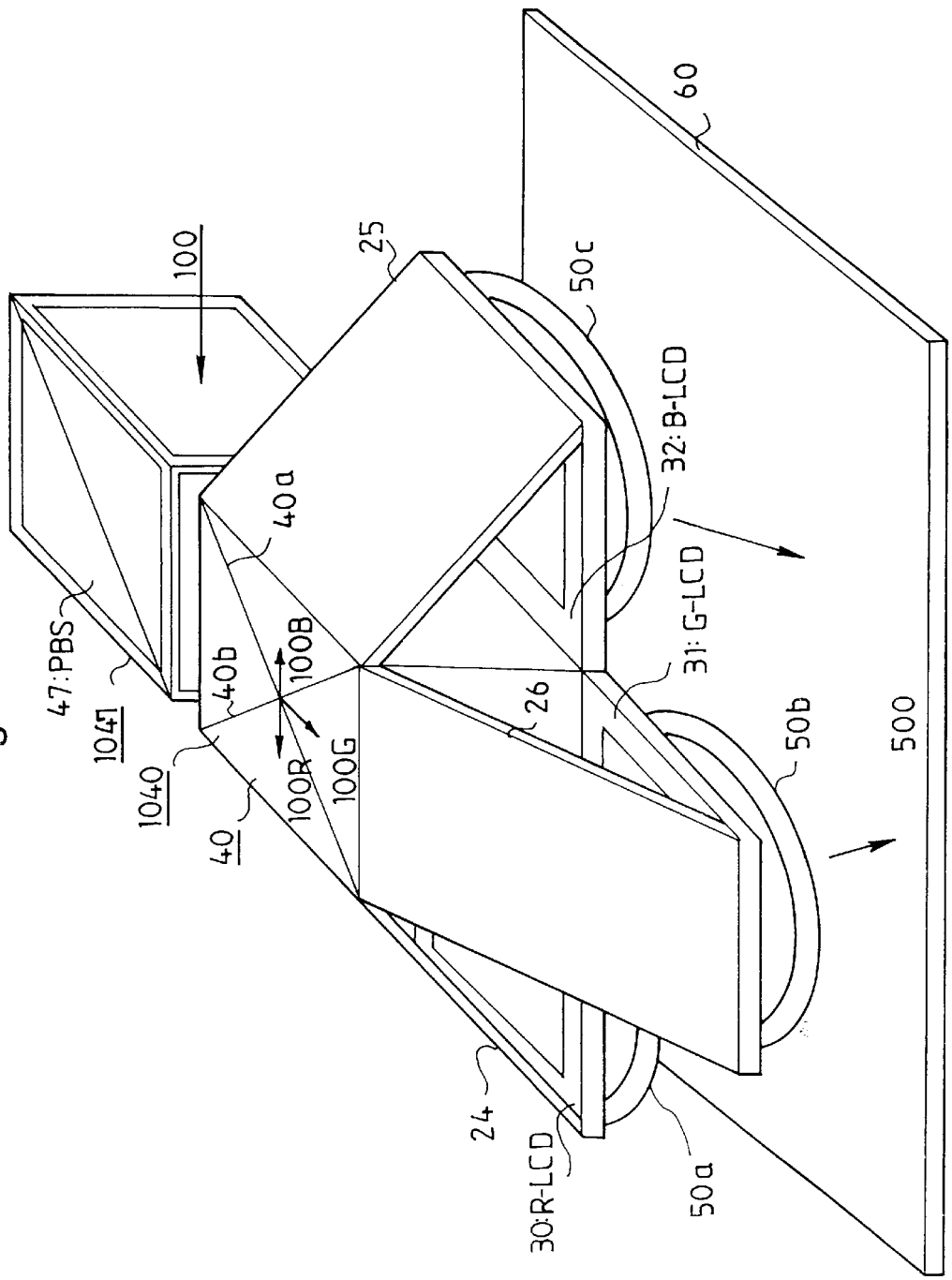
FIG. 58 shows another configuration of a liquid crystal projector of the present invention.

FIG. 58 shows the liquid crystal projector of the present embodiment. This liquid crystal projector is composed of the wavelength separating module 1040, polarization separating module 1047, liquid crystal panels 30, 31 and 32, reflecting mirrors 24, 25 and 26, and the projection lenses 50a, 50b and 50c. The lights of R, G and B are sent to the liquid crystal panels 30, 31 and 32 for R, G and B via the reflecting mirrors 24, 25 and 26, in the liquid crystal projector. The three lights modulated in the liquid crystal panels are synthesized on a screen 60 by the projection lenses 50a, 50b and 50c to generate an image.

Though the case of the polarization separating module 1047 being provided is shown in FIG. 54, it is also acceptable there being no polarization separating module. Compared with the liquid crystal panels for modulating red and blue, it is also acceptable to make the liquid crystal panel for modulating green be high precise, and to input a green signal with a luminance signal into the liquid crystal panel for green so as to modulate. It is also acceptable to construct the liquid crystal panels for red and blue by STN type liquid crystal panel and the liquid crystal panel for green by TN type liquid crystal panel.
Embodiment 3-13.

Figure 59:
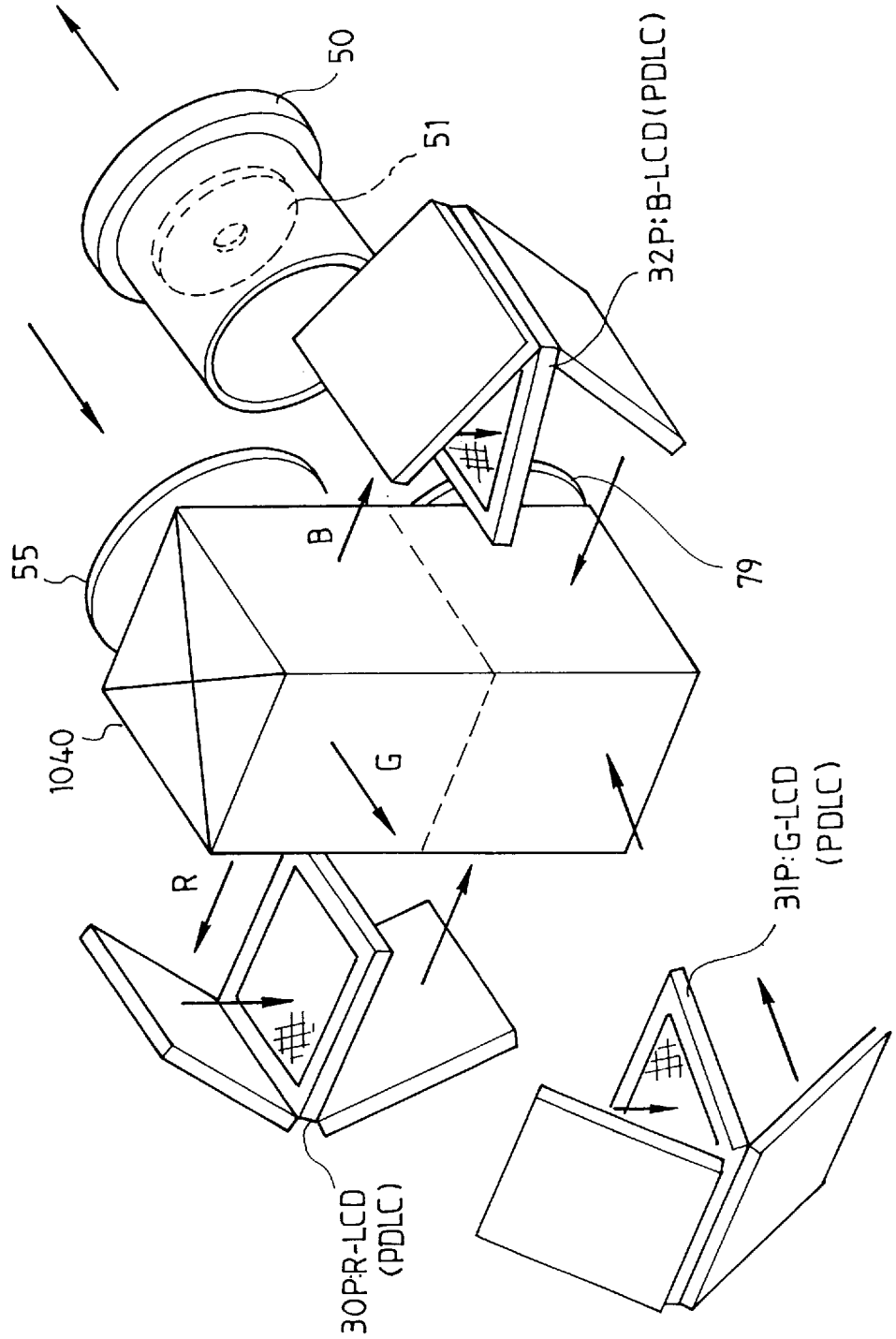
FIG. 59 shows a liquid crystal projector wherein a PDLC panel is used, in the present invention.

FIG. 59 shows the liquid crystal projector of the present embodiment. A feature of the present embodiment is that a polymer dispersed liquid crystal (PDLC) panel is used. Dispersion and transmission of the light is utilized in the PDLC panel. PDLC panels 30P, 31P and 32P are used in the present embodiment instead of the liquid crystal panels 30, 31 and 32 of the above embodiments. As a rule, it is necessary to input parallel light into the PDLC panel. Therefore, parallel light is formed by the lens 55 and the parallel light is input into the PDLC panel. Light output from the PDLC panel is also the parallel light. This parallel light is collected to an aperture 51 by a lens 79. The contrast ratio can be increased by the aperture 51. Since the polarization stated in the above embodiments is not used in the case of the PDLC panel, intact natural light can be input, so that a bright image can be obtained.

Figure 60:
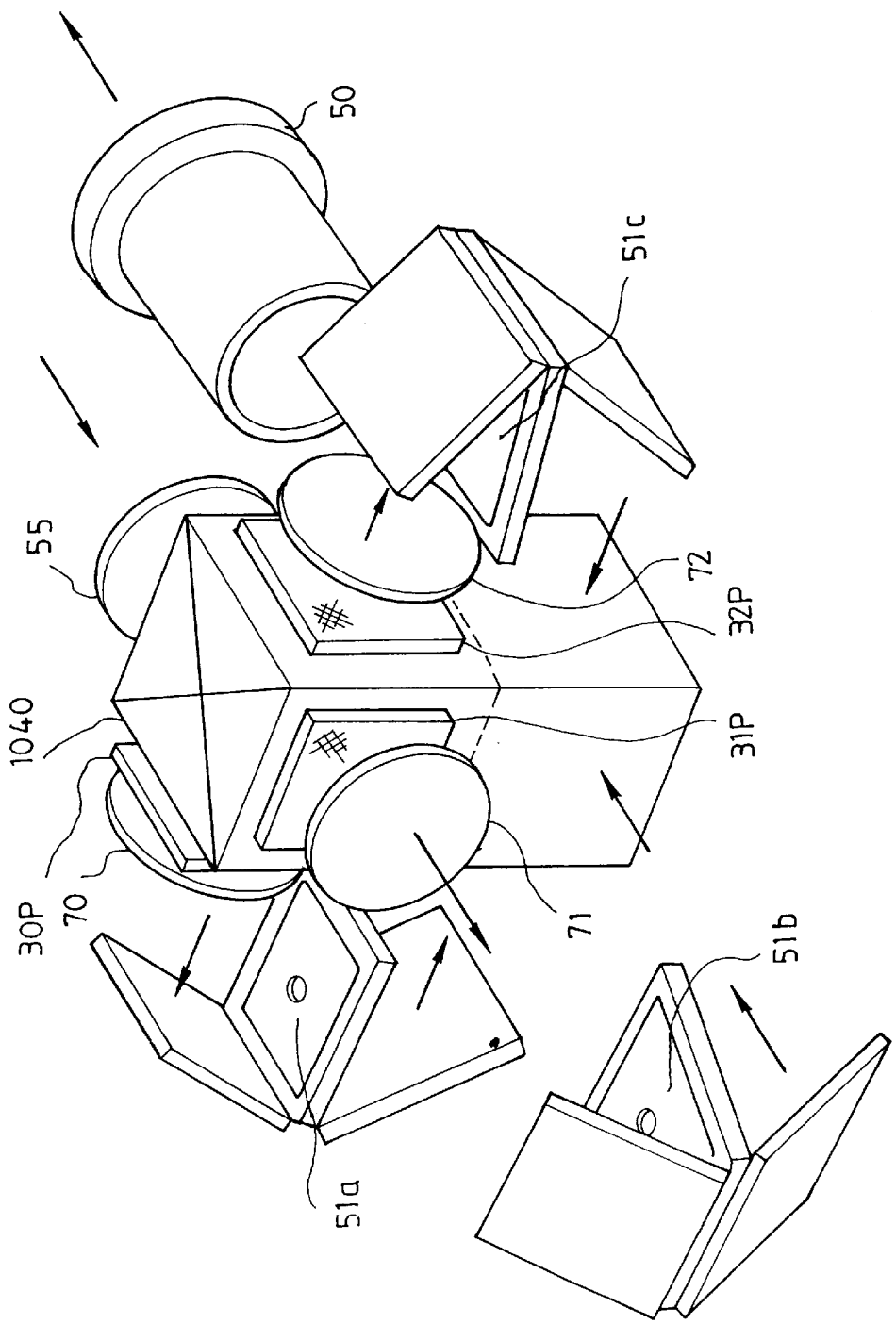
FIG. 60 shows another liquid crystal projector wherein a PDLC panel is used, in the present invention.

FIG. 60 shows another example of the PDLC panel being used. The PDLC panels 30P, 31P and 32P are installed at the sides of the wavelength separating module 1040. Apertures 51a, 51b and 51c are installed in the center of the reflecting mirrors. Lenses 70, 71 and 72 whose focal points are at the apertures are installed between the PDLC panels 30P, 31P and 32P, and the apertures 51a, 51b and 51c.

Though the case of the PDLC panel being used for the color processing part is described with reference to FIGS. 59 and 60, it is also acceptable to use the PDLC panel for the liquid crystal panel for luminance in the polarization processing part.

Figure 61:
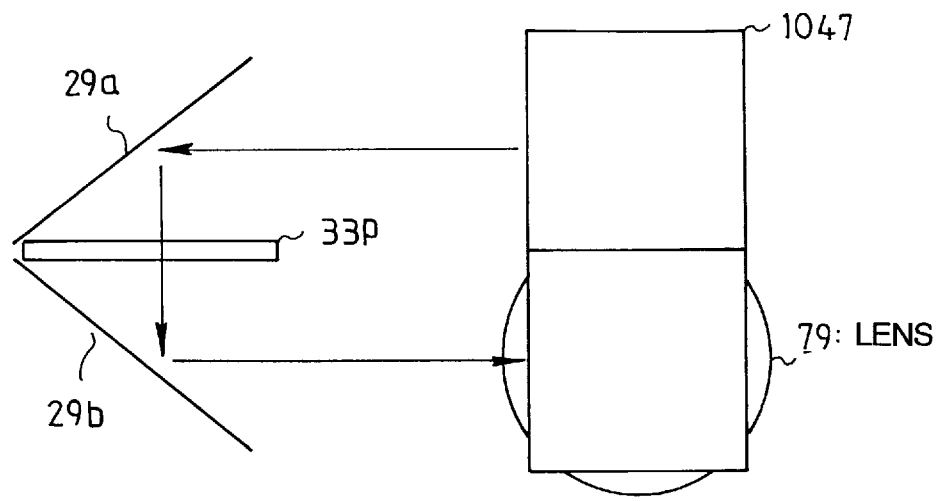
FIG. 61 shows a polarization processing part wherein a PDLC panel is used, in the present invention.

FIG. 61 shows that the liquid crystal panel 33P of PDLC is installed between the reflecting mirrors 29a and 29b. The lens 79 and the aperture 51 (not shown) in the color processing part can also be used as the lens and the aperture for this configuration.

Figure 62:
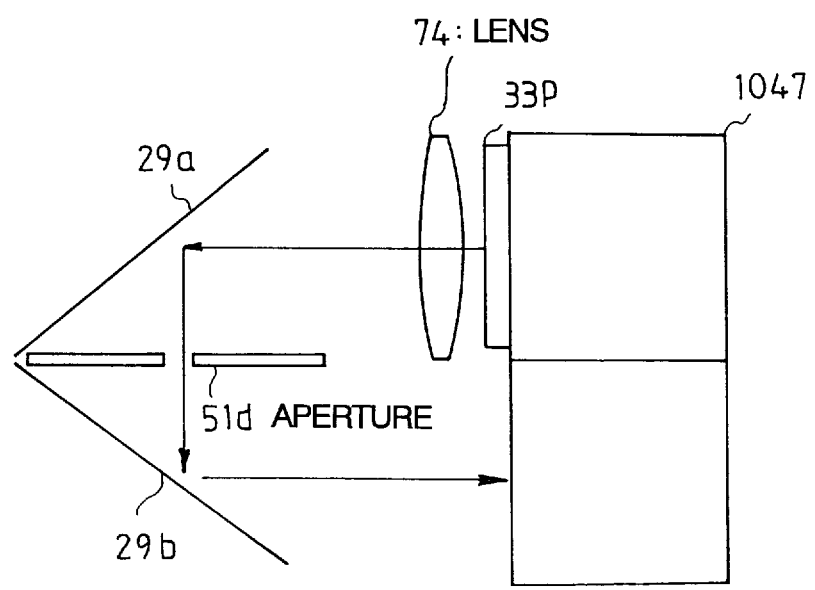
FIG. 62 shows another polarization processing part wherein a PDLC panel is used, in the present invention.

FIG. 62 shows that the liquid crystal panel 33P of PLDC is installed at the side of the polarization separating module 1047. An aperture 51d is provided between the reflecting mirrors 29a and 29b. In this case, the lens 74 and the aperture 51d are exclusively used for the polarization processing part.

Embodiment 3-14.

Figure 63:
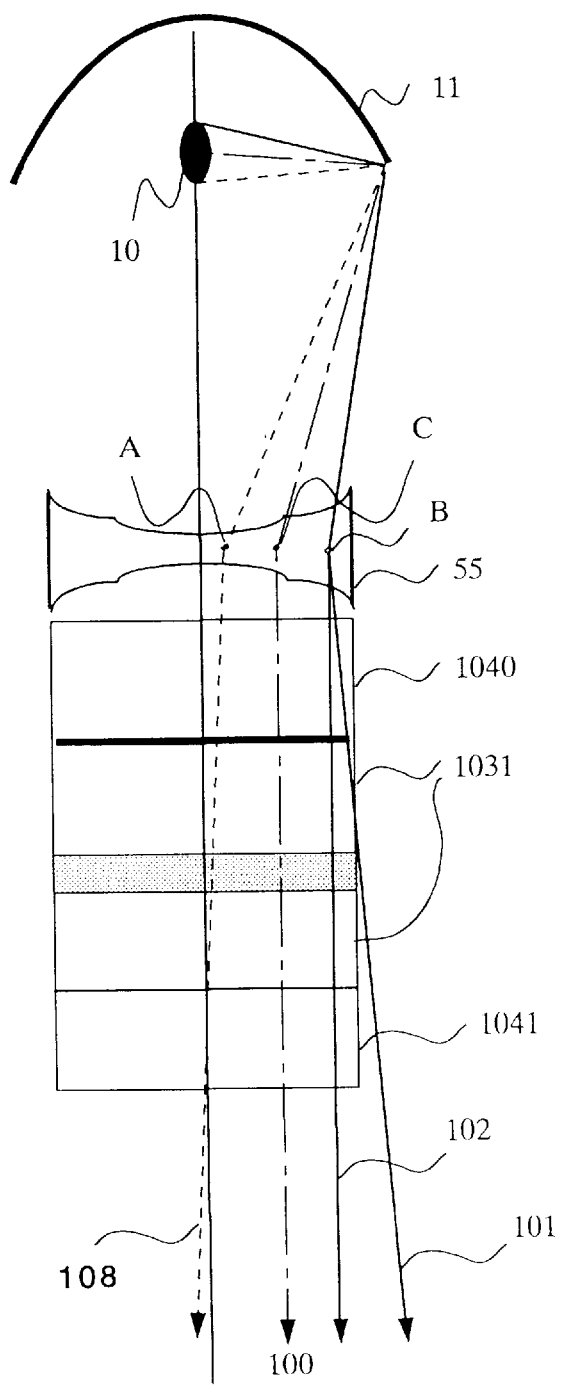
FIG. 63 shows operation of a lens in an image generation apparatus of the present invention.
Figure 64:
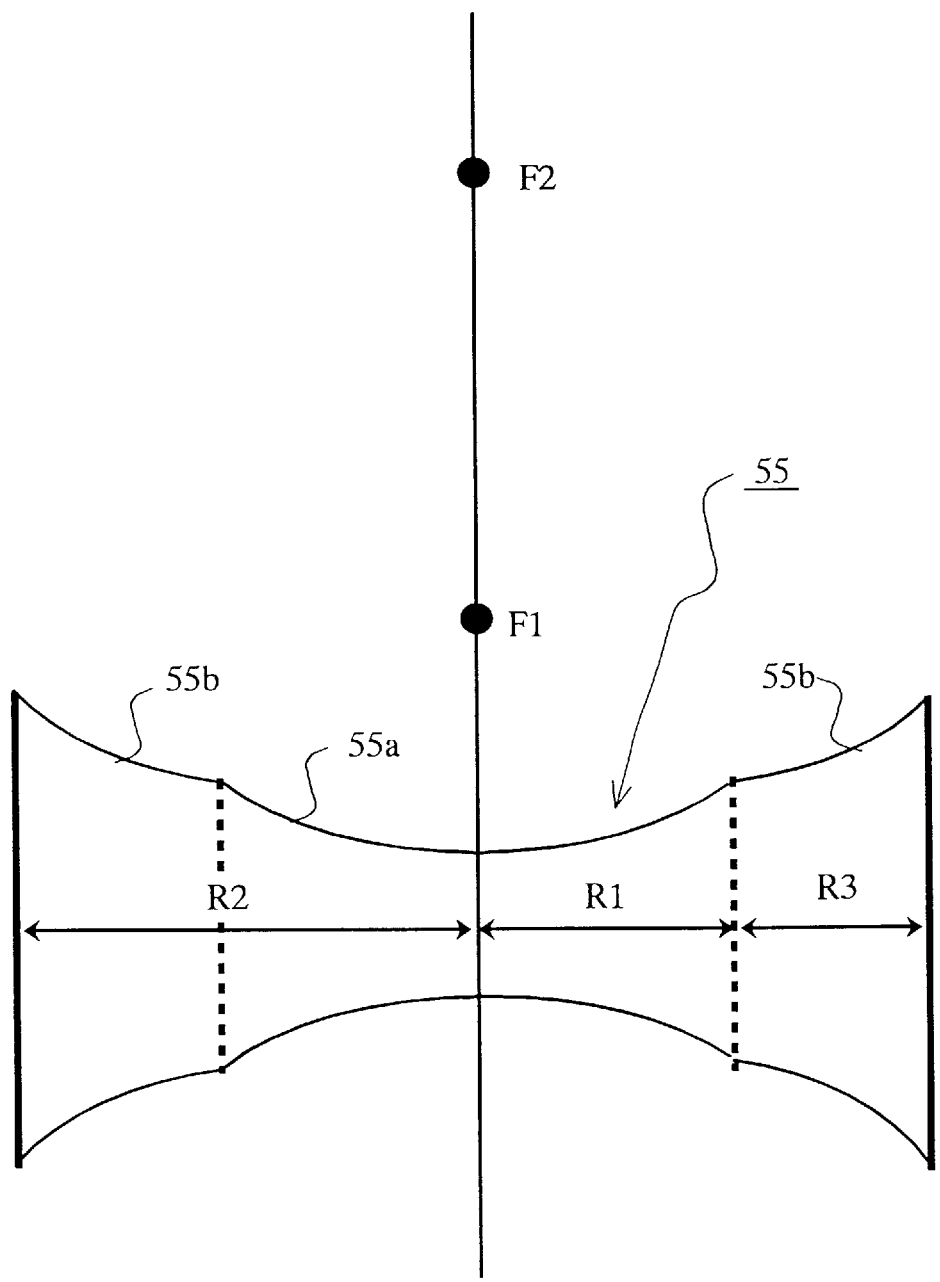
FIG. 64 shows a lens in an image generation apparatus of the present invention.

FIGS. 63 and 64 show details of the lens 55 installed at the entrance of the polarization separating module or wavelength separating module. The lamp 10, the main reflecting mirror 11, a bifocal lens 55, the wavelength separating module 1040 (or the polarization separating module 1047), the optical path connecting module 1031, the wavelength synthesizing module 1041 (or the polarization synthesizing module 1048), and the liquid crystal panel 31 are provided in FIG. 63. Generally, when a focus of concave lens is placed at a focus of the main reflecting mirror, that is when the focus of the lens is placed at the center of arc length of the lamp 10, light from the center of the lamp 10, namely from the focus of the main reflecting mirror, shown in broken line in FIG. 63, is reflected at the main reflecting mirror. Then, the reflected light is passed through a point C and becomes parallel light 100. Light from one end of the light source (one end of the arc length), shown in dotted line in FIG. 63, is passed through a point A inner than the point C at the concave lens, and becomes a light 108 inner than the parallel light 100, in the case of the single focus lens. Namely, though this inner light 108 has some inclination, it can be effectively utilized by the liquid crystal panel 31.

On the other hand, light from the other end of the light source (the other end of the arc length), shown in line in FIG. 63, is passed through a point B outer than the point C at the concave lens, and becomes light 101 outer than the parallel light 100, in the case of the single focus lens. This light is thrown out of the liquid crystal panel as shown in FIG. 63.

As shown in FIG. 64, the lens 55 has two focuses F1 and F2 in the present embodiment. The lens 55 is composed of a first lens part 55a and a second lens part 55b. The first lens part 55a, having the focus F1, is within radius R1 from the optical axis. The second lens part 55b is within length R3 (R2−R1=R3), outer part of the radius R1. The second lens part 55b has the second focus F2. A focal length of the first focus F1 is shorter than the focal length of the second focus F2. That the focus F1 and the focal point of the main reflecting mirror are identical indicates the focus F1 is placed at the center of the arc length of the light source.

As stated above, it is possible to change the light thrown out of the optical path such as the light 101, to light which can be input into the liquid crystal panel 31 such as light 102, by using the bifocal lens.

Embodiment 4

The image generation apparatus including image converting means for converting a ratio of length to breadth of an image to a desired ratio will now be described in the present embodiment.

Figure 65:
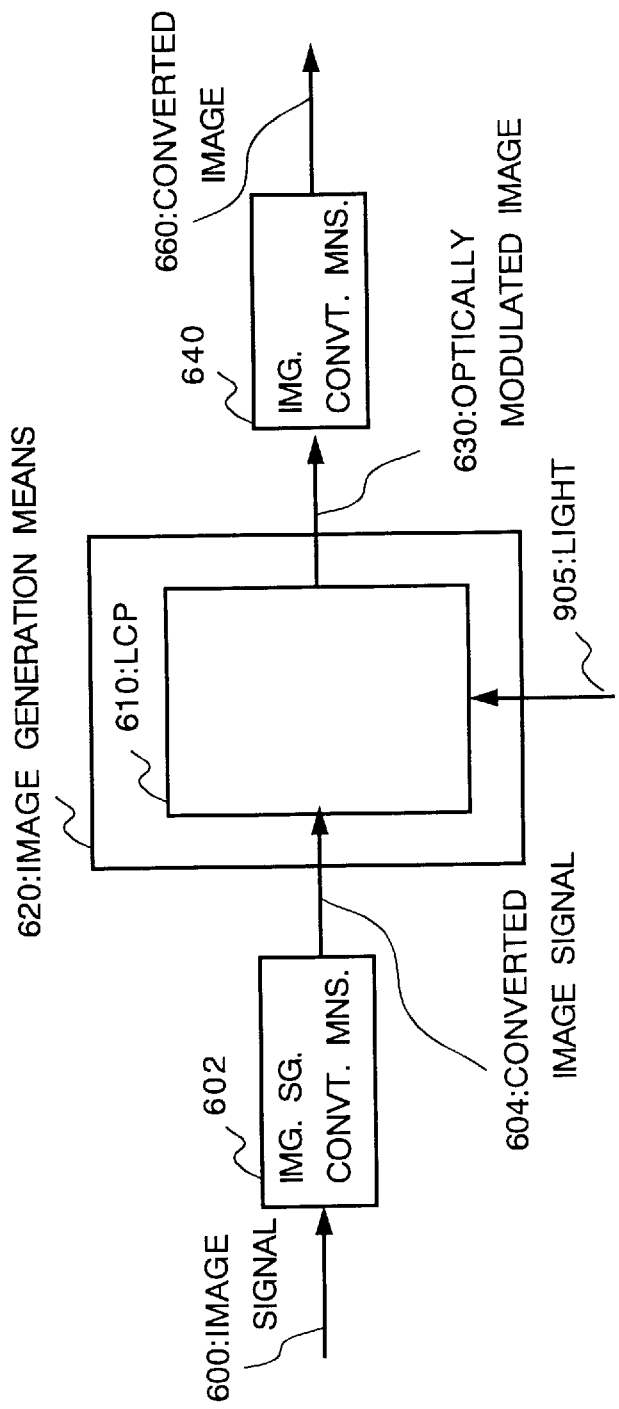
FIG. 65 shows a block diagram of an image generation apparatus of the present invention.

FIG. 65 shows a block diagram of a configuration of the image generation apparatus of the present embodiment. Operation of the image generation apparatus will be explained with reference to FIG. 65.

Image signal converting means 602 inputs an image signal 600 and converts the image signal 600 to a converted image signal 604 whose ratio of length to breadth is the same as that of a liquid crystal panel 610. Image generation means 620 inputs the converted image signal 604 into the liquid crystal panel 610. The image generation means 620 also inputs input light 905 into the liquid crystal panel 610. The image generation means 620 generates an optically modulated image 630 based on the converted image signal 604 and the input light 905, in the liquid crystal panel 610. The optically modulated image 630 generated by the image generation means 620 is converted to an image 660 having a desired ratio of length to breadth, by image converting means 640. The desired ratio of length to breadth indicates an aspect ratio of image which the user views.

Conventionally, image information has been made to adapt to the ratio of length to breadth of the image viewed by the user. The liquid crystal panel used for the image generation means also has been made based on the ratio of length to breadth of the image viewed by the user. Supposing that a screen for image has the ratio of 3:4, the image information and the liquid crystal panel have also had the ratio of 3:4. On the contrary, in the image generation apparatus of the present embodiment, it is possible to generate an image by using the liquid crystal panel whose ratio of length to breadth is different from at least one of ratios of length to breadth of the image signal 600 and the converted image 660. This is because the image signal converting means 602 converts the ratio of length to breadth of an input image signal to be the same as the ratio of length to breadth of the liquid crystal panel 610. Also, it is because the image converting means 640 converts the optically modulated image 630 to the image 660 having a desired ratio of length to breadth. Namely, even if the image screen and the image information have the ratio of length to breadth of 3:4, ratio of length to breadth of the liquid crystal panel does not need to be 3:4. Regarding the ratio of length to breadth of the liquid crystal panel, it should be defined so that the liquid crystal panel can be efficiently and low-pricedly manufactured. Otherwise, the ratio of length to breadth of the liquid crystal panel can be defined depending upon a sectional shape of luminous flux generated by the optical system including the liquid crystal panel. When the sectional shape of the luminous flux is circle, square is the best shape for utilizing the light most effectively. Therefore, it is desirable for the liquid crystal panel to have the ratio of length to breadth of 4:4. When the liquid crystal panel has the ratio of length to breadth of 4:4, it can be changed from 4:4 to 3:4 by multiplying the length by ¾. Similarly, when the image information has the ratio of length to breadth of 3:4 and the liquid crystal panel has that of 4:4, the image information can be converted from 3:4 to 4:4 by a digital process. Then, the image information of 4:4 can be input into the liquid crystal panel.

Figure 66:
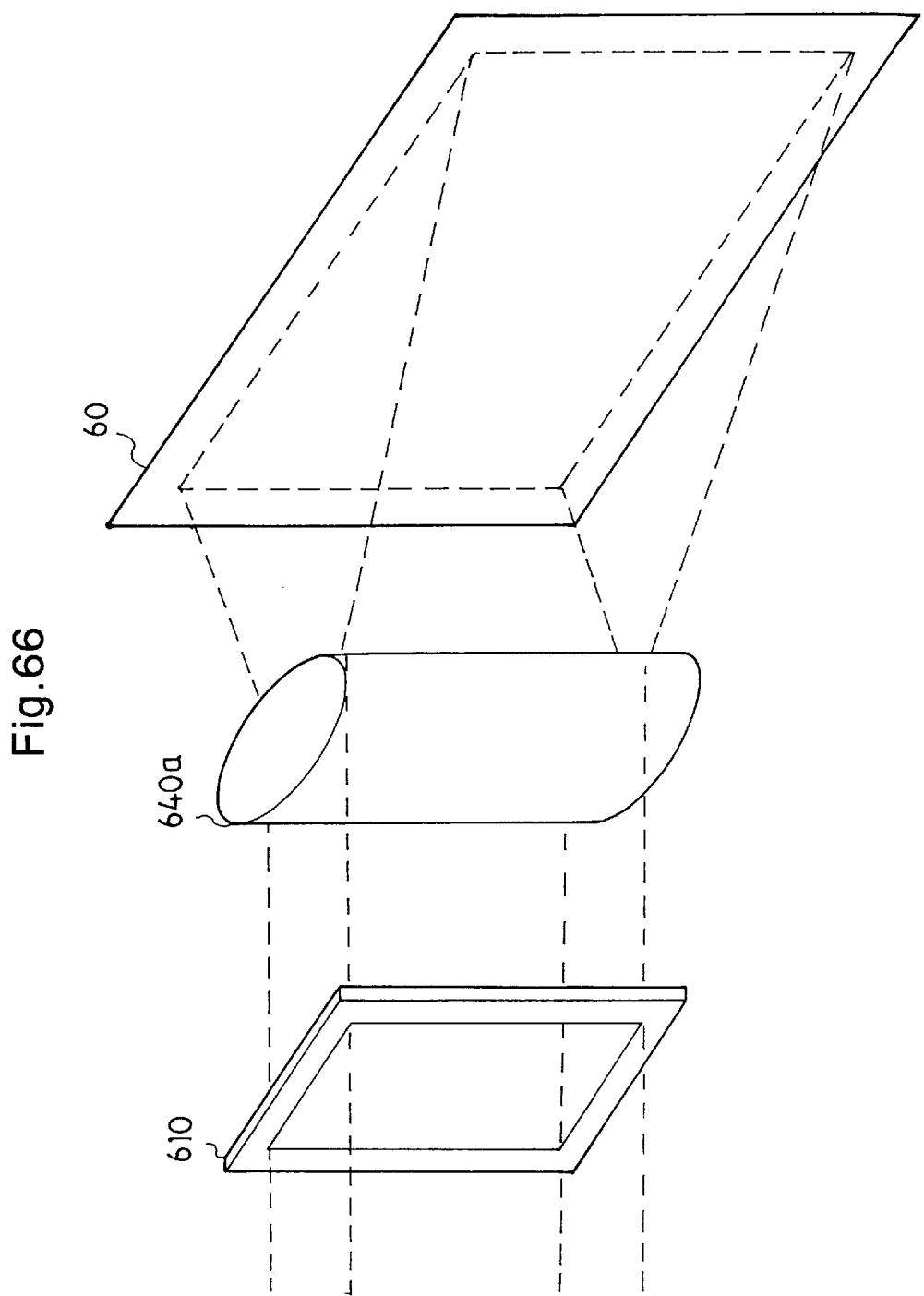
FIG. 66 shows another block diagram of an image generation apparatus of the present invention.

In FIG. 66, the image converting means is a cylindrical lens 640a. An image generated in the liquid crystal panel 610 is laterally magnified by the cylindrical lens 640a and projected onto the screen 60 as shown by the dotted line in FIG. 66.

Although the case of the image being laterally magnified is shown in FIG. 66, it is also acceptable to be vertically magnified. The ratio of length to breadth of the image can be freely set by changing a shape, characteristic and allocation of the cylindrical lens. An image generation apparatus, wherein image conversion is selective, can be realized by providing a removable or detachable lens.

Figure 67:
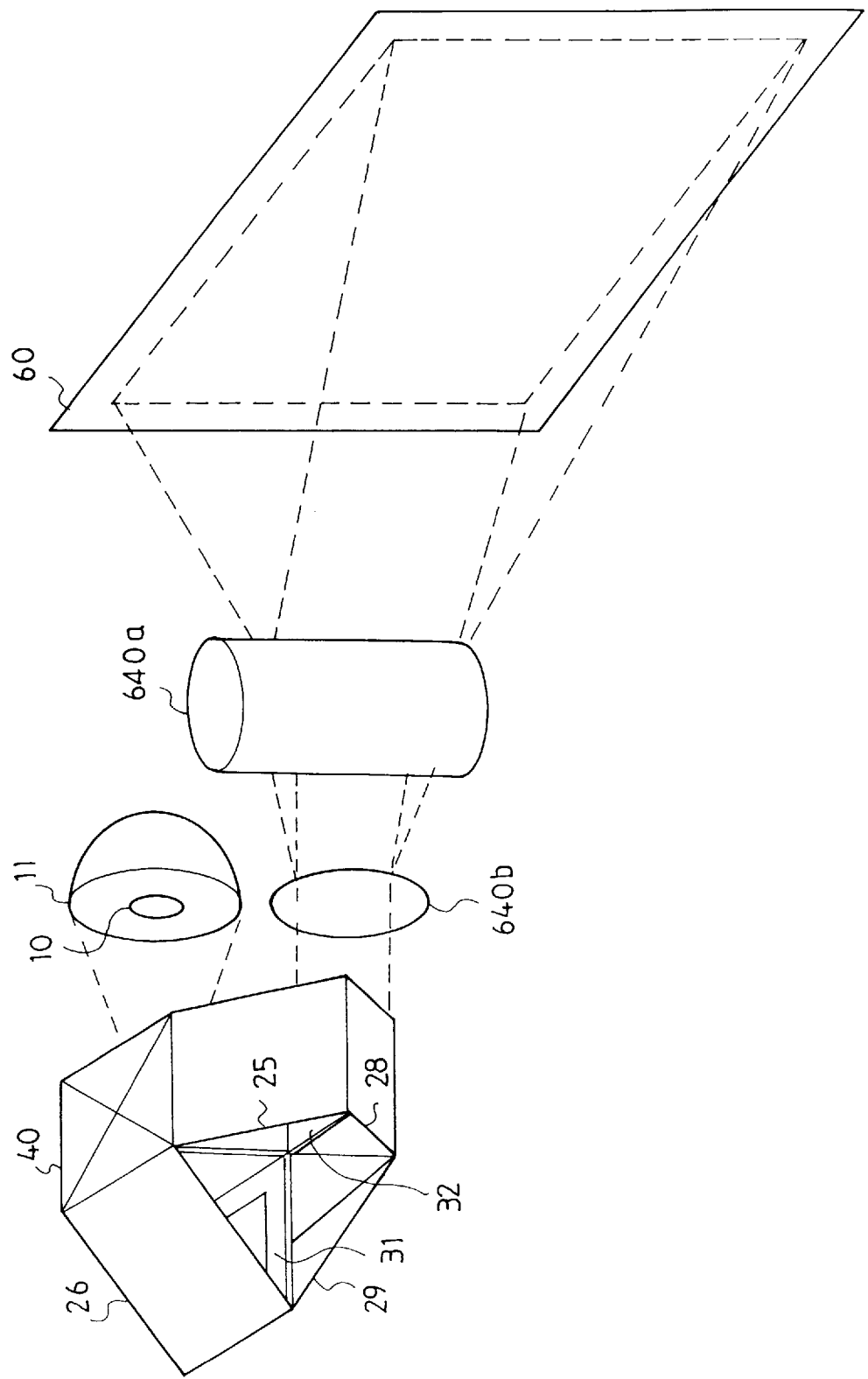
FIG. 67 shows another block diagram of an image generation apparatus of the present invention.

FIG. 67 shows an example of the image generation apparatus wherein two lenses are used. Light is projected on the image generation apparatus by the light source system including the lamp 10 and the main reflecting mirror 11. As the image generation apparatus of FIG. 67 has the same configuration as that of FIG. 1, explanations on the references are omitted. First, a generated image is vertically magnified by a cylindrical lens 640b, and then laterally magnified by the cylindrical lens 640a and projected on the screen 60.

As stated above, the image can be freely magnified, vertically and laterally, by using assembled plural lenses. In addition, when switching means (not shown) for switching the lenses is provided, the image generation apparatus, wherein magnification rate can be selective at projection time depending upon the switched lens, can be realized.

Although a project type display apparatus including the cylindrical lens is disclosed in Unexamined Japanese Patent Publication 4-149426, this cylindrical lens is for correcting astigmation, and not for changing the ratio of length to breadth as described in the present embodiment.

Embodiment 5

Figure 68:
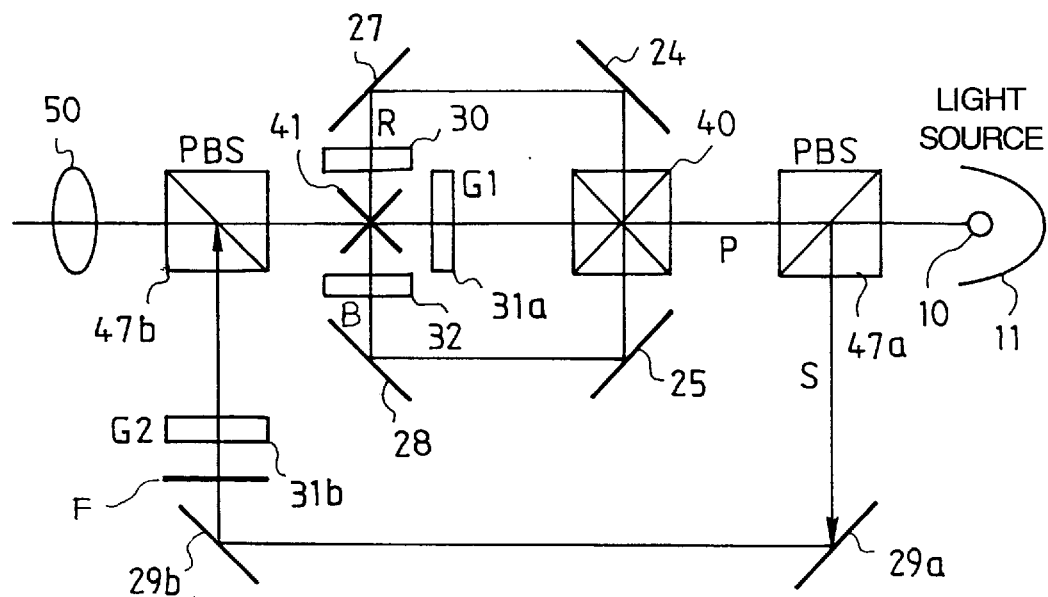
FIG. 68 shows a configuration of an image generation apparatus wherein a first and a second liquid crystal panels for green are used, in the present invention.

FIG. 68 shows another configuration of the image generation apparatus of the present invention. A feature of the image generation apparatus of FIG. 68 is including a first liquid crystal panel 31a for first green and a second liquid crystal panel 31b for second green. A filter F for extracting green light from white light (the wave S in FIG. 68) is installed before the second liquid crystal panel 31b for second green. Size and accuracy of the liquid crystal panel 30 for red, liquid crystal panel 32 for blue, first liquid crystal panel 31a for first green, and second liquid crystal panel 31b for second green is all equal. The liquid crystal panel 30 for red, the liquid crystal panel 32 for blue, and the first liquid crystal panel 31a for first green are located so that pixels corresponding to the panels can be synthesized on the same place of the screen. On the other hand, the second liquid crystal panel 31b for second green is located so that an image can be generated at a place which is vertically offset by half of pixel from the synthesized place of red, blue, and first green.

Figure 69:
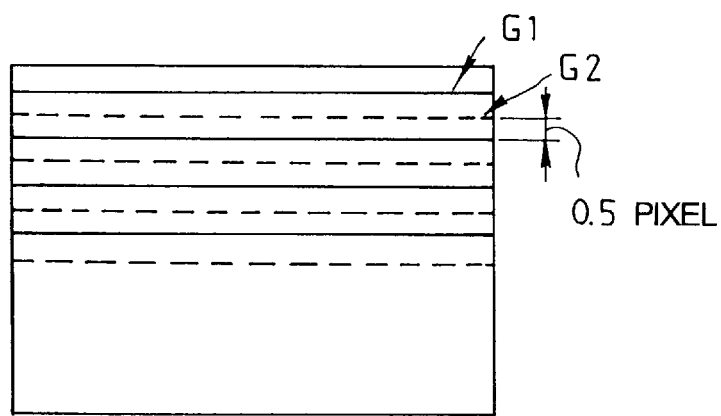
FIG. 69 shows relation of scanning line, of a first liquid crystal panel for green and a second liquid crystal panel for green, in the present invention.
Figure 70:
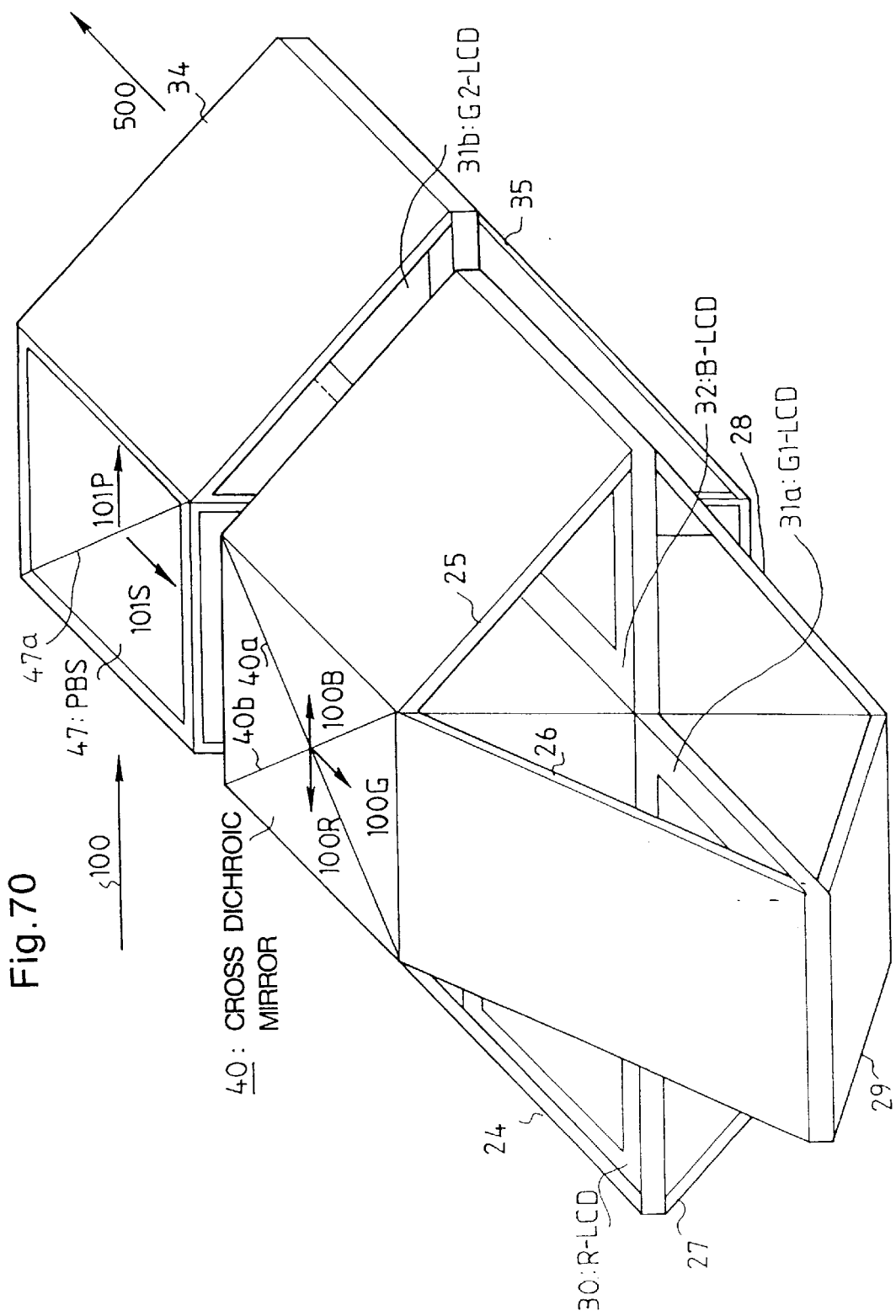
FIG. 70 shows another configuration of an image generation apparatus of the present invention.
Figure 71:
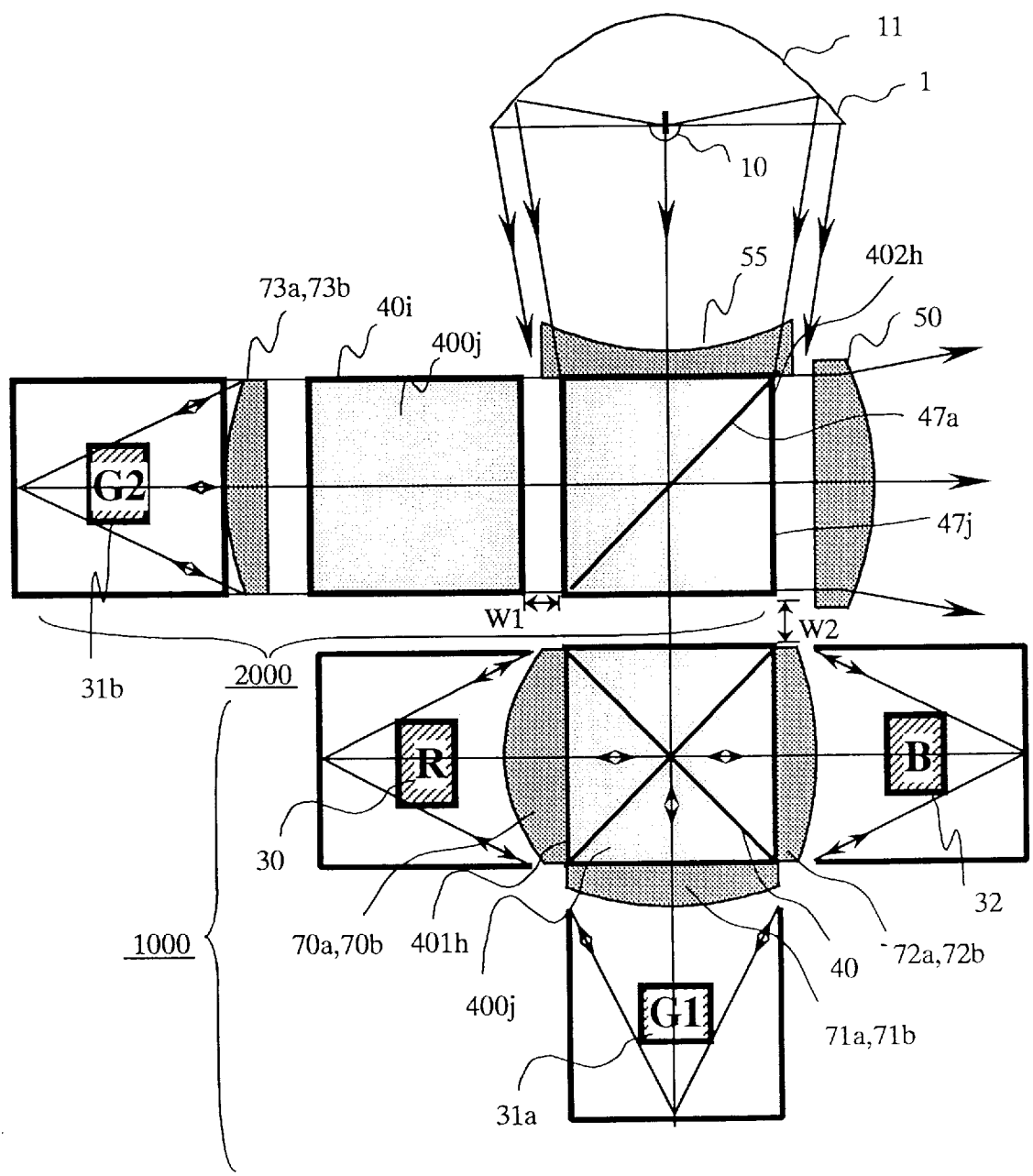
FIG. 71 shows another configuration of an image generation apparatus of the present invention.
Figure 72:
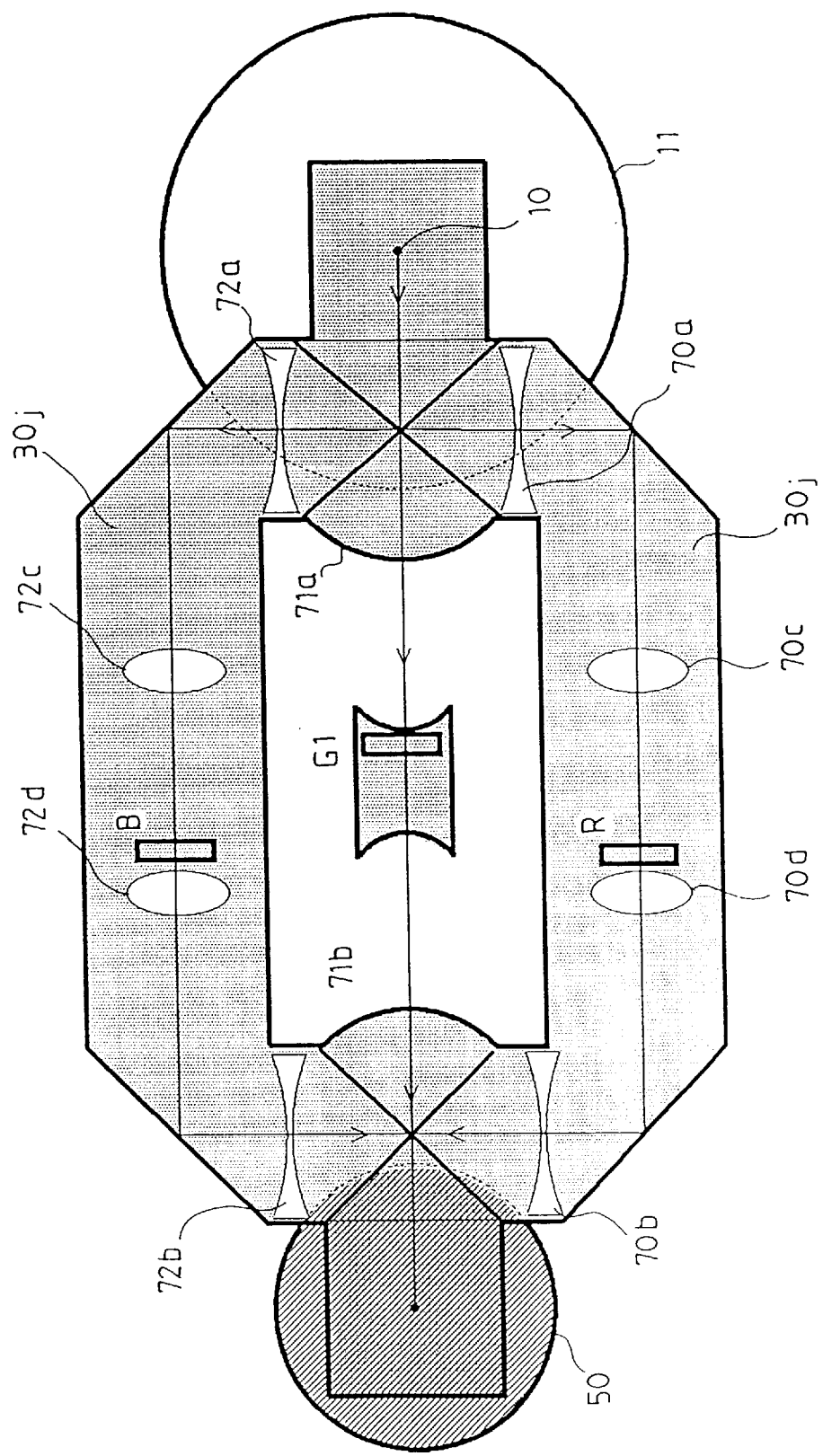
FIG. 72 shows another configuration of an image generation apparatus of the present invention.
Figure 73:
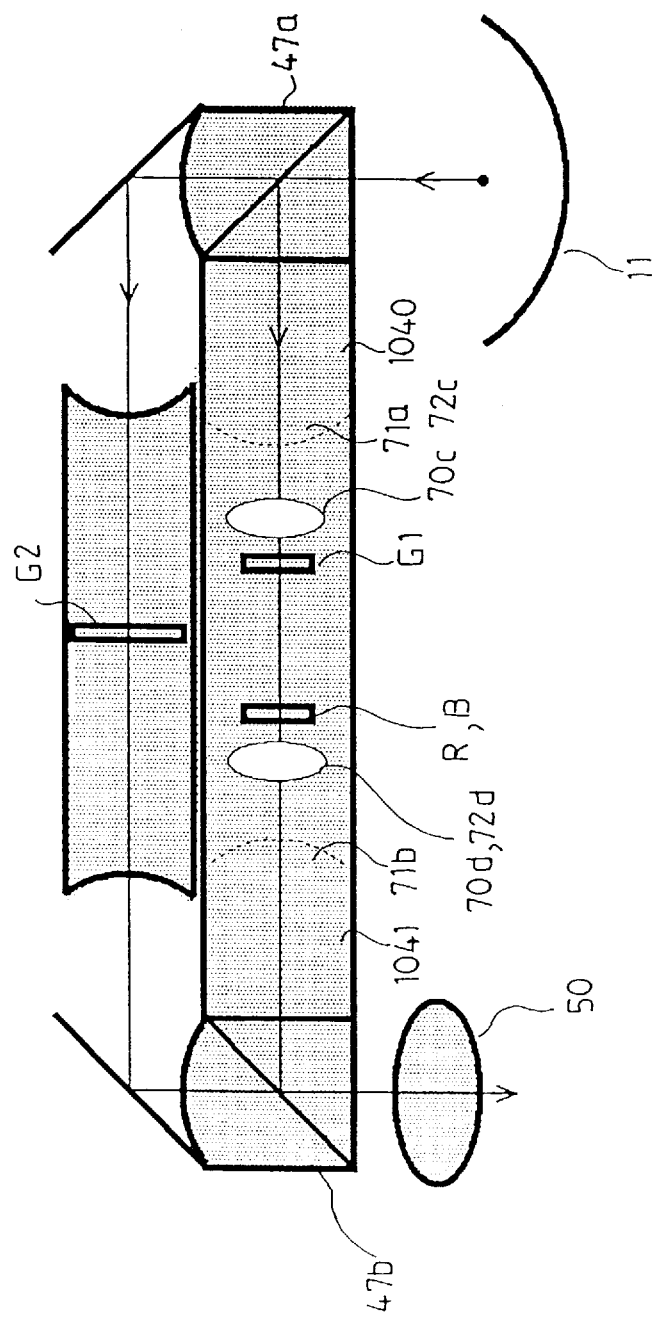
FIG. 73 shows another configuration of an image generation apparatus of the present invention.

FIG. 69 shows relation between scanning lines output from the first liquid crystal panel 31a for first green and the second liquid crystal panel 31b for second green. The scanning line output from the first liquid crystal panel 31a for first green (G1) is shown by the line. The scanning line output from the second liquid crystal panel 31b for second green (G2) is shown by the dotted line. The scanning line from the second liquid crystal panel 31b for second green is output vertically 0.5 pixels offset from the scanning line output from the first liquid crystal panel 31a for first green.

The largest current problem of a small-sized liquid crystal panel of such as 0.7 inches is that there are not enough pixels lengthwise in the screen. For instance, the number of the lengthwise pixels of the liquid crystal panel of 0.7 inches is 240 dots. However, more than four hundred scanning lines are necessary lengthwise, for displaying an image generated by NTSC signals used in a home television and so on.

In order to solve the problem, the liquid crystal panel for green is vertically shifted by 0.5 pixels in the present embodiment. A high definition image of four hundred and eighty scanning lines can be realized by shifting the liquid crystal panel for green as the above. Accordingly, the high definition image of four hundred eighty scanning lines can be obtained by using two liquid crystal panels for green of 0.7 inches, for instance.

In addition, the cost of the liquid crystal projector can be reduced because all the liquid crystal panels for red, blue, first green and second green are structured by the same type liquid crystal panels.

When the liquid crystal projector is operated by inputting an image signal of interlace mode, the above system of the present embodiment can be realized, without any special circuit, by inputting an image signal of a first field into the first liquid crystal panel for first green and inputting an image signal of a second field into the second liquid crystal panel for second green. Namely, in the case of the interlace mode signal being input, the high definition image having four hundred and eighty scanning lines can be obtained, without conversion of noninterlace to interlace and a special processing such as double speed scan.

It is generally impossible to operate the liquid crystal panel in the interlace mode. However, the NTSC signals used in the home television and so on are in the interlace mode. Therefore, it is necessary to convert an interlace signal to a noninterlace signal, when the liquid crystal panel lengthwise actually displays four hundred and eighty scanning lines. A conversion circuit, a memory and so on are needed for the converting, which brings about cost increase. According to the present embodiment, the interlace signals can be intactly used without the conversion of the interlace signal to the noninterlace signal.

Since all the sizes of the liquid crystal panels are the same as stated above, there is no need of a lens for adjusting magnification. The case that size of the liquid crystal panel for luminance is larger than size of other liquid crystal panels for colors, or size of the liquid crystal panel for green is larger than size of other liquid crystal panels has been described in the above embodiments. According to the present embodiment, there is no need of the lens for adjusting magnification because all the panel sizes are the same.

The system of the liquid crystal panel for green being comprised of the first and second liquid crystal panels for first green and second green can also be applied to the liquid crystal projector stated in the Related Art or the liquid crystal projector of the configuration of each above-stated embodiment.

FIGS. 70 to 73 show examples of the liquid crystal projectors, stated in the above embodiments, wherein the system of the present embodiment is applied. A feature of FIGS. 70 to 73 is that the second liquid crystal panel for second green substitutes for the liquid crystal panel for luminance used in the above embodiments. Though the filter F is not shown in FIGS. 70 to 73, it is acceptable for the filter F to exist somewhere in the optical path between the polarization beam splitter 47a and the second liquid crystal panel 31b for second green (G2).

Although the case of the liquid crystal panel for green being vertically shifted by 0.5 pixels has been described in the above explanation, it is also acceptable to be laterally or diagonally shifted. It is also acceptable to be shifted by 0.1, 0.4 or 0.7 pixels not by 0.5 pixels.

Figure 74:
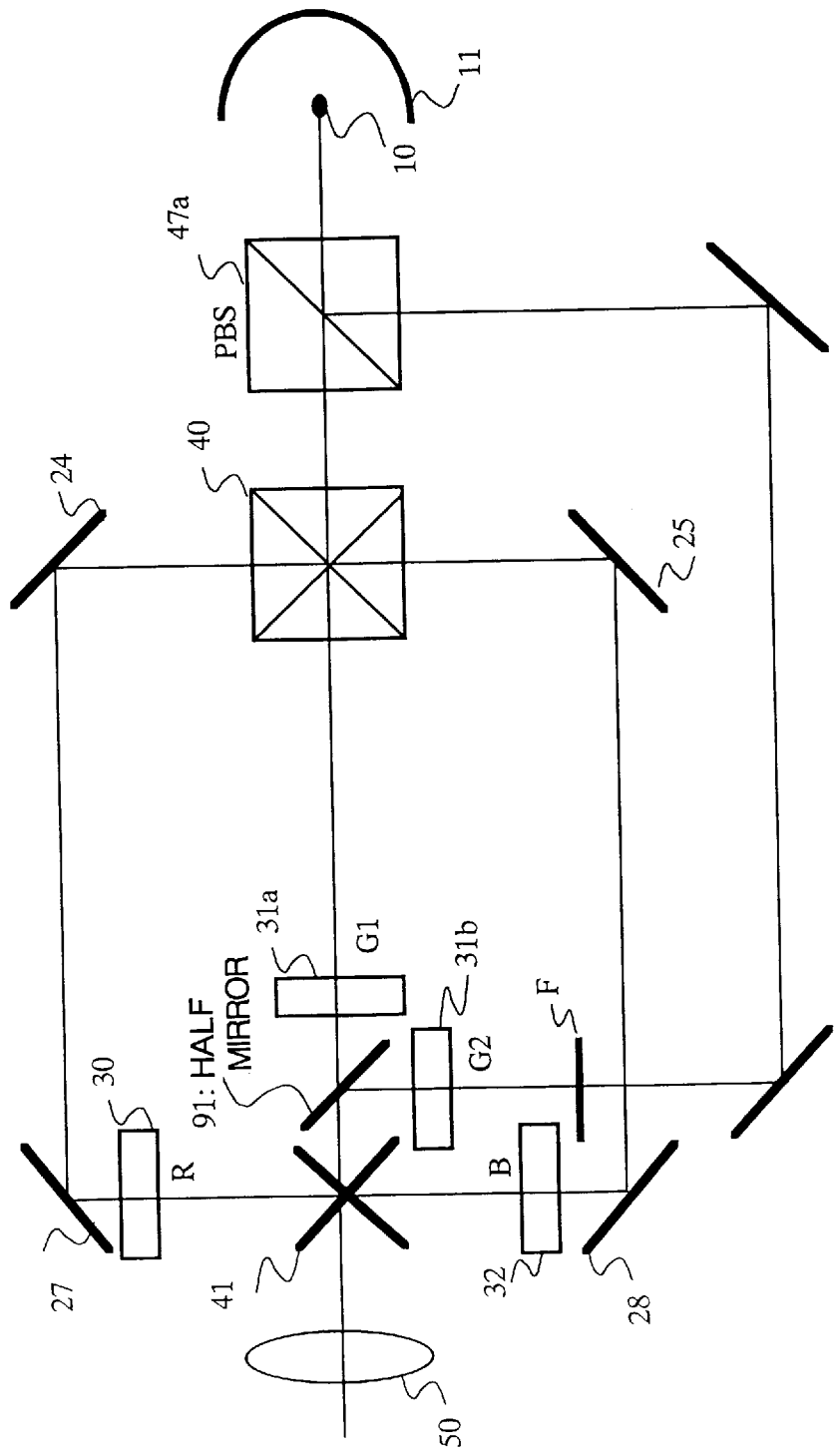
FIG. 74 shows a configuration of an image generation apparatus wherein a first liquid crystal panel, a second liquid crystal panel, and a half mirror are used, in the present invention.

FIG. 74 shows another configuration of the image generation apparatus of the present embodiment. The respect that outputs from the first liquid crystal panel 31a for first green and the second liquid crystal panel 31b for second green are synthesized by a half mirror 91 differs from the configuration of FIG. 68. The output from the second liquid crystal panel 31b for second green is synthesized by the polarization beam splitter 47b in the case of FIG. 68. Although it is possible to synthesize lights having different wavelengths in the cross dichroic mirror 41, it is impossible to synthesize lights having the same wavelength. Therefore, in the case of FIG. 68, the lights having the same wavelength can be synthesized by the polarization beam splitter 47b. It is a feature of FIG. 74 that the half mirror 91 is used for synthesizing light for green. Though the light utilization efficiency is reduced to be 50% by using the half mirror 91, the green light can be as bright as red or blue because the brightness of the green light of the present embodiment is double.

It is desirable that lengths from the cross dichroic mirror 41 to the first liquid crystal panel 31*a* for first green and to the second liquid crystal panel 31*b* for second green are equal. It is also desirable that lengths from the cross dichroic mirror 41 to the liquid crystal panel 30 for red and to the liquid crystal panel 32 for blue are equal.

In the case that the polarization beam splitter or the half mirror is used for synthesizing the waves P and S, optical path length between the liquid crystal panel and the projection lens is extended by length of about a diameter of the liquid crystal panel. Because space for the polarization beam splitter or the half mirror is needed in addition to the space for the dichroic mirror. Therefore, back focus of the projection lens is lengthened, and it becomes difficult to use a lens whose focal length f is short. Then, since large magnification can not be realized, projection length becomes long. It is necessary for a projection television of back projection type to have a projection length as short as possible because thinning the apparatus is an important requirement.

Figure 75:
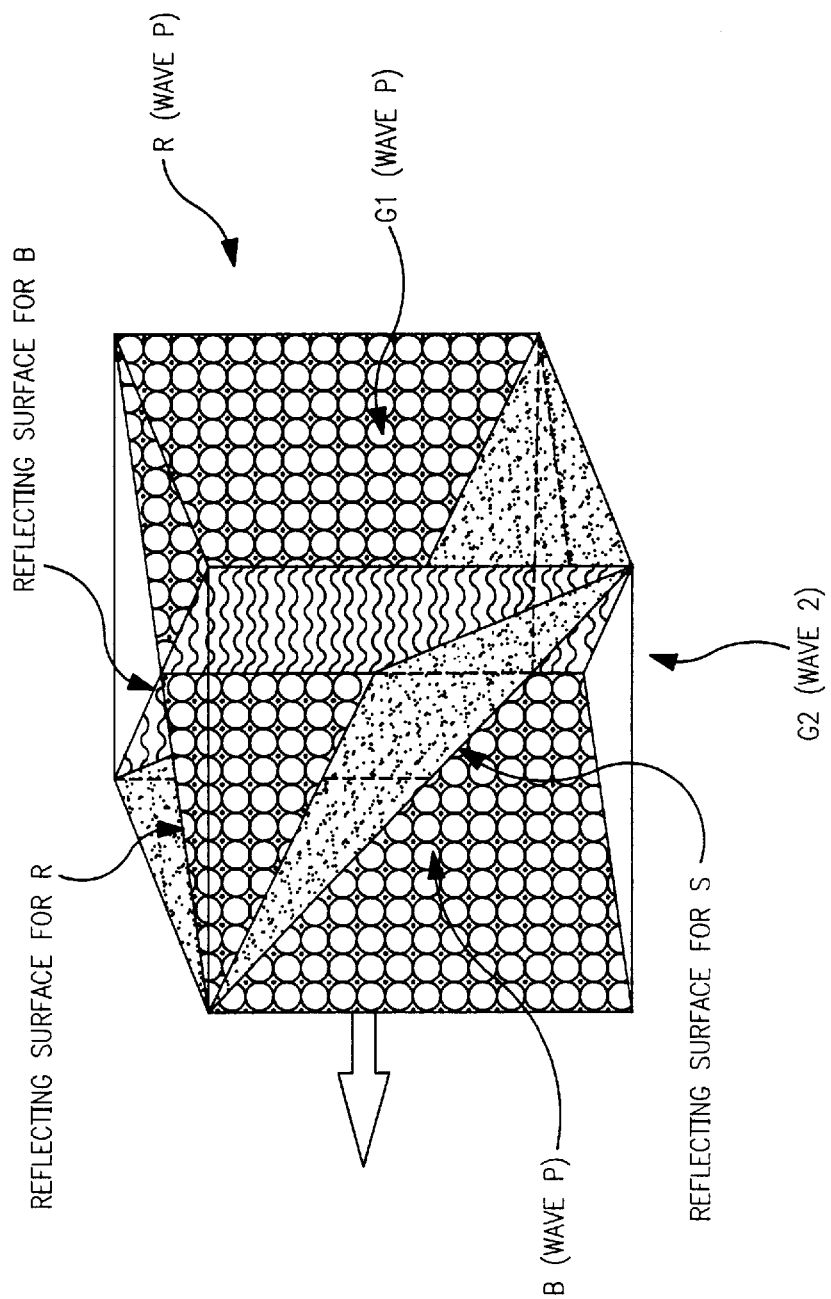
FIG. 75 shows one example of an optical mixer of the present invention.
Figure 76:
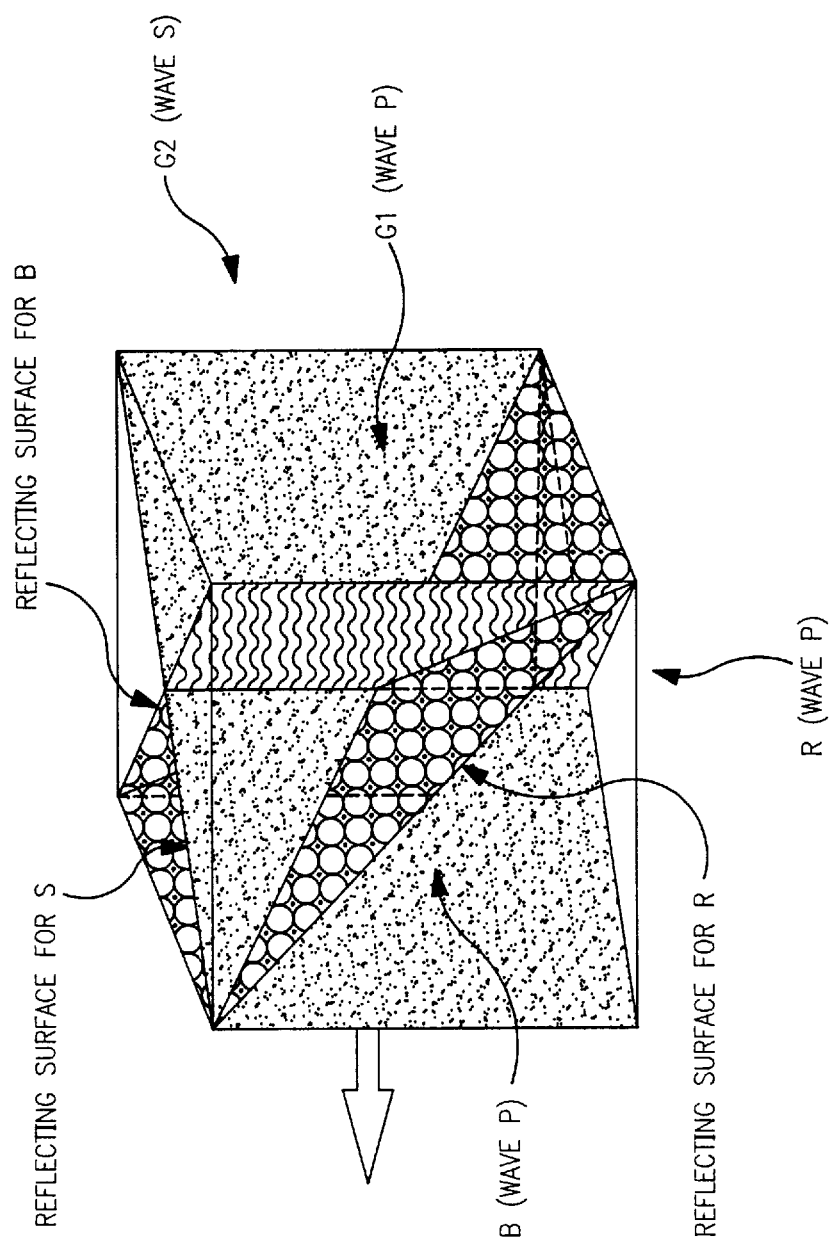
FIG. 76 shows another example of an optical mixer of the present invention.

Therefore, an optical mixer as shown in FIGS. 75 and 76 is used. The optical mixer of FIG. 75 mixes the lights of R, G, B and the waves P and S in the cube. Owing to the optical mixer, green light from the liquid crystal panel for second green can be mixed using the same back focus of the case of three colors being mixed by the cross dichroic mirror.

FIG. 75 shows a compound prism wherein reflecting surfaces for R and B cross like a letter X, and a reflecting surface for S diagonally crosses the letter X. FIG. 76 shows the compound prism wherein the reflecting surfaces for B and S cross like a letter X, and the reflecting surface for R diagonally crosses the letter X.

In FIG. 75, lights R, G, B coming from the directions of letters R, G, B are input into the compound prism. The light R is reflected at the reflecting surface for red, the light B is reflected at the reflecting surface for blue, and the light G1 is transmitted. Then, the three lights are mixed. At this time, a part of the mixed light is transmitted through the reflecting surface for S. Since all these lights are waves P, the lights get no influence of the reflecting surface for S which diagonally crosses the X-shaped dichroic mirror. Then, the mixed light is output as shown in FIG. 75. Light G2 is input along the direction parallel with the reflecting surface of the cross dichroic mirror. Since the light G2 is wave S, the light G2 is reflected at the reflecting surface for S, synthesized with the wave P made by mixing the lights R, G, B, and output. A part of the wave S reflected at the reflecting surface for S is transmitted through the reflecting surfaces for R and B of the dichroic mirror. As this transmitted wave S is composed of only green component, the wave S can be transmitted through all the reflecting surfaces and gets no influence. The stated principle of operation can also be applied to the case of FIG. 76. The principle is developed in the optical path system for optical separation in three dimensions in FIG. 76.

Figure 77:
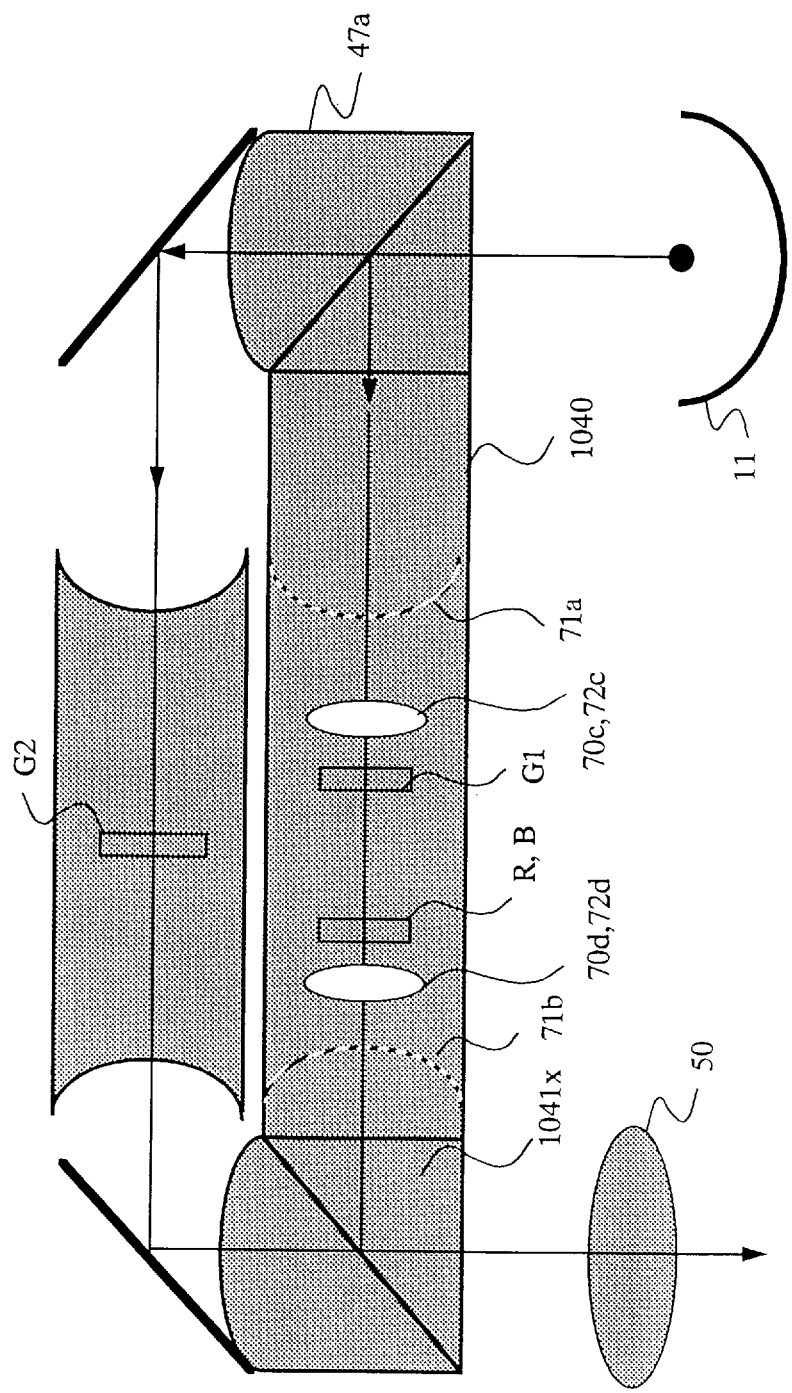
FIG. 77 shows a configuration of liquid crystal projector wherein an optical mixer is used, in the present invention.

FIG. 77 shows an example of the liquid crystal projector applying the optical mixer. An optical mixer 1041*x* of FIG. 77 is composed of the cross dichroic mirror and the polarization beam splitter as shown in FIG. 75. Lights of red, blue, the first green, and the second green can be mixed and output, by the optical mixer 1041*x*.

Although the case of the optical mixer being used in the configuration of FIG. 77 has been stated, the optical mixer of the present embodiment can also be applicable to each above-mentioned projector under the following condition. As long as the cross dichroic mirror has a role of a fourth liquid crystal panel wherein single light like green light is modulated and the modulated single light is transmitted as stated in the present embodiment, the optical mixer can be applicable to the each projector. However, when the liquid crystal panel for luminance is used in the above stated embodiment, the optical mixer of the present embodiment can not be applicable. The reason is that since the output from the liquid crystal panel for luminance is white light, a part of the white light, depending upon its wavelength, is sometimes reflected by the cross dichroic mirror.

Embodiment 6

Figure 78:
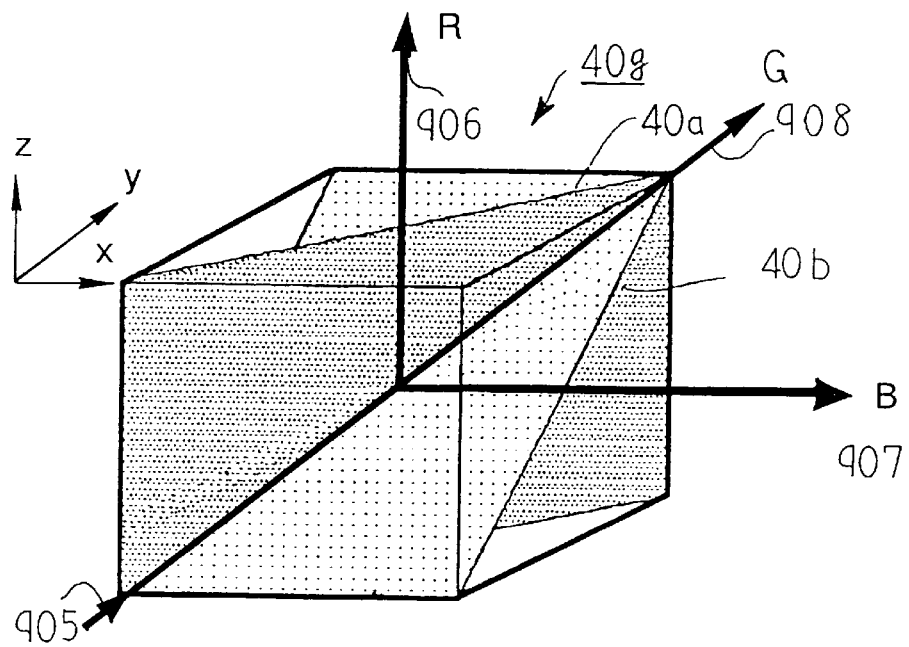
FIG. 78 shows a cross dichroic filter used in an image generation apparatus of the present invention.

FIG. 78 shows the cross dichroic mirror of the present embodiment. The respect that the cross dichroic mirror of the present embodiment is not made by the dichroic mirrors cross like the letter X, differs from the above-mentioned embodiment. As shown in FIG. 78, the first dichroic mirror 40*a* for reflecting red crosses the second dichroic mirror 40*b* for reflecting blue, at the diagonal line of each reflecting surface. Hereinafter in this specification, the present case that two dichroic mirrors cross at the diagonal line, that is the mirrors orthogonally go, is also called the cross dichroic mirror.

FIG. 78 shows a cross dichroic mirror module 40*g* for separating light, of the present embodiment. In the conventional module, the dichroic mirror for reflecting R and the dichroic mirror for reflecting B are arranged like the letter X. In the present embodiment, the cross dichroic mirror module 40*g* is composed of the dichroic mirror 40*a* being parallel to Z-axis and the dichroic mirror 40*b* being parallel to X-axis. R-component light of the input light 905 along the Y-axis is reflected at the dichroic mirror 40*a*. The reflected R-component light is output along the Z-axis as light 906. Simultaneously, B-component light of the input light 905 is reflected at the dichroic mirror 40*b*. The reflected B-component light is output along the X-axis as light 907. G-component light of the input light 905 is output along the Y-axis as light 908. As stated above, the input light 905 is separated into three lights, R-component light 906, G-component light 908 and B-component light 907. The three lights orthogonally go in the directions of three dimensions.

Figure 79:
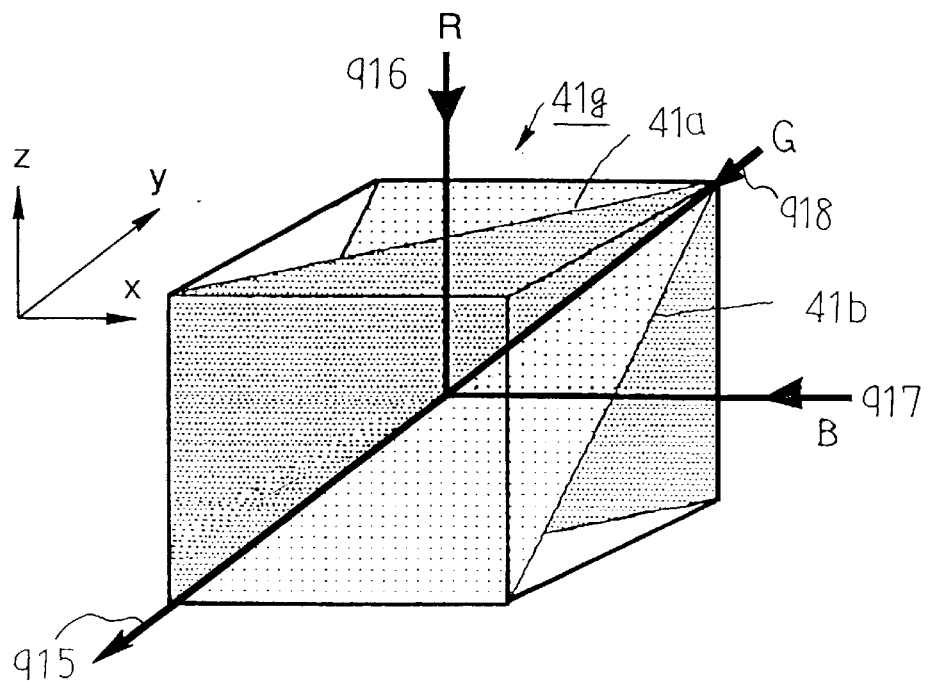
FIG. 79 shows another cross dichroic filter used in an image generation apparatus of the present invention.

FIG. 79 shows a cross dichroic mirror module 41*g* for synthesizing light, of the present embodiment. The configuration of the cross dichroic mirror module 41*g* for synthesizing light is the same as that of FIG. 78. R-component light 916 is reflected at the dichroic mirror 41*a* for reflecting R and output as light 915. B-component light 917 is reflected at the dichroic mirror 41*b* for reflecting B and output as the light 915. G-component light 918 is not reflected at the dichroic mirrors 41*a* and 41*b*, and output directly as the light 915. As stated above, lights 916, 917 and 918, orthogonally go in the directions of thee dimensions, are synthesized in the module of the present embodiment to be the output light 915.

Figure 80:
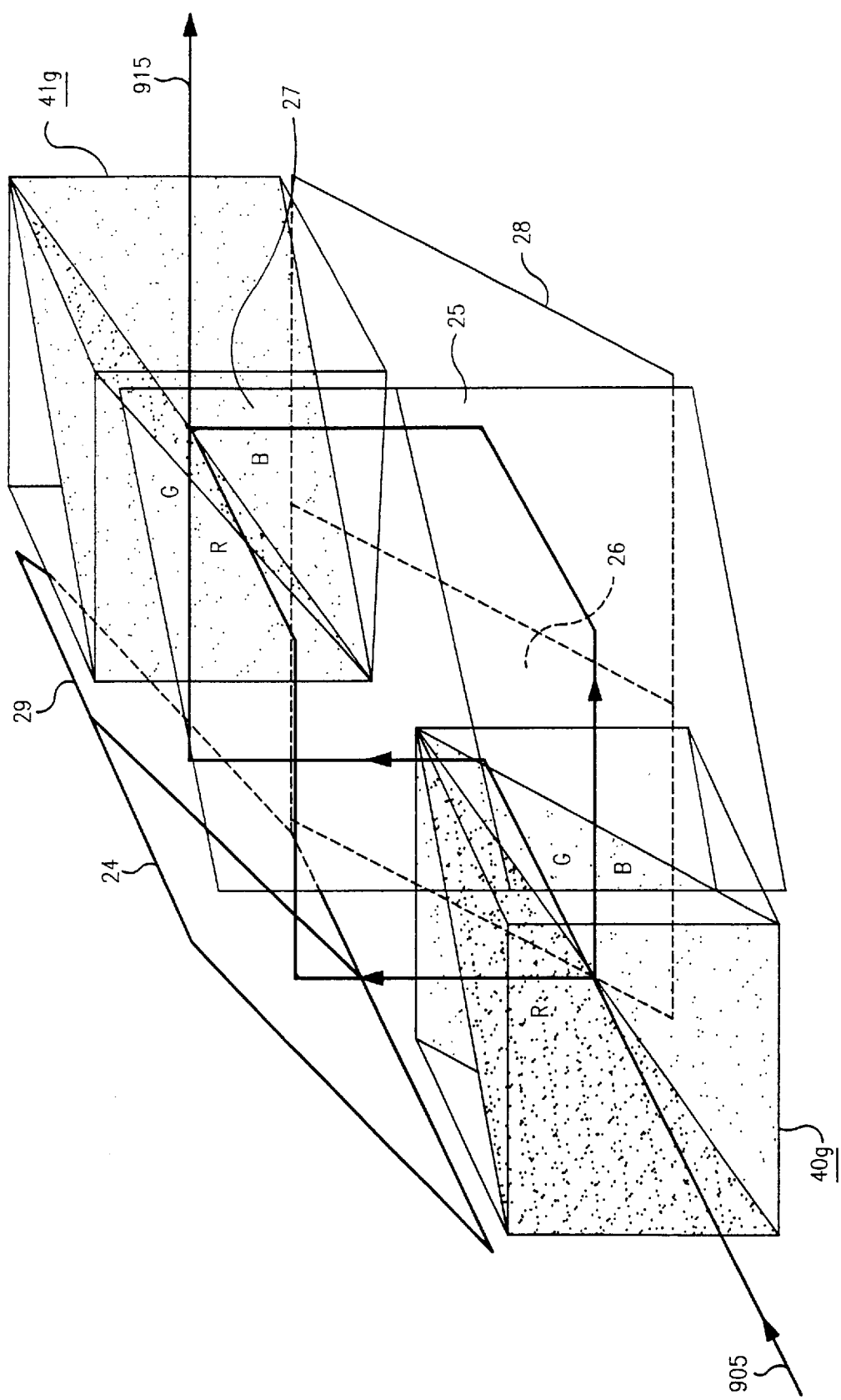
FIG. 80 shows a configuration of an optical unit of an image generation apparatus of the present invention.

FIG. 80 shows an optical unit of the present embodiment. This optical unit is composed of the cross dichroic mirror module 40*g* for separating light, the cross dichroic mirror module 41*g* for synthesizing light, have been stated above, and six reflecting mirrors 24 to 29. In the cross dichroic mirror module 41*g* for synthesizing light of FIG. 79, the light R is input from upper direction. On the other hand, the cross dichroic mirror module 41*g* for synthesizing light of FIG. 80 is installed to input the light R from side.

The input light 905 is separated into the lights, R, B and G, which orthogonally go, by the cross dichroic mirror module 40g for separating light. The light R is turned 90 degrees by the reflecting mirror 24 and turned again 90 degrees by the reflecting mirror 27 to get into the cross dichroic mirror module 41g for synthesizing light. Then, the light R is synthesized in the cross dichroic mirror module 41g for synthesizing light to be output as the light 915.

The light G directly goes through the cross dichroic mirror module 40g for separating light and gets to the reflecting mirror 26. The light G is turned 90 degrees at the reflecting mirror 26 and turned again 90 degrees at the reflecting mirror 29 to get into the cross dichroic mirror module 41g for synthesizing light. Then, the light G is synthesized in the cross dichroic mirror module 41g for synthesizing light to be output as the light 915.

The light B is turned 90 degrees at the reflecting mirror 25 and turned again 90 degrees at the reflecting mirror 28 to get into the cross dichroic mirror module 41g for synthesizing light. Then, the light B is synthesized in the cross dichroic mirror module 41g for synthesizing light to be output as the light 915. It is possible to equalize each optical path length from the lamp up to the image synthesizing of red, green and blue, by installing the liquid crystal panels at proper locations on the optical path between the cross dichroic mirror module 40g for separating light and the cross dichroic mirror module 41g for synthesizing light. It is also possible to equalize each optical path length from each liquid crystal panel to the projection lens. A surface of the cross dichroic mirror module 41g for synthesizing light, wherein the lights R, G and B are input, can be stated as an example of the proper locations. It is also acceptable to install the liquid crystal panel for red at the location where the reflecting mirror 24 for reflecting R and the reflecting mirror 27 for reflecting R join. In this case, the liquid crystal panel for red is vertically installed with respect to the optical path. Similarly, the liquid crystal panels for blue and green can be installed at the location where two reflecting mirrors on the optical path for blue or green, join. In this case, the liquid crystal panels for blue and green are vertically installed with respect to each optical path.

Figure 81:
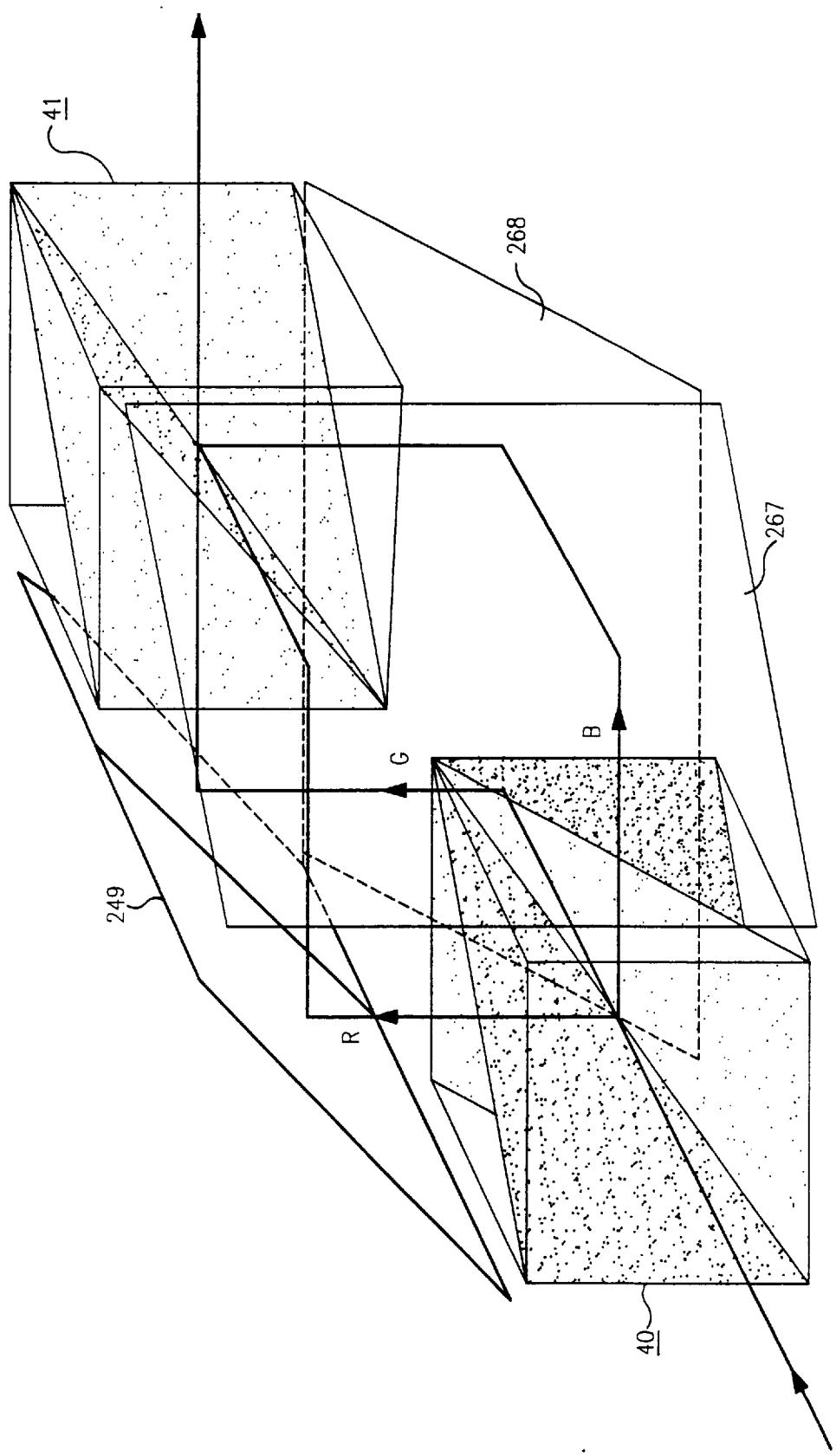
FIG. 81 shows another configuration of an optical unit of an image generation apparatus of the present invention.

FIG. 81 shows another example of the optical unit of the present embodiment. The respect that one mirror, instead of two mirrors, is used in the optical unit in FIG. 81 differs from the configuration of the optical unit of FIG. 80. The reflecting mirror 24 or 29 in FIG. 80 is installed for reflecting R or G. It is possible to install the reflecting mirrors 24 and 29 on the same plane. Therefore, a reflecting mirror 249 made by joining the reflecting mirrors 24 and 29 is shown in FIG. 81. Similarly, a reflecting mirror 257 made by joining the reflecting mirrors 25 and 27 of FIG. 80 is shown in FIG. 81 and a reflecting mirror 268 made by joining the reflecting mirrors 26 and 28 of FIG. 80 is shown in FIG. 81. The number of the components can be reduced by using the mirror made of one mirror.

Figure 82:
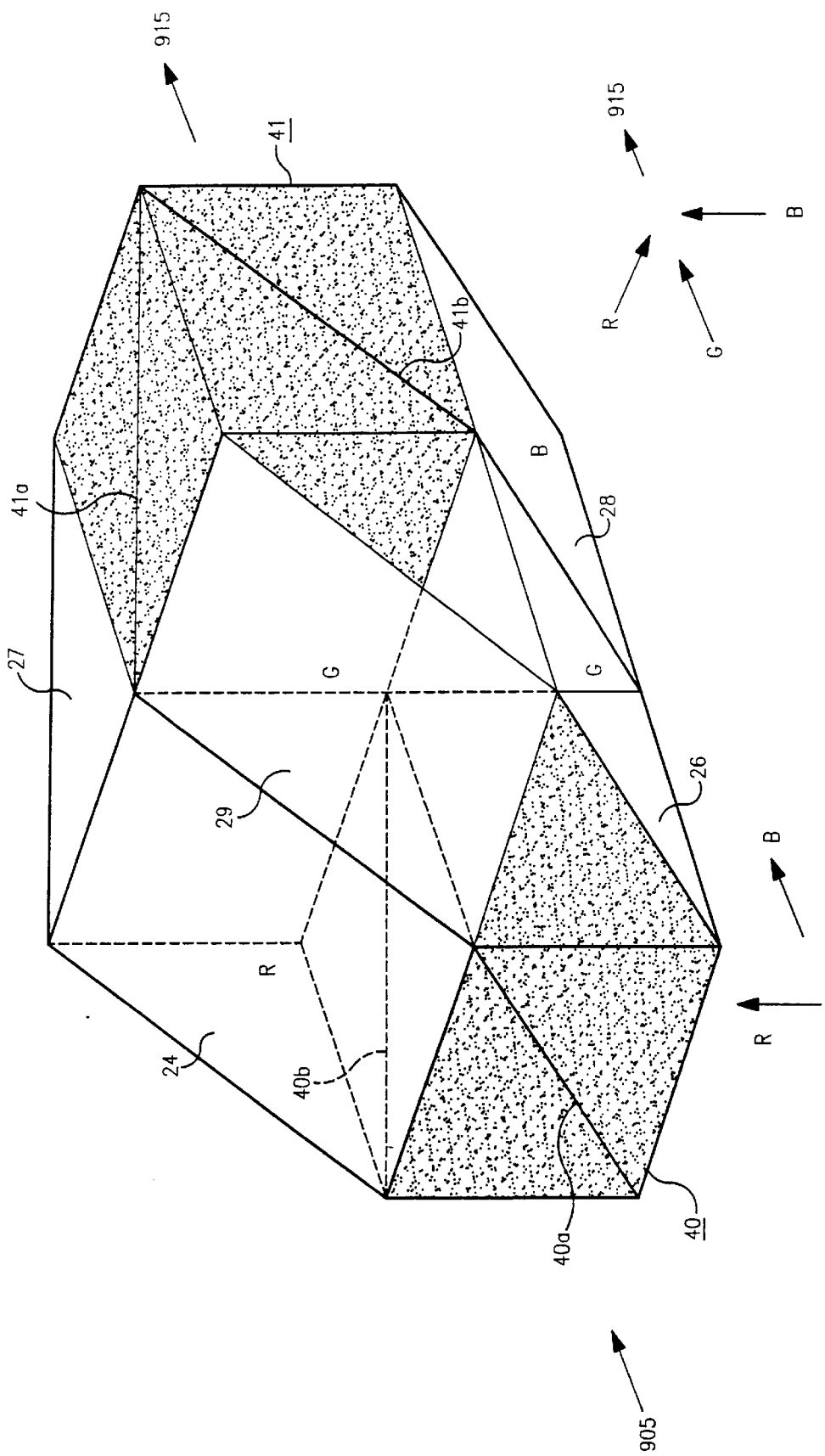
FIG. 82 shows an optical unit of an image generation apparatus of the present invention.

FIG. 82 shows another example of the optical unit of the present embodiment. Direction of the light B separated from the input light in the optical unit of FIG. 82 differs from that of FIG. 80. In FIG. 80, the direction of the light B separated from the input light is right side of proceeding input light. In FIG. 82, the direction of the light B separated from the input light is left side of the proceeding input light. Other respects are the same as those in the configuration of FIG. 80.

It is acceptable to apply the configuration of making one mirror by two mirrors in FIG. 82.

The optical unit described in the present embodiment can be applied to the color processing part stated in the above embodiments. Accordingly, it is possible to apply each example of the applications and embodiments stated for the color processing part of the above-mentioned liquid crystal projector, to the optical unit including the cross dichroic mirror of the present embodiment. For instance, the followings can be applied to the optical unit of the present embodiment.

(1) To put the cross dichroic mirror in a box and to soak the cross dichroic mirror in liquid having higher refractive index than the air, in the box to be a module.

(2) To install a spacer, whose height is H1, for the optical unit in order to have better adjustment in arrangement with respect to the lighting equipment and the projection lens.

(3) To process two surfaces of the cross dichroic mirror of the present embodiment, which are applied with thin film, in order to be continuously connected at their joining line without any opening space.

(4) To put a polarization film in the moduled box.

(5) To install lenses at the front and back of the optical unit of the present embodiment. To make the lenses and the box be one module.

(6) To add a polarization separating module or a polarization synthesizing module to the optical unit of the present embodiment.

Embodiment 7

An image synthesizing system in the case of size of the liquid crystal panel for luminance being different from that of the liquid crystal panel for color will now be described in the present embodiment. The liquid crystal projector which is compact and which can project as large an image as possible will also be stated in the present embodiment.

Figure 83:
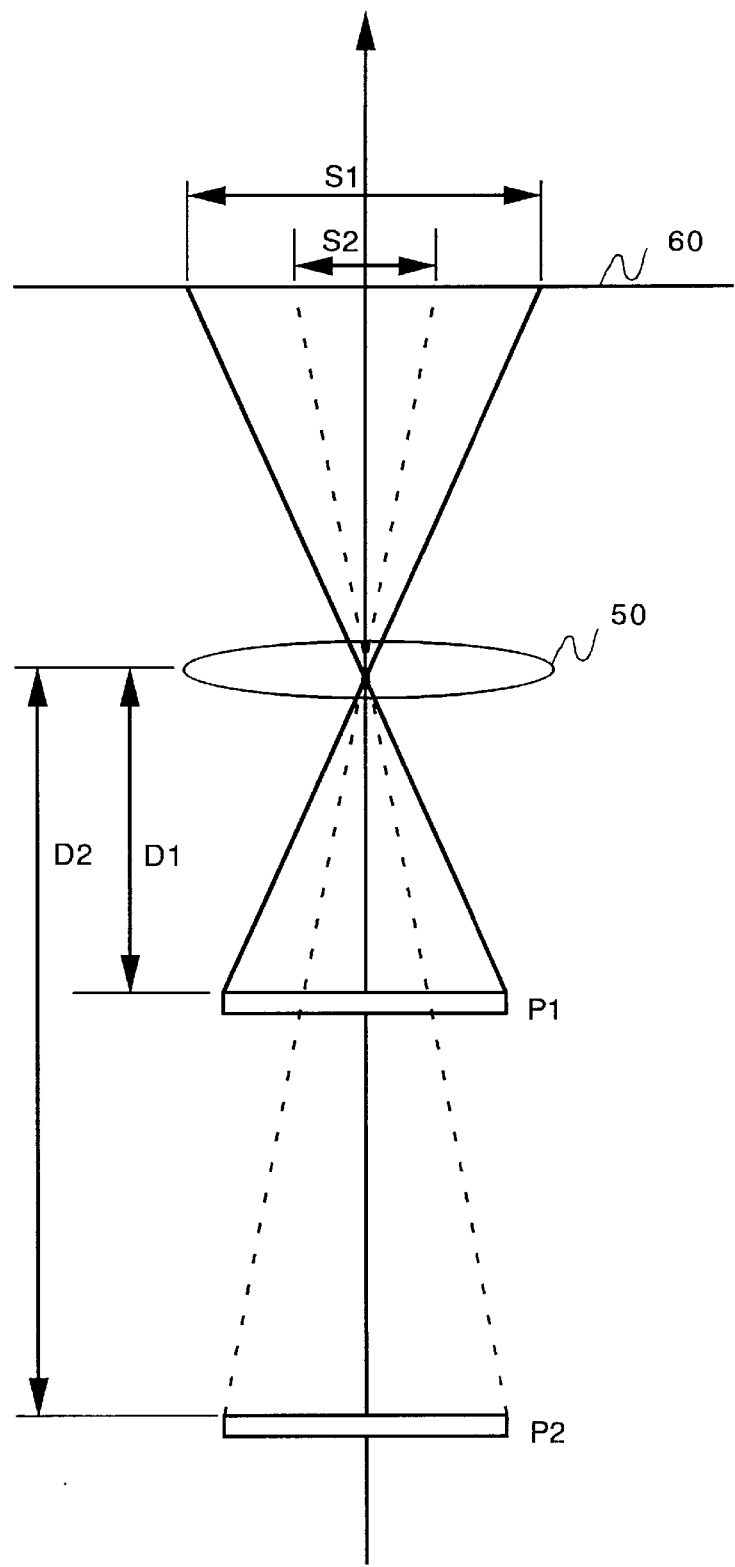
FIG. 83 shows relation between distance, between a liquid crystal panel and a projection lens, and size of image of a screen, in the present invention.

FIG. 83 shows relation between location of the liquid crystal panel and size of the image projected on the screen. When the liquid crystal panel is located at P1, light transmitted through the projection lens 50 generates an image of size S1 on the screen 60. When the liquid crystal panel is located at P2, the light transmitted through the projection lens 50 generates an image of size S2 on the screen 60. The shorter the distance between the projection lens 50 and the liquid crystal panel is, the larger the size of the image projected on the screen 60 becomes. Making the distance between the liquid crystal panel and the projection lens 50 short indicates making the size of the liquid crystal projector compact. Therefore, it is possible to downsize the liquid crystal projector and to project a large image on the screen, by bringing the liquid crystal panel close to the projection lens 50 as much as possible.

Figure 84:
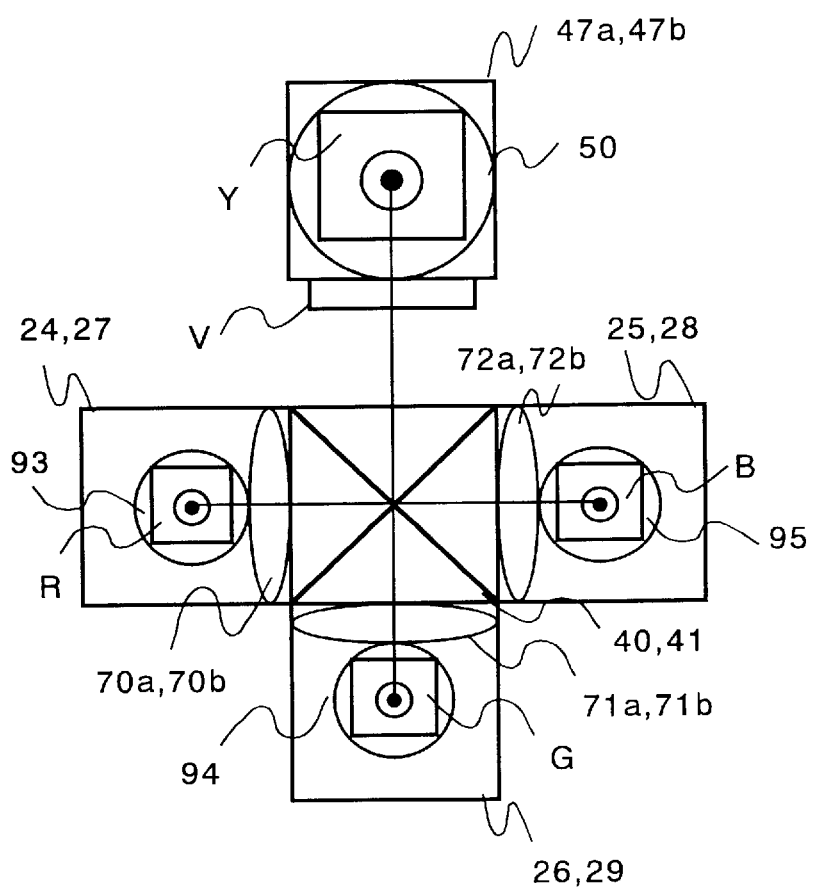
FIG. 84 shows a front view of a liquid crystal projector wherein a relay lens is used, in the present invention.
Figure 85:
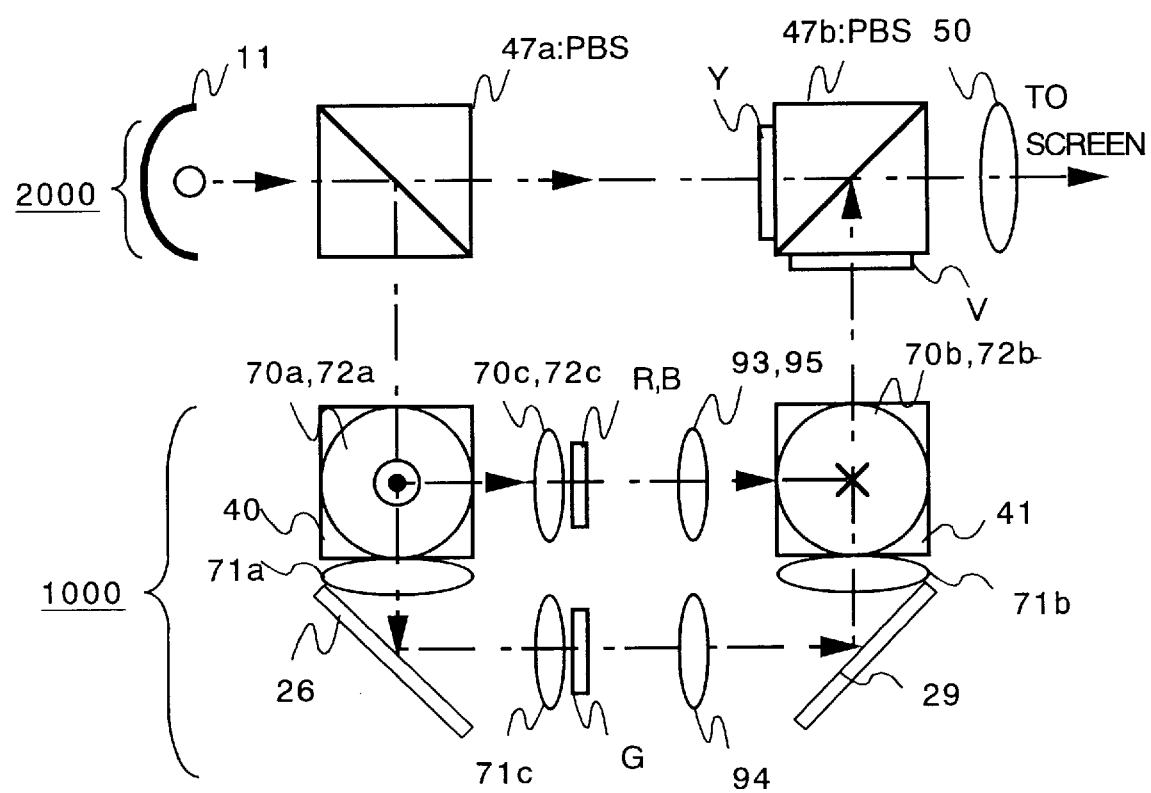
FIG. 85 shows a side view of a liquid crystal projector wherein a relay lens is used, in the present invention.
Figure 86:
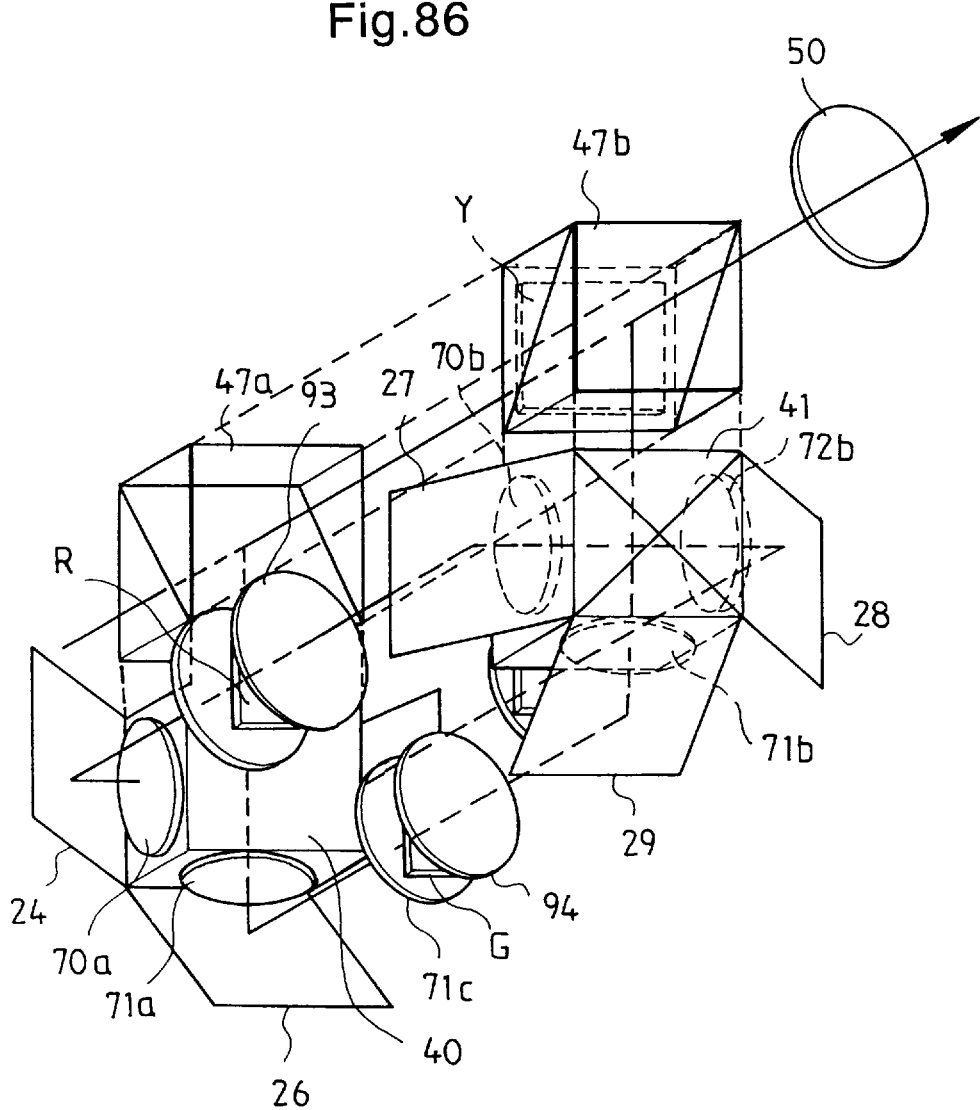
FIG. 86 shows a perspective view of a liquid crystal projector wherein a relay lens is used, in the present invention.

A front view of the liquid crystal projector of the present embodiment is shown in FIG. 84, a side view in FIG. 85 and a perspective view in FIG. 86.

It is assumed in the present embodiment that the liquid crystal panel for luminance is 1.3 inches long at its diagonal line, and the liquid crystal panel for color is 0.7 inches long at its diagonal line. In addition, it is assumed in the present embodiment that ratios of length to breadth of the liquid crystal panels for luminance and for color are equal. Consequently, ratio of area of the liquid crystal panel for luminance and the liquid crystal panel for color is about 4:1.

In the case of the size of the liquid crystal panel for luminance being different from that of the liquid crystal panel for color as the above, relay lenses 93, 94 and 95 are used for equalizing sizes of images. Then, the images are synthesized in the polarization beam splitter 47b.

As shown in FIG. 85, the relay lenses 93, 94 and 95 are located between the liquid crystal panels for colors R, G and B and the cross dichroic mirror 41. Each of the relay lenses 93, 94 and 95 is respectively installed corresponding to each of the liquid crystal panels for color. The liquid crystal panel for luminance is installed on the side of the polarization beam splitter 47b. The relay lenses 93, 94 and 95 send images from the liquid crystal panels for color, onto an image forming position V on another side of the polarization beam splitter 47b so as to form an image. V in FIG. 85 indicates the position whereon the relay lenses 93, 94 and 95 send images to form an image. It is not supposed that a special liquid crystal panel or other hardware is located at V. Size of image at the image forming position V is the same as that of image of the liquid crystal panel for luminance. The polarization beam splitter 47b synthesizes the image at the image forming position V and the image of the liquid crystal panel for luminance. Then an image at final stage, that is made of synthesized images, is projected on the screen through the projection lens 50.

The optical system in the case of the image being magnified by the relay lens 94 will now be explained with reference to FIG. 87.

Figure 87:
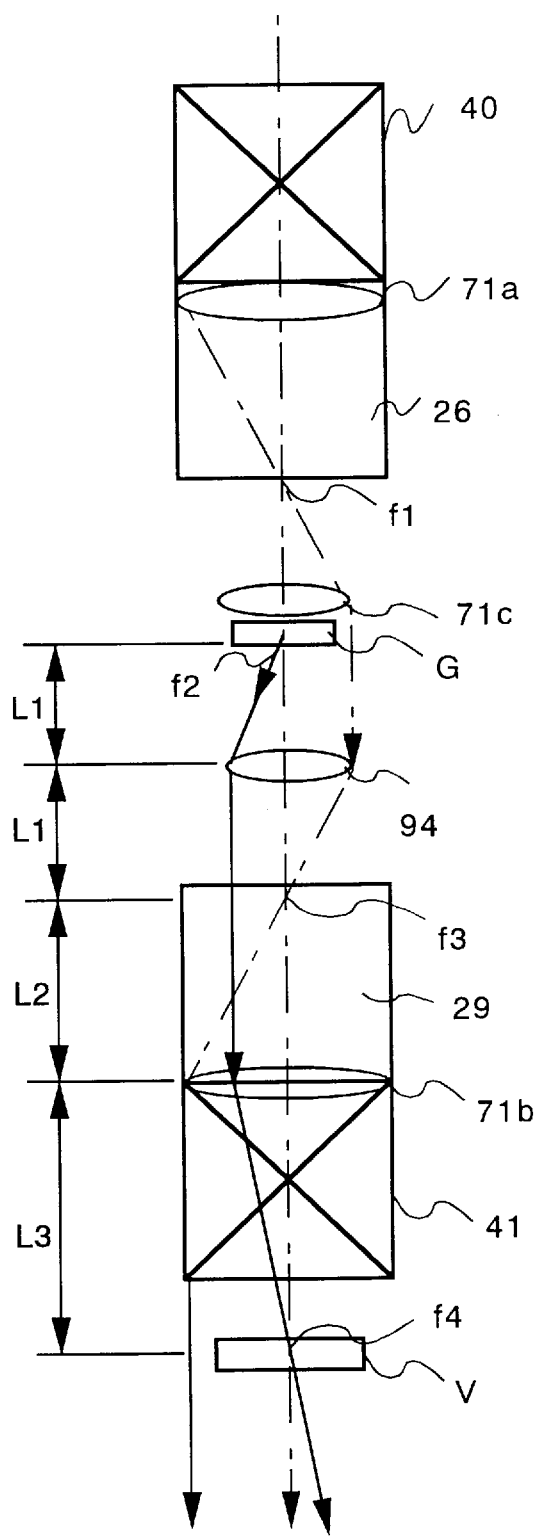
FIG. 87 shows an optical system of a liquid crystal projector wherein a relay lens is used, in the present invention.

In FIG. 87, a focus f1 is a common focus of the lens 71a and a lens 71c. A focus f2 is a focus of the relay lens 94. A focus f3 is a common focus of the relay lens 94 and the lens 71b. A focus f4 is a focus of the lens 71b. Length L1 is a focal length of the relay lens 94 and length L2 is a focal length of the lens 71b. Supposing that L1×2=L2 and L2=L3, diameter of light output from the liquid crystal panel G for green is gradually magnified to be double at the process from the relay lens 94 to the lens 71b.

As shown in FIG. 87, the cross dichroic mirror 41 should be installed between the lens 71b and the image forming position V. Therefore, when size of the cross dichroic mirror 41 is large, the relation L2=L3 is not always satisfied. In such a case, it is possible to practically extend the focal length of the lens 71b by soaking the cross dichroic mirror 41 in liquid whose refractive index is n (n>1). Namely, even when the relation L2=L3 is not physically satisfied, the image size can be magnified to be double as stated above, by making the lengths of L2 and L3 be equivalent. In this way, the size of image output from the liquid crystal panel for color can be double.

The focus f1 is a common focus of the lenses at both sides of the focus f1, and the focus f3 is a common focus of the lenses at both sides of the focus f3. Light dispersion can be prevented and the light can be effectively utilized, by making the focuses f1 and f3 be common focuses of the two lenses at the both sides of the focuses f1 and f3.

Case of making size of image onto the screen be large as much as possible by shortening the distance between the liquid crystal panel and the projection lens 50, will now be stated.

As shown in FIG. 85, the liquid crystal panel for luminance and the image forming position V are placed on the sides of the polarization beam splitter 47b. When the liquid crystal panel for luminance and the liquid crystal panel for color are used, images from the two liquid crystal panels are synthesized by the polarization beam splitter 47b and output to the projection lens 50. In this case, the location of the liquid crystal panel to be the closest to the projection lens 50 is on the side of the polarization beam splitter 47b. Therefore, it is desirable to install the liquid crystal panel for luminance on one side of the polarization beam splitter 47b and the liquid crystal panel for color on another side of the splitter 47b. For instance, it is desirable to locate the liquid crystal panel for color at the image forming position V in FIG. 85. In the case that the color processing part 1000 is composed of the three liquid crystal panels for R, G and B as shown in FIG. 85, it is needed to synthesize outputs from the three liquid crystal panels by the cross dichroic mirror 41 and to send the synthesized output to the polarization-beam splitter 47b. Therefore, it is impossible to install the three liquid crystal panels for R, G and B on the sides of the polarization beam splitter 47b. In the present embodiment, images from the three liquid crystal panels for color are collected on the image forming position V on the side of the polarization beam splitter 47b by the relay lenses 93, 94 and 95. This operates as if the liquid crystal panels for color were on the image forming position V. Namely, the above is equivalent to a virtual liquid crystal panel for color being on the image forming position V.

To install the liquid crystal panel for luminance and the virtual liquid crystal panel for color on the sides of the polarization beam splitter 47b as stated above, indicates to install the liquid crystal panel for luminance and the virtual liquid crystal panel for color at locations whose distances from the projection lens 50 are equal. In this case, the location is the closest to the projection lens 50. A large image can be projected on the screen by the above-mentioned way.

Figure 88:
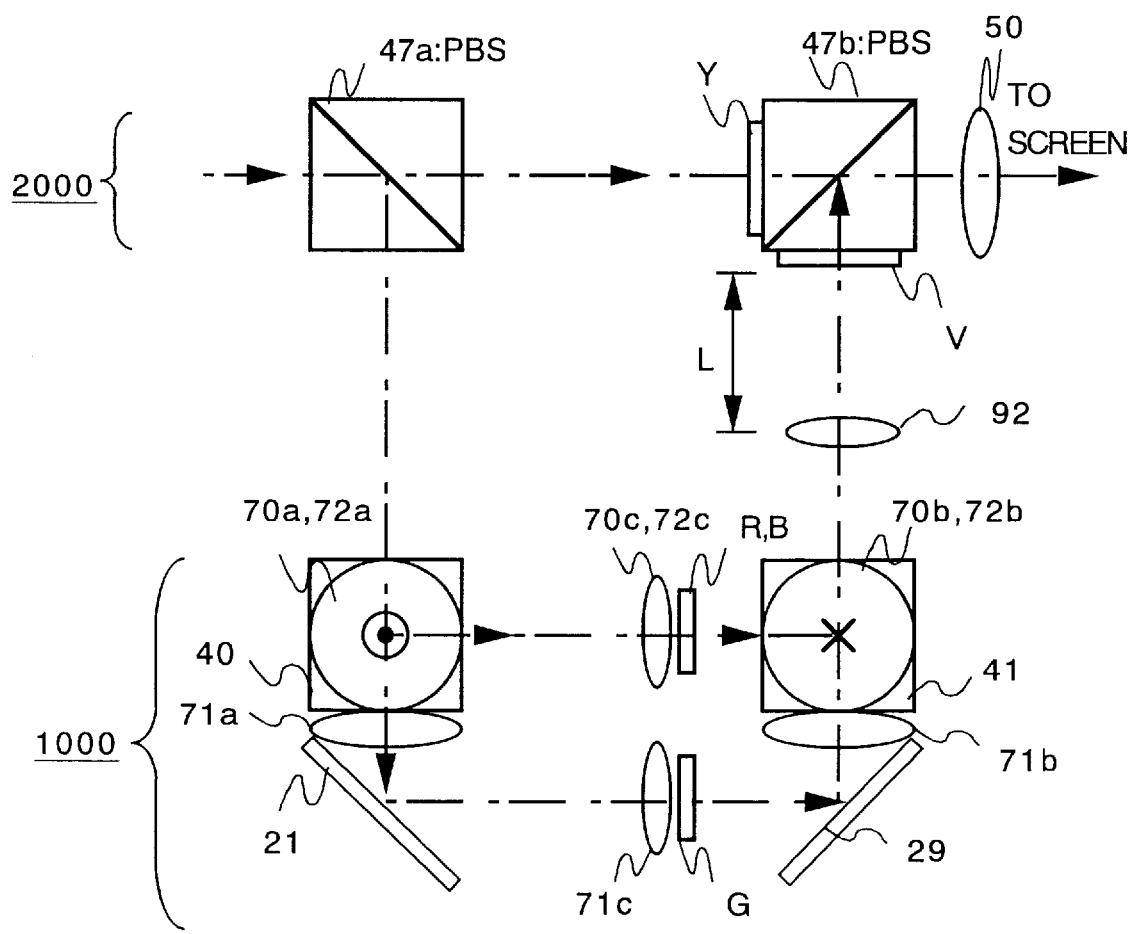
FIG. 88 shows another configuration of a liquid crystal projector wherein a relay lens is used, in the present invention.

Although the case of three relay lenses being used has been described, it is also acceptable to install one relay lens 92 between the cross dichroic mirror 41 and the polarization beam splitter 47b as shown in FIG. 88. In this case, the image forming position V of the image made by the relay lens 92 is also on the side of the polarization beam splitter 47b. Accordingly, it is necessary to keep a fixed length L between the cross dichroic mirror 41 and the polarization beam splitter 47b. In the case that the relay lenses are installed for each of the liquid crystal panels as shown in FIGS. 84 to 86, it is required that each relay lens has a characteristic adapted to each color of R, G and B. In the case that only one relay lens is installed between the cross dichroic mirror 41 and the polarization beam splitter 47b, it is required that the relay lens has a characteristic adapted to three colors R, G and B. Although it is an advantage that one lens is enough to be used, it is a disadvantage that an expensive lens is needed.

Figure 89:
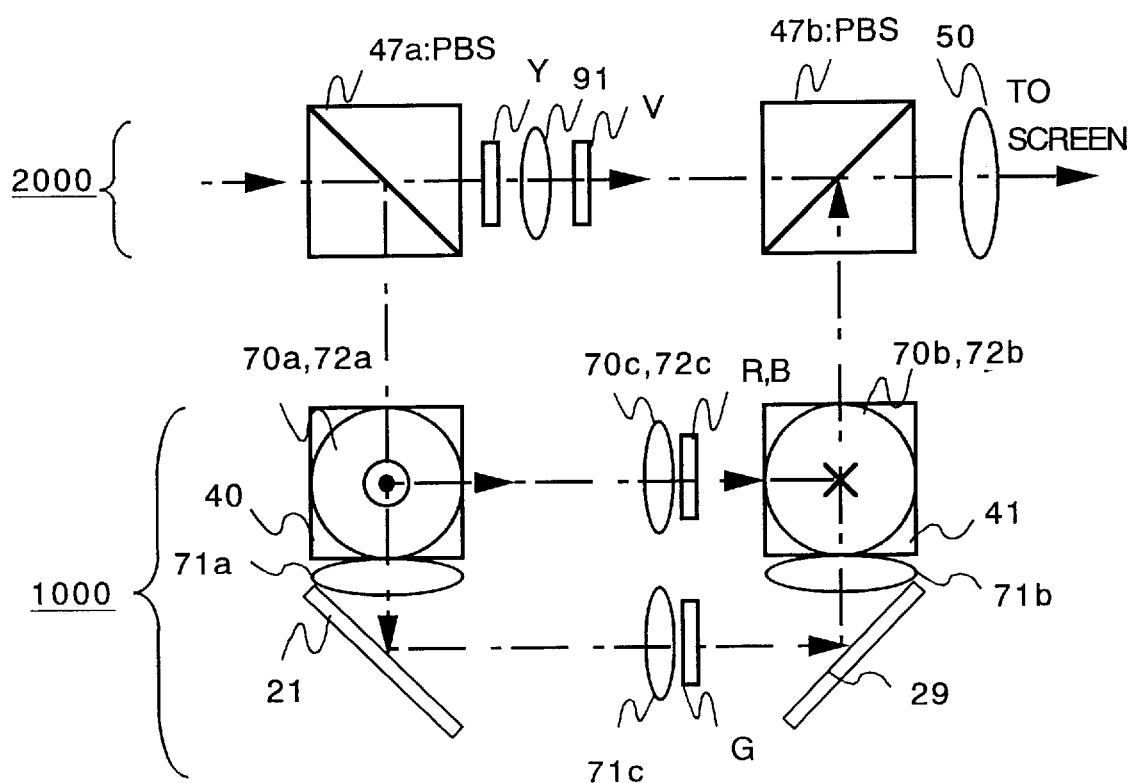
FIG. 89 shows another configuration of a liquid crystal projector wherein a relay lens is used, in the present invention.

The case of the image of the liquid crystal panel for color being magnified has been described in the above two examples. The case of the image of the liquid crystal panel for luminance being reduced is shown in FIG. 89. In FIG. 89, output from the liquid crystal panel for luminance is reduced by a relay lens 91, and an image, whose size is the same as that of an image output from the liquid crystal panel for color, is generated on the image forming position V.

Although the case that each of the relay lenses 91 to 95 is composed of one lens has been described in the above example, it is also acceptable to compose the relay lens by assembling plural lenses.

Figure 90:
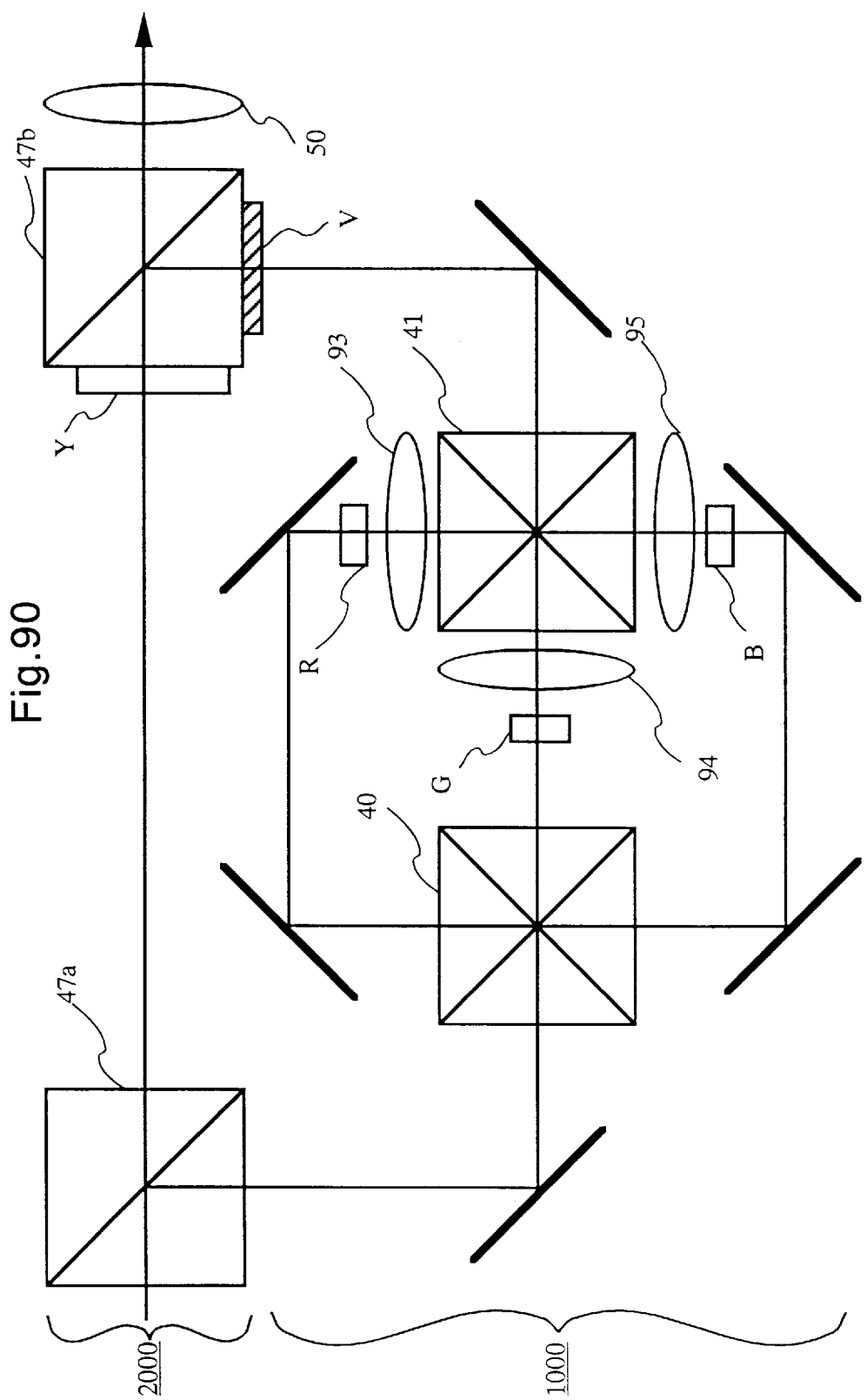
FIG. 90 shows another configuration of a liquid crystal projector wherein a relay lens is used, in the present invention.
Figure 91:
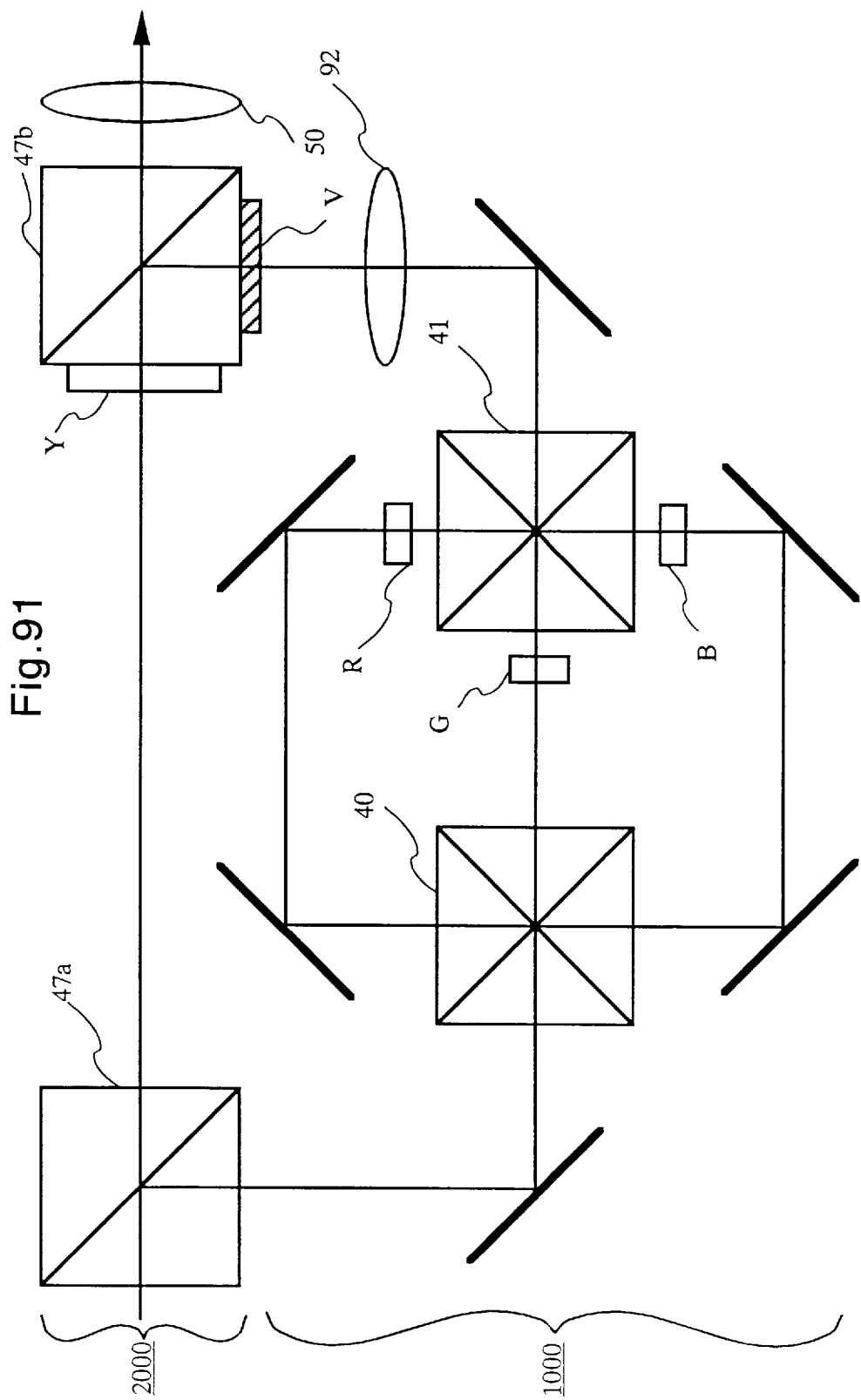
FIG. 91 shows another configuration of a liquid crystal projector wherein a relay lens is used, in the present invention.
Figure 92:
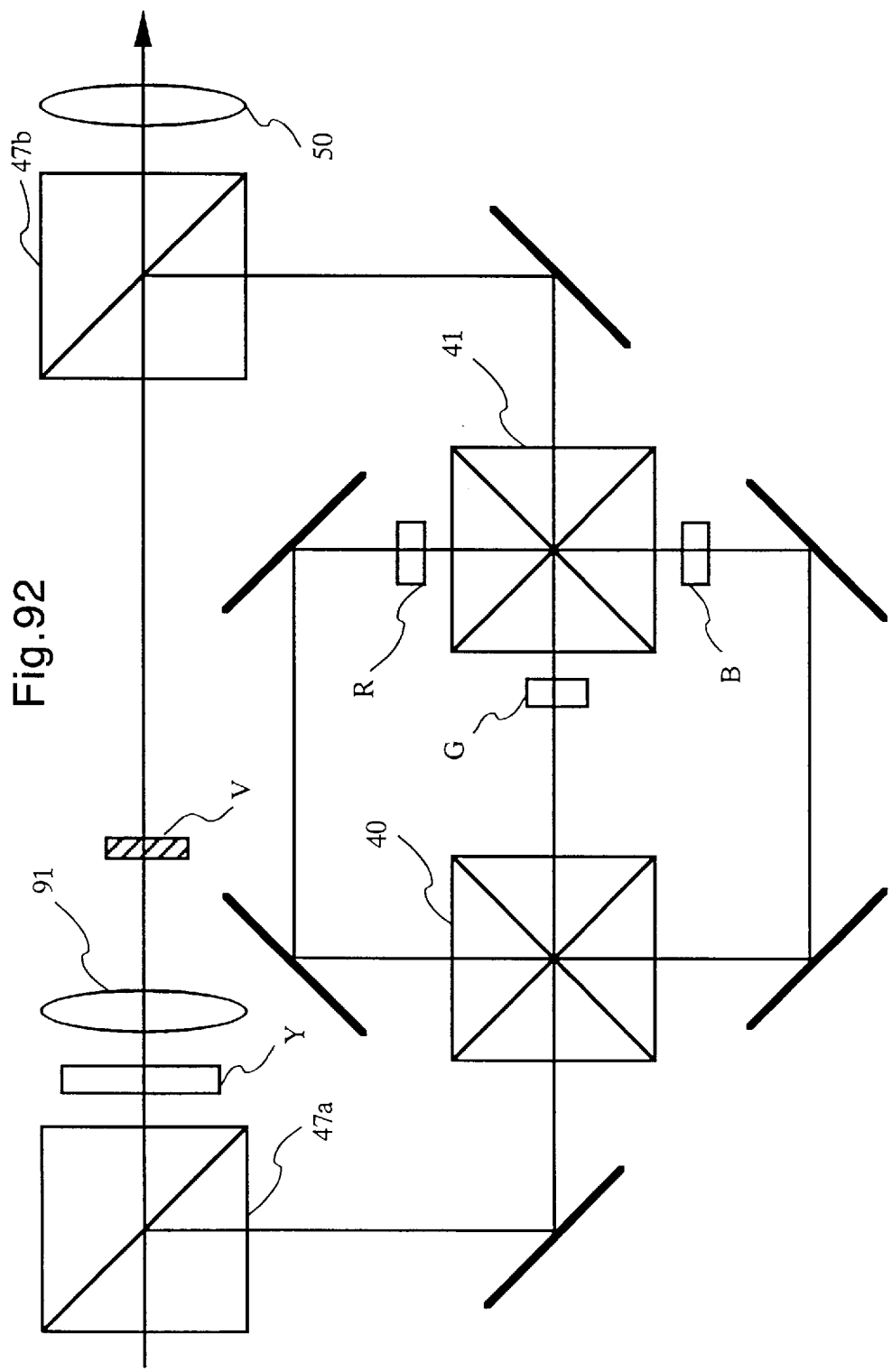
FIG. 92 shows another configuration of a liquid crystal projector wherein a relay lens is used, in the present invention.

FIGS. 90, 91 and 92 show the case that sizes of the image of the liquid crystal panel for luminance and the image of the liquid crystal panel for color are made to be equal by using the relay lens, in the liquid crystal projector. The configurations of the liquid crystal projector shown in FIGS. 90, 91 and 92 are different from that of the stated liquid crystal projector. In FIGS. 90 and 91, the liquid crystal panel for luminance and the image forming position V are located on the sides of the polarization beam splitter 47b. This location is the closest to the projection lens 50. In FIG. 90, three relay lenses 93, 94 and 95 are used. In FIG. 91, the relay lens 92 is installed between the cross dichroic mirror 41 and the polarization beam splitter 47b. In FIG. 92, the relay lens 91 is installed between the liquid crystal panel for luminance and the polarization beam splitter 47*b*.

Figure 93:
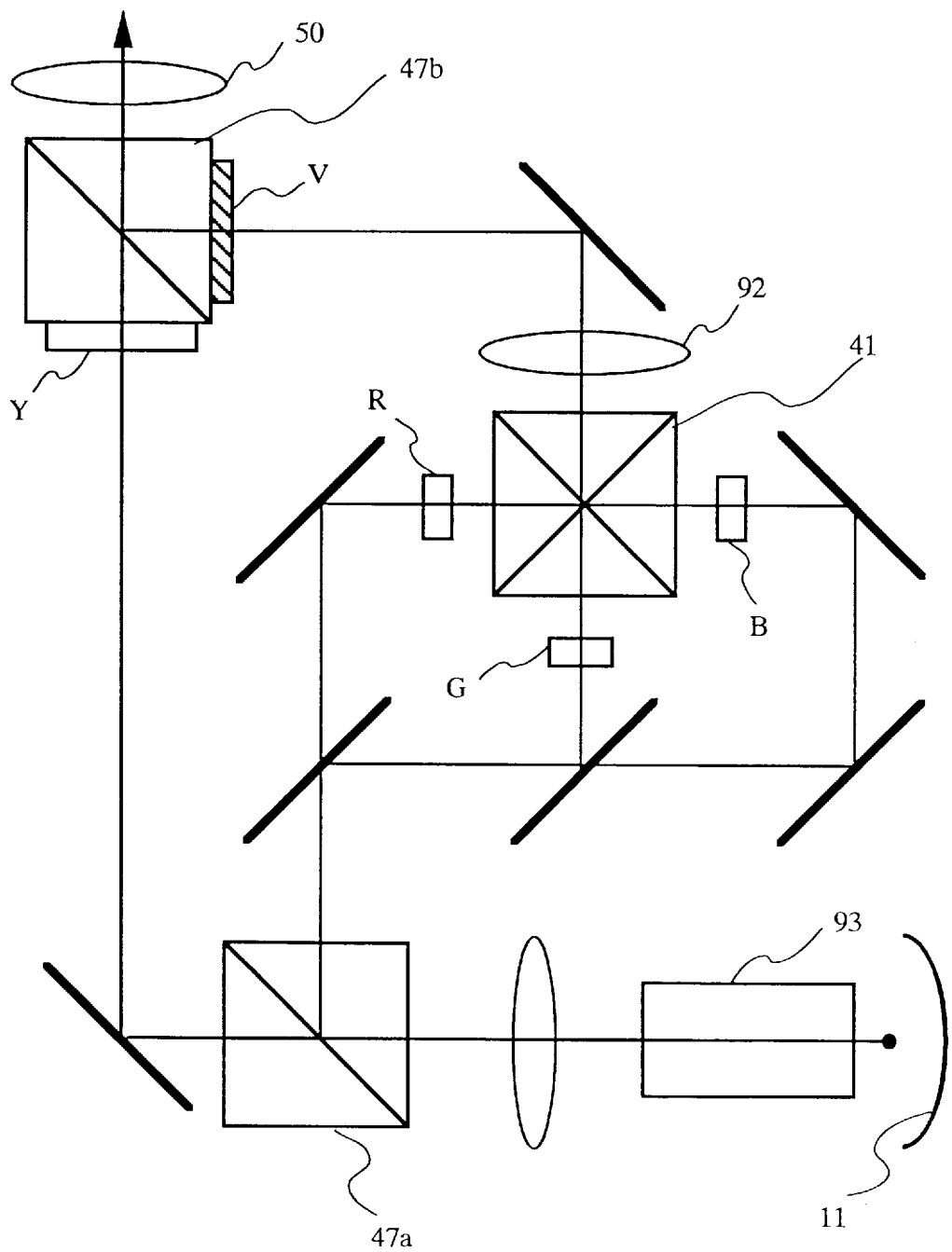
FIG. 93 shows another configuration of a liquid crystal projector wherein a relay lens is used, in the present invention.
Figure 94:
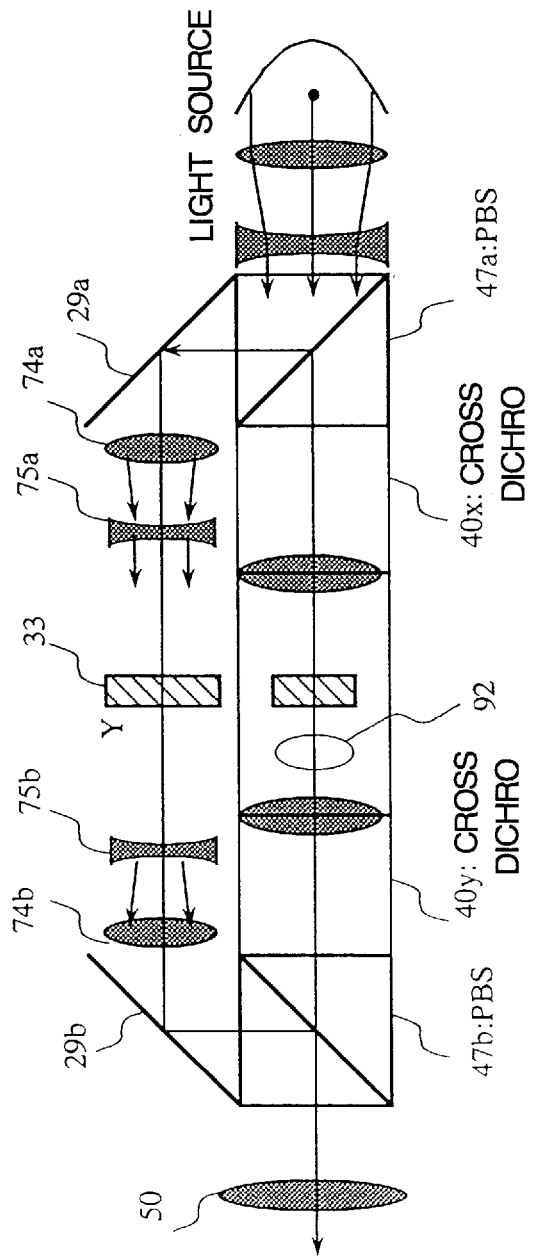
FIG. 94 shows another configuration of a liquid crystal projector wherein a relay lens is used, in the present invention.
Figure 95:
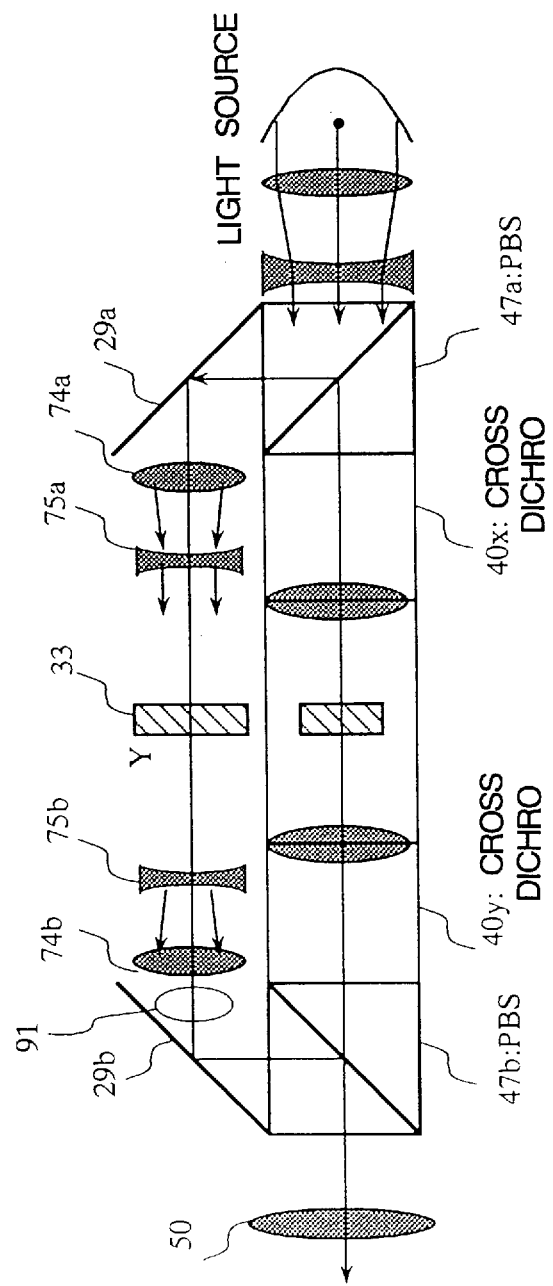
FIG. 95 shows another configuration of a liquid crystal projector wherein a relay lens is used, in the present invention.
Figure 96:
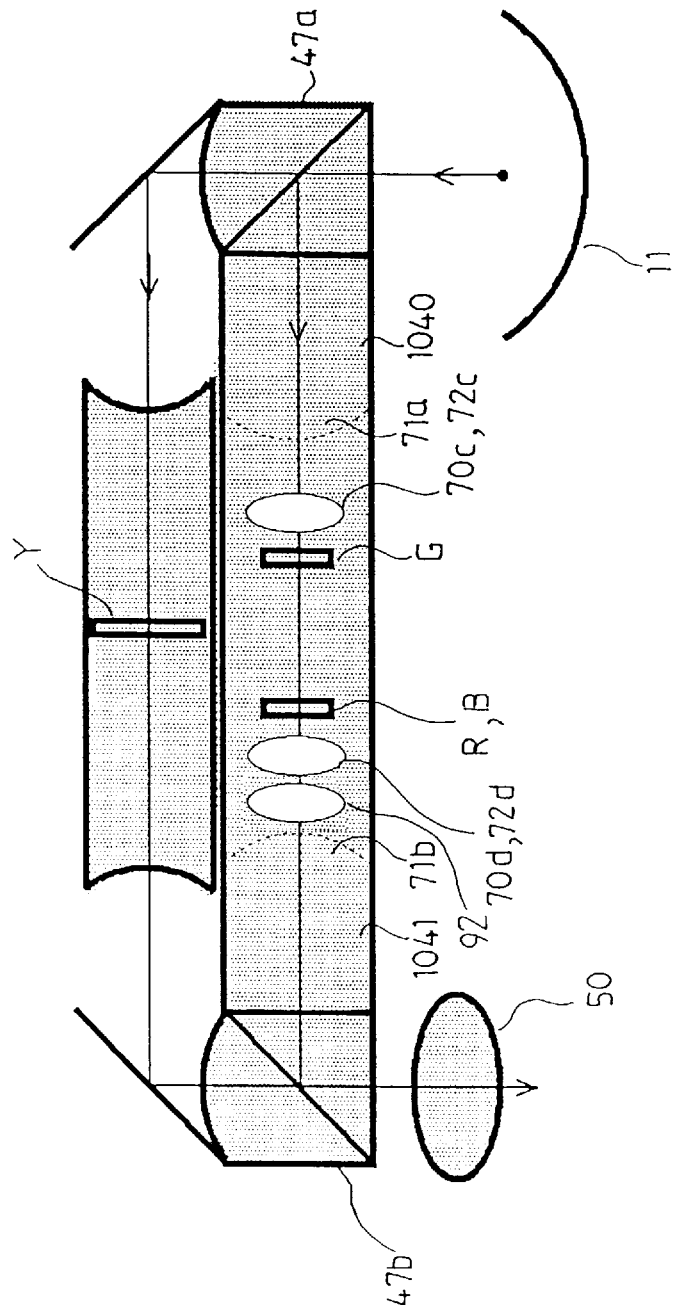
FIG. 96 shows another configuration of a liquid crystal projector wherein a relay lens is used, in the present invention.
Figure 97:
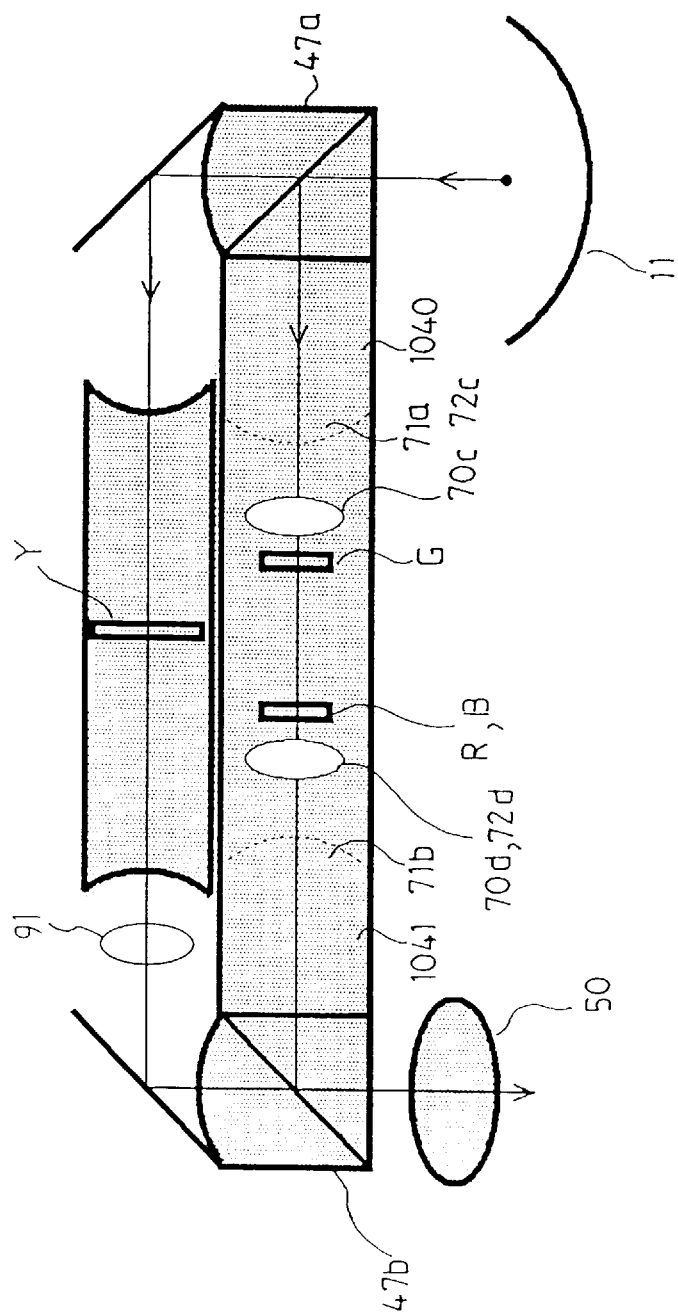
FIG. 97 shows another configuration of a liquid crystal projector wherein a relay lens is used, in the present invention.

FIG. 93 shows that the relay lens is used in the liquid crystal projector of another configuration. The relay lens 92 is installed between the cross dichroic mirror 41 and the polarization beam splitter 47*b* in FIG. 93. It is also acceptable to install three relay lenses between each liquid crystal panel for color and the cross dichroic mirror in FIG. 93. It is also acceptable to install the relay lens between the liquid crystal panel for luminance and the polarization beam splitter 47*b*.

FIGS. 94, 95, 96 and 97 show the case that the relay lens is applied to the liquid crystal projector stated in the above embodiments. The relay lens 92 is used for the liquid crystal panel for color in FIG. 94. The relay lens 91 is used for the liquid crystal panel for luminance in FIG. 95. The relay lens 92 is used for the liquid crystal panel for color in FIG. 96. The relay lens 91 is used for the liquid crystal panel for luminance in FIG. 97.

Other characteristics of the liquid crystal projector of the present embodiment will now be stated with reference to FIGS. 84 and 85. The polarization beam splitter 47*a*, the liquid crystal panel for luminance and the polarization beam splitter 47*b* are installed directly in series in the liquid crystal projector in FIGS. 84 and 85. Namely, the polarization beam splitter 47*a*, the liquid crystal panel for luminance, the polarization beam splitter 47*b* and the projection lens 50 are arranged along the direction of directly advancing input light from the light source 11.

A reason for installing each module of the polarization processing part 2000 in series along the direct line as stated above, is that the liquid crystal panel for luminance has high resolution. As has been stated, the resolution of the liquid crystal panel for luminance is defined to be high compared with the resolution of the liquid crystal panel for color, based on the human visual characteristic. Accordingly, it is necessary to accurately align the optical axis inputting into the liquid crystal panel for luminance. The alignment of the optical axis can be accurately adjusted and easily performed by serially installing each component of the polarization processing part 2000 along the direct line.

On the other hand, display of low resolution is performed in the color processing part 1000, compared with the polarization processing part 2000, based on the human visual characteristic. Therefore, it is not so strongly required for the color processing part 1000 to accurately perform the alignment, compared with the case of the luminance. Accordingly, it is acceptable to change the optical path of the color processing part 1000 by using a mirror and a cross dichroic mirror.

The case that the optical path of the polarization processing part 2000 is changed by using the mirror has been stated in above-mentioned embodiments. A feature of the present embodiment is that the optical path of the polarization processing part 2000 is direct as shown in FIG. 85. FIGS. 88 and 89 also show this feature. Even when the color processing part 1000 has a different configuration from the above, it is possible to keep the optical path of the polarization processing part 2000 to be direct as shown in FIGS. 90, 91 and 92.

Now, the liquid crystal projector wherein the cross dichroic mirror is not used since the relay lens is used, will be explained.

Figure 98:
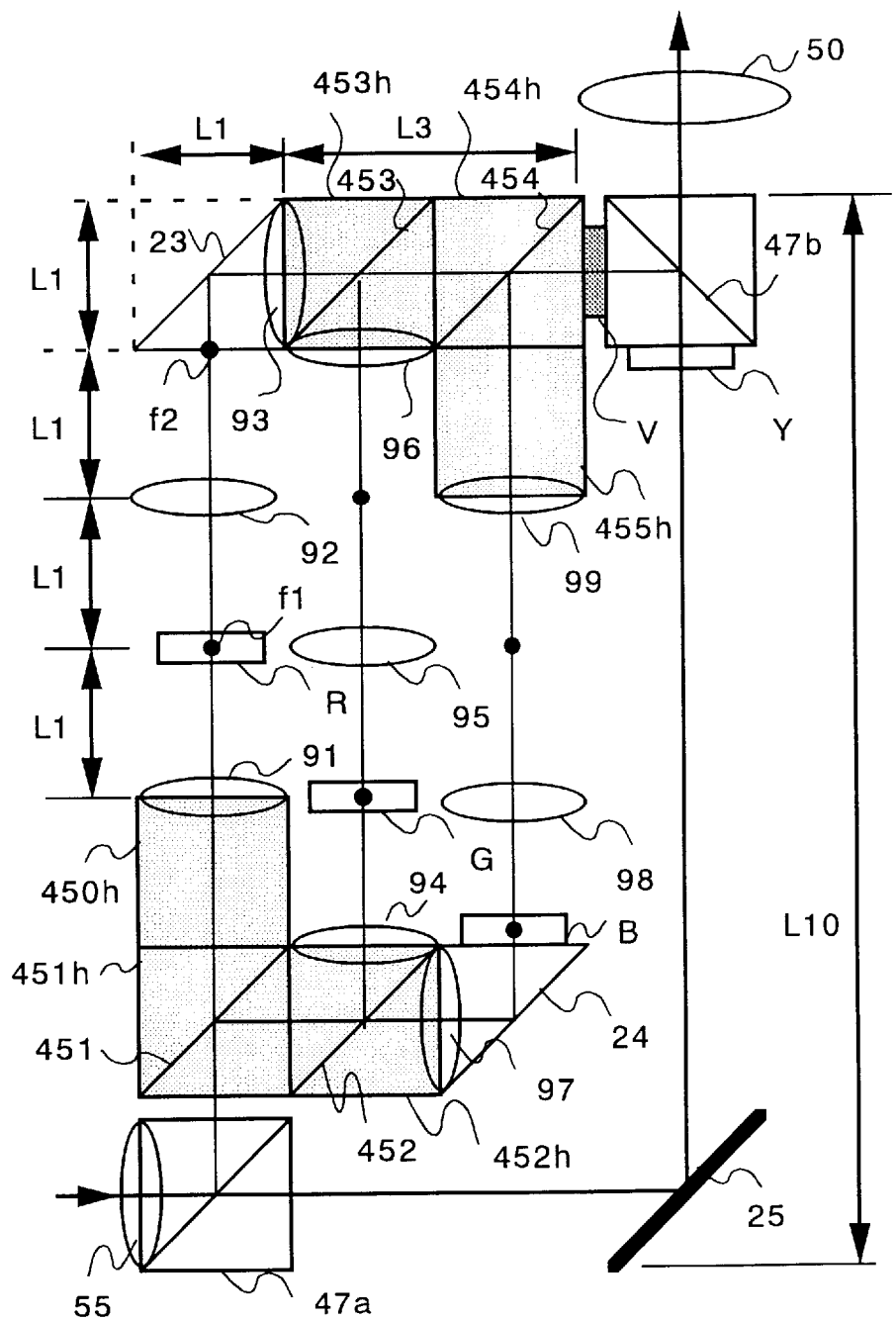
FIG. 98 shows a configuration of a liquid crystal projector wherein a cross dichroic mirror is not used, in the present invention.

FIG. 98 shows one example of the liquid crystal projector wherein the cross dichroic mirror is not used. As has been stated, the cross dichroic mirror is made by crossing two dichroic mirrors. An advantages of the cross dichroic mirror is that the number of the components of the apparatus can be reduced and so the apparatus can be downsized. However, the cross dichroic mirror has disadvantages that an open space is generated at the crossing line of the two dichroic mirrors and the cross dichroic mirror is expensive. It is possible to shorten the distance between the liquid crystal panel for color and the projection lens by using the cross dichroic mirror. However, when images from the three liquid crystal panels for color can be collected to form an image on the image forming position V on the side of the polarization beam splitter 47*b*, it is not necessary to shorten the distance between the liquid crystal panel for color and the projection lens 50. Accordingly, it is desirable not to use the cross dichroic mirror which has the above disadvantages.

FIG. 98 shows the configuration of the liquid crystal panel wherein two dichroic mirrors are used instead of the cross dichroic mirror. The polarization beam splitters 47*a* and 47*b*, dichroic mirrors 451 to 454, boxes 451*h* to 454*h* wherein the dichroic mirrors 451 to 454 are soaked in the liquid whose refractive index is n, the reflecting mirrors 23 to 25, and the relay lenses 91 to 99 are shown in FIG. 98. The focus f1 is a common focus of the relay lens 91 and the relay lens 92. The liquid crystal panel for red is installed at the common focus f1. The focus f2 is a common focus of the relay lens 92 and the relay lens 93. Focal lengths of the relay lenses 91 to 99 are all L1. Distances from the relay lenses 93, 96 and 99 to the image forming position V are defined to be L3. Although the length L3 is physically longer than the focal length L1, it is possible to regard the lengths L1 and L3 to be equivalent because inside of the boxes 453*h* to 455*h* are filled with the liquid having the refractive index n. Therefore, it is possible to locate the image forming position V at a focal position of the relay lenses 93, 96 and 99. The images from the three liquid crystal panels for color are transmitted through the relay lenses and collected on the image forming position V to form an image. In this case, size of the image is equal to the size of the liquid crystal panel for color, because the focal length of each relay lens is L1 (L3 is equivalent to L1). Size of the liquid crystal panel for luminance is the same as that of the liquid crystal panel for color in the case of FIG. 98. The image from the liquid crystal panel for luminance and the image formed on the image forming position V are synthesized by the polarization beam splitter 47*b* and output to the projection lens 50.

It is possible to combine the boxes 450*h*, 451*h* and 452*h* so as to structure one module for wavelength separation, in the liquid crystal projector of FIG. 98. It is also possible to combine the boxes 453*h*, 454*h* and 455*h* so as to structure one module for wavelength synthesis. This wavelength separating module is the same as the wavelength synthesizing module. Namely, one kind of module can be used as the wavelength separating module or the wavelength synthesizing module. It is acceptable to add the reflecting mirrors 23 and 24 to the above modules in order to be one module. In addition, it is also acceptable to add the relay lenses 91, 94, 97, and 93, 96, 99 to the above modules in order to be one module. Even when these reflecting mirrors and the relay lenses are added in order to be one module, the module can be used as the wavelength separating module or the wavelength synthesizing module.

As stated above, the number of the components can be greatly reduced by making modules. In addition, the manufacturing cost of the liquid crystal projector can be reduced, because one module can be used as the wavelength separating module or the wavelength synthesizing module.

Figure 99:
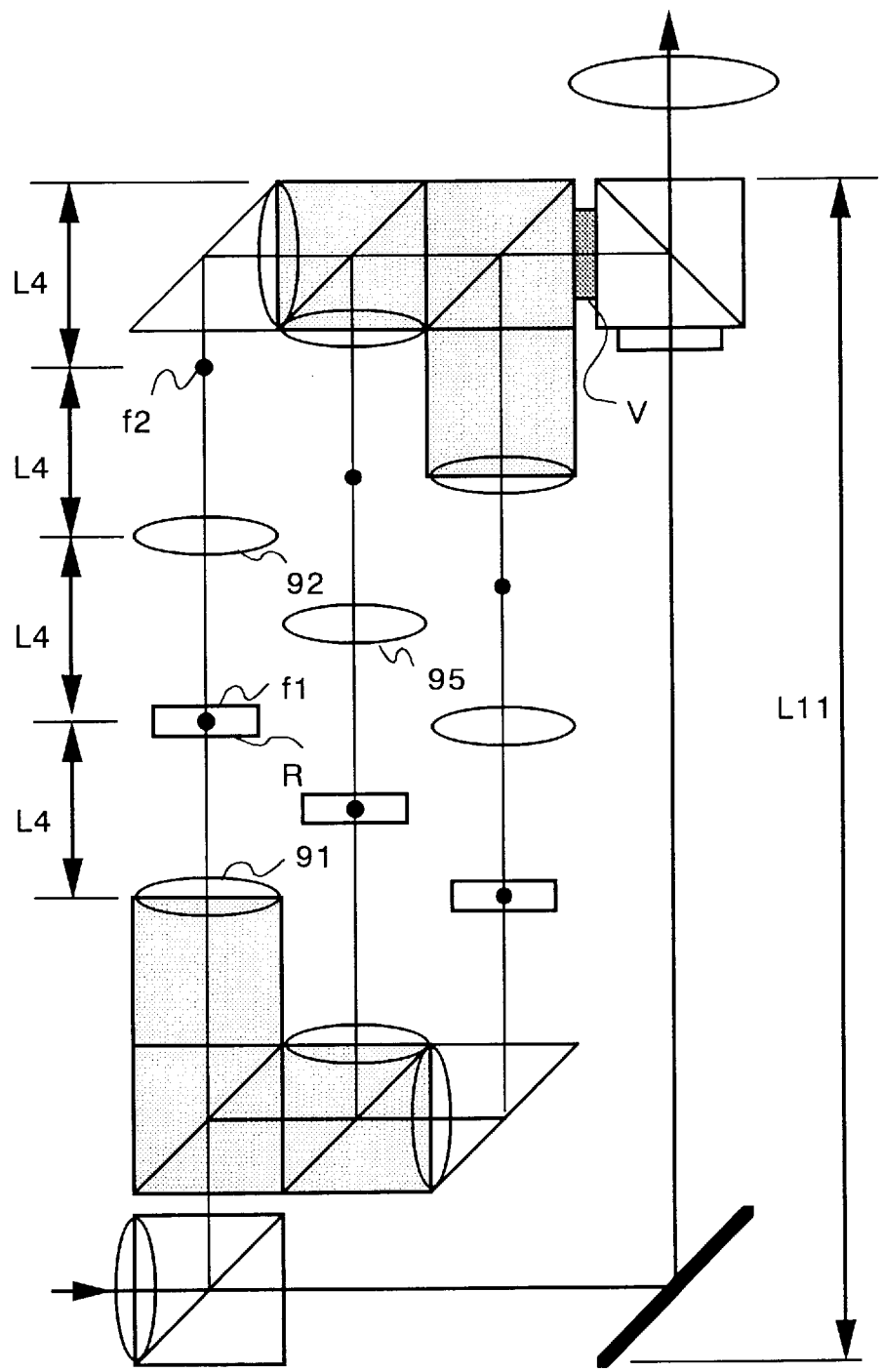
FIG. 99 shows another configuration of a liquid crystal projector wherein a cross dichroic mirror is not used, in the present invention.

FIG. 99 shows one example of an improved liquid crystal projector of FIG. 98. FIG. 99 shows the liquid crystal projector wherein length between the wavelength separating module and the wavelength synthesizing module is extended. Length of the liquid crystal projector of FIG. 98 is L10. Length of the liquid crystal projector of FIG. 99 is L11 (L10<L11). Since the length between the wavelength separating module and the wavelength synthesizing module is extended in the liquid crystal projector of FIG. 99, the focal lengths of the relay lenses 91 to 99 can be changed from L1 to L4 (L4>L1). A lens having a long focal length can be got at lower price than a lens having a short focal length. Therefore, the price of the liquid crystal projector can be reduced by extending the length of the liquid crystal projector. In addition, the length between the wavelength separating module and the wavelength synthesizing module can be freely changed based on the focal length and a characteristic of the relay lens, which increases flexibility of designing of the liquid crystal projector.

Figure 100:
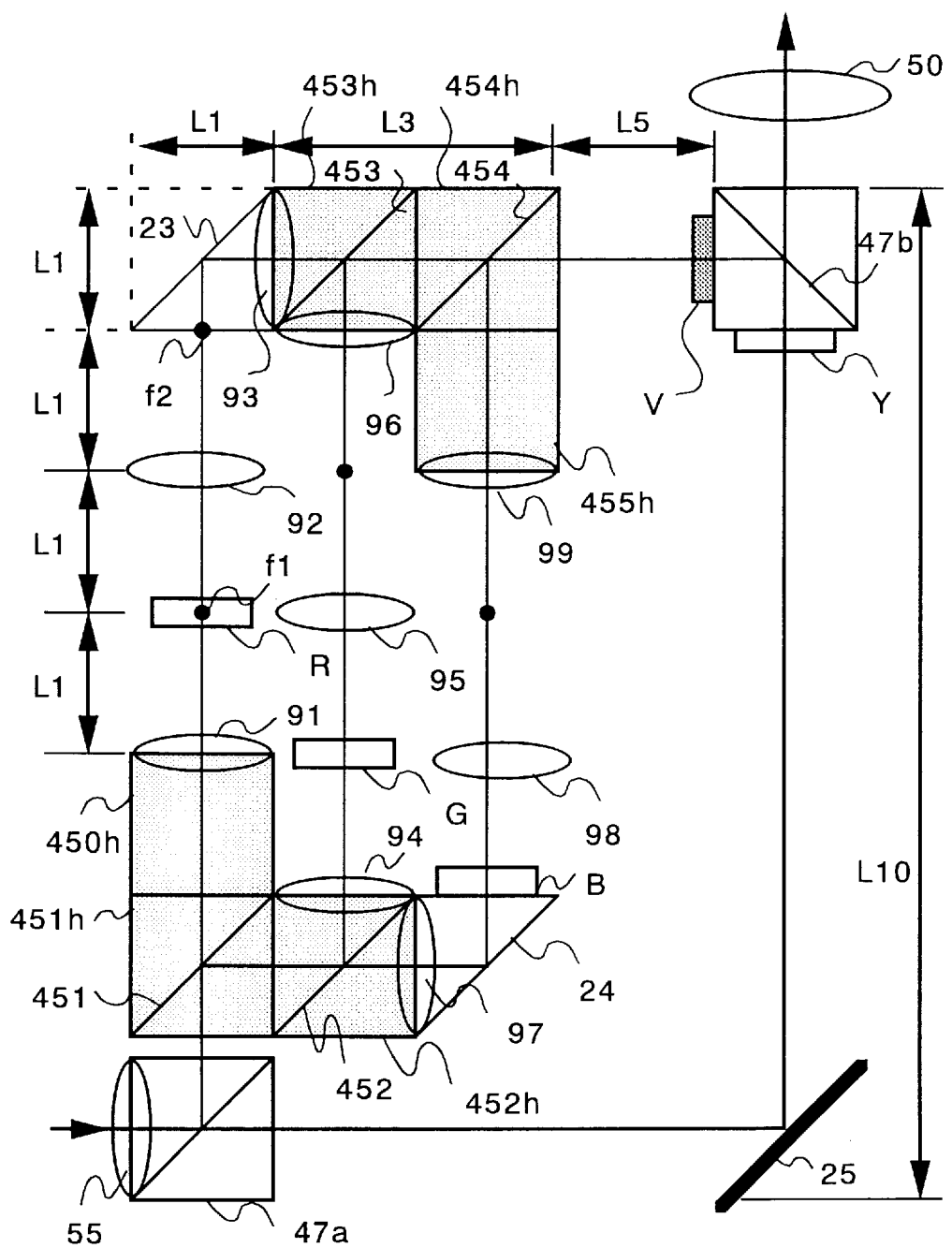
FIG. 100 shows another configuration of a liquid crystal projector wherein a cross dichroic mirror is not used, in the present invention.

FIG. 100 shows another configuration of the liquid crystal projector. A feature of FIG. 100 is that a length L5 is provided between the polarization beam splitter 47b and the box 454h. The length L5 is provided in order to make focal position of the relay lenses 93, 96 and 99 correspond with the image forming position V on the side of the polarization beam splitter 47b. The image forming position V can be accurately located at the focal position of the relay lenses 93, 96 and 99, by adjusting the length L5. The relay lenses 93, 96 and 99 can be flexibly selected by changing the length L5.

Figure 101:
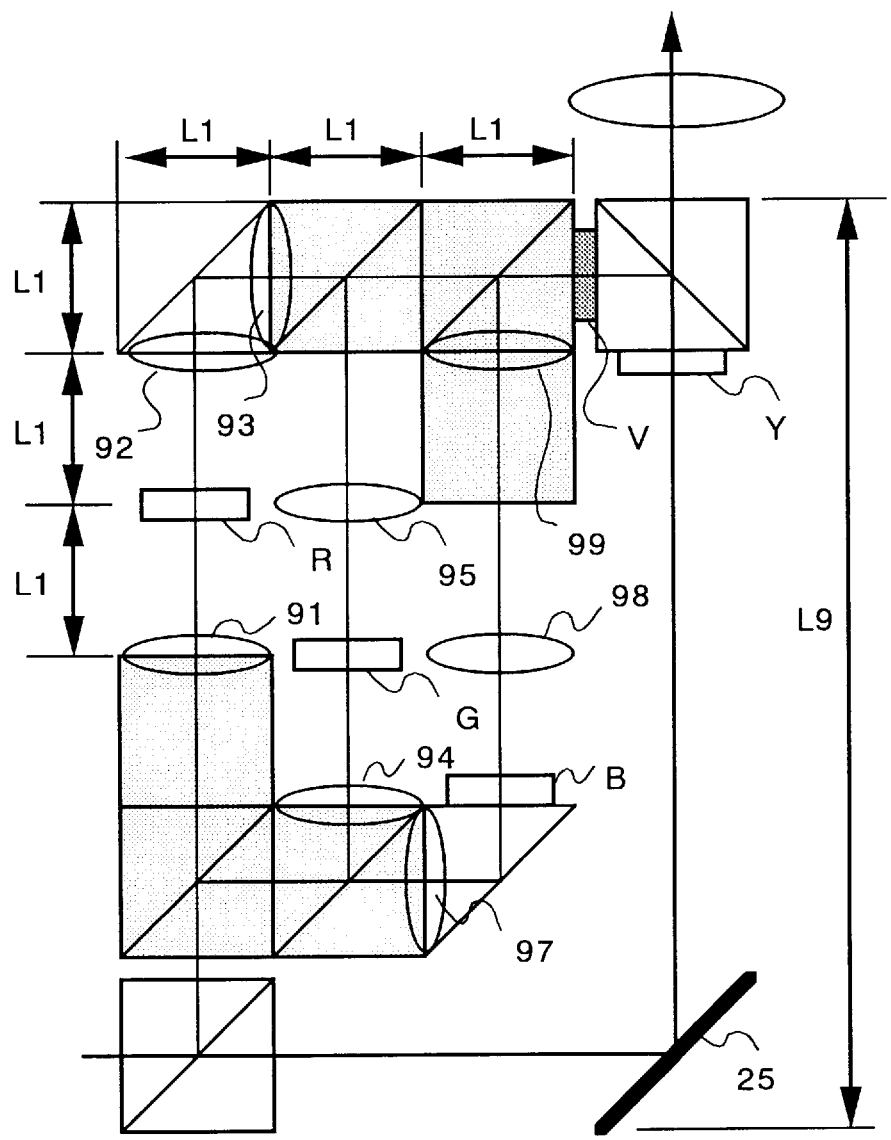
FIG. 101 shows another configuration of a liquid crystal projector wherein a cross dichroic mirror is not used, in the present invention.

FIG. 101 shows another configuration of the liquid crystal projector. Length L9 of the liquid crystal projector of FIG. 101 is shorter than the length L10 of the liquid crystal projector of FIG. 98. The focal lengths of the relay lenses 91 to 99 of FIG. 101 are L1, which are the same as those of the relay lenses of FIG. 98. Since the length L9 of the liquid crystal projector is shorter than the length L10, the location of the relay lenses of FIG. 101 differs from that of the relay lenses of FIG. 98. Therefore, if making a module is performed with including the relay lens, it is impossible to use a module of one kind for both of the wavelength separating module and the wavelength synthesizing module. The reason is that the location of the relay lenses of the wavelength separating module differs from that of the wavelength synthesizing module. When the relay lenses 91 to 99 having short focal lengths are used in the case of FIG. 101, it is possible to have the same location of the relay lenses as of FIG. 98.

Figure 102:
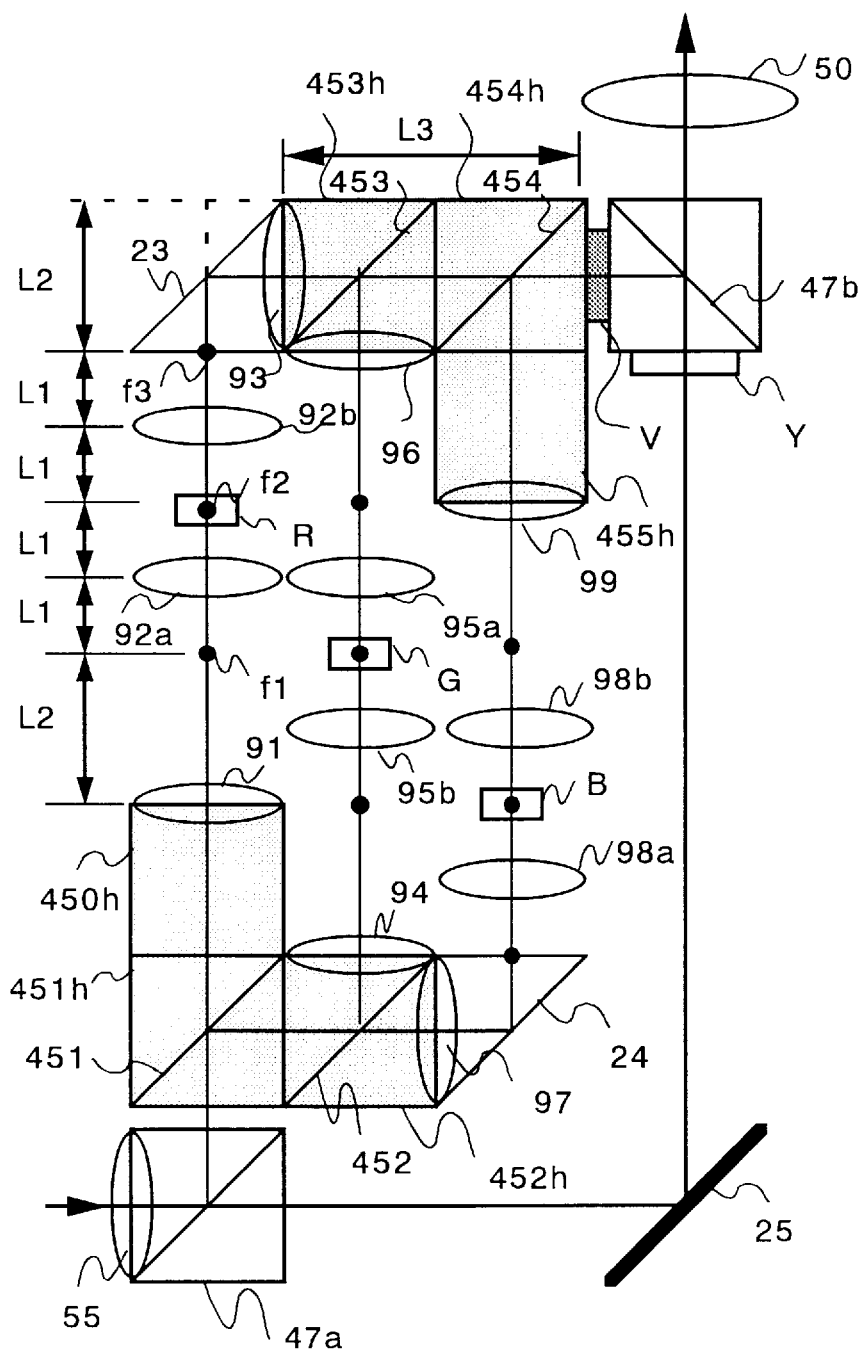
FIG. 102 shows another configuration of a liquid crystal projector wherein a cross dichroic mirror is not used, in the present invention.

FIG. 102 shows another configuration of the liquid crystal projector. FIG. 102 shows the case that size of the liquid crystal panel for luminance is larger than that of the liquid crystal panel for color. The case that an image output from the liquid crystal panel for color is magnified to be double and sent onto the image forming position V to form an image, will now be explained as one example.

The relay lens 91 and a relay lens 92a have a common focus f1. The relay lens 92a and a relay lens 92b have a common focus f2. The liquid crystal panel for red is located at the common focus f2. The relay lens 92b and the relay lens 93 have a common focus f3. Focal lengths of the relay lenses 92a and 92b are L1. Focal lengths of the relay lenses 91 and 93 are L2 (L1×2=L2). Light dispersion can be prevented and light can be effectively utilized by defining the focuses f1, f2 and f3 as the common focus of each relay lens. When the relation L1×2=L2 and the relation L2=L3 are satisfied, the image output from the liquid crystal panel R for color is magnified to be double and projected on the image forming position V to form an image. Although the length L3 is physically longer than the length L2, the L3 and the L2 can be equivalent. The reason is that the focal length can be particularly lengthened since the light is transmitted through the liquid having the refractive index n. The same relation as the above can also be satisfied in the liquid crystal panels B and G for blue and green. Namely, images twice as large as the size of each liquid crystal panel of the panels B and G can be projected on the image forming position V to form an image.

Figure 103:
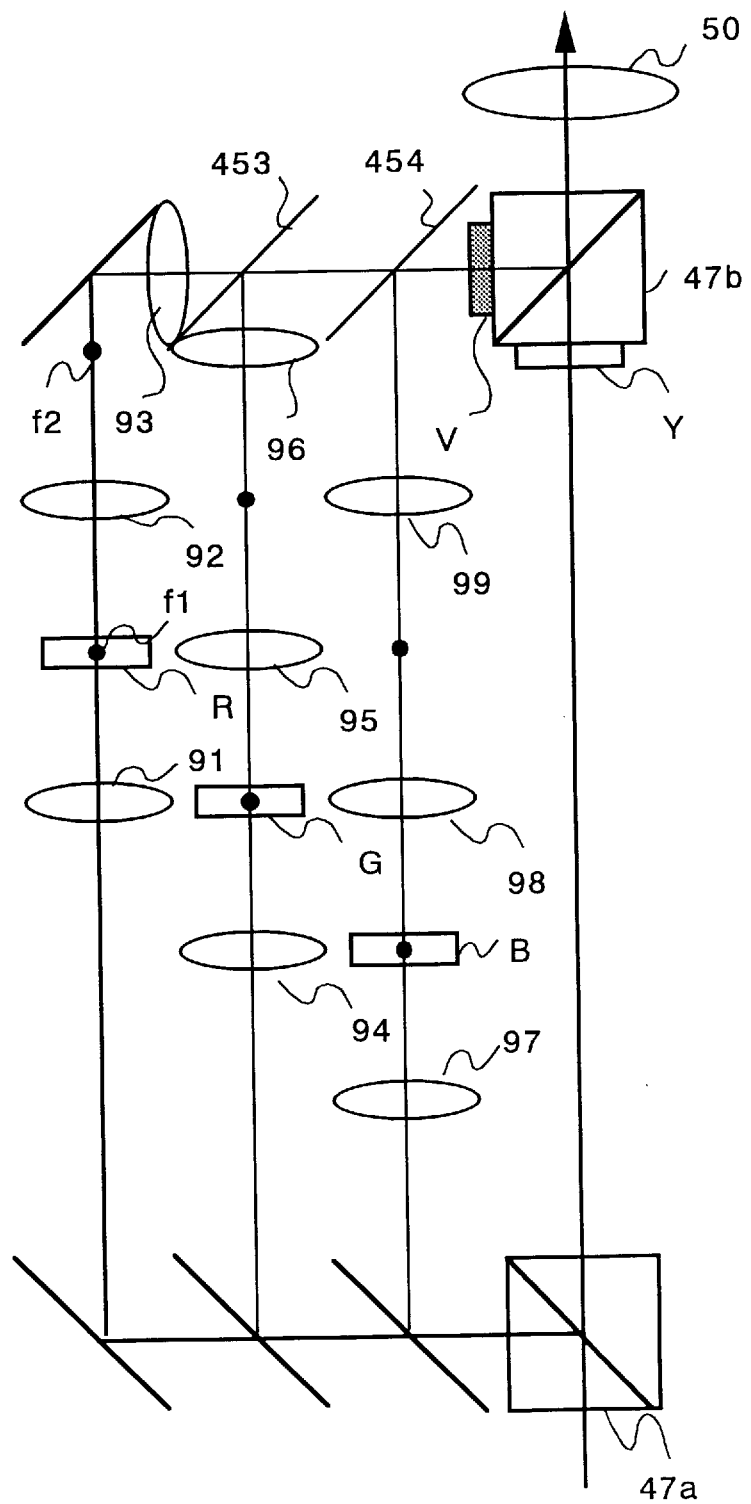
FIG. 103 shows another configuration of a liquid crystal projector wherein a cross dichroic mirror is not used, in the present invention.

As shown in FIG. 103, it is also acceptable to install the polarization beam splitter 47a, the liquid crystal panel Y for luminance, the polarization beam splitter 47b and the projection lens 50 along the direction of directly advancing light. Since the optical path lengths of the three liquid crystal panels for color are different, it is desirable to make the optical path lengths be equivalent, by using the box (not shown) filled with the liquid having the refractive index n.

The case of the liquid crystal panel for luminance being used in the liquid crystal projector has been described with reference to FIGS. 98 to 103. It is also acceptable to install the second liquid crystal panel for second green as shown in FIGS. 68 to 77.

Figure 104:
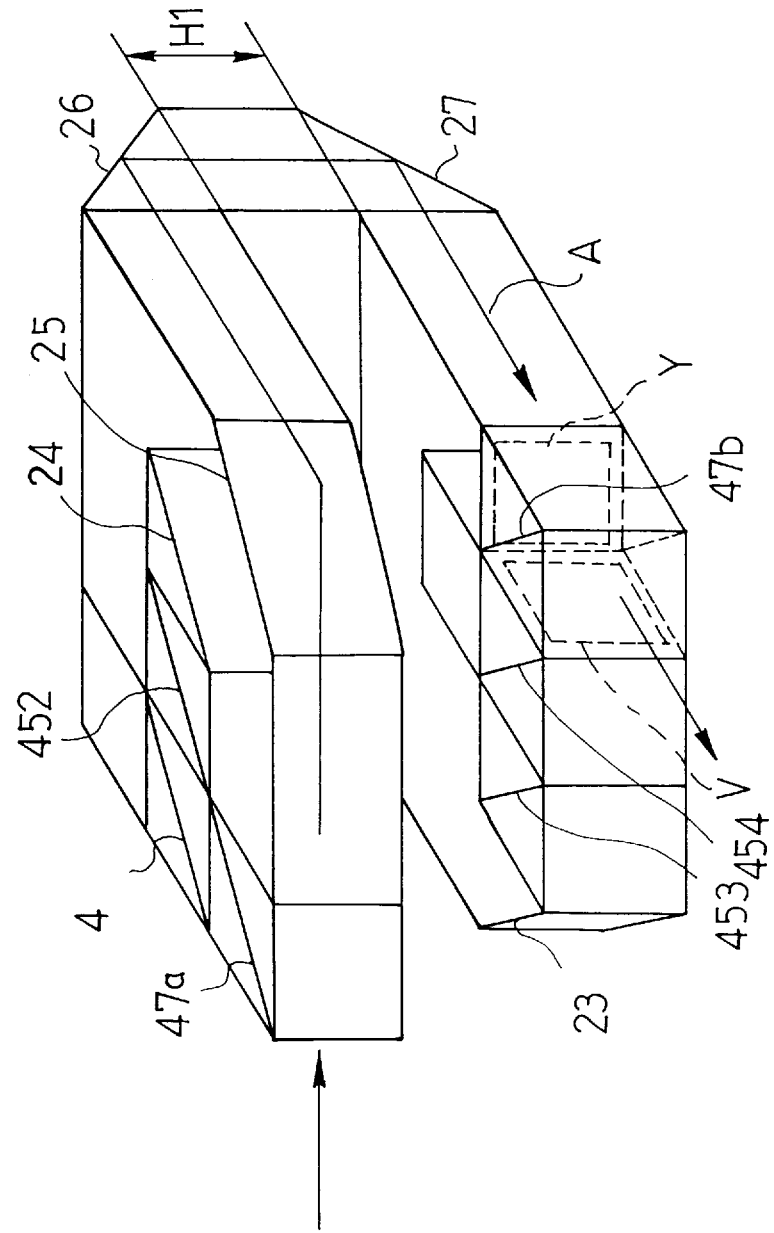
FIG. 104 shows a liquid crystal projector which is bending like a letter U, in the present invention.

FIG. 104 shows a configuration wherein the liquid crystal projector shown in FIG. 98 is bending like a letter U. Since the optical path is bending like the letter U, the reflecting mirrors 26 and 27 are added. It is possible to make the length of the liquid crystal projector be about half of the length of FIG. 98, by applying the configuration of the letter U to the liquid crystal projector. The optical path length can be changed and the lens can be flexibly selected, by adjusting the height of the spacer H1. In addition, locating the light source, the projection lens and other components can be flexibly performed.

Figure 105:
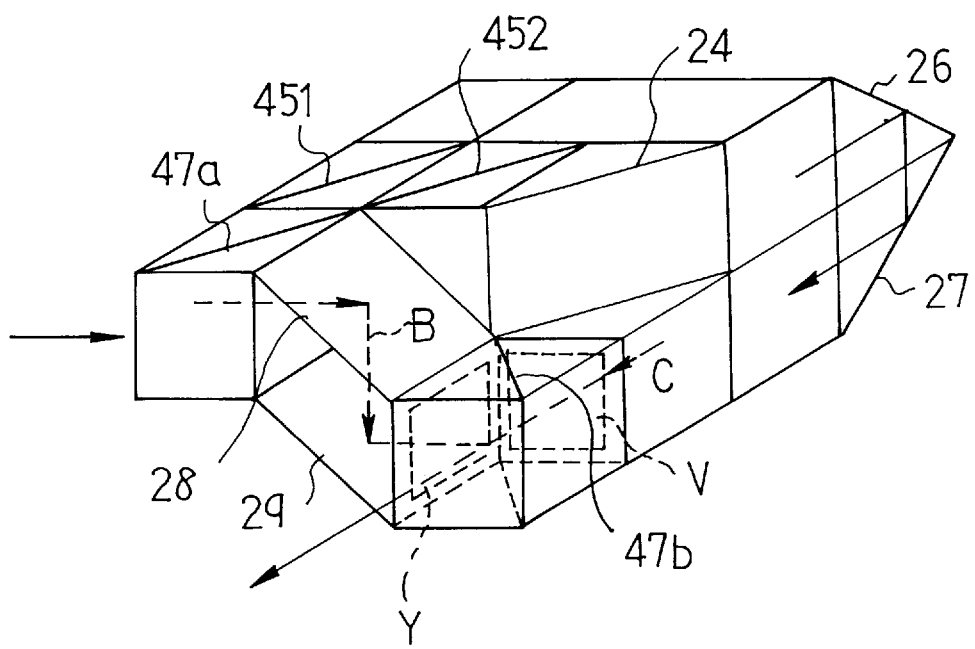
FIG. 105 shows a bending liquid crystal projector of the present invention.

FIG. 105 shows another example of the configuration wherein the liquid crystal projector is bending. In the liquid crystal projector like the letter U of FIG. 104, though the polarization beam splitters 47a and 47b are close each other, the optical path length up to the liquid crystal panel for luminance is long, as shown by an arrow A in FIG. 104. In FIG. 105, the optical path length of light inputting into the liquid crystal panel for luminance is made to be the shortest, by installing the reflecting mirrors 28 and 29 between the polarization beam splitters 47a and 47b. Light transmitted through the polarization beam splitter 47a is reflected at the reflecting mirrors 28 and 29, transmitted through the liquid crystal panel for luminance, and input into the polarization beam splitter 47b, as shown by an arrow B. The polarization beam splitter 47b synthesizes images, which come from the liquid crystal panel for color and the liquid crystal panel for luminance along an arrow C, and outputs the synthesized image.

Though not shown, it is also acceptable to bend the liquid crystal projector of FIG. 103 like the letter U as shown in FIGS. 104 and 105. When the liquid crystal projector of FIG. 103 is bent like the letter U, the polarization beam splitter 47a, the liquid crystal panel for luminance and the polarization beam splitter 47b can be installed along the direction of advancing light.

Some examples of the liquid crystal projector, wherein the cross dichroic mirror is not used because the image forming position V is provided on the side of the polarization beam splitter 47b, have been described with reference to FIGS. 98 to 105. As stated above, the cross dichroic mirror is expensive and has characteristic disadvantages. The relay lens has two roles, one is forming the image of the liquid crystal panel for color on the image forming position V, and the other is equalizing the size of the image of the liquid crystal panel for color with that of the liquid crystal panel for luminance.

In the configurational examples in FIGS. 98 to 102, lengths from each of the three liquid crystal panels for color to the image forming position V are all equal. In addition, the number of the lenses and kinds of lenses, existed between the liquid crystal panels for color and the image forming position V, are all the same. Distances, in the liquid of the refractive index n, wherethrough the light is transmitted, are also the same. Accordingly, color adjusting and position adjusting can be accurately and easily performed. The polarization processing part, including the polarization beam splitters 47a and 47b and the liquid crystal panel for luminance, exists in FIGS. 98 to 105. It is also acceptable that no polarization processing part exists.

Figure 106:
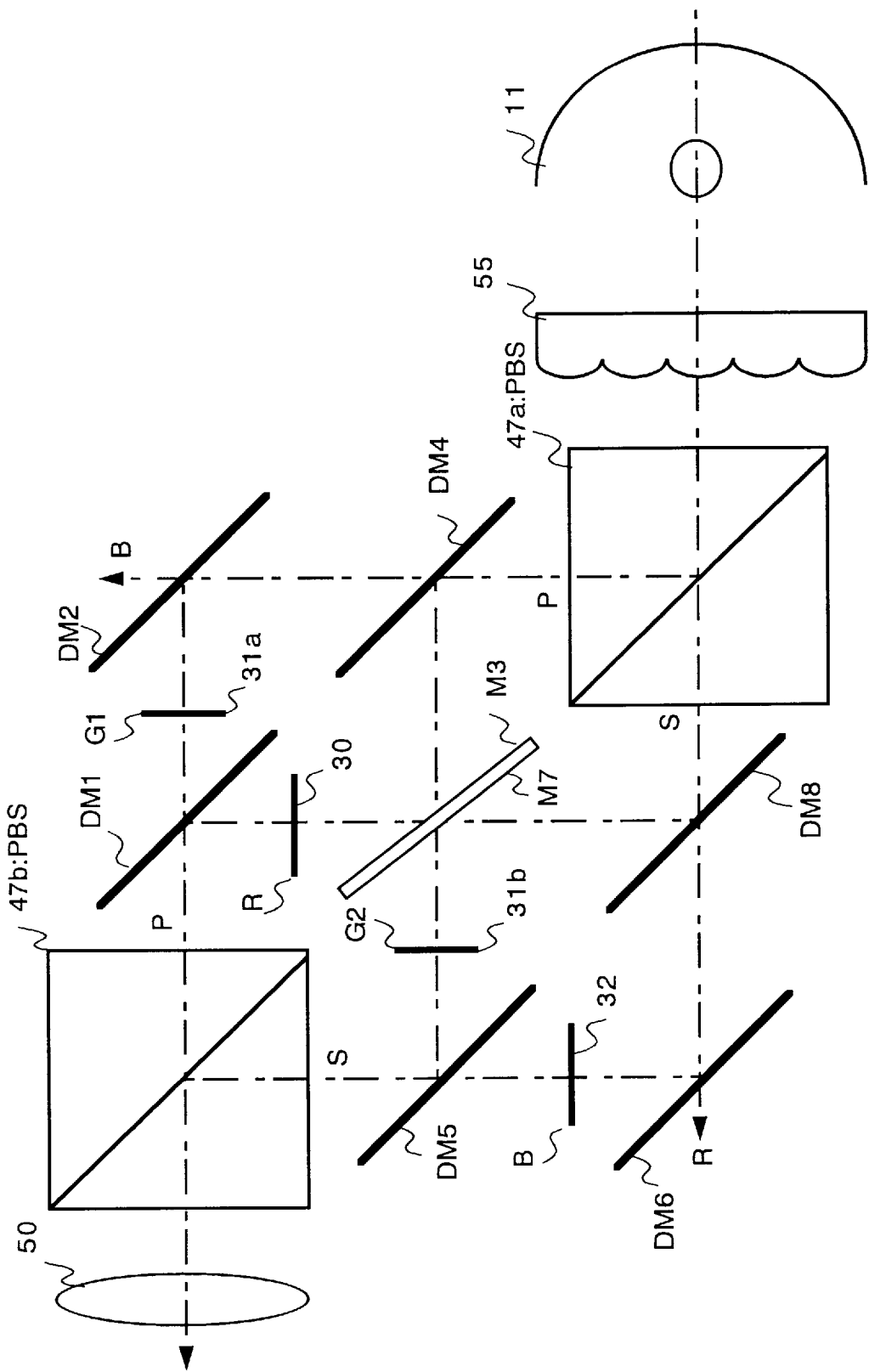
FIG. 106 shows a configuration of a liquid crystal projector wherein a cross dichroic mirror is not used, in the present invention.

FIG. 106 shows another configuration of the liquid crystal projector. The cross dichroic mirror is not used in the liquid crystal projector of FIG. 106. In FIG. 106, DM1 denotes the dichroic mirror for transmitting green light and reflecting red light, DM2 denotes the one for transmitting blue light and reflecting green light, DM4 denotes the one for transmitting blue and green light and reflecting red light, DM5 for transmitting blue light and reflecting green light, DM6 for transmitting red light and reflecting blue light, DM8 for transmitting red and blue light and reflecting green light, and M3 and M7 denote the reflecting mirrors.

By applying the configuration of FIG. 106 to the liquid crystal projector, green light can be input and modulated in the first and second liquid crystal panels 31a and 31b for green, red light can be input and modulated in the liquid crystal panel 30 for red, and blue light can be input and modulated in the liquid crystal panel 32 for blue. In addition, output light from the first liquid crystal panel 31a for green and the liquid crystal panel 30 for red are synthesized by the dichroic mirror DM1, and input into the polarization beam splitter 47b. On the other hand, output light from the second liquid crystal panel 31b for green and the liquid crystal panel 32 for blue are synthesized by the dichroic mirror DM5 and input into the polarization beam splitter 47b.

The dichroic mirror DM2 transmits the blue light and the dichroic mirror DM6 transmits the red light. Unnecessary light is abandoned in the above way.

A feature of the present embodiment is that four liquid crystal panels are divided into pairs. Since the liquid crystal panels are divided into groups assembled by even liquid crystal panels (assembled by two, in this example), the cross dichroic mirror is dispensable. When it is necessary to synthesize three color lights, one cross dichroic mirror can be used for synthesizing or two dichroic mirrors directly allocated can be used for synthesizing. As the liquid crystal panels are divided into pairs as shown in FIG. 106, it is not necessary to use the cross dichroic mirror nor to directly allocate the two dichroic mirrors.

Namely, there is one dichroic mirror and one polarization beam splitter only in each optical path between each of the four liquid crystal panels and the projection lens. Therefore, it is possible to make the distances between the projection lens and the liquid crystal panels be equal and short. A large image can be projected on the screen by shortening the distance between the projection lens and the liquid crystal panel.

The first and second liquid crystal panels 31a and 31b for green are offset by a half pixel along the length of the image. By locating the liquid crystal panel at the position shifted by a half pixel along the image length as stated above, an image lengthwise having double resolution can be generated. The details about this has been already described in Embodiment 5. Although not stated in Embodiment 5, it is also acceptable to widthwise make resolution of the first and second liquid crystal panels 31a and 31b for green higher than that of the liquid crystal panels 30 and 32 for red and blue. Namely, it can be supposed that the resolution for width-direction of the first and second liquid crystal panels 31a and 31b for green are 800 dots and that of the liquid crystal panels 30 and 32 for red and blue are 400 dots. By applying the above, a green image formed by the first and second liquid crystal panels 31a and 31b has the resolution, for both length-direction and width-direction, twice as much as that of an image formed by the liquid crystal panels 30 and 32 for red and blue.

In FIG. 106, the image from the first liquid crystal panel 31a for green is transmitted through the dichroic mirror DM1 and input into the polarization beam splitter 47b. On the other hand, the image from the liquid crystal panel 30 for red is reflected at the dichroic mirror DM1 and input into the polarization beam splitter 47b. Therefore, when the images from the first liquid crystal panel 31a for green and the liquid crystal panel 30 for red are input into the polarization beam splitter 47b, the images are reversed with respect to right and left. It is necessary to adjust a signal circuit in order to output images, which have been reversed in advance with respect to right and left, from the first liquid crystal panel 31a for green or the liquid crystal panel 30 for red. It is also necessary to adjust the signal circuit in order to output the images which have been reversed in advance with respect to right and left, from the second liquid crystal panel 31b for green or the liquid crystal panel 32 for blue.

Figure 107:
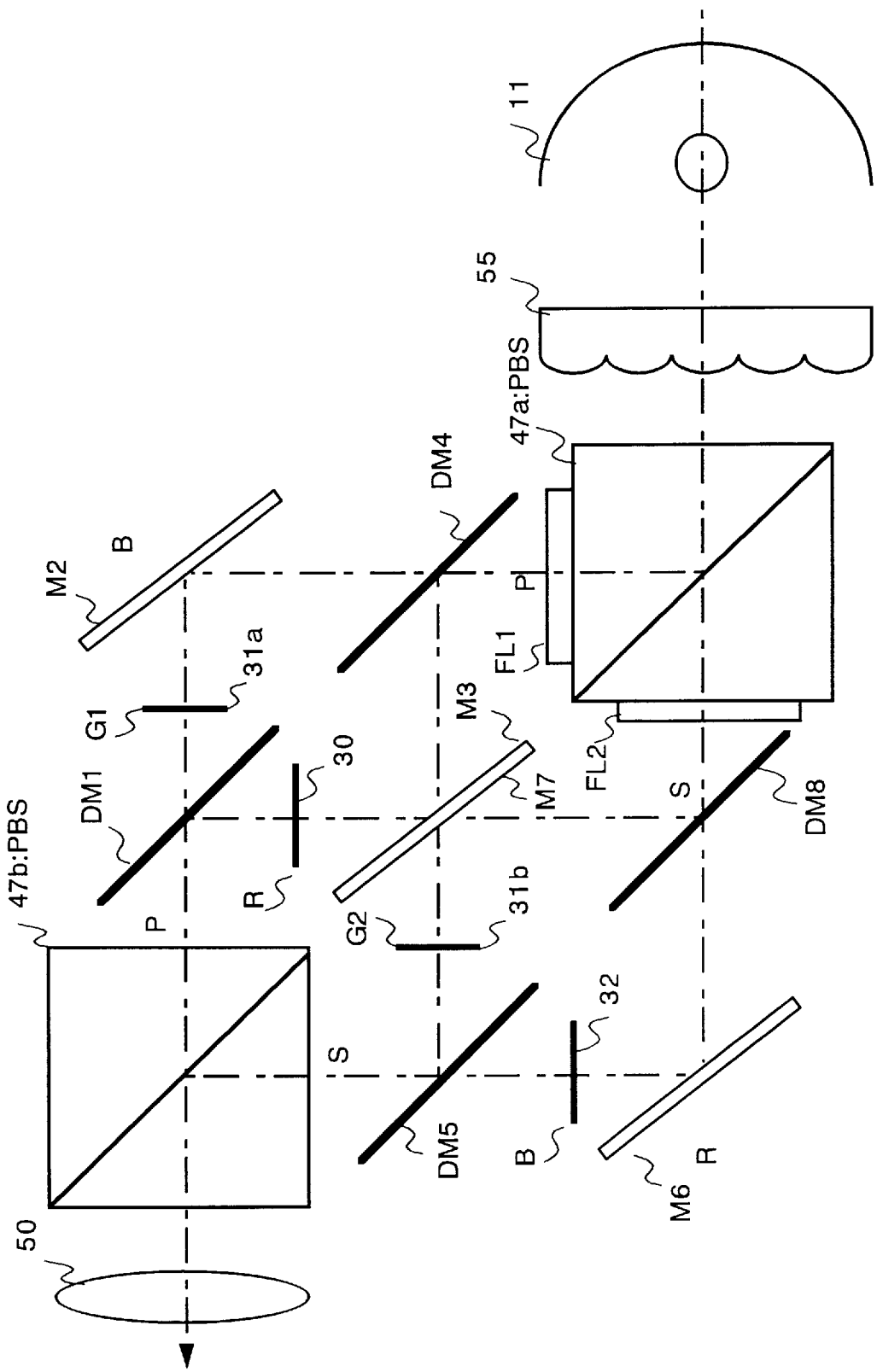
FIG. 107 shows another configuration of a liquid crystal projector wherein a cross dichroic mirror is not used, in the present invention.

FIG. 107 shows another configuration of the liquid crystal projector. The respect that reflecting mirrors M2 and M6 are used in FIG. 107 instead of the dichroic mirrors DM2 and DM6, differs from the liquid crystal projector shown in FIG. 106. The respect that filters FL1 and FL2 are installed on the sides of the polarization beam splitter 47a in FIG. 107 also differs from FIG. 106. The filter FL1 is for reflecting blue light and the filter FL2 is for reflecting red light. Since unnecessary light is reflected by using the filters FL1 and FL2, the reflecting mirrors M2 and M6 can be used instead of the dichroic mirrors DM2 and DM6 of FIG. 106.

Figure 108:
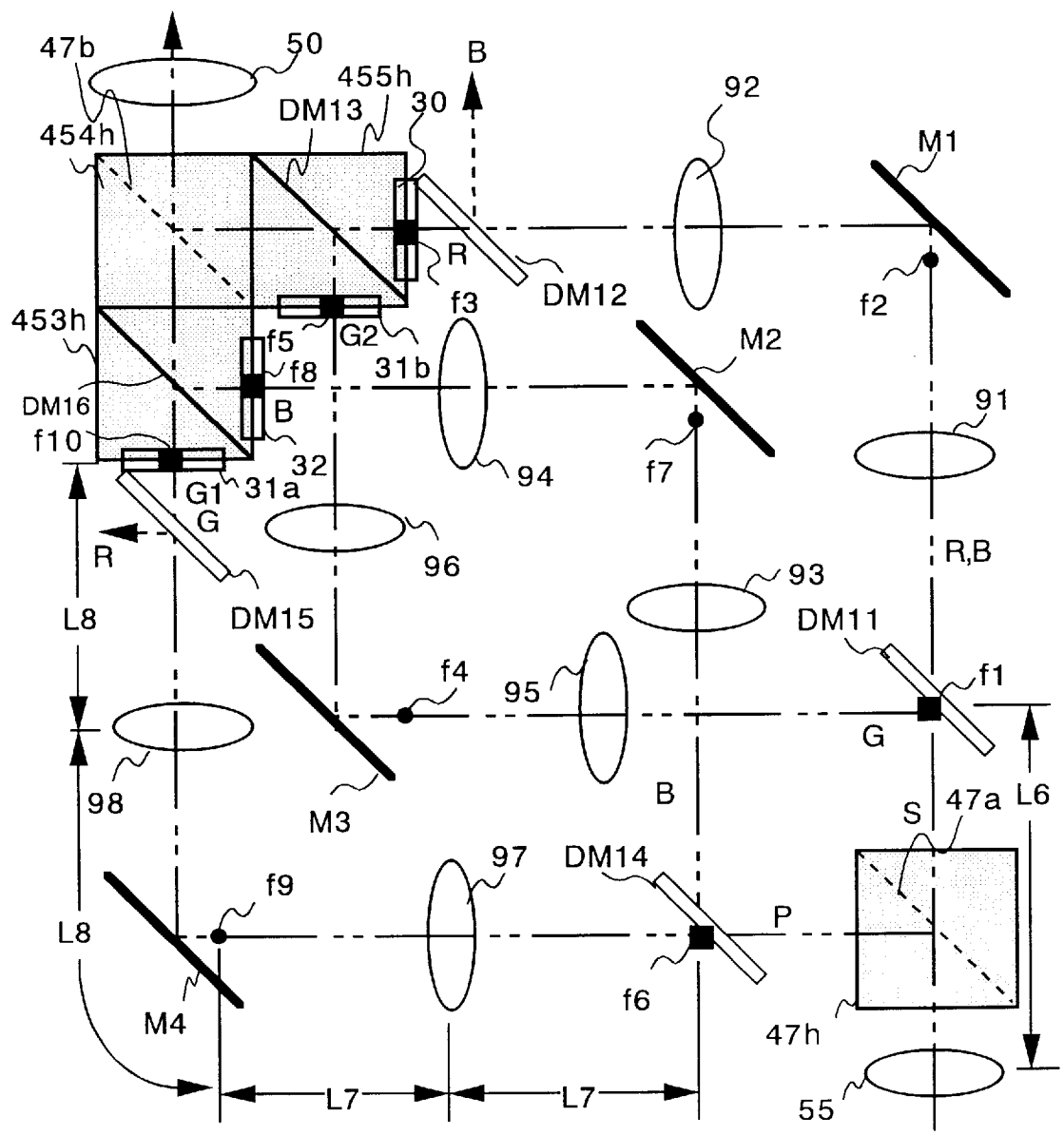
FIG. 108 shows another configuration of a liquid crystal projector of the present invention.

FIG. 108 shows another configuration of the liquid crystal projector. FIG. 108 also shows the case of the liquid crystal projector wherein the cross dichroic mirror is not used. Dichroic mirrors DM11 to DM16, reflecting mirrors M1 to M4, the relay lenses 91 to 98 and focuses f1 to f10 of the relay lenses are shown in FIG. 108. The focuses f1 to f10 are also common focuses of each lens in the present embodiment. For instance, the focus f6 is the common focus of the lens 55 and the relay lens 97. The focus f9 is the common focus of the relay lenses 97 and 98. The focus f10 is the common focus of the relay lens 98 and the projection lens 50. The liquid crystal panels 30, 31a, 31b and 32 are installed at the sides of the boxes 453h and 455h. The boxes 453h and 455h are filled with the liquid whose refractive index is n (n>=1). The dichroic mirrors DM13 and DM16 are soaked in the liquid. The polarization beam splitter 47b is also soaked in the liquid having refractive index n in the box 454h.

It is possible to practically shorten the distances between the projection lens 50 and each of the liquid crystal panels 30, 31a, 31b and 32, by filling the boxes 453h, 454h and 455h with the liquid whose refractive index is n. Namely, an equivalent allocation to the case that the liquid crystal panel is located close to the projection lens can be obtained, and a magnified image can be generated on the screen. The dichroic mirror DM12 reflects blue light and the dichroic mirror DM15 reflects red light. Unnecessary light is removed by the dichroic mirrors DM12 and DM15. Focal length of the relay lens 97 is L7, and the focal length of the relay lens 98 is L8. It is acceptable that a value of the focal length L7 is equal to that of the focal length L8.

Figure 109:
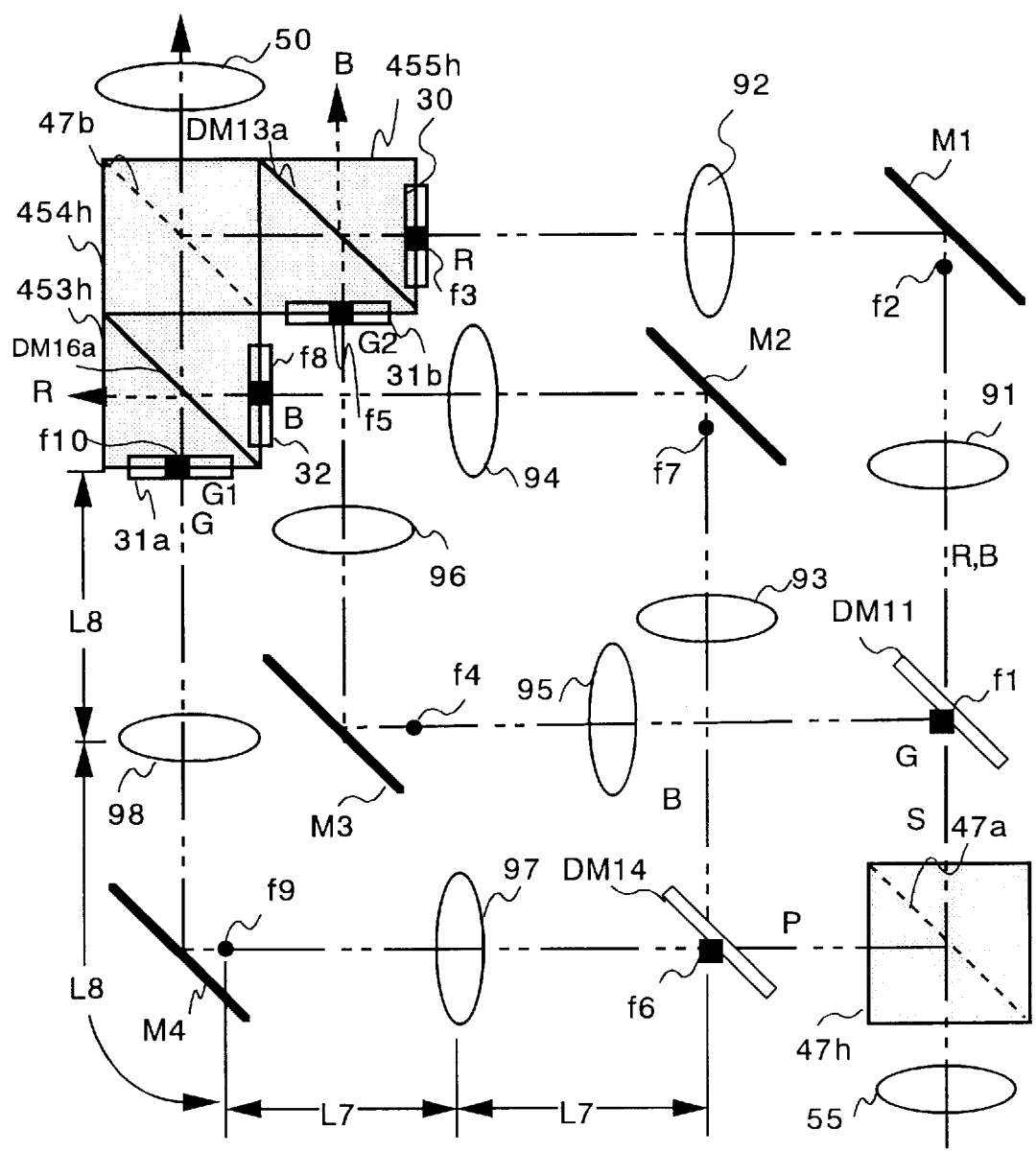
FIG. 109 shows another configuration of a liquid crystal projector of the present invention.

FIG. 109 shows another configuration of the liquid crystal projector. The respect that functions of the dichroic mirrors DM12 and DM15 are included by the dichroic mirrors DM13a and DM16a in FIG. 109 differs from the liquid crystal projector of FIG. 108. The dichroic mirror DM13a synthesizes red light and green light, and reflects blue light. The dichroic mirror DM16a synthesizes blue light and green light, and reflects red light. Therefore, the numbers of the dichroic mirrors can be reduced in the case of FIG. 109.

Figure 110:
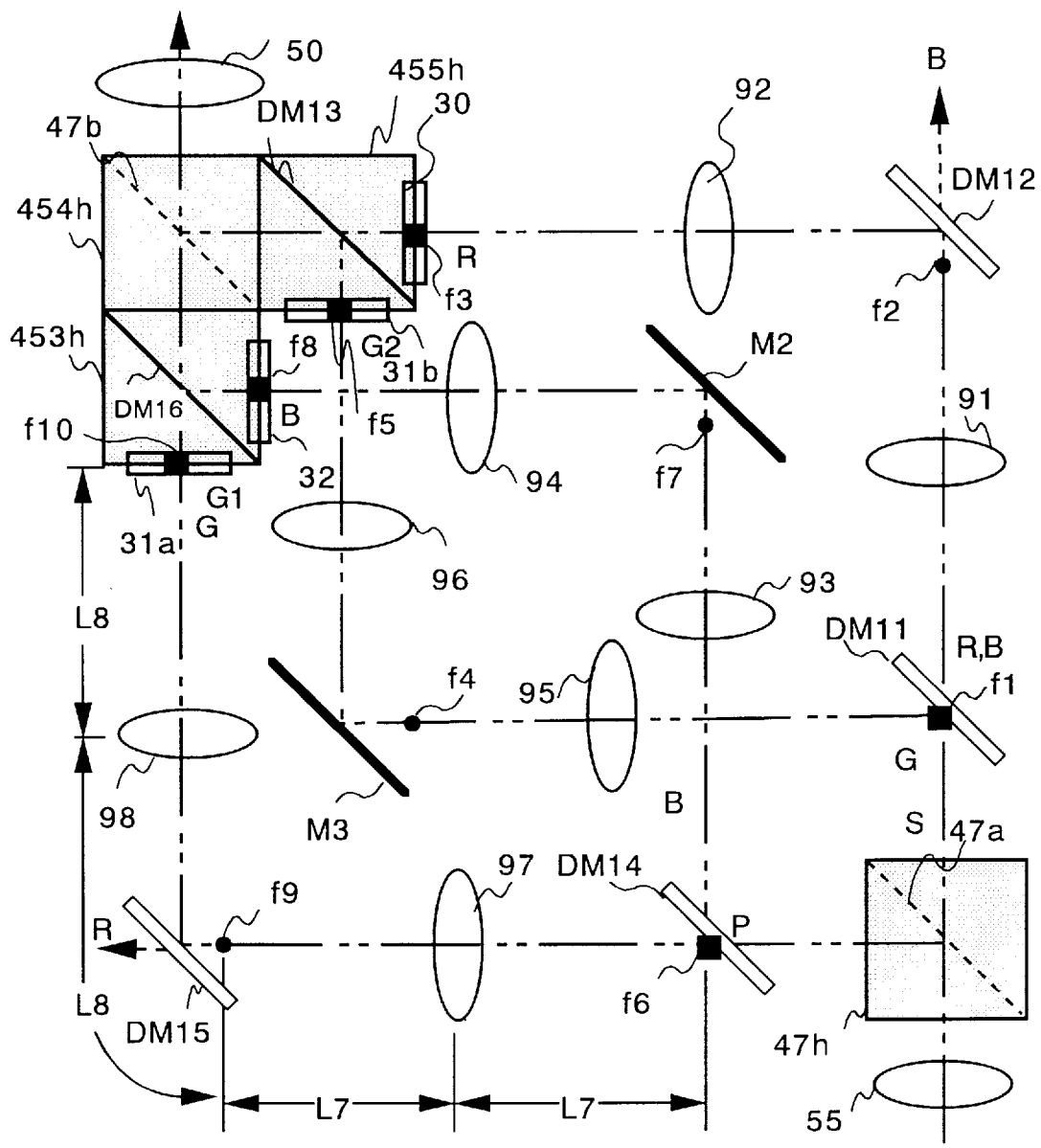
FIG. 110 shows another configuration of a liquid crystal projector of the present invention.

FIG. 110 shows another configuration of the liquid crystal projector. In FIG. 110, the respect that the dichroic mirror DM12 is moved to be located at the position of the reflecting mirror M1 of FIG. 108 and to be substituted for the reflecting mirror M1 differs from the liquid crystal projector of FIG. 108. The respect that the dichroic mirror DM15 is moved to be located at the position of the reflecting mirror M4 of FIG. 108 and to be substituted for the reflecting mirror M4 also differs from the liquid crystal projector of FIG. 108. Since the optical path can be changed and unnecessary light can be removed by using the dichroic mirror as stated above, it is possible to take the reflecting mirror away, which reduces the number of the components.

Embodiment 8

Figure 111:
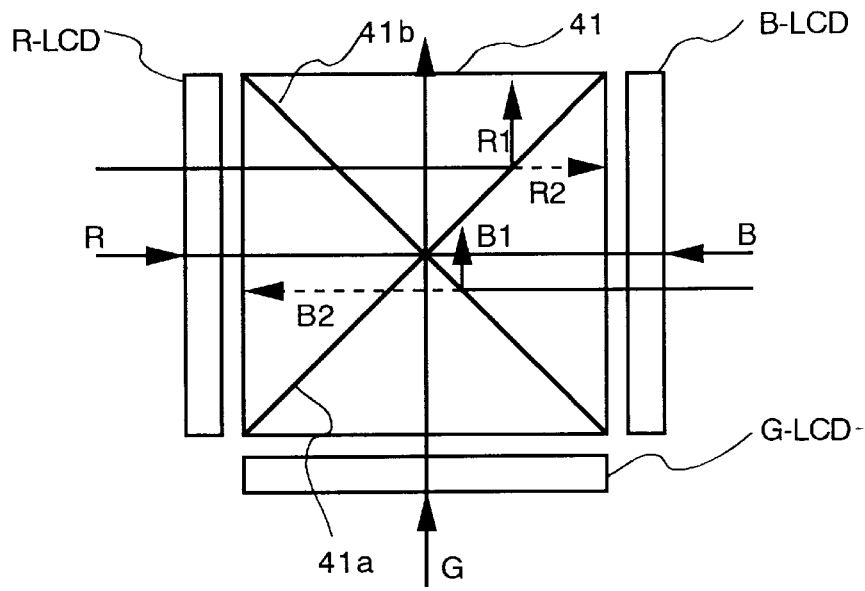
FIG. 111 illustrates a problem in the case of a cross dichroic mirror being used, in the present invention.

The case that the liquid crystal panels are installed on the sides of the cross dichroic mirror 41 such as the case of FIG. 111 has been described in the above embodiments. When the liquid crystal panels are installed on the both sides of the cross dichroic mirror, lights R2 and B2, which have not been reflected at the dichroic mirrors 41a and 41b, are projected on the backsides of the liquid crystal panels located at the opposite sides of the cross dichroic mirror.

Figure 112:
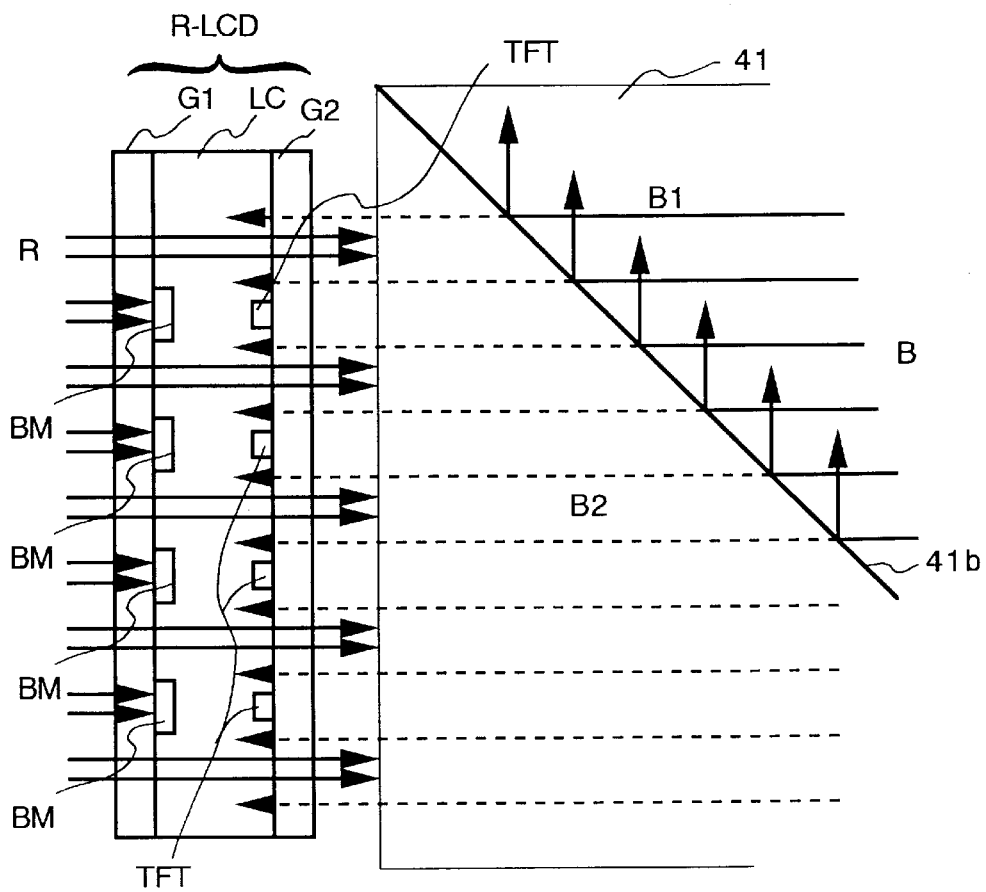
FIG. 112 illustrates a problem in detail in the case of a cross dichroic mirror being used, in the present invention.
Figure 113:
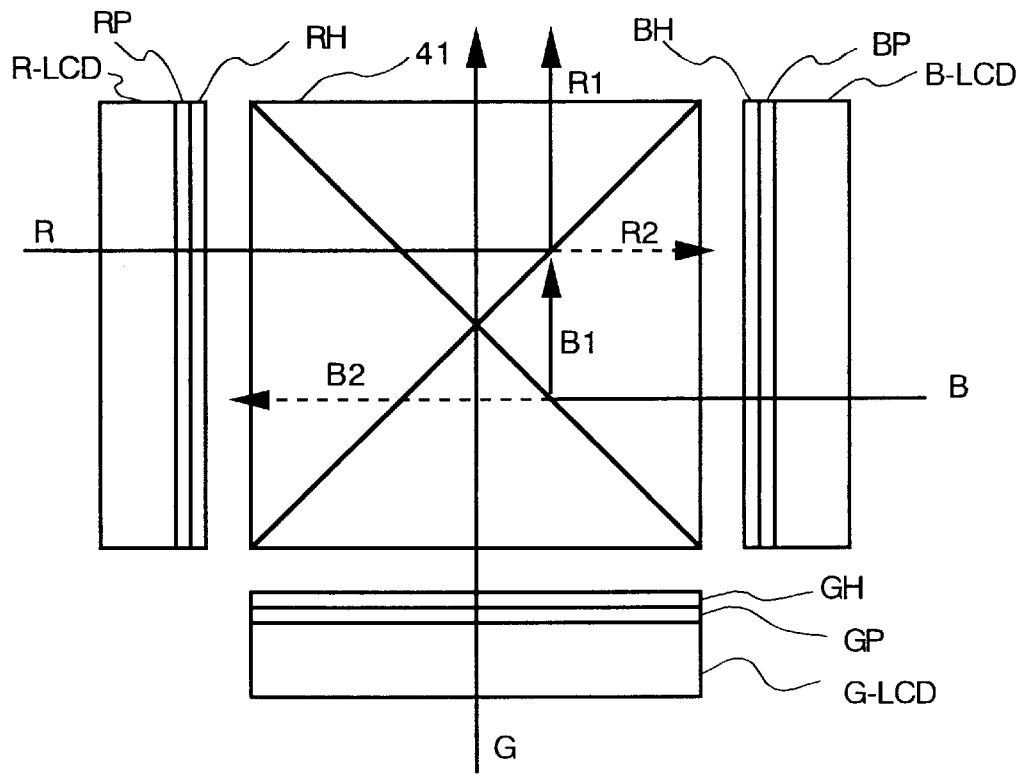
FIG. 113 shows a configuration wherein a cross dichroic mirror, a ¼ wavelength plate and a polarization film are used, in the present invention.

FIG. 112 shows the case that light is input into the liquid crystal panel for red from the backside of the panel. The liquid crystal panel is composed of liquid crystal LC and glass plates G1 and G2. The liquid crystal LC is enclosed between the glass plates G1 and G2. The liquid crystal LC is operated by the thin film transistor TFT. A black matrix BM is installed at light input side so that the thin film transistor TFT can not be misoperated. The black matrix BM has a configuration for blocking the input light and keeping the thin film transistor to have accurate operation. The black matrix BM is valid for input light direction, but can not block light coming from the backside of the liquid crystal panel. As shown in FIG. 112, most of blue light B is reflected as light B1 at the dichroic mirror 41b of the cross dichroic mirror 41, but a part of the blue light B is transmitted through the dichroic mirror 41b as light B2. The transmitted light B2 is input into the liquid crystal panel for red from the backside of the panel and transmitted through the glass plate G2 to project the thin film transistor TFT. A configuration shown in FIG. 113 is contrived to prevent the above disadvantage. ¼ wavelength plates RH and BH are installed between the cross dichroic mirror and each of the liquid crystal panels. Polarization films RP and BP are applied on the liquid-crystal-panel-sides of the ¼ wavelength plates RH and BH. The lights R2 and B2 transmitted through the dichroic mirror can be blocked by installing the ¼ wavelength plate and the polarization film.

Figure 114:
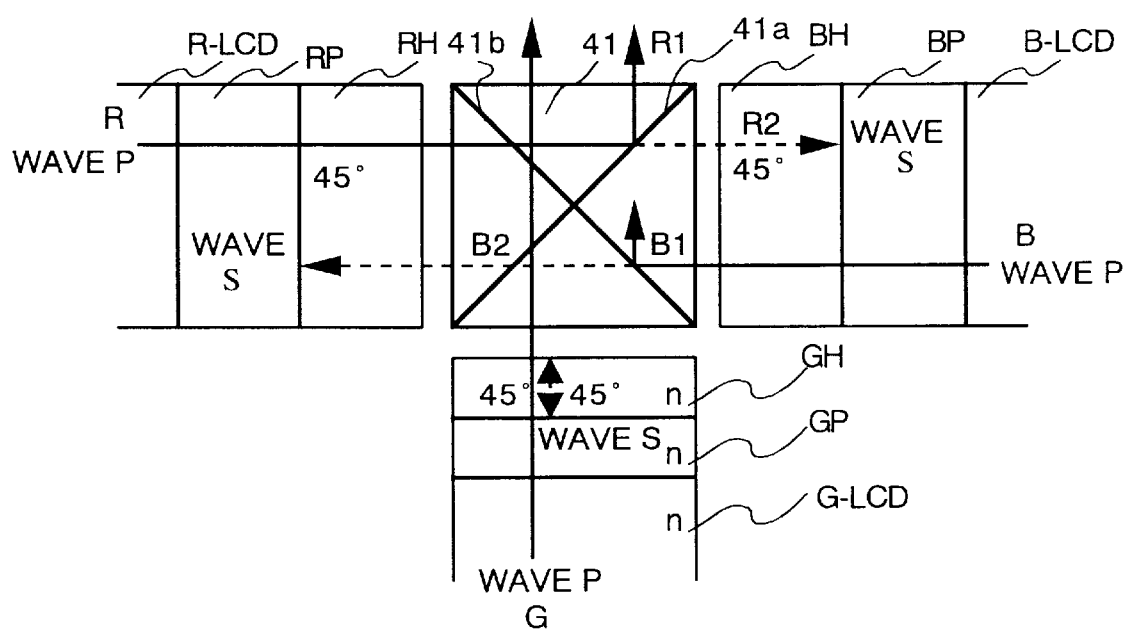
FIG. 114 shows operation of a cross dichroic mirror, a ¼ wavelength plate and a polarization film, in the present invention.

FIG. 114 shows operation of the above. It is supposed in FIG. 114 that blue light uses the wave P, and the polarization films RP and BP transmit the wave P but block the wave S. The wave P, transmitted through the liquid crystal panel for blue, is transmitted through the polarization film BP and the ¼ wavelength plate BH. The wave P is changed to elliptical polarizing light from direct polarizing light by being transmitted through the ¼ wavelength plate. Most of the light transmitted through the ¼ wavelength plate BH is reflected at the dichroic mirror 41b of the cross dichroic mirror 41, and output as the light B1. The light B2 transmitted through the dichroic mirror 41b is input into the ¼ wavelength plate RH, and changed from the elliptical polarizing light to the direct polarizing light by the ¼ wavelength plate RH. The axis for phase characteristic of the ¼ wavelength plate BH is at 90 degrees with respect to the axis for phase characteristic of the ¼ wavelength plate RH. Accordingly, the light B2 becomes the wave S after being transmitted through the ¼ wavelength plate RH. Since the polarization film RP transmits the wave P and blocks the wave S, the light B2 does not reach the liquid crystal panel for red.

As stated above, since the light is transmitted through the ¼ wavelength plate twice, the wave P is polarized to be the wave S, and the wave S is blocked by the polarization film. Thus, inputting the light from the backside of the liquid crystal panel can be prevented. Namely, inputting the light from the backside can be prevented by installing the ¼ wavelength and the polarization film on the liquid crystal panels located at the both sides of the cross dichroic mirror.

The case of the liquid crystal panel for green will now be explained with reference to FIG. 114. It is desirable to install a polarization film GP and a ¼ wavelength plate GH for the liquid crystal panel for green. As shown in FIG. 114, it is supposed that the liquid crystal panel for green, the polarization film GP and the ¼ wavelength plate GH are structured by a material whose refractive index is n. Since all the refractive indexes are the same, the light proceeds, without being reflected, at each border of the liquid crystal panel, the polarization film GP and the ¼ wavelength plate GH. However, when the light is output to the air from the ¼ wavelength plate GH, reflecting light is generated as shown by the arrow, since the refractive indexes of the air and the ¼ wavelength plate GH are different. When the reflecting light is input into the polarization film GP, the wave P has been already polarized to be the wave S because the light had been transmitted through the ¼ wavelength plate GH twice. Therefore, the reflecting light can not be input into the liquid crystal panel for green since the polarization film GP blocks the wave S.

Figure 115:
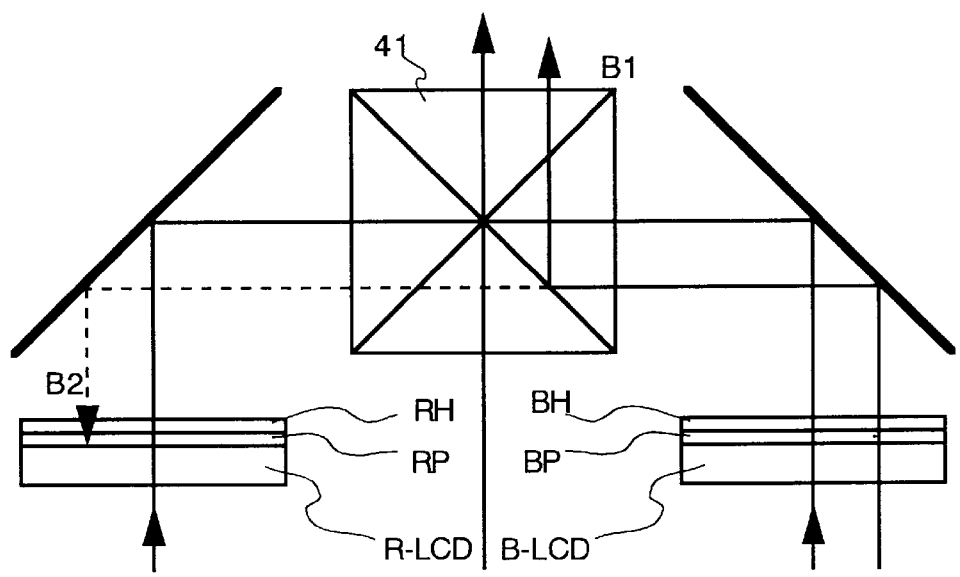
FIG. 115 shows another example of the case that a ¼ wavelength plate and a polarization film are used, in the present invention.

FIG. 115 shows the case that the liquid crystal panel is not directly located at the side of the cross dichroic mirror. Though the reflecting mirror is located between the cross dichroic mirror 41 and the liquid crystal panel in FIG. 114, inputting the light into the thin film transistor can be prevented by installing the ¼ wavelength plate and the polarization film as stated above.

Figure 116:
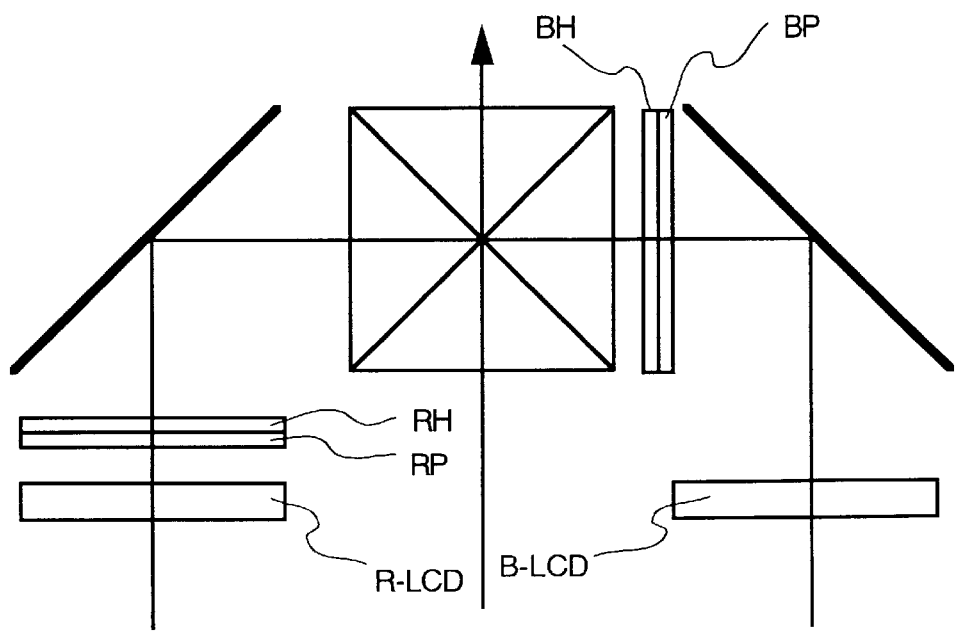
FIG. 116 shows another example of the case that a ¼ wavelength plate and a polarization film are used, in the present invention.
Figure 117:
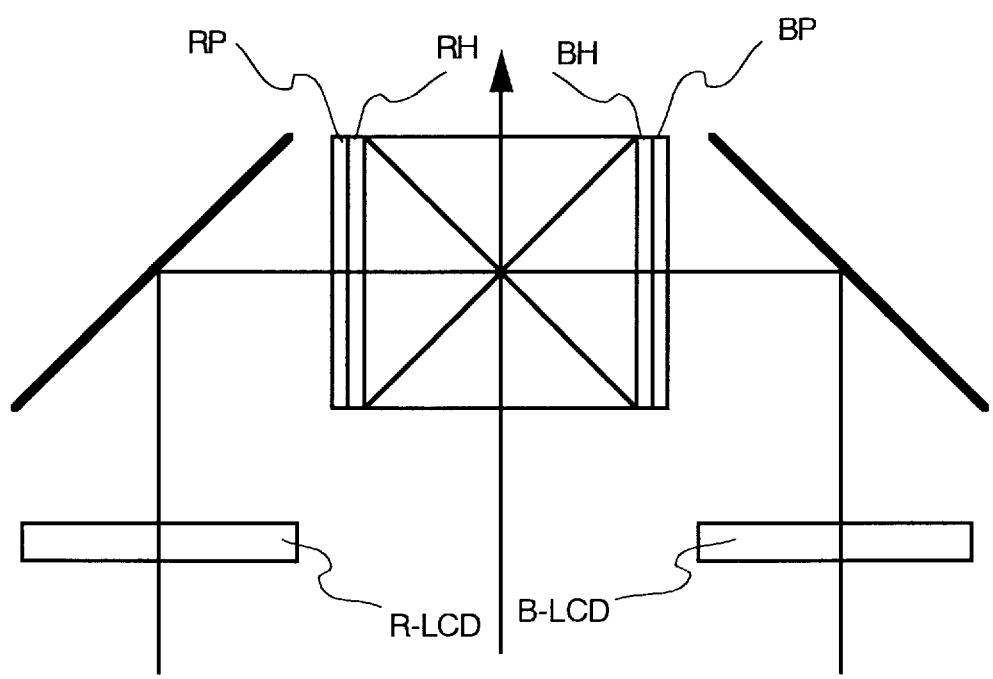
FIG. 117 shows another example of the case that a ¼ wavelength plate and a polarization film are used, in the present invention.

FIG. 116 shows another configuration wherein the polarization film and the ¼ wavelength plate are located away from the liquid crystal panel. Although not shown, it is also acceptable to separately locate the polarization film and the ¼ wavelength plate. It is also acceptable to locate only the polarization film and the ¼ wavelength plate on the both sides of the cross dichroic mirror as shown in FIG. 117.

Figure 118:
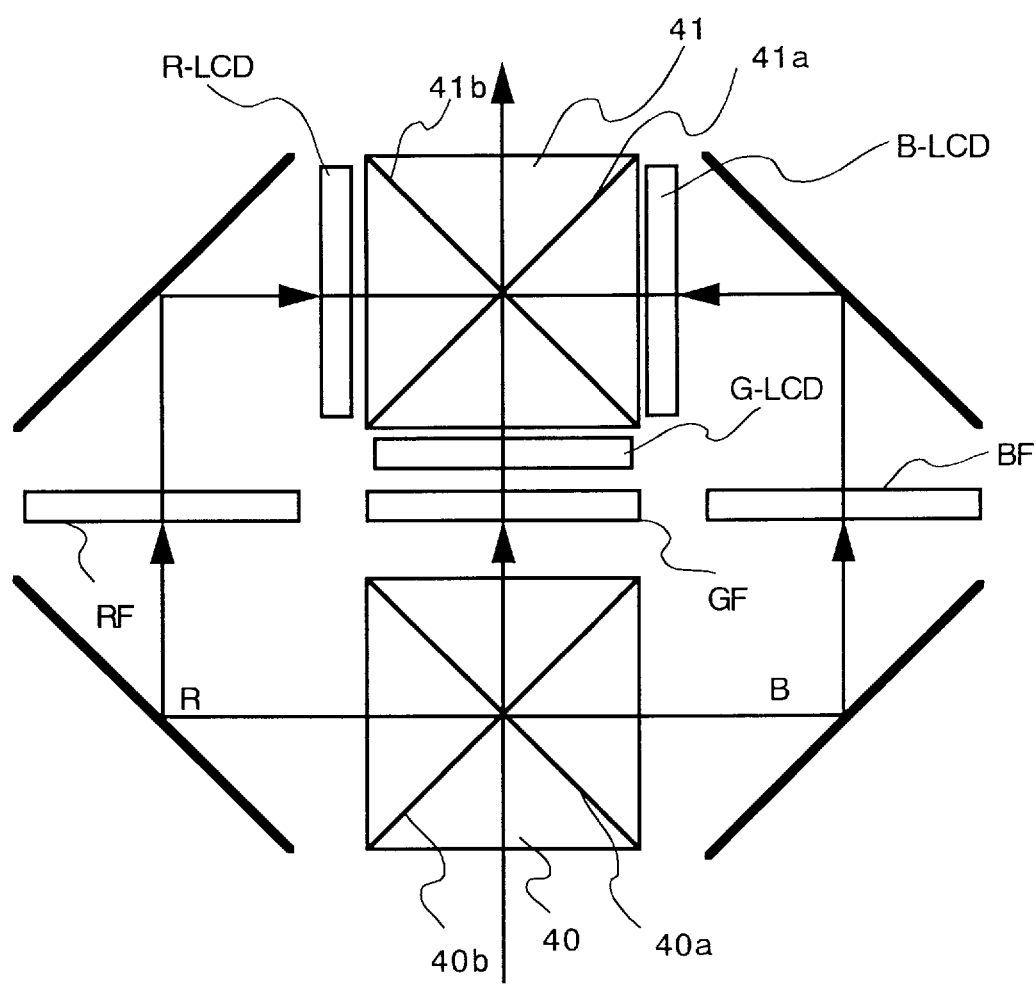
FIG. 118 shows a configuration of a cross dichroic mirror and a filter, in the present invention.

FIG. 118 shows the case that a filter is used for preventing the light from being input from the backside of the liquid crystal panel. The cross dichroic mirror 40 separates the light, and the cross dichroic mirror 41 synthesizes the light, in the liquid crystal projector shown in FIG. 118. There is the case that a characteristic of the dichroic mirror 40a used in the cross dichroic mirror 40 is different from that of the dichroic mirror 41a used in the cross dichroic mirror 41. There is another case that a characteristic of the dichroic mirror 40b differs from that of the dichroic mirror 41b. Therefore, only signals whose frequency is adapted to the characteristic of the cross dichroic mirror 41 are filtered by filters RF, GF and BF. By this procedure, the light transmitted through the dichroic mirrors 41a and 41b and input into the liquid crystal panel from the backside can be reduced.

Figure 119:
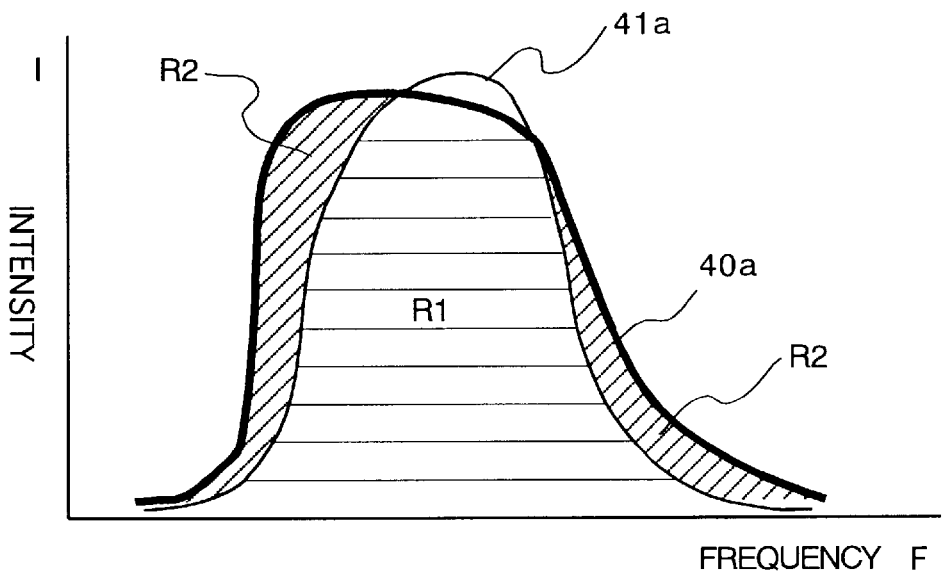
Figure 120:
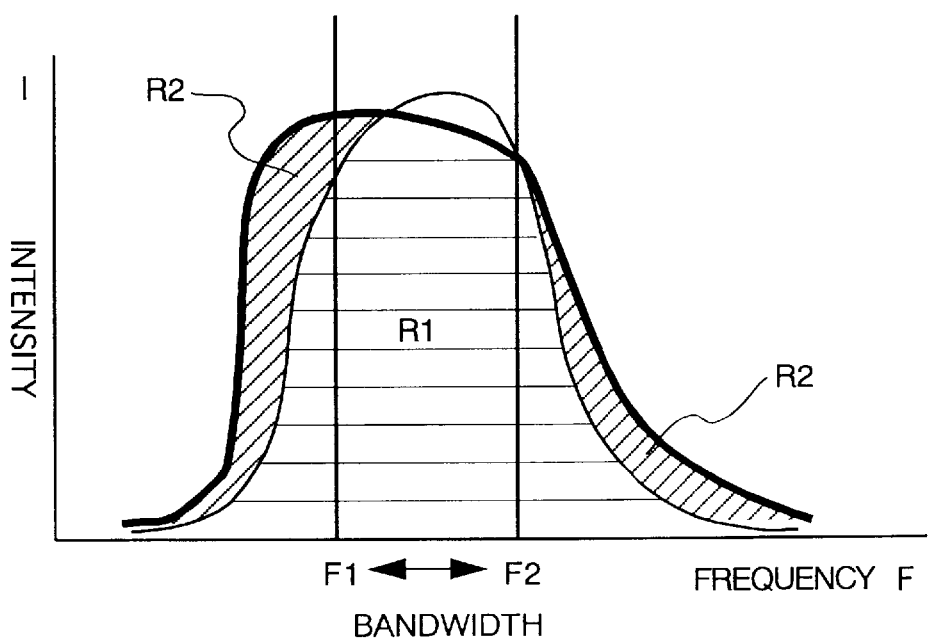
Figure 121:
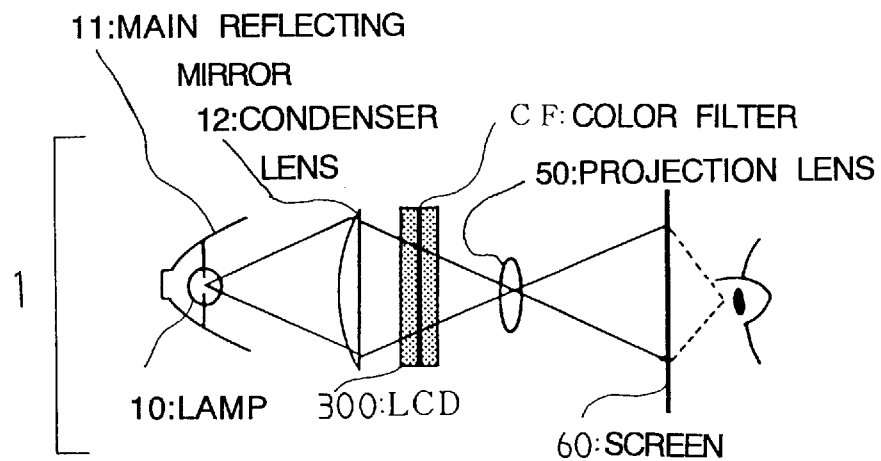
Figure 122:
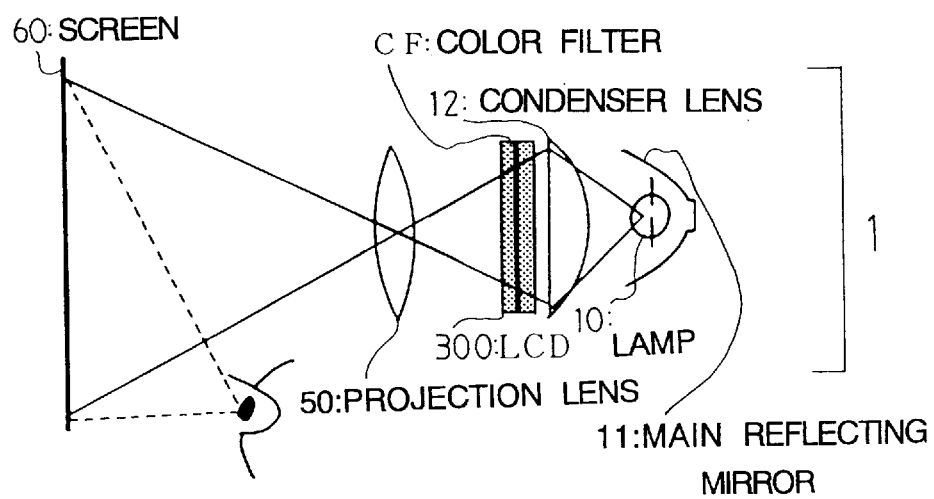
Figure 123:
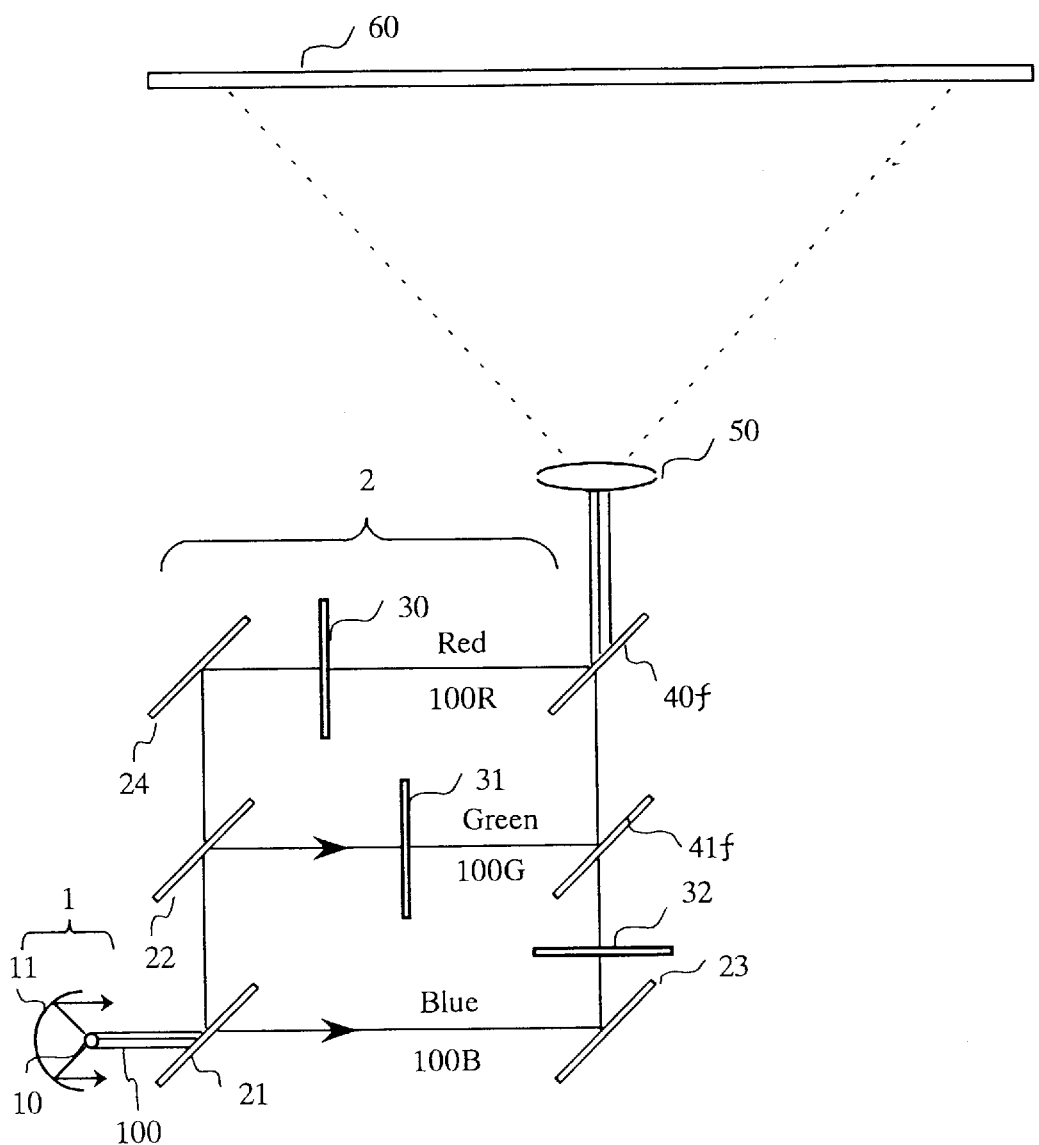

FIG. 119 shows the characteristic of the dichroic mirrors 40a and 41a. The separating dichroic mirror 40a reflects light having a frequency shown by a thick line in FIG. 119, to make the light be red light R. The synthesizing dichroic mirror 41a reflects light having a frequency shown by a fine line. Since the characteristics of the dichroic mirrors 40a and 41a are different, part R1 shown by lateral lines can be reflected by the dichroic mirror 41a, but part R2 shown by slanted lines can not be reflected and input into the liquid crystal panel for blue from the backside. Therefore, as shown in FIG. 118, the red light R output form the dichroic mirror 40a is filtered by the filter RF. The filter RF transmits light whose frequency is between F1 to F2 as shown in FIG. 120. Accordingly, the part R2 shown by the slanted lines has been already removed by the filter RF when the light is input into the cross dichroic mirror 41, which prevents the light from being transmitted through the dichroic mirror 41a.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An image generation apparatus comprising:
   a color processing part, and
   a polarization processing part, wherein the color processing part comprises:
   (a) a wavelength separating module
      including a first reflection surface for reflecting a light having a first wavelength, and a second reflection surface crossing the first reflection surface and reflecting a light having a second wavelength,
      for outputting three lights by reflecting the lights having the first wavelength and the second wavelength and transmitting a light having other wavelength;
   (b) a first, a second and a third optical modulators for respectively modulating the three lights output from the wavelength separating module, and for respectively outputting the three lights modulated by the first, the second and the third optical modulators;
   (c) a wavelength synthesizing module
      including a first reflection surface for reflecting a light having the first wavelength out of input lights and a second reflection surface for reflecting a light having the second wavelength out of input lights,
      for inputting the three lights modulated by the first, the second and the third optical modulators, for synthesizing the three lights to generate an image by reflecting the lights having the first wavelength and the second wavelength and transmitting a light having other wavelength, and for outputting a synthesized light made by synthesizing the three lights;
   (d) a first optical path connecting module for setting a first optical path between the wavelength separating module and the wavelength synthesizing module, and wherein the polarization processing part comprises:
   (e) a polarization separating module for inputting a light, separating the light into a first light and a second light, whose polarization directions are different, and outputting the first light to the wavelength separating module;
   (f) a fourth optical modulator for inputting the second light and an image signal, modulating polarization state of the input second light based on the image signal, and outputting a modulated light made by modulating the polarization state of the input second light based on the image signal;
   (g) a polarization synthesizing module for inputting the synthesized light output from the wavelength synthesizing module and the modulated light output from the fourth optical modulator, and for synthesizing the lights to generate an image; and
   (h) a second optical path connecting module, installed between the polarization separating module and the polarization synthesizing module, for setting a second optical path in order to lead the second light from the polarization separating module to the polarization synthesizing module through the fourth optical modulator.

2. An image generation apparatus comprising:
   a color processing part, and
   a polarization processing part, wherein the color processing part comprises:
   (a) a wavelength separating module
      including a first reflection surface for reflecting a light having a first wavelength, and a second reflection surface crossing the first reflection surface and reflecting a light having a second wavelength,
      for outputting three lights by reflecting the lights having the first wavelength and the second wavelength and transmitting a light having other wavelength;
   (b) a first, a second and a third optical modulators for respectively modulating the three lights output from the wavelength separating module, and for respectively outputting the three lights modulated by the first, the second and the third optical modulators;
   (c) a wavelength synthesizing module
      including a first reflection surface for reflecting a light having the first wavelength out of input lights and a second reflection surface for reflecting a light having the second wavelength out of input lights,
      for inputting the three lights modulated by the first, the second and the third optical modulators, for synthesizing the three lights to generate an image by reflecting the lights having the first wavelength and the second wavelength and transmitting light having other wavelength, and for outputting a synthesized light made by synthesizing the three lights;
   (d) at least one collective lens, provided between the wavelength separating module and the wavelength synthesizing module; and
   (e) a first optical path connecting module for setting an optical path including the at least one collective lens, between the wavelength separating module and the wavelength synthesizing module, wherein the polarization processing part comprises:

(f) a polarization separating module for inputting a light, separating the light into a first light and a second light, whose polarization directions are different, and outputting the first light to the wavelength separating module;

(g) a fourth optical modulator for inputting the second light and an image signal, modulating polarization state of the input second light based on the image signal, and outputting a modulated light made by modulating the polarization state of the input second light based on the image signal;

(h) a polarization synthesizing module for inputting the synthesized light output from the wavelength synthesizing module and the modulated light output from the fourth optical modulator, and for synthesizing the lights to generate an image; and (i) a second optical path connecting module, installed between the polarization separating module and the polarization synthesizing module, for setting a second optical path in order to lead the second light from the polarization separating module to the polarization synthesizing module through the fourth optical modulator.

3. An image generation apparatus comprising:

a color processing part, a polarization processing part, and a projection lens for projecting an image onto a screen, wherein the color processing part comprises:

(a) a first, a second and a third optical modulators for displaying color;

(b) a wavelength separating module, installed at light-input-side of the first, the second and the third optical modulators, for inputting a light, separating the light to three lights of a first light, a second light, and a third light, and outputting the three lights to the first, the second and the third optical modulators;

(c) a wavelength synthesizing module, installed at light-output-side of the first, the second and the third optical modulators, for inputting the three lights from the first, the second and the third optical modulators, for synthesizing the three lights to generate a synthesized light as the image, and for outputting the image; and (d) a first optical path connecting module including a reflecting mirror, for setting optical paths between the wavelength separating module and the first, the second and the third optical modulators, and between the wavelength synthesizing module and the first, the second and the third optical modulators, wherein the polarization processing part comprises:

(e) a polarization separating module for inputting a light, separating the light into a first light and a second light, whose polarization directions are different, and outputting the first light to the wavelength separating module;

(f) a fourth optical modulator for inputting the second light and an image signal, modulating polarization state of the input second light based on the image signal, and outputting a modulated light made by modulating the polarization state of the input second light based on the image signal;

(g) a polarization synthesizing module for inputting the synthesized light output from the wavelength synthesizing module and the modulated light output from the fourth optical modulator, and for synthesizing the lights to generate an image; and (h) a second optical path connecting module, installed between the polarization separating module and the polarization synthesizing module, for setting a second optical path in order to lead the second light from the polarization separating module to the polarization synthesizing module through the fourth optical modulator, wherein the image generation apparatus forms the image from the wavelength synthesizing module at an image forming position, whose distance from the projection lens is equal to distance between the projection lens and the fourth optical modulator, the image forming position located on an optical path between the wavelength synthesizing module and the projection lens.

4. The image generation apparatus of claim 1, 2 or 3 wherein the wavelength separating module inputs the first light output from the polarization processing part, and wherein the first, the second and the third optical modulators are installed at the first optical path of the first light, provided corresponding to three color signals of blue, green and red, and modulate three lights by the three color signals indicating strength of blue, green and red, and wherein the fourth optical modulator is provided for a monochromatic image.

5. The image generation apparatus of claim 4 wherein each of the first, the second and the third optical modulators in the color processing part is a STN type liquid crystal panel, and the fourth optical modulator in the polarization processing part is a TN type liquid crystal panel.

6. The image generation apparatus of claim 1, 2 or 3, further comprising a light source for projecting light and a lens for inputting light from the light source, and wherein the lens is a diverging lens whose outer circumference has a longer focal length than inner circumference.

7. The image generation apparatus of claim 1, 2 or 3 wherein the first optical modulator modulates a first color light, the second optical modulator modulates a second color light, and the third and the fourth optical modulators modulate a third color light, and the first optical modulator is a liquid crystal panel for red, the second optical modulator is a liquid crystal panel for blue, and the third and the fourth optical modulators are liquid crystal panels for green.

8. The image generation apparatus of claim 1, 2 or 3, further comprising a relay lens for equalizing size of image output from the fourth optical modulator and size of images output from the first to the third optical modulators.

9. The image generation apparatus of 1, 2 or 3, further comprising a light source for projecting light, a main reflecting mirror for reflecting light, and a collective lens, wherein the collective lens collects the light reflected from the main reflecting mirror to be a conical luminous flux and projects the conical luminous flux onto the optical modulator.

10. The image generation apparatus of claim 1, 2 or 3, further comprising a light source for projecting a light of conical luminous flux, and a lens installed at an entrance of light into the first optical path connecting module, for changing the conical luminous flux to a cylindrical luminous flux.

11. An image generation apparatus comprising:

an optical mixer, wherein the optical mixer includes:

(a) a first filter for reflecting a light having a first wavelength;

(b) a second filter, crossing the first filter, for reflecting a light having a second wavelength; and (c) a third filter, diagonally crossing both the first filter and the second filter, for reflecting a light having a specific polarization-direction and transmitting a light having other polarization-direction.

12. An image generation apparatus comprising:

a color processing part, wherein the color processing part comprises:

(a) a wavelength separating module
   including a first reflection surface for reflecting a light having a first wavelength and a second reflection surface crossing the first reflection surface at a diagonal line with the first reflection surface and reflecting a light having a second wavelength,
   for outputting three lights by reflecting the lights having the first wavelength and the second wavelength and transmitting a light having other wavelength;
(b) a first, a second and a third optical modulators for respectively modulating the three lights output from the wavelength separating module and for respectively outputting the three lights modulated by the first, the second and the third optical modulators;
(c) a wavelength synthesizing module
   including a first reflection surface for reflecting a light having the first wavelength out of input lights, and a second reflection surface crossing the first reflection surface at a diagonal line with the first reflection surface and for reflecting a light having the second wavelength out of input lights,
   for inputting the three lights modulated by the first, the second and the third optical modulators, and for synthesizing the three lights to generate an image by reflecting the lights having the first wavelength and the second wavelength and transmitting a light having other wavelength, wherein the wavelength synthesizing module is located offset from any direction of three dimensional directions of the wavelength separating module; and
(d) an optical path connecting module for setting an optical path between the wavelength separating module and the wavelength synthesizing module.

* * * * *